(12) United States Patent
Anderson et al.

(10) Patent No.: US 12,727,626 B2
(45) Date of Patent: Sep. 8, 2026

(54) VAPORIZER DEVICE WITH SUBASSEMBLIES

(71) Applicant: JUUL Labs, Inc., Washington, DC (US)

(72) Inventors: Samuel C. Anderson, San Francisco, CA (US); Wei-Ling Chang, San Francisco, CA (US); Brandon Cheung, San Francisco, CA (US); Steven Christensen, San Mateo, CA (US); Joseph Chun, El Dorado Hills, CA (US); Joseph R. Fisher, Jr., Santa Cruz, CA (US); Nicholas J. Hatton, Oakland, CA (US); Kevin Lomeli, San Francisco, CA (US); James Monsees, San Francisco, CA (US); Andrew L. Murphy, San Francisco, CA (US); Claire O'Malley, San Francisco, CA (US); John R. Pelochino, Portland, OR (US); Hugh Pham, San Jose, CA (US); Vipul V. Rahane, Sunnyvale, CA (US); Matthew J. Taschner, Alemeda, CA (US); Val Valentine, San Francisco, CA (US); Kenneth Wong, San Jose, CA (US)

(73) Assignee: JUUL Labs, Inc., Washington, DC (US)

( * ) Notice: Subject to any disclaimer, the term of this patent is extended or adjusted under 35 U.S.C. 154(b) by 11 days.

(21) Appl. No.: 18/624,046

(22) Filed: Apr. 1, 2024

(65) Prior Publication Data

US 2025/0000178 A1 Jan. 2, 2025

Related U.S. Application Data

(63) Continuation of application No. 17/134,075, filed on Dec. 24, 2020, now Pat. No. 11,944,130, which is a (Continued)

(51) Int. Cl.
*A24F 40/90* (2020.01)
*H01R 13/62* (2006.01)

(Continued)

(52) U.S. Cl.
CPC ......... *A24F 40/90* (2020.01); *H01R 13/6205* (2013.01); *H01R 13/6683* (2013.01);

(Continued)

(58) Field of Classification Search
CPC ..... A24F 40/90; H01R 13/6205; H01R 43/26; H02J 7/0045
See application file for complete search history.

(56) References Cited

U.S. PATENT DOCUMENTS

| | | | |
|---|---|---|---|
| 8,998,632 | B2 | 4/2015 | Golko et al. |
| 9,877,521 | B1 | 1/2018 | Gillis |

(Continued)

FOREIGN PATENT DOCUMENTS

| | | | |
|---|---|---|---|
| CA | 3009050 | A1 | 6/2017 |
| CN | 102160906 | A | 8/2011 |

(Continued)

*Primary Examiner* — Hae Moon Hyeon

(57) ABSTRACT

A vaporizer device includes an outer shell and a skeleton forming a rigid tray located within the outer shell of the vaporizer device. The rigid tray includes a back wall, a first side wall extending from a first side of the back wall, and a second side wall extending from a second side of the back wall. The second side wall is approximately parallel to the first side wall, wherein the back wall, the first side wall, and the second side wall define an interior volume. The vaporizer device includes a power source and electrical circuitry electrically coupled to the power source for supplying power to a vaporizer cartridge coupled to the vaporizer device. The power source and the electrical circuitry are secured to the skeleton and at least partially positioned within the interior volume.

19 Claims, 86 Drawing Sheets

Related U.S. Application Data continuation of application No. 16/455,680, filed on Jun. 27, 2019, now Pat. No. 10,888,125, which is a continuation-in-part of application No. 16/455,629, filed on Jun. 27, 2019, and a continuation-in-part of application No. 16/449,278, filed on Jun. 21, 2019, now Pat. No. 10,986,875.

(60) Provisional application No. 62/824,725, filed on Mar. 27, 2019, provisional application No. 62/801,033, filed on Feb. 4, 2019, provisional application No. 62/793,889, filed on Jan. 17, 2019, provisional application No. 62/780,898, filed on Dec. 17, 2018, provisional application No. 62/760,918, filed on Nov. 13, 2018, provisional application No. 62/690,946, filed on Jun. 27, 2018, provisional application No. 62/690,947, filed on Jun. 27, 2018.

(51) Int. Cl.
*H01R 13/66* (2006.01)
*H01R 43/26* (2006.01)
*H02J 7/70* (2026.01)

(52) U.S. Cl.
CPC .............. *H01R 43/26* (2013.01); *H02J 7/751* (2026.01); *H02J 7/70* (2026.01)

(56) References Cited

U.S. PATENT DOCUMENTS 9,974,338 B2 * 5/2018 Alarcon .................. A24F 40/50
10,888,125 B2 * 1/2021 Anderson .......... H01R 13/6205
11,632,983 B2 * 4/2023 Fu ........................... A24F 40/40 131/328
11,944,130 B2 * 4/2024 Anderson ............. H02J 7/0045
2014/0014124 A1 1/2014 Eco-Cigs
2015/0020831 A1 1/2015 Weigensberg et al.
2015/0101625 A1 4/2015 Newton et al.
2015/0114409 A1 4/2015 Brammer et al.
2015/0142387 A1 5/2015 Alarcon et al.
2015/0181944 A1 7/2015 Li et al.
2015/0245658 A1 9/2015 Worm et al.
2015/0313287 A1 11/2015 Verleur et al.
2016/0021930 A1 1/2016 Minskoff et al.
2016/0143364 A1 5/2016 DePiano et al.
2016/0198770 A1 7/2016 Alarcon
2016/0249680 A1 9/2016 Liu
2016/0262454 A1 9/2016 Sears et al.
2016/0278436 A1 9/2016 Verleur et al.
2016/0366938 A1 12/2016 Wu
2016/0366947 A1 12/2016 Monsees et al.
2016/0374399 A1 12/2016 Monsees et al.
2017/0080861 A1 3/2017 Vora et al.
2017/0157341 A1 6/2017 Pandya et al.
2017/0245554 A1 8/2017 Digirettes
2017/0258133 A1 9/2017 Rai
2018/0020728 A1 * 1/2018 Alarcon ................ A61M 15/06 392/404
2018/0020731 A1 1/2018 Rasmussen et al.
2018/0020736 A1 1/2018 Silvestrini et al.
2018/0027878 A1 2/2018 Dendy et al.
2018/0049478 A1 2/2018 Rai
2018/0070636 A1 3/2018 Ruscio et al.
2018/0077967 A1 3/2018 Hatton et al.
2018/0213844 A1 8/2018 Sur et al.
2019/0037926 A1 2/2019 Qiu
2019/0098931 A1 4/2019 Leadley et al.
2019/0099561 A1 4/2019 Nettenstrom
2019/0159519 A1 5/2019 Bowen et al.
2019/0166913 A1 6/2019 Trzecieski
2019/0246693 A1 8/2019 Nettenstrom et al.
2019/0364968 A1 * 12/2019 Fu ............................ H02J 7/00
2021/0251302 A1 8/2021 Timbs
2022/0022537 A1 1/2022 Murray et al.

FOREIGN PATENT DOCUMENTS

CN 102612361 A 7/2012
CN 203851805 U 10/2014
CN 204519354 U 8/2015
CN 204670389 U 9/2015
CN 106343611 A 1/2017
CN 106686995 A 5/2017
CN 206293499 U 6/2017
CN 107072322 A 8/2017
CN 107205492 A 9/2017
CN 206978737 U 2/2018
CN 212574135 U 2/2021
EP 2835063 A1 2/2015
EP 2875741 A2 5/2015
EP 3132698 A1 2/2017
EP 3708011 A1 9/2020
GB 2468932 A 9/2010
GB 2507102 A 4/2014
GB 2540135 A 1/2017
GB 2542010 A 3/2017
GB 2550540 A 11/2017
JP 2019515655 A 6/2019
KR 10-2018-0117654 A 10/2018
RU 61096 U1 2/2007
WO WO-2013093695 A1 6/2013
WO WO-2014066730 A1 5/2014
WO WO-2015190810 A1 12/2015
WO WO-2016186859 A1 11/2016
WO WO-2017137512 A1 8/2017
WO WO-2017176111 A1 10/2017
WO WO-2018041450 A1 3/2018
WO WO-2018068602 A1 4/2018
WO WO-2018076680 A1 5/2018
WO WO-2018202730 A1 11/2018
WO WO-2019223116 A1 11/2019
WO WO-2019232086 A1 12/2019
WO WO-2020117338 A1 6/2020

* cited by examiner

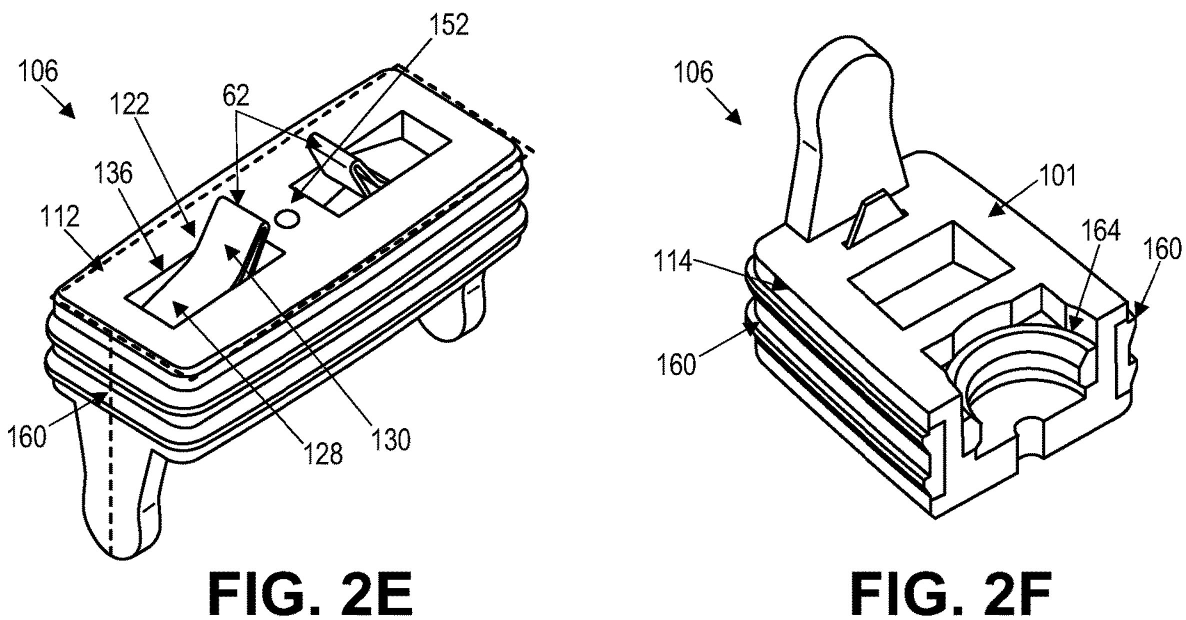
FIG. 2E
FIG. 2F
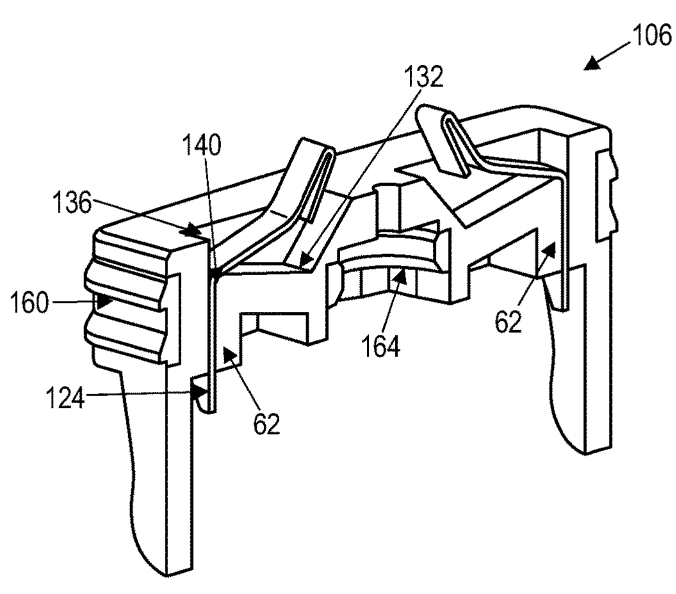
FIG. 2G

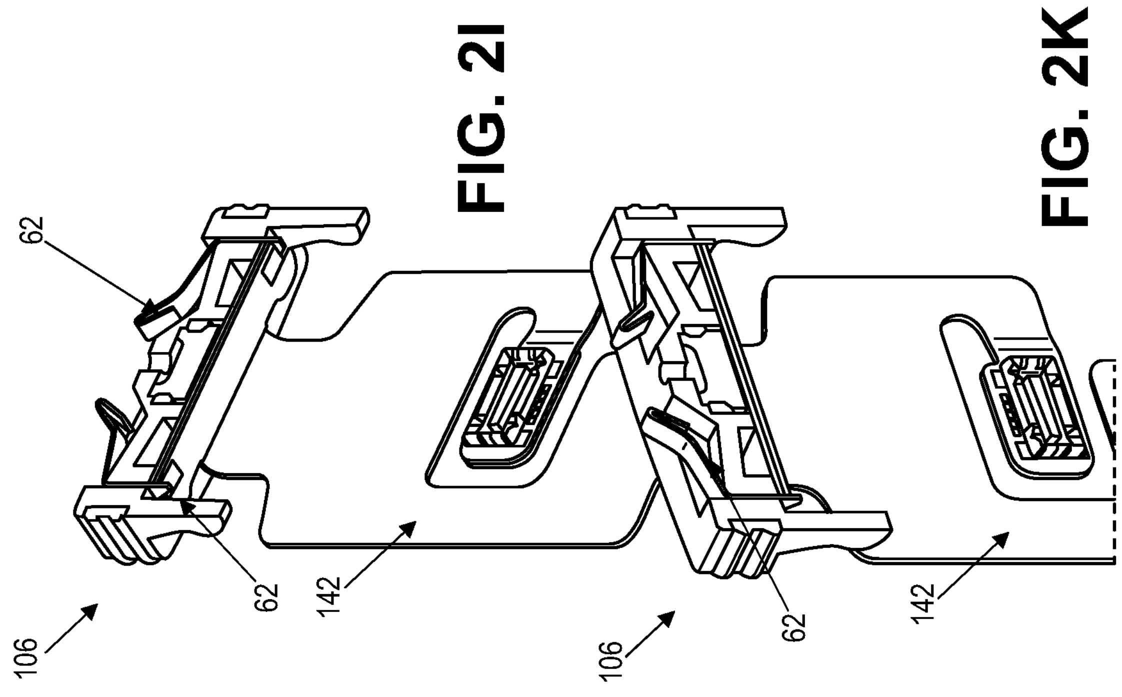
FIG. 2I
62
62
142
106
FIG. 2K
62
142
106
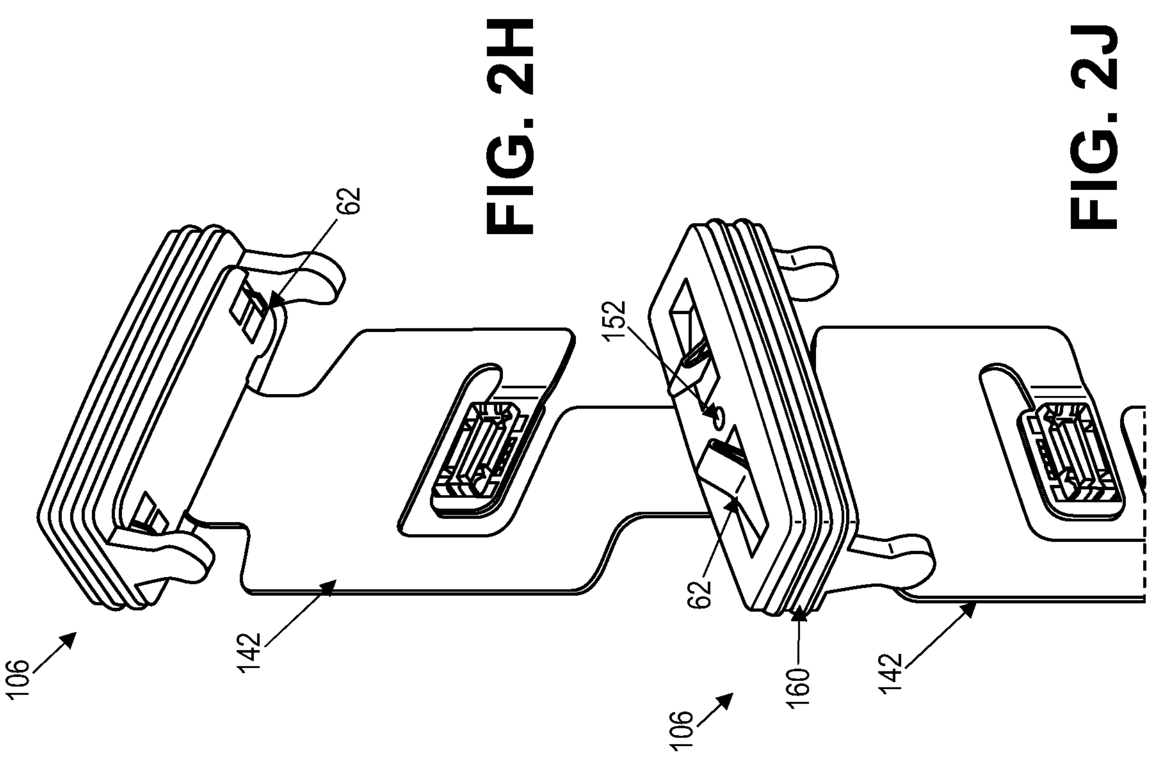
FIG. 2H
62
142
106
FIG. 2J
152
62
160
142
106

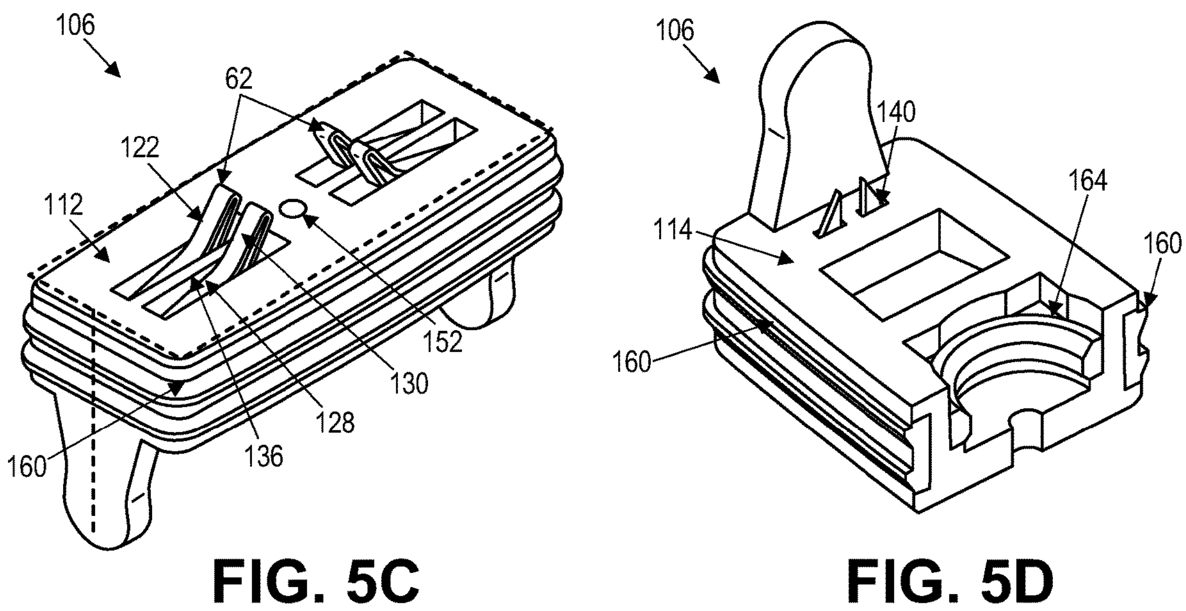
FIG. 5C
FIG. 5D
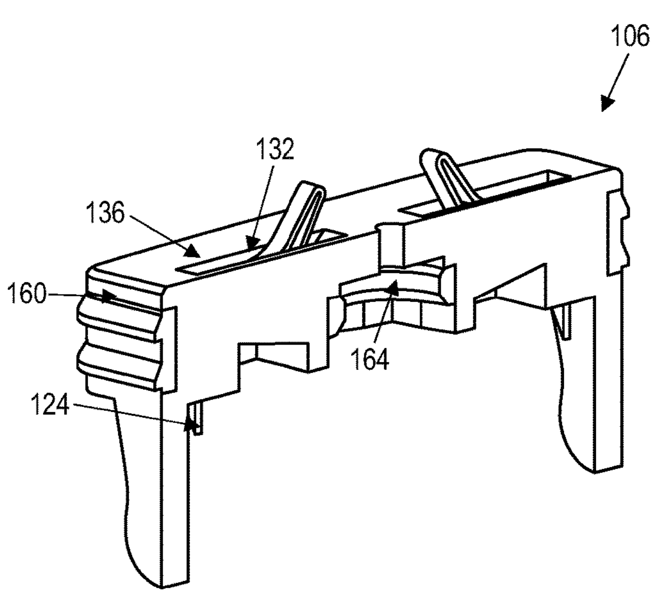
FIG. 5E

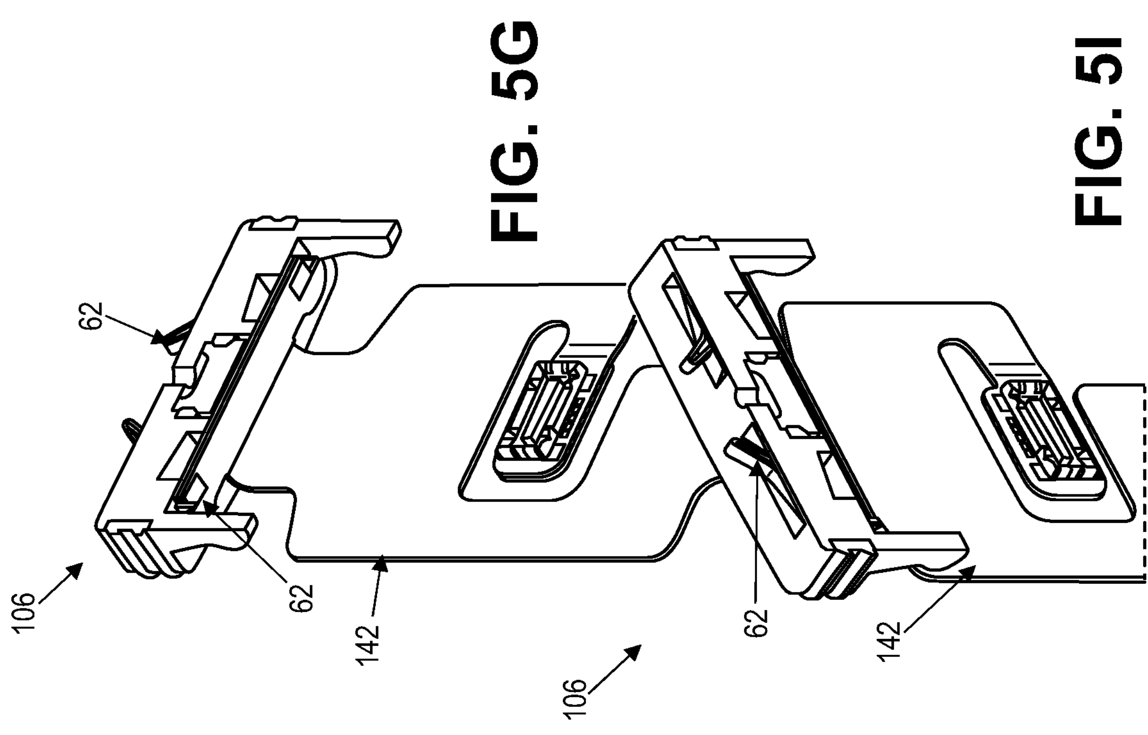
FIG. 5G
FIG. 5I
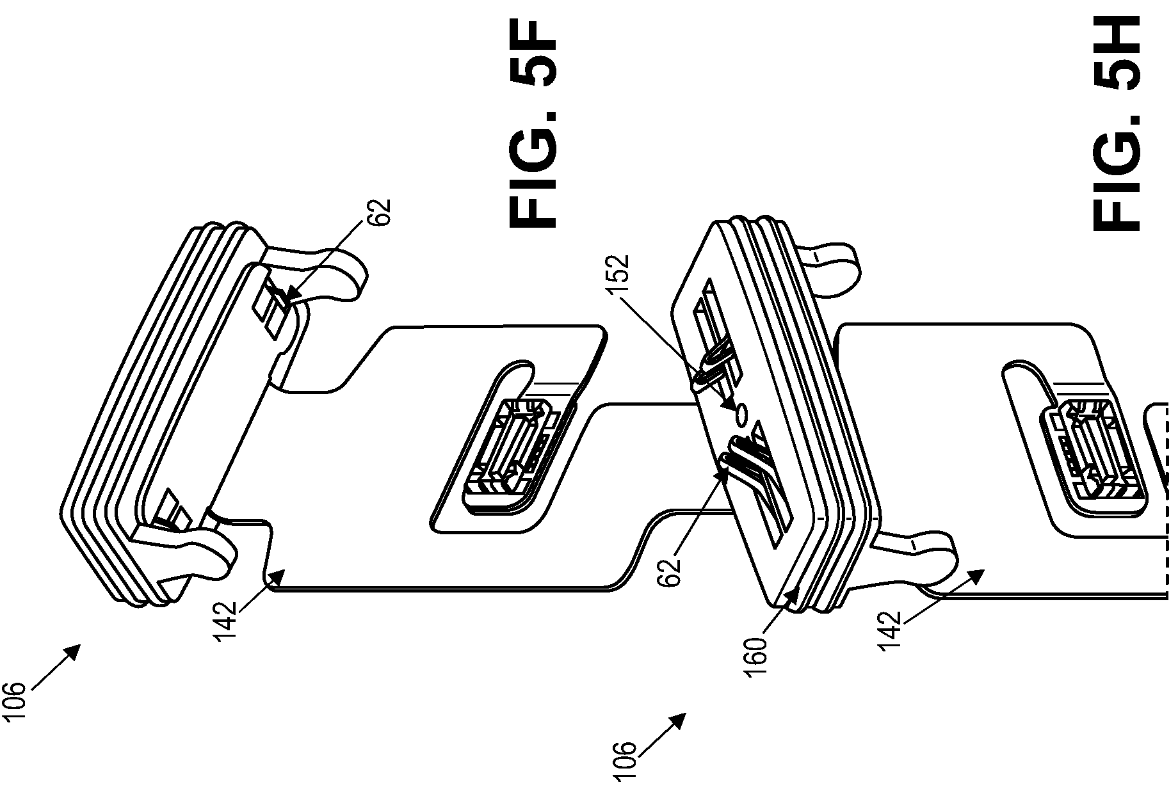
FIG. 5F
FIG. 5H 554
538
552
534
550
502
520
524
526
532
530

102
406
510
508
504
512
502
450

3004
3010
3012
3050

3012
62
69
3029
3002
19
8
3050

4000
Vaporizer device body 4001
Charger 4033
Power Source 4003
Input 4017
Sensor 4037
Output 4015
Controller 4005
Wireless circuit 4007
Memory 4025
4011
4013
4009
4021
4023
4019
Cartridge 4014
Identifier 4038
Heater 4018
Reservoir 4020
Mouthpiece 4044

4001
4014
4044
4020
4052
4054

4000
4001
4014
4044

VAPORIZER DEVICE WITH SUBASSEMBLIES

CROSS-REFERENCE TO RELATED APPLICATIONS

This application is a continuation of U.S. application Ser. No. 17/134,075, filed on Dec. 24, 2020, and titled "VAPORIZER DEVICE WITH SUBASSEMBLIES," which is a continuation of U.S. application Ser. No. 16/455,680, filed on Jun. 27, 2019, and titled "VAPORIZER DEVICE WITH SUBASSEMBLIES," which claims priority to U.S. Provisional Application No. 62/690,946, filed on Jun. 27, 2018, and titled "VAPORIZER DEVICE," U.S. Provisional Application No. 62/780,898, filed on Dec. 17, 2018, and titled "VAPORIZER DEVICE," U.S. Provisional Application No. 62/801,033, filed on Feb. 4, 2019, and titled "VAPORIZER DEVICE," U.S. Provisional Application No. 62/690,947, filed on Jun. 27, 2018, and titled "CONNECTED VAPORIZER DEVICE SYSTEMS," U.S. Provisional Application No. 62/760,918, filed on Nov. 13, 2018, and titled "CONNECTED VAPORIZER DEVICE SYSTEMS," U.S. Provisional Application No. 62/793,889, filed on Jan. 17, 2019, and titled "CONNECTED VAPORIZER DEVICE SYSTEMS," and U.S. Provisional Application No. 62/824,725, filed on Mar. 27, 2019, and titled "CONNECTED VAPORIZER DEVICE SYSTEMS," is a continuation-in-part of U.S. application Ser. No. 16/455,629, filed on Jun. 27, 2019, and titled "CONNECTED VAPORIZER DEVICE SYSTEMS," and is a continuation-in-part of U.S. application Ser. No. 16/449,278, filed on Jun. 21, 2019, and titled "VAPORIZER DEVICE HEATER CONTROL," the entirety of each of which is incorporated by reference herein.

BACKGROUND

Vaporizing devices, including electronic vaporizers or e-vaporizer devices, allow the delivery of vapor containing one or more active ingredients by inhalation of the vapor. Electronic vaporizer devices are gaining increasing popularity both for prescriptive medical use, in delivering medicaments, and for consumption of tobacco and other plant-based smokeable materials, such as cannabis, including solid (e.g., loose-leaf) materials, solid/liquid (e.g., suspensions, liquid-coated) materials, wax extracts, and prefilled pods (cartridges, wrapped containers, etc.) of such materials. Electronic vaporizer devices in particular may be portable, self-contained, and convenient for use.

SUMMARY

Aspects of the current subject matter relate to a vaporizer device for generating inhalable vapor.

In some variations, one or more of the following features described in the following paragraphs may optionally be included in any feasible combination.

In some implementations, a vaporizer device may include a first subassembly, a second subassembly, and a third subassembly. The first subassembly, the second subassembly, and the third subassembly may form modular components that are may be assembled and at least partially fit within an outer shell of the vaporizer device. The first subassembly may include a cartridge connector. The cartridge connector may secure a vaporizer cartridge to the vaporizer device. The cartridge connector may include a cartridge connector body and at least two receptacle contacts coupled to the cartridge connector body. The at least two receptacle contacts may electrically communicate with the vaporizer cartridge. The second subassembly may include a skeleton defining a rigid tray. The rigid tray may retain a power source. The third subassembly may include a plurality of charging contacts and an end cap. The plurality of charging contacts may supply power to the power source. The end cap may enclose one end of the vaporizer device. The end cap may include a plurality of openings to allow the plurality of charging contacts to couple to an external power supply.

In some variations, the skeleton includes a first end and a second end. The second end may be opposite the first end. The first subassembly may be coupleable to the first end of the skeleton and the third subassembly may be coupleable to the second end of the skeleton. In some variations, the first subassembly is coupleable to the second subassembly via a snap-fit arrangement. In some variations, the third subassembly is coupleable to the second subassembly via a snap-fit arrangement.

In some variations, the third subassembly includes a light source. The light source may indicate a state of the device. In some variations, the third subassembly includes an antenna. The antenna may wirelessly communicate with an external device. In some variations, the third subassembly includes a magnet. The magnet may magnetically couple the vaporizer device to the external power supply.

In some variations, the cartridge connector includes a sidewall connection feature. In some variations, the skeleton includes a protrusion member that may securably engage with the sidewall connection feature. In some variations, the cartridge connector includes a pressure sensor.

In some variations, a method of assembling the vaporizer device includes coupling the first subassembly to a first end of the second subassembly. The method may further include coupling the third subassembly to a second end of the second subassembly. The second end may be opposite the first end. The method may also include positioning at least a portion of the first subassembly, the second subassembly, and the third subassembly within the outer shell.

In some variations, the method may include coupling the cartridge connector to the outer shell via a snap-fit arrangement to secure the first subassembly, the second subassembly, and the third subassembly to the outer shell.

In some implementations, a method of assembling a vaporizer device may include coupling a first subassembly to a first end of a second subassembly. The first subassembly may include a cartridge connector that may secure a vaporizer cartridge to the vaporizer device. The cartridge connector may include a cartridge connector body and at least two receptacle contacts coupled to the cartridge connector body. The at least two receptacle contacts may electrically communicate with the vaporizer cartridge. The second subassembly may include a skeleton defining a rigid tray that may retain a power source. The method may also include coupling the third subassembly to a second end of the second subassembly. The second end may be opposite the first end. The third subassembly may include a plurality of charging contacts and an end cap. The plurality of charging contacts may supply power to the power source. The end cap may enclose one end of the vaporizer device. The end cap may include a plurality of openings to allow the plurality of charging contacts to couple to an external power supply. The method may further include positioning at least a portion of the first subassembly, the second subassembly, and the third subassembly within the outer shell. Each of the first subassembly, the second subassembly, and the third subassembly may form modular components.

In some variations, the skeleton includes a first skeleton end and a second skeleton end opposite the first skeleton end. The first subassembly may be coupleable to the first skeleton end and the third subassembly may be coupleable to the second skeleton end.

In some variations, the method further includes engaging a sidewall connection feature of the cartridge connector with a protrusion member of the skeleton to couple the first subassembly with the second subassembly.

In some implementations, a cartridge connector for securing a vaporizer cartridge to a vaporizer body may include a cartridge connector body and at least four receptacle contacts. The vaporizer body may include an outer shell and a cartridge receptacle. The cartridge receptacle may receive the vaporizer cartridge. The cartridge connector body may include a first side and a second side opposite the first side. The at least four receptacle contacts may extend from the first side of the cartridge connector body. The at least four receptacle contacts may electrically communicate with the vaporizer cartridge and supply power to the vaporizer cartridge. The cartridge connector may secure the vaporizer cartridge within the cartridge receptacle on the first side of the cartridge connector. The cartridge connector may be coupled to the outer shell of the vaporizer body on the second side of the cartridge connector.

In some variations, at least a portion of each of the at least four receptacle contacts may deflect towards the cartridge connector body when the vaporizer cartridge is coupled to the cartridge connector. In some variations, the receptacle contacts may measure a resistance of a heating element of the vaporizer cartridge to control a temperature of the heating element.

In some variations, the cartridge connector includes a pressure sensor. In some variations, the pressure sensor is centrally aligned between two opposing dimensions of the cartridge connector, in line with an airflow path. In some variations, the pressure sensor is positioned on the second side of the cartridge connector body. In some variations, the cartridge connector further includes a pressure sensor recess. The pressure sensor recess may receive the pressure sensor. The pressure sensor recess may be positioned on the second side of the cartridge connector body.

In some variations, the cartridge connector further includes a sealing mechanism. The scaling mechanism may include a first portion and a second portion. The first portion may extend about an exterior surface of the cartridge connector body. The second portion may extend about a pressure sensor recess that may receive a pressure sensor. In some variations, the first portion and the second portion are integrally formed. In some variations, the exterior surface of the cartridge connector body is approximately perpendicular to the pressure sensor recess. In some variations, the cartridge connector body includes a recess extending around the exterior surface. The first portion of the scaling mechanism may be at least partially located within the recess. In some variations, the first portion includes a ribbed portion. In some variations, the ribbed portion includes at least one rib. In some variations, the cartridge connector is separable from the outer shell.

In some variations, the cartridge connector further includes a retaining feature that may couple the cartridge connector to the outer shell. In some variations, the retaining feature includes a longitudinal member, a lateral member, a first side leg, a second side leg, and a central leg. The lateral member may be aligned perpendicular relative to the longitudinal member. The lateral member may include a first end portion and a second end portion. The first side leg may extend outwardly from the first end portion. The second side leg may extend outwardly from the second end portion. The central leg may extend from the lateral member. The retaining feature may optionally be selectively coupled to a corresponding receiving feature on an interior of the outer shell.

In some variations, at least a portion of the first side leg and at least a portion of the second side leg may be injection molded with the cartridge connector body.

In some implementations, a vaporizer device may include a vaporizer cartridge and a vaporizer body. The vaporizer cartridge may include a mouthpiece, a reservoir, a wicking element, and a heating element. The heating element may vaporize vaporizable material stored within the reservoir. The vaporizer body may include an outer shell, a cartridge receptacle that may receive the vaporizer cartridge and a cartridge connector. The cartridge connector body may include a first side and a second side opposite the first side. The cartridge connector may also include at least four receptacle contacts extending from the first side of the cartridge connector body. The at least four receptacle contacts may electrically communicate with the vaporizer cartridge and supply power to the vaporizer cartridge. The cartridge connector may secure the vaporizer cartridge within the cartridge receptacle on the first side of the cartridge connector. The cartridge connector may be coupled to the outer shell of the vaporizer device on the second side of the cartridge connector.

In some variations, the receptacle contacts are may measure a resistance of the heating element of the vaporizer cartridge to control a temperature of the heating element. In some variations, the cartridge connector includes a pressure sensor centrally aligned between two opposing dimensions of the cartridge connector, in line with an airflow path.

In some implementations, a vaporizer device include a vaporizer cartridge and a vaporizer body. The vaporizer cartridge may include a mouthpiece, a reservoir, a wicking element, and a heating element that may vaporize vaporizable material stored within the reservoir.

The vaporizer body may include a cartridge receptacle, a plurality of charging contacts, and a light source. The cartridge receptacle may be positioned at a proximal end of the vaporizer body. The cartridge receptacle may receive at least a portion of the vaporizer cartridge. The plurality of charging contacts may be positioned at a distal end of the vaporizer body. The plurality of charging contacts may receive power from an external power supply. The light source may be located closer to the distal end of the vaporizer body than the proximal end of the vaporizer body. The light source may indicate one or more of a state of the device and an action.

In some variations, the light source includes at least two illuminating devices. In some variations, each of the at least two illuminating devices includes at least one LED. In some variations, the light source includes at least five illuminating devices. In some variations, the vaporizer body further includes an opening through which the light source is visible. In some variations, the opening includes a pill-shape. In some variations, the opening includes a first side, a second side approximately parallel to the first side, a third side may extend between the first side and the second side, and a fourth side may extend between the first side and the second side. Each of the first side and the second side may be longer than each of the third side and the fourth side. In some variations, each of the at least two illuminating devices are separated from one another.

In some variations, the vaporizer body optionally includes an outer shell and an end cap. The outer shell may extend from the proximal end towards the distal end. The cartridge receptacle may be located within the outer shell. The end cap may extend from the distal end towards the proximal end. The end cap may optionally interface with the outer shell. The end cap may include a plurality of openings. The plurality of charging contacts may be accessible through the plurality of openings. In some variations, the light source is may be visible through an opening located at an intersection formed between the outer shell and the end cap.

In some variations, each of the plurality of charging contacts is accessible through a corresponding charging contact opening formed in a distal side of the vaporizer body. In some variations, the corresponding charging contact opening is rounded. In some variations, the corresponding charging contact opening is circular.

In some variations, an outer surface of the at least two illuminating devices is aligned with an exterior surface of the vaporizer body. In some variations, an outer surface of the at least two illuminating device is positioned inset relative to an exterior surface of the vaporizer body. In some variations, an outer surface of the plurality of charging contacts is aligned with an exterior surface of the vaporizer body. In some variations, an outer surface of the plurality of charging contacts is positioned inset relative to an exterior surface of the vaporizer body.

In some implementations, a vaporizer device may include a skeleton. The skeleton may form a rigid tray. The skeleton may be located within an outer shell of the vaporizer device. The rigid tray may include a back wall, a first side wall extending from a first side of the back wall, and a second side wall extending from a second side of the back wall. The second side wall may be approximately parallel to the first side wall. The back wall, the first side wall, and the second side wall may define an interior volume. In some variations, electrical circuitry and a power source for supplying power to a vaporizer cartridge coupled to the vaporizer device may be at least partially secured within the interior volume.

In some variations, the first side wall may include a first retainer spring at a first end portion of the first side wall. The first retainer spring may secure a cartridge connector to the skeleton. The cartridge connector may be coupleable to the vaporizer cartridge. In some variations, the second side wall includes a second retainer spring at a second end portion of the second side wall. The second retainer spring may secure the cartridge connector to the skeleton. In some variations, the first retainer spring and the second retainer spring extends towards the interior volume. In some variations, the first retainer spring and the second retainer spring are biased towards the interior volume. In some variations, the first retainer spring and the second retainer spring are each securable to the cartridge connector via a snap-fit arrangement.

In some variations, the skeleton further includes a first end and a second end opposite the first end. A cartridge connector of the vaporizer device may be coupled to the first end. The cartridge connector may be coupleable to the vaporizer cartridge. In some variations, an end cap module of the vaporizer device may be coupled to the second end of the skeleton. The end cap module may include charging contacts may supply power to the power source. In some variations, the skeleton further includes a securement member. The securement member may extend from the first side wall and the second side wall to at least partially surround the interior volume. The securement member may surround at least a portion of the cartridge connector that is located within the interior volume.

In some implementations, a vaporizer device includes a vaporizer cartridge and a vaporizer body. The vaporizer cartridge may include a mouthpiece, a reservoir, a wicking element, and a heating element that may vaporize vaporizable material stored within the reservoir.

The vaporizer body may include an outer shell, a power source for supplying power to the vaporizer cartridge, and the skeleton forming the rigid tray.

In some implementations, a vaporizer device may include an outer shell and an end cap subassembly. The end cap subassembly may include a plurality of charging contacts and an end cap. The plurality of charging contacts may supply power to the power source. The end cap may enclose one end of the vaporizer device. The end cap may include a plurality of openings to allow the plurality of charging contacts to couple to an external power supply.

In some variations, at least a portion of the end cap subassembly is positioned within the outer shell. In some variations, at least a portion of the end cap subassembly is positioned outside of the outer shell.

In some variations, the end cap subassembly further includes a light source may indicate a state of the device. In some variations, the light source includes at least two illuminating devices. In some variations, each of the at least two illuminating devices includes at least one LED. In some variations, the light source includes at least five illuminating devices. In some variations, each of the at least two illuminating devices are separated from one another.

In some variations, the end cap further includes a recess that may allow a light source to be visible through the recess. In some variations, an outer surface of the light source is aligned with an exterior surface of the outer shell. In some variations, an outer surface of the light source is positioned inset relative to an exterior surface of the outer shell.

In some variations, the plurality of openings are rounded. In some variations, the plurality of charging contact openings are circular. In some variations, the end cap subassembly further includes an antenna. The antenna may wirelessly communicate with an external device.

In some variations, the end cap subassembly further includes an antenna carrier. The antenna carrier may support the antenna. The antenna carrier may isolate the antenna and the plurality of charging contacts from the outer shell to thereby improve antenna performance. In some variations, the antenna wraps around a side wall of the antenna carrier.

In some variations, the end cap subassembly further includes a magnet that may magnetically couple the vaporizer device to the external power supply. In some variations, the end cap subassembly further includes an anterior carrier that supports the magnet. The antenna carrier may space the magnet apart from the antenna and apart from the plurality of charging contacts, to thereby improve antenna performance.

In some implementations, a vaporizer device may include a vaporizer cartridge and a vaporizer body. The vaporizer cartridge may include a mouthpiece, a reservoir, a wicking element, and a heating element that may vaporize vaporizable material stored within the reservoir.

The vaporizer body may include an outer shell, and an end cap subassembly. The end cap subassembly may include a plurality of charging contacts that may supply power to the power source. The end cap subassembly may also include an end cap that may enclose one end of the vaporizer body. The end cap may include a plurality of openings to allow the plurality of charging contacts to couple to an external power supply.

In some implementations, a vaporizer device includes a vaporizer cartridge and a vaporizer body. The vaporizer cartridge may include a mouthpiece, a reservoir, a wicking element, and a heating element that may vaporize vaporizable material stored within the reservoir. The vaporizer body may include a cartridge connector, a charging contact, a primary circuit board, and a secondary circuit board. The cartridge connector may include at least two receptacle contacts. The at least two receptacle contacts may be positioned on a first side of the cartridge connector and may supply power from a power source to the vaporizer cartridge. The charging contact may supply power from an external power supply to the power source. The primary circuit board may be positioned proximate to the charging contact. The primary circuit board may control one or more operations of the vaporizer device. The secondary circuit board may be electrically coupled with the primary circuit board. The secondary circuit board may be positioned proximate to a second side of the cartridge connector, for example, to at least remotely control an amount of power supplied from the power source to the vaporizer cartridge.

In some variations, the vaporizer body further includes a cartridge receptacle positioned at a first end of the vaporizer body. The at least two receptacle contacts may be positioned within the cartridge receptacle. The cartridge receptacle may receive the vaporizer cartridge. In some variations, the charging contact may be positioned proximate to a second end of the vaporizer body. The first end may be located opposite to the first end.

In some variations, the secondary circuit board is electrically coupled to a portion of each of the at least two receptacle contacts. In some variations, the secondary circuit board includes at least two slots. Each of the at least two slots may correspond to the portion of each of the at least two receptacle contacts. The secondary circuit board may be electrically coupled to the portion of each of the at least two receptacle contacts at each of the at least two slots.

In some variations, the secondary circuit board is nested against the second side of the cartridge connector. In some variations, the cartridge connector includes a pressure sensor. The secondary circuit board may contact the pressure sensor.

In some variations, the secondary circuit board includes a thermoprotection feature. In some variations, the thermoprotection feature limits or prevents the power source from supplying power to the vaporizer cartridge. In some variations, the thermoprotection feature limits or prevents the power source from supplying power to the vaporizer cartridge when the thermoprotection feature detects a temperature of the power source that is greater than or equal to a threshold temperature. In some variations, the primary circuit board is a printed circuit board assembly.

In some implementations, a vaporizer device includes a cartridge connector and a pressure sensor. The cartridge connector may be coupled to a vaporizer cartridge on a first side of the cartridge connector. The pressure sensor may be positioned on a second side of the cartridge connector. The second side may be opposite the first side. The pressure sensor may be positioned along a longitudinal axis that may extend through a center of the vaporizer device from at least the first side to the second side of the cartridge connector.

In some variations, the cartridge connector includes a pressure sensor port. The pressure sensor port may be centrally aligned along the longitudinal axis. The pressure sensor portion may extend between the first side and the second side of the cartridge connector. The pressure sensor port may define an airflow path.

In some variations, the cartridge connector may further include a pressure sensor recess. The pressure sensor recess may receive the pressure sensor. The pressure sensor recess may be positioned on the second side of the cartridge connector. In some variations, the vaporizer device further includes a gasket at least partially positioned within the pressure sensor recess. The gasket may at least partially surround the pressure sensor. In some variations, the gasket includes a portion that extends about an exterior surface of the cartridge connector. In some variations, the exterior surface of the cartridge connector is approximately perpendicular to the pressure sensor recess. In some variations, the pressure sensor recess is circular.

In some variations, the cartridge connector further includes at least two receptacle contacts. The at least two receptacle contacts may electrically communicate with the vaporizer cartridge. In some variations, the vaporizer device may include a transverse axis that is perpendicular to the longitudinal axis. Each of the at least two receptacle contacts may be positioned offset from the longitudinal axis and the transverse axis.

In some variations, the cartridge connector may secure the vaporizer cartridge within a cartridge receptacle of the vaporizer device on the first side of the cartridge connector. In some variations, the cartridge connector may be coupled to an outer shell of the vaporizer device on the second side of the cartridge connector.

In some implementations, a vaporizer device may include a vaporizer cartridge and a vaporizer body. The vaporizer cartridge may include a mouthpiece, a reservoir, a wicking element, and a heating element that may vaporize vaporizable material stored within the reservoir. The vaporizer body may include the cartridge connector and the pressure sensor. The cartridge connector may be coupled to the vaporizer cartridge on a first side of the cartridge connector. The pressure sensor may be positioned on a second side of the cartridge connector. The second side may be opposite the first side. The pressure sensor may be positioned along a longitudinal axis that may extend through a center of the vaporizer device from at least the first side to the second side of the cartridge connector.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 2E shows a perspective view of a cartridge connector consistent with implementations of the current subject matter;

FIG. 2F shows a perspective cross-sectional view of a cartridge connector consistent with implementations of the current subject matter;

FIG. 2G shows a perspective cross-sectional view of a cartridge connector consistent with implementations of the current subject matter;

FIG. 2H shows a perspective view of a cartridge connector and a circuit board consistent with implementations of the current subject matter;

FIG. 2I shows a perspective cross-sectional view of a cartridge connector and a circuit board consistent with implementations of the current subject matter;

FIG. 2J shows a perspective view of a cartridge connector and a circuit board consistent with implementations of the current subject matter;

FIG. 2K shows a perspective cross-sectional view of a cartridge connector and a circuit board consistent with implementations of the current subject matter;

FIG. 5C shows a perspective view of a cartridge connector consistent with implementations of the current subject matter;

FIG. 5D shows a perspective cross-sectional view of a cartridge connector consistent with implementations of the current subject matter;

FIG. 5E shows a perspective cross-sectional view of a cartridge connector consistent with implementations of the current subject matter;

FIG. 5F shows a perspective view of a cartridge connector and a circuit board consistent with implementations of the current subject matter;

FIG. 5G shows a perspective cross-sectional view of a cartridge connector and a circuit board consistent with implementations of the current subject matter;

FIG. 5H shows a perspective view of a cartridge connector and a circuit board consistent with implementations of the current subject matter;

FIG. 5I shows a perspective cross-sectional view of a cartridge connector and a circuit board consistent with implementations of the current subject matter;

FIG. 35 is a system block diagram illustrating another example heater control according to some implementations of the current subject matter;

FIG. 36 is a system block diagram illustrating another example heater control according to some implementations of the current subject matter;

FIG. 37 is a system block diagram according to some implementations of the current subject matter;

FIG. 38 illustrates an example of variable vapor production;

FIG. 39 is a block diagram illustrating pod identifier circuitry according to some implementations;

FIG. 40A shows a schematic diagram illustrating features of a vaporizer device having a cartridge and a vaporizer device body consistent with some implementations of the current subject matter;

FIG. 40B shows a diagram providing a top view of a vaporizer device with a cartridge separated from a cartridge receptacle on a vaporizer device body consistent with some implementations of the current subject matter;

FIG. 40C shows a diagram providing a top view of a vaporizer device with a cartridge inserted into a cartridge receptacle on a vaporizer device body consistent with some implementations of the current subject matter;

FIG. 40D shows a diagram providing a top isometric perspective view of a vaporizer device with a cartridge inserted into a cartridge receptacle on a vaporizer device body consistent with some implementations of the current subject matter;

FIG. 40E shows a diagram providing a top isometric perspective view from a mouthpiece end of a cartridge suitable for use with a vaporizer device body consistent with some implementations of the current subject matter;

FIG. 40F shows a diagram providing a top isometric perspective view from an opposite end of a cartridge suitable for use with a vaporizer device body consistent with some implementations of the current subject matter;

FIG. 41A shows a schematic diagram illustrating features of a non-cartridge-based vaporizer device consistent with some implementations of the current subject matter;

Figure 41C:
Figure 41C:
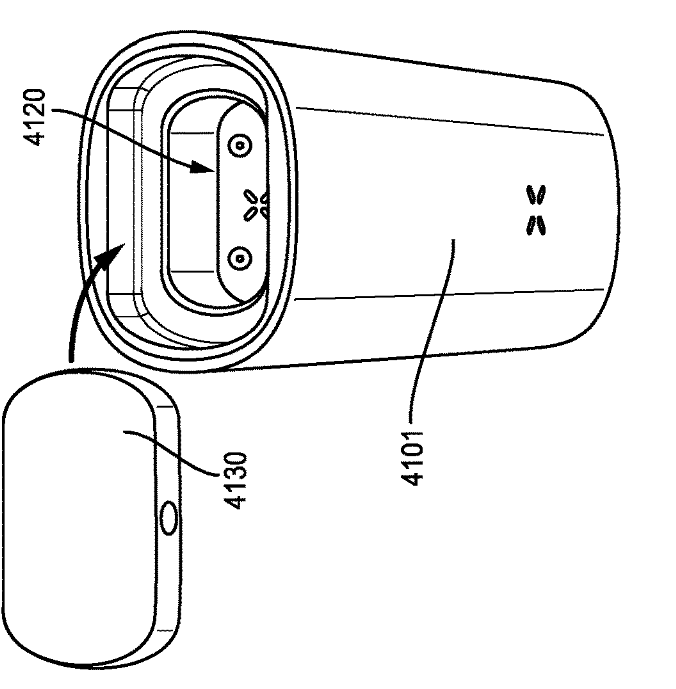
Figure 41B:
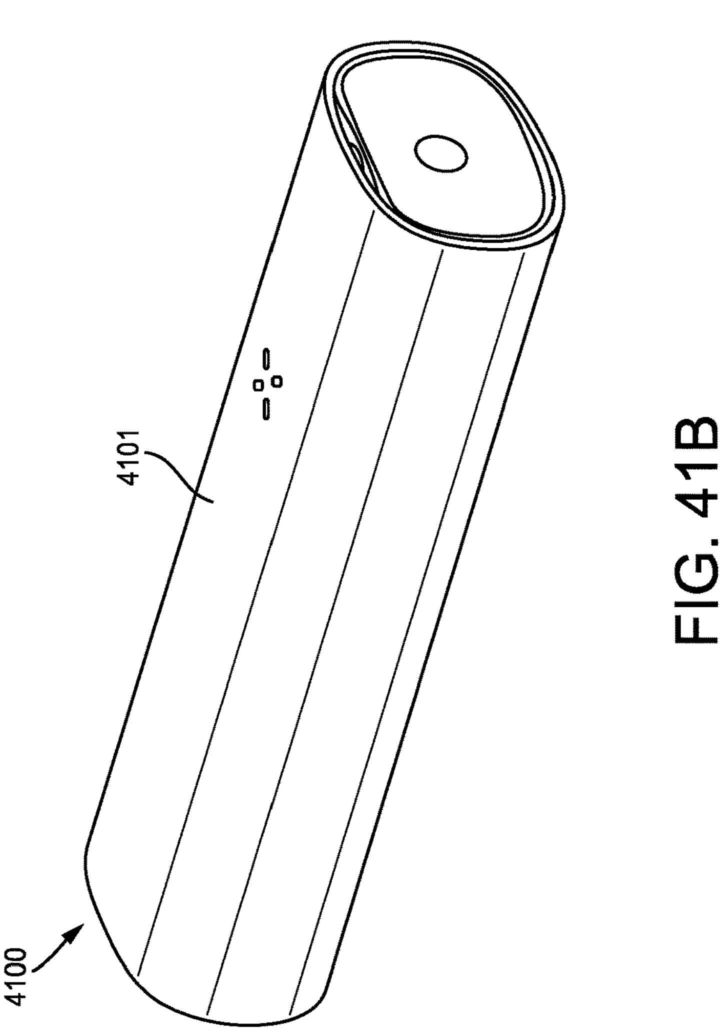

FIG. 41B shows a diagram providing a side isometric perspective view of an example non-cartridge-based vaporizer device; and FIG. 41C shows a diagram providing a bottom isometric perspective view of the example non-cartridge-based vaporizer device.

DETAILED DESCRIPTION

Implementations of the current subject matter include devices relating to vaporizing of one or more materials for inhalation by a user. The term "vaporizer" is used generically in the following description to refer to a vaporizer device. Examples of vaporizers consistent with implementations of the current subject matter include electronic vaporizers, electronic cigarettes, e-cigarettes, or the like. Such vaporizers are generally portable, hand-held devices that heat a vaporizable material to provide an inhalable dose of the material. The vaporizable material used with a vaporizer may optionally be provided within a cartridge (e.g., a part of the vaporizer that contains the vaporizable material in a reservoir or other container and that can be refillable when empty or disposable in favor of a new cartridge containing additional vaporizable material of a same or different type). A vaporizer may be a cartridge-using vaporizer, a cartridge-less vaporizer, or a multi-use vaporizer capable of use with or without a cartridge. For example, a multi-use vaporizer may include a heating chamber (e.g., an oven) configured to receive a vaporizable material directly in the heating chamber and also to receive a cartridge or other replaceable device having a reservoir, a volume, or the like for at least partially containing a usable amount of vaporizable material. In various implementations, a vaporizer may be configured for use with liquid vaporizable material (e.g., a carrier solution in which an active and/or inactive ingredient(s) are suspended or held in solution or a neat liquid form of the vaporizable material itself) or a solid vaporizable material. A solid vaporizable material may include a plant material that emits some part of the plant material as the vaporizable material (e.g., such that some part of the plant material remains as waste after the vaporizable material is emitted for inhalation by a user) or optionally can be a solid form of the vaporizable material itself (e.g., a "wax") such that all of the solid material can eventually be vaporized for inhalation. A liquid vaporizable material can likewise be capable of being completely vaporized or can include some part of the liquid material that remains after all of the material suitable for inhalation has been consumed.

Figure 1:
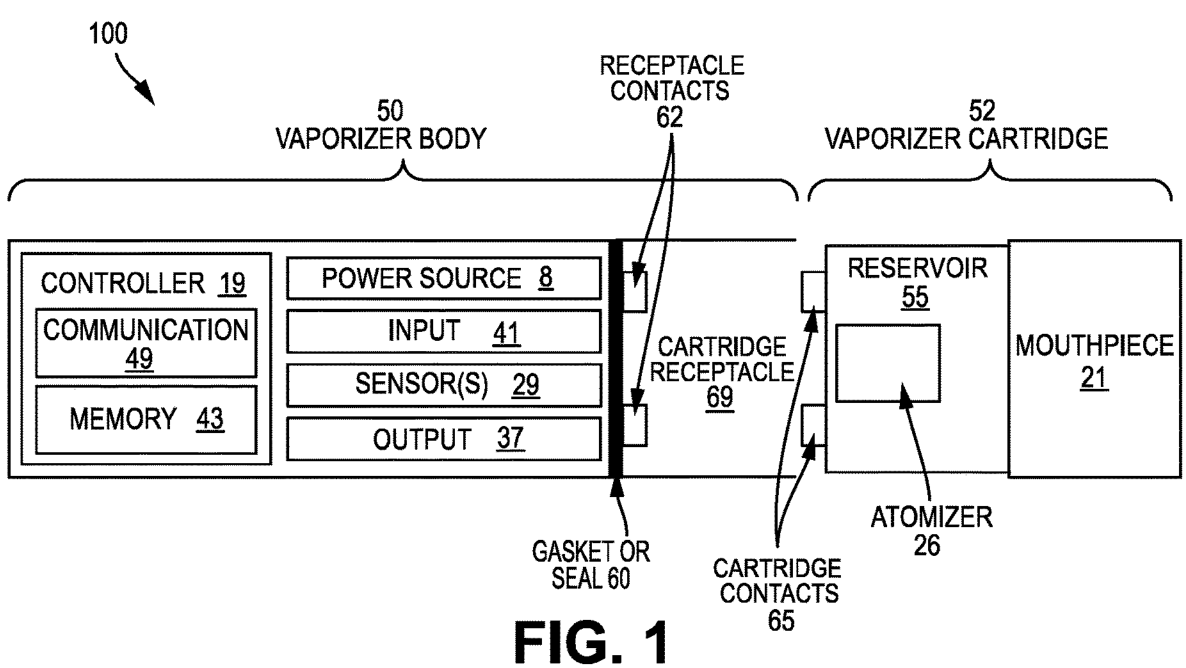
FIG. 1 shows a block diagram illustrating features of a cartridge-based vaporizer consistent with implementations of the current subject matter.

Referring to the block diagram of FIG. 1, a vaporizer 100 typically includes a power source 8 (such as a battery which may be a rechargeable battery), and a controller 19 (e.g., a processor, circuitry, etc. capable of executing logic) for controlling delivery of heat to an atomizer 26 to cause a vaporizable material to be converted from a condensed form (e.g., a solid, a liquid, a solution, a suspension, a part of an at least partially unprocessed plant material, etc.) to the gas phase. The controller 19 may be part of one or more printed circuit boards (PCBs) consistent with certain implementations of the current subject matter. After conversion of the vaporizable material to the gas phase, and depending on the type of vaporizer, the physical and chemical properties of the vaporizable material, and/or other factors, at least some of the gas-phase vaporizable material may condense to form particulate matter in at least a partial local equilibrium with the gas phase as part of an aerosol, which can form some or all of an inhalable dose provided by the vaporizer 100 for a given puff or draw on the vaporizer. It will be understood that the interplay between gas and condensed phases in an aerosol generated by a vaporizer can be complex and dynamic, as factors such as ambient temperature, relative humidity, chemistry, flow conditions in airflow paths (both inside the vaporizer and in the airways of a human or other animal), mixing of the gas-phase or aerosol-phase vaporizable material with other air streams, etc., may affect one or more physical parameters of an aerosol. In some vaporizers, and particularly for vaporizers for delivery of more volatile vaporizable materials, the inhalable dose may exist predominantly in the gas phase (i.e., formation of condensed phase particles may be very limited).

Vaporizers for use with liquid vaporizable materials (e.g., neat liquids, suspensions, solutions, mixtures, etc.) typically include an atomizer 26 in which a wicking element (also referred to herein as a wick (not shown in FIG. 1), which can include any material capable of causing fluid motion by capillary pressure) conveys an amount of a liquid vaporizable material to a part of the atomizer that includes a heating element (also not shown in FIG. 1). The wicking element is generally configured to draw liquid vaporizable material from a reservoir configured to contain (and that may in use contain) the liquid vaporizable material such that the liquid vaporizable material may be vaporized by heat delivered from a heating element. The wicking element may also optionally allow air to enter the reservoir to replace the volume of liquid removed. In other words, capillary action pulls liquid vaporizable material into the wick for vaporization by the heating element (described below), and air may, in some implementations of the current subject matter, return to the reservoir through the wick to at least partially equalize pressure in the reservoir. Other approaches to allowing air back into the reservoir to equalize pressure are also within the scope of the current subject matter.

The heating element can be or include one or more of a conductive heater, a radiative heater, and a convective heater. One type of heating element is a resistive heating element, which can be constructed of or at least include a material (e.g., a metal or alloy, for example a nickel-chromium alloy, or a non-metallic resistor) configured to dissipate electrical power in the form of heat when electrical current is passed through one or more resistive segments of the heating element. In some implementations of the current subject matter, an atomizer can include a heating element that includes resistive coil or other heating element wrapped around, positioned within, integrated into a bulk shape of, pressed into thermal contact with, or otherwise arranged to deliver heat to a wicking element to cause a liquid vaporizable material drawn by the wicking element from a reservoir to be vaporized for subsequent inhalation by a user in a gas and/or a condensed (e.g., aerosol particles or droplets) phase. Other wicking element, heating element, and/or atomizer assembly configurations are also possible, as discussed further below.

Certain vaporizers may also or alternatively be configured to create an inhalable dose of gas-phase and/or aerosol-phase vaporizable material via heating of a non-liquid vaporizable material, such as for example a solid-phase vaporizable material (e.g., a wax or the like) or plant material (e.g., tobacco leaves and/or parts of tobacco leaves) containing the vaporizable material. In such vaporizers, a resistive heating element may be part of or otherwise incorporated into or in thermal contact with the walls of an oven or other heating chamber into which the non-liquid vaporizable material is placed. Alternatively, a resistive heating element or elements may be used to heat air passing through or past the non-liquid vaporizable material to cause convective heating of the non-liquid vaporizable material. In still other examples, a resistive heating element or elements may be disposed in intimate contact with plant material such that direct conductive heating of the plant material occurs from within a mass of the plant material (e.g., as opposed to only by conduction inward from walls of an oven).

The heating element may be activated (e.g., a controller, which is optionally part of a vaporizer body as discussed below, may cause current to pass from the power source through a circuit including the resistive heating element, which is optionally part of a vaporizer cartridge as discussed below), in association with a user puffing (e.g., drawing, inhaling, etc.) on a mouthpiece 21 of the vaporizer to cause air to flow from an air inlet, along an airflow path that passes an atomizer (e.g., wicking element and heating element), optionally through one or more condensation areas or chambers, to an air outlet in the mouthpiece. Incoming air passing along the airflow path passes over, through, etc., the atomizer, where gas phase vaporizable material is entrained into the air. As noted above, the entrained gas-phase vaporizable material may condense as it passes through the remainder of the airflow path such that an inhalable dose of the vaporizable material in an aerosol form can be delivered from the air outlet (e.g., in a mouthpiece 21 for inhalation by a user).

Activation of the heating element may be caused by automatic detection of the puff based on one or more of signals generated by one or more sensors 29, such as for example a pressure sensor or sensors disposed to detect pressure along the airflow path relative to ambient pressure (or optionally to measure changes in absolute pressure), one or more motion sensors of the vaporizer, one or more flow sensors of the vaporizer, and/or a capacitive lip sensor of the vaporizer; in response to detection of interaction of a user with one or more input devices 41 (e.g., buttons or other tactile control devices of the vaporizer 100), and/or to receipt of signals from a computing device in communication with the vaporizer; and/or via other approaches for determining that a puff is occurring or imminent.

As alluded to in the previous paragraph, a vaporizer consistent with implementations of the current subject matter may be configured to connect (e.g., wirelessly or via a wired connection) to a computing device (or optionally two or more devices) in communication with the vaporizer. To this end, the controller 19 may include communication hardware 49. The controller may also include a memory 43. A computing device can be a component of a vaporizer system that also includes the vaporizer 100, and can include its own communication hardware, which can establish a wireless communication channel with the communication hardware 49 of the vaporizer 100. For example, a computing device used as part of a vaporizer system may include a general purpose computing device (e.g., a smartphone, a tablet, a personal computer, some other portable device such as a smartwatch, or the like) that executes software to produce a user interface for enabling a user of the device to interact with a vaporizer. In other implementations of the current subject matter, such a device used as part of a vaporizer system can be a dedicated piece of hardware such as a remote control or other wireless or wired device having one or more physical and/or soft (e.g., configurable on a screen or other display device and selectable via user interaction with a touch-sensitive screen or some other input device like a mouse, pointer, trackball, cursor buttons, or the like) interface controls. The vaporizer can also include one or more output 37 features or devices for providing information to the user.

A computing device that is part of a vaporizer system as defined above can be used for any of one or more functions, such as controlling dosing (e.g., dose monitoring, dose setting, dose limiting, user tracking, etc.), controlling sessioning (e.g., session monitoring, session setting, session limiting, user tracking, etc.), controlling nicotine delivery (e.g., switching between nicotine and non-nicotine vaporizable material, adjusting an amount of nicotine delivered, etc.), obtaining locational information (e.g., location of other users, retailer/commercial venue locations, vaping locations, relative or absolute location of the vaporizer itself, etc.), vaporizer personalization (e.g., naming the vaporizer, locking/password protecting the vaporizer, adjusting one or more parental controls, associating the vaporizer with a user group, registering the vaporizer with a manufacturer or warranty maintenance organization, etc.), engaging in social activities with other users (e.g., games, social media communications, interacting with one or more groups, etc.), or the like. The terms "sessioning", "session", "vaporizer session," or "vapor session," are used generically to refer to a period devoted to the use of the vaporizer. The period can include a time period, a number of doses, an amount of vaporizable material, and/or the like.

In the example in which a computing device provides signals related to activation of the resistive heating element, or in other examples of coupling of a computing device with a vaporizer for implementation of various control or other functions, the computing device executes one or more computer instructions sets to provide a user interface and underlying data handling. In one example, detection by the computing device of user interaction with one or more user interface elements can cause the computing device to signal the vaporizer 100 to activate the heating element, either to a full operating temperature for creation of an inhalable dose of vapor/aerosol or to a lower temperature to begin heating the heating element. Other functions of the vaporizer may be controlled by interaction of a user with a user interface on a computing device in communication with the vaporizer.

The temperature of a resistive heating element of a vaporizer may depend on a number of factors, including an amount of electrical power delivered to the resistive heating element and/or a duty cycle at which the electrical power is delivered, conductive heat transfer to other parts of the electronic vaporizer and/or to the environment, latent heat losses due to vaporization of a vaporizable material from the wicking element and/or the atomizer as a whole, and convective heat losses due to airflow (e.g., air moving across the heating element or the atomizer as a whole when a user inhales on the electronic vaporizer). As noted above, to reliably activate the heating element or heat the heating element to a desired temperature, a vaporizer may, in some implementations of the current subject matter, make use of signals from a pressure sensor to determine when a user is inhaling. The pressure sensor can be positioned in the airflow path and/or can be connected (e.g., by a passageway or other path) to an airflow path connecting an inlet for air to enter the device and an outlet via which the user inhales the resulting vapor and/or aerosol such that the pressure sensor experiences pressure changes concurrently with air passing through the vaporizer device from the air inlet to the air outlet. In some implementations of the current subject matter, the heating element may be activated in association with a user's puff, for example by automatic detection of the puff by the pressure sensor detecting a pressure change in the airflow path.

Typically, the pressure sensor (as well as any other sensors 29) can be positioned on or coupled (e.g., electrically or electronically connected, either physically or via a wireless connection) to the controller 19 (e.g., a printed circuit board assembly or other type of circuit board). To take measurements accurately and maintain durability of the vaporizer, it can be beneficial to provide a resilient sealing mechanism 60 to separate an airflow path from other parts of the vaporizer. The sealing mechanism 60, which can be a gasket, may be configured to at least partially surround the pressure sensor such that connections of the pressure sensor to internal circuitry of the vaporizer are separated from a part of the pressure sensor exposed to the airflow path. In an example of a cartridge-based vaporizer, the sealing mechanism or gasket 60 may also separate parts of one or more electrical connections between a vaporizer body 50 and a vaporizer cartridge 52. Such arrangements of a gasket or sealing mechanism 60 in a vaporizer 100 can be helpful in mitigating against potentially disruptive impacts on vaporizer components resulting from interactions with environmental factors such as water in the vapor or liquid phases, other fluids such as the vaporizable material, etc., and/or to reduce escape of air from the designed airflow path in the vaporizer. Unwanted air, liquid, and/or other fluid passing and/or contacting circuitry of the vaporizer can cause various unwanted effects, such as alteration of pressure readings, and/or can result in the buildup of unwanted material, such as moisture, the vaporizable material, etc., in parts of the vaporizer where they may cause poor pressure signal, degradation of the pressure sensor or other components, and/or a shorter life of the vaporizer. Leaks in the sealing mechanism or gasket 60 can also result in a user inhaling air that has passed over parts of the vaporizer device containing or constructed of materials that may not be desirable to inhale.

A general class of vaporizers that have recently gained popularity includes a vaporizer body 50 that includes a controller 19, a power source 8 (e.g., battery), one or more sensors, charging contacts, a gasket or sealing mechanism 60, and a cartridge receptacle 69 configured to receive a vaporizer cartridge 52 for coupling with the vaporizer body 50 through one or more of a variety of attachment structures. In some examples, vaporizer cartridge 52 includes a reservoir 55 for containing a liquid vaporizable material and a mouthpiece 21 for delivering an inhalable dose to a user. The vaporizer cartridge can include an atomizer 26 having a wicking element and a heating element. Alternatively, one or both of the wicking element and the heating element can be part of the vaporizer body 50. In implementations in which any part of the atomizer 26 (e.g., heating element and/or wicking element) is part of the vaporizer body 50, the vaporizer can be configured to supply liquid vaporizable material from a reservoir in the vaporizer cartridge to the atomizer part(s) included in the vaporizer body.

Cartridge-based configurations for vaporizers that generate an inhalable dose of a non-liquid vaporizable material via heating of a non-liquid vaporizable material are also within the scope of the current subject matter. For example, a vaporizer cartridge may include a mass of a plant material that is processed and formed to have direct contact with parts of one or more resistive heating elements, and such a vaporizer cartridge may be configured to be coupled mechanically and electrically to a vaporizer body that includes a processor, a power source, and electrical contacts for connecting to corresponding cartridge contacts for completing a circuit with the one or more resistive heating elements.

In vaporizers in which the power source 8 is part of a vaporizer body 50 and a heating element is disposed in a vaporizer cartridge 52 configured to couple with the vaporizer body 50, the vaporizer 100 may include electrical connection features (e.g., means for completing a circuit) for completing a circuit that includes the controller (e.g., a printed circuit board, a microcontroller, or the like), the power source, and the heating element. These features may include at least two contacts on a bottom surface of the vaporizer cartridge 52 (referred to herein as cartridge contacts 65) and at least two contacts disposed near a base of the cartridge receptacle (referred to herein as receptacle contacts 62) of the vaporizer 100 such that the cartridge contacts 65 and the receptacle contacts 62 make electrical connections when the vaporizer cartridge 52 is inserted into and coupled with the cartridge receptacle 69. The circuit completed by these electrical connections can allow delivery of electrical current to the resistive heating element and may further be used for additional functions, such as for example for measuring a resistance of the resistive heating element for use in determining and/or controlling a temperature of the resistive heating element based on a thermal coefficient of resistivity of the resistive heating element, for identifying a cartridge based on one or more electrical characteristics of a resistive heating element or the other circuitry of the vaporizer cartridge, etc.

In some examples of the current subject matter, the at least two cartridge contacts and the at least two receptacle contacts can be configured to electrically connect in either of at least two orientations. In other words, one or more circuits necessary for operation of the vaporizer can be completed by insertion of a vaporizer cartridge 52 in the cartridge receptacle 69 in a first rotational orientation (around an axis along which the end of the vaporizer cartridge 52 having the cartridge contacts 65 is inserted into the cartridge receptacle 69 of the vaporizer body 50) such that a first cartridge contact of the at least two cartridge contacts 65 is electrically connected to a first receptacle contact of the at least two receptacle contacts 62 and a second cartridge contact of the at least two cartridge contacts 65 is electrically connected to a second receptacle contact of the at least two receptacle contacts 62. Furthermore, the one or more circuits necessary for operation of the vaporizer can be completed by insertion of a vaporizer cartridge 52 in the cartridge receptacle 69 in a second rotational orientation such that the first cartridge contact of the at least two cartridge contacts 65 is electrically connected to the second receptacle contact of the at least two receptacle contacts 62 and the second cartridge contact of the at least two cartridge contacts 65 is electrically connected to the first receptacle contact of the at least two receptacle contacts 62. This feature of a vaporizer cartridge 52 being reversibly insertable into a cartridge receptacle 69 of the vaporizer body 50 is described further below.

In one example of an attachment structure for coupling a vaporizer cartridge 52 to a vaporizer body, the vaporizer body 50 includes a detent (e.g., a dimple, protrusion, etc.) protruding inwardly from an inner surface the cartridge receptacle 69. One or more exterior surfaces of the vaporizer cartridge 52 can include corresponding recesses (not shown in FIG. 1) that can fit and/or otherwise snap over such detents when an end of the vaporizer cartridge 52 is inserted into the cartridge receptacle 69 on the vaporizer body 50. When the vaporizer cartridge 52 and the vaporizer body 50 are coupled (e.g., by insertion of an end of the vaporizer cartridge 52 into the cartridge receptacle 69 of the vaporizer body 50), the detent in the vaporizer body 50 may fit within and/or otherwise be held within the recesses of the vaporizer cartridge 52 to hold the vaporizer cartridge 52 in place when assembled. Such a detent-recess assembly can provide enough support to hold the vaporizer cartridge 52 in place to ensure good contact between the at least two cartridge contacts 65 and the at least two receptacle contacts 62, while allowing release of the vaporizer cartridge 52 from the vaporizer body 50 when a user pulls with reasonable force on the vaporizer cartridge 52 to disengage the vaporizer cartridge 52 from the cartridge receptacle 69.

Further to the discussion above about the electrical connections between a vaporizer cartridge and a vaporizer body 50 being reversible such that at least two rotational orientations of the vaporizer cartridge 52 in the cartridge receptacle 69 are possible, in some vaporizers the shape of the vaporizer cartridge 52, or at least a shape of the end of the vaporizer cartridge that is configured for insertion into the cartridge receptacle 69 may have rotational symmetry of at least order two. In other words, the vaporizer cartridge 52 or at least the insertable end of the vaporizer cartridge 52 may be symmetric upon a rotation of 180° around an axis along which the vaporizer cartridge 52 is inserted into the cartridge receptacle 69. In such a configuration, the circuitry of the vaporizer body 50 may support identical operation regardless of which symmetrical orientation of the vaporizer cartridge 52 occurs.

In some examples, the vaporizer cartridge 52, or at least an end of the vaporizer cartridge 52 configured for insertion in the cartridge receptacle 69 may have a non-circular cross-section transverse to the axis along which the vaporizer cartridge 52 is inserted into the cartridge receptacle 69. For example, the non-circular cross-section may be approximately rectangular, approximately elliptical (e.g., have an approximately oval shape), non-rectangular but with two sets of parallel or approximately parallel opposing sides (e.g., having a parallelogram-like shape), or other shapes having rotational symmetry of at least order two. In this context, approximately having a shape indicates that a basic likeness to the described shape is apparent, but that sides of the shape in question need not be completely linear and vertices need not be completely sharp. Rounding of both or either of edges or vertices of the cross-sectional shape is contemplated in the description of any non-circular cross-section referred to herein.

The at least two cartridge contacts 65 and the at least two receptacle contacts 62 can take various forms. For example, one or both sets of contacts may include conductive pins, tabs, posts, receiving holes for pins or posts, or the like. Some types of contacts may include springs or other urging features to cause better physical and electrical contact between the contacts on the vaporizer cartridge and the vaporizer body. The electrical contacts may optionally be gold-plated, and/or can include other materials.

Various advantages and benefits of the current subject matter may relate to improvements relative to current vaporizer configurations, methods of manufacture, and the like. For example, some currently available vaporizers include charging contacts that provide an electrical interface between a charging device or other power source and a battery of the vaporizer. In some situations, the charging contacts may wear out and/or may be required to be replaced. Certain vaporizers may require that the entire unit be replaced in such situations. A modularized device having, for example, an end cap module that includes the charging contacts, would allow for only one or more components to be replaced, without the need to replace the entire unit.

Additionally, during manufacturing of a vaporizer, components can be coupled having certain tolerances. Some manufacturing defects can cause components to be manufactured outside of a desired tolerance range. Such tolerance issues may become more likely with more complex sealing structures, which may increase the likelihood that there will be a leak and/or other defect with the seal. An outer shell that surrounds various internal components may, with the internal components, form a single unit. Such devices may present manufacturing challenges. For example, each of the internal components, large and small, as well as the outer shell, may be required to be assembled at a single location. Assembly of each of the components of the device to form the single unit may encounter tolerance and other machining issues. For example, due to the complexity of certain internal components, and the size or shape of certain components, the components of the device may not be properly aligned when assembled.

For an assembled vaporizer, it may be difficult to fix any issues that may arise with any of the internal components when the components and the outer shell are assembled as a single unit. A modularized vaporizer may beneficially alleviate some or all of the issues that may arise with manufacturing the device as a single unit, such as at a single location. For example, a modularized vaporizer can be assembled by combining two or more larger components within the outer shell. The modularized vaporizer can enhance case of manufacturability by allowing for sub-assemblies to be manufactured in more than one location. Assembling only a few sub-assemblies at one time to form the vaporizer can also help to reduce tolerance issues, and may allow for certain internal components (or sub-assemblies) to be fixed or replaced more easily. As described in more detail below, one or more separate sub-assemblies can be combined and can be coupled with the outer shell. The one or more separate sub-assemblies may be configured to couple with the outer shell through an opening on one or more sides of the outer shell.

Various cartridge connecting features may include additional challenges in that the designs may not be volumetrically compact, and may instead tend to occupy a significant portion of the vaporizer 100 in which they are incorporated. A modularized cartridge connector for a vaporizer 100, consistent with features of one or more implementations of the current subject matter, may provide advantages and improvements relative to existing approaches, while also introducing additional benefits as described herein. For example, detents in walls of the cartridge receptacle 69 of the vaporizer body 50 (e.g., for securing a vaporizer cartridge 52 in place) may be difficult to reproducibly manufacture. For example, specialized tools may be required during manufacturing of the vaporizer body 50 to accurately place detents in the inner walls of the cartridge receptacle 69. Incorrectly positioned detents may result in poor and/or leaky seals and/or may not allow for a strong, proper connection between the vaporizer cartridge and the vaporizer body.

It will further be understood that over time and due to repeated use of the vaporizer, a plating and/or a structural material of the electrical contacts discussed may experience wear, corrosion, thermal degradation, etc., which may result in the contact resistance increasing between cartridge contacts 65 and receptacle contacts 62, undesirably reducing performance of the vaporizer 100. For example, the vaporizer may not heat properly, and/or may not generate a desired amount of vaporized vaporizable material for the user to inhale.

As noted above, the vaporizer 100 consistent with implementations of the current subject matter may include a vaporizer body 50 having an outer shell, and a vaporizer cartridge 52 (also referred to as a cartridge or a pod). The vaporizer body 50 may include a power source 8 (e.g., a battery), a controller 19, and an interface to electrically and mechanically connect with the vaporizer cartridge 52. In some implementations, the vaporizer body 50 can include a cartridge connector providing an interface between the vaporizer body 50 and the vaporizer cartridge 52 and/or one or more sealing mechanisms 60 to isolate certain portions of the vaporizer body 50 from the vaporizer cartridge 52 (and more particularly from vaporizable material that may escape from the vaporizer cartridge 52). A cartridge connector consistent with implementations of the current subject matter can be implemented as a modular component that can be removably coupled with at least the outer shell or another component of the vaporizer body 50.

In some implementations, the vaporizer body 50 can also include an end cap module having charging contacts that provide an interface between the battery of the vaporizer body and an external power source. The end cap module described in accordance with implementations of the current subject matter can be implemented as a modular component that can be removably coupled with at least the outer shell or another component of the vaporizer body 50.

As noted above, the vaporizer cartridge 52 may generally include a reservoir, an air path, and an atomizer 26. In some configurations, the heating element and/or atomizer described in accordance with implementations of the current subject matter can be implemented directly into a vaporizer body and/or may not be removable from the vaporizer body. In some implementations, the vaporizer body may not include a removable cartridge or cartridge connector.

The vaporizer device 100, and any component thereof (e.g., the vaporizer body 50 and the vaporizer cartridge 52) including hardware, software or any combination of hardware and software can include any of the features described and/or shown in U.S. Provisional Application No. 62/690,947, filed on Jun. 27, 2018, and titled "CONNECTED VAPORIZER DEVICE SYSTEMS," U.S. Provisional Application No. 62/760,918, filed on Nov. 13, 2018, and titled "CONNECTED VAPORIZER DEVICE SYSTEMS," U.S. Provisional Application No. 62/793,889, filed on Jan. 17, 2019, and titled "CONNECTED VAPORIZER DEVICE SYSTEMS," U.S. Provisional Application No. 62/824,725, filed on Mar. 27, 2019, and titled "CONNECTED VAPORIZER DEVICE SYSTEMS," and U.S. Application No. U.S. application Ser. No. 16/455,629, filed on Jun. 27, 2019, and titled "CONNECTED VAPORIZER DEVICE SYSTEMS," the entirety of each of which is incorporated by reference herein.

Figure 1A:
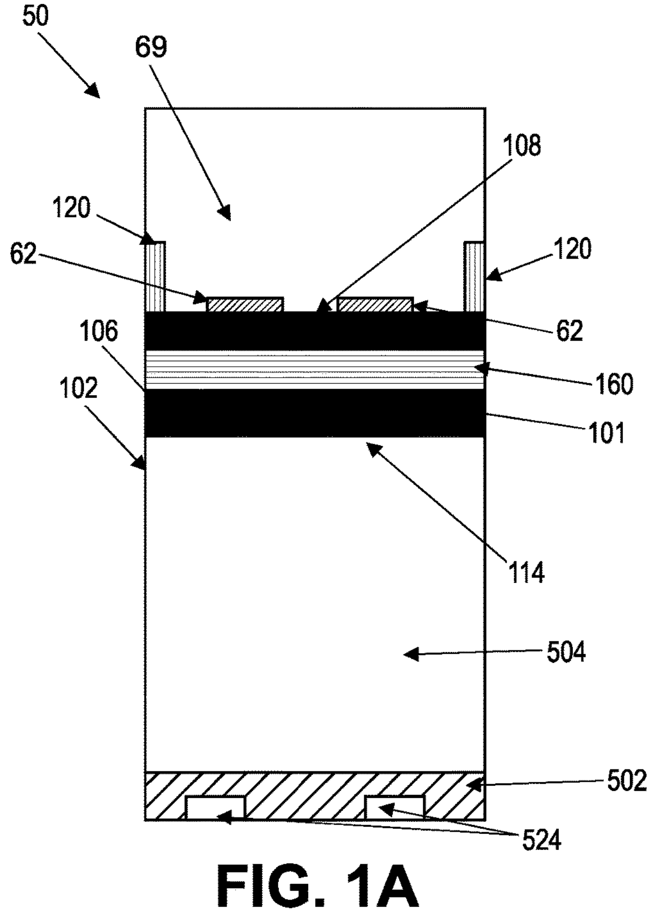
FIG. 1A shows a schematic view of a vaporizer device, a vaporizer cartridge, a cartridge connector, and an end cap module consistent with implementations of the current subject matter.
Figure 1B:
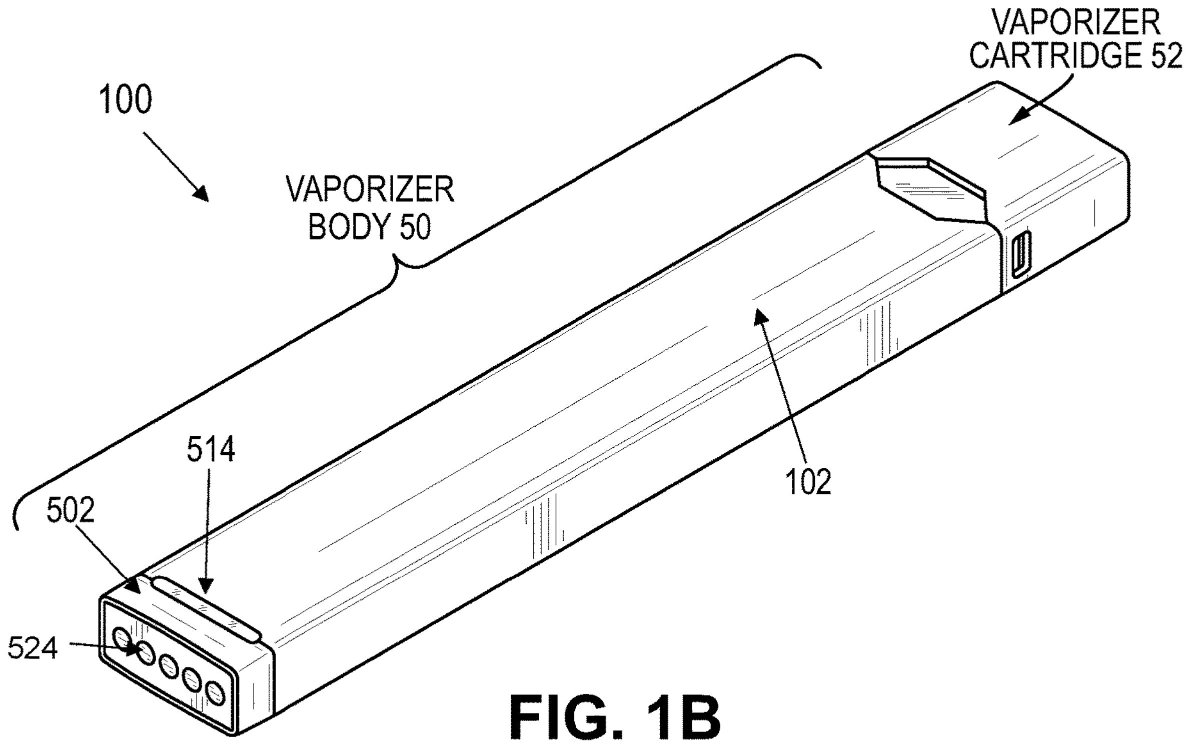
FIG. 1B shows a perspective view of a vaporizer device and a vaporizer cartridge coupled with the vaporizer device consistent with implementations of the current subject matter.
Figure 1C:
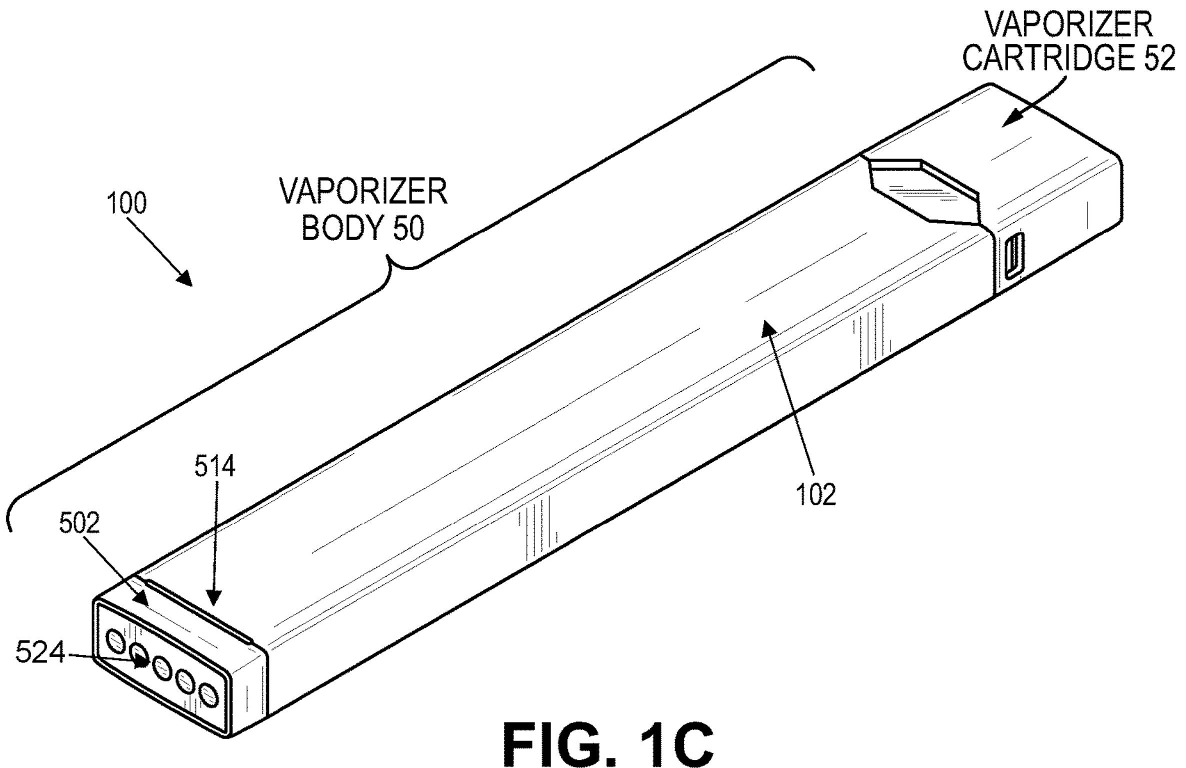
FIG. 1C shows a perspective view of another example of a vaporizer device and a vaporizer cartridge coupled with the vaporizer device consistent with implementations of the current subject matter.
Figure 1D:
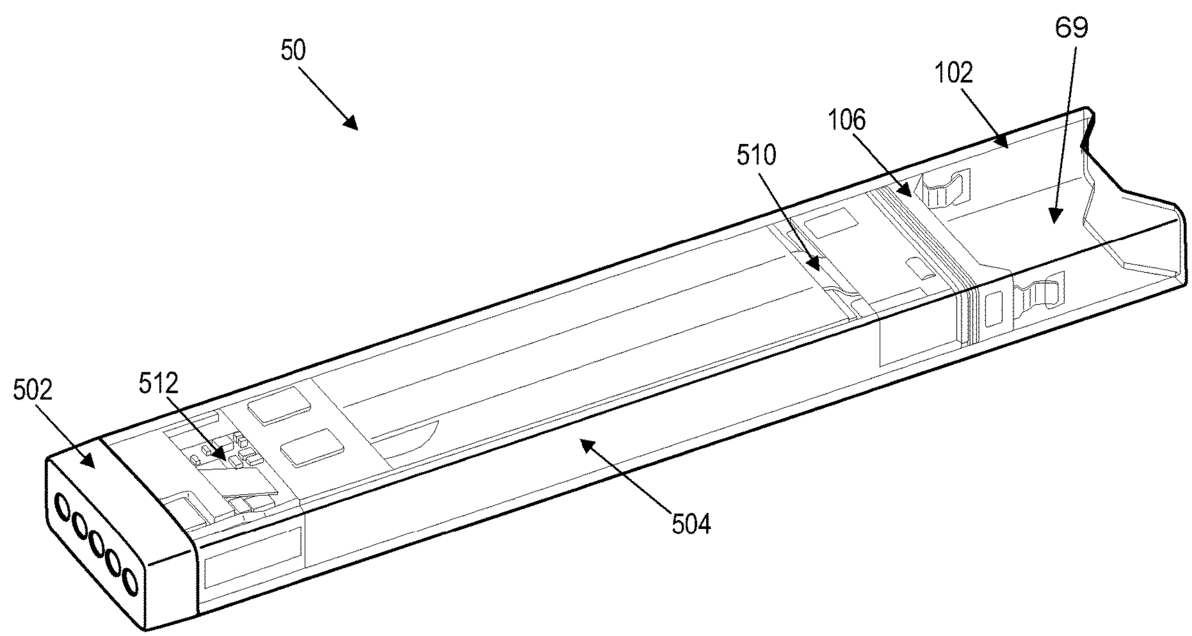
FIG. 1D shows a cutaway view of a vaporizer device consistent with implementations of the current subject matter.

FIG. 1A illustrates a schematic view of a vaporizer body 50 consistent with implementations of the current subject matter. The vaporizer body 50 can include an outer shell 102, a cartridge connector 106 for coupling (mechanically and/or electrically) to a vaporizer cartridge 52 (not shown in FIG. 1A), and an end cap module 502. The cartridge connector 106 and the end cap module can be implemented as modular components that are removably coupled with at least the outer shell 102 of the vaporizer body 50.

Figure 2A:
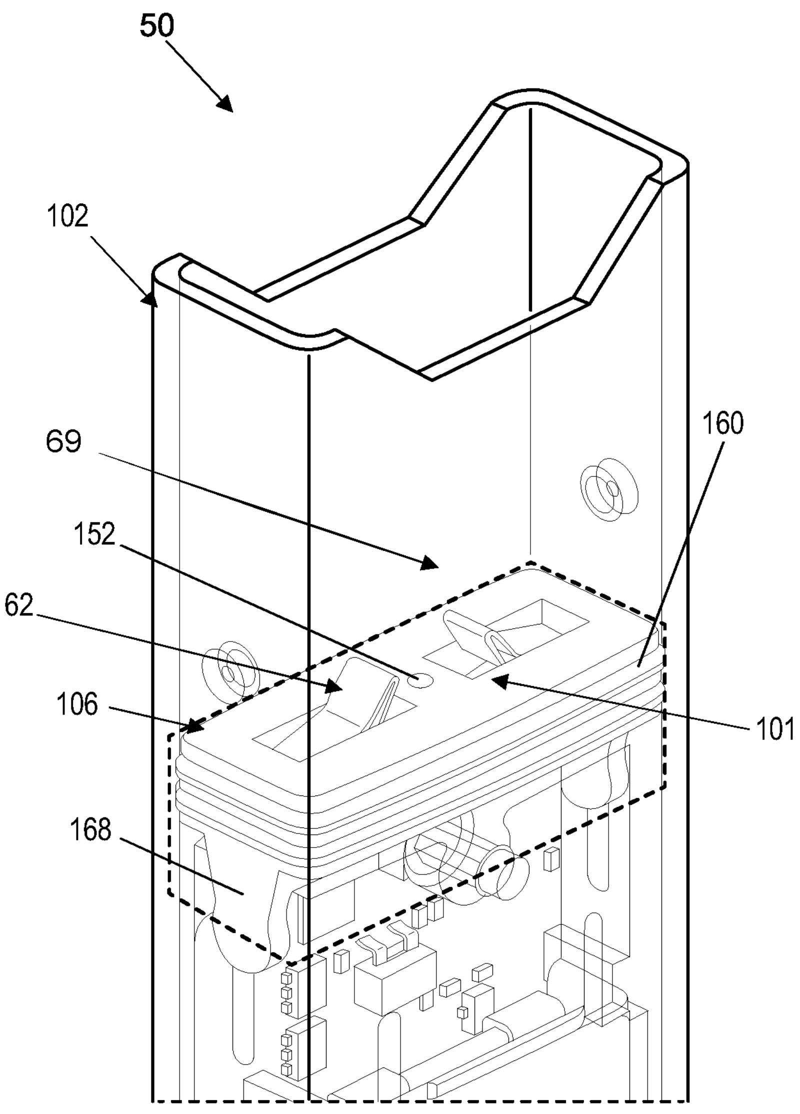
FIG. 2A shows a perspective view showing some internal components of a vaporizer device in which a cartridge connector is incorporated consistent with implementations of the current subject matter.

The cartridge connector 106 provides an interface between the vaporizer body 50 and the vaporizer cartridge 52. As explained in more detail below, the cartridge connector 106 includes a top portion 112 (see FIG. 2E) and a bottom portion 114, a cartridge connector body 101, a sealing mechanism 160 (an example of a gasket or sealing mechanism 60), one or more receptacle contacts 62 and/or one or more retaining features 120.

The retaining features 120 can secure the cartridge connector 106 to the outer shell 102 and the vaporizer cartridge 52 to the cartridge connector 106 within the outer shell 102. The retaining features 120 may eliminate the need for detents to be positioned in the outer shell 102, reducing tolerance and manufacturing issues. The retaining features 120 may more securely engage the vaporizer cartridge 52 via one or more tabbed portions as explained in more detail below.

The receptacle contacts 62 can be configured to electrically communicate with one or more cartridge contacts 65 of the vaporizer cartridge 52. Power can be supplied from the vaporization device to the heating element of the vaporizer cartridge 52 via an electrical interface defined by the electrical communication between the cartridge contacts 65 of the vaporizer cartridge 52 and the receptacle contacts 62 of the cartridge connector 106, such as when the heating element is activated.

The sealing mechanism 160 can extend radially around at least a portion of an outer side surface of the cartridge connector 106, such as entirely around the sides of the cartridge connector 106, to seal the cartridge connector 106 on each side within the outer shell 102 of the vaporizer body 50. The sealing mechanism 160 can include a variety of profiles. For example, the sealing mechanism 160 can include a single or double symmetrical seal. The sealing mechanism 160 may also include a single or double wiping seal configuration. The sealing mechanism can provide a sufficient seal to reduce the likelihood that unwanted air and/or material will pass the cartridge connector 106. The sealing mechanism 160 helps to ensure that a pressure sensor (positioned along the bottom portion 114 of the cartridge connector 106), among other electronic components, is properly sealed from the environment and/or the vaporizer cartridge 52 when assembled.

Figures 10A, 10B:
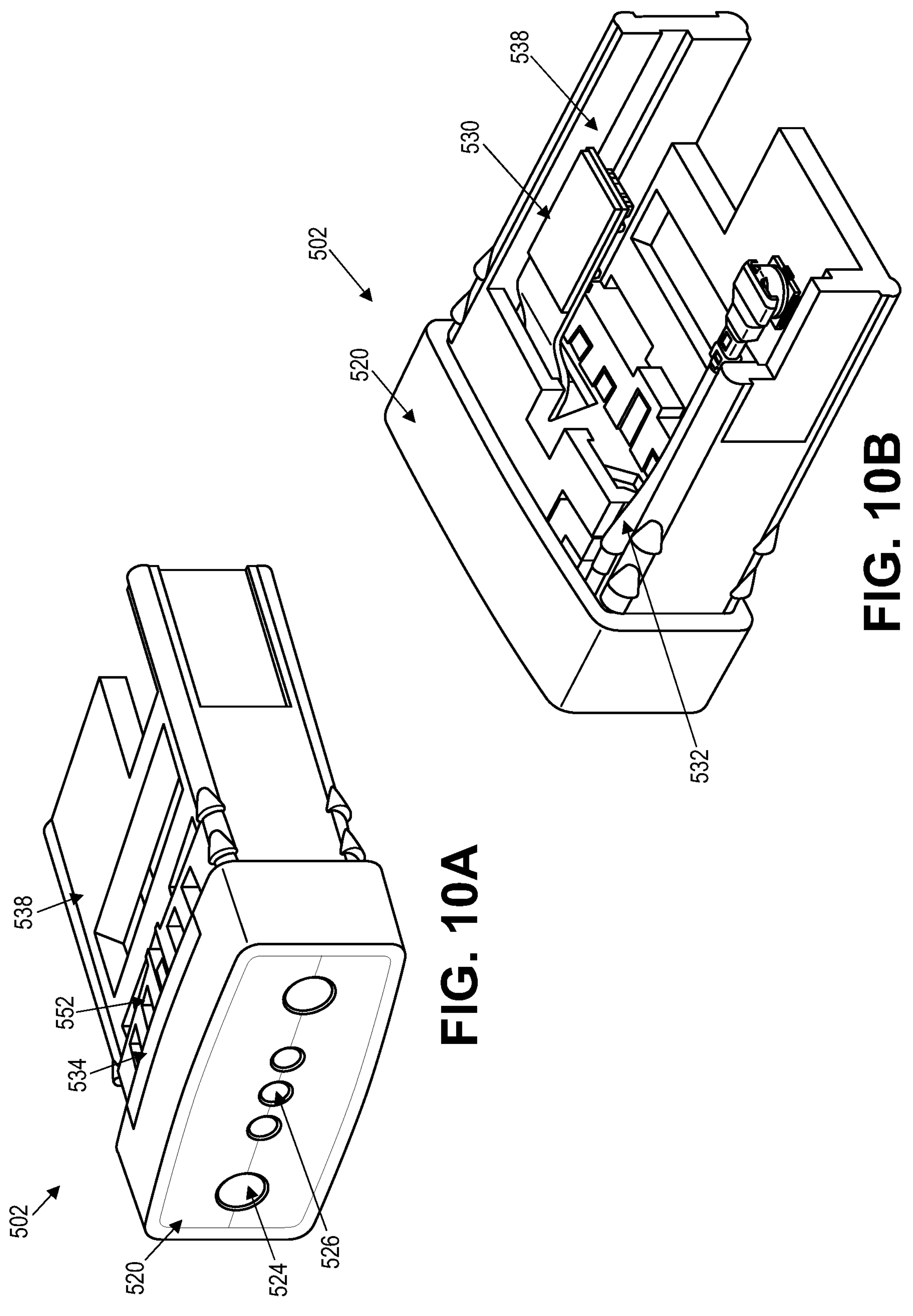
FIG. 10A shows a perspective view of an end cap module of a vaporizer device consistent with implementations of the current subject matter.
FIG. 10B shows a perspective view of an end cap module of a vaporizer device consistent with implementations of the current subject matter.
Figure 10C:
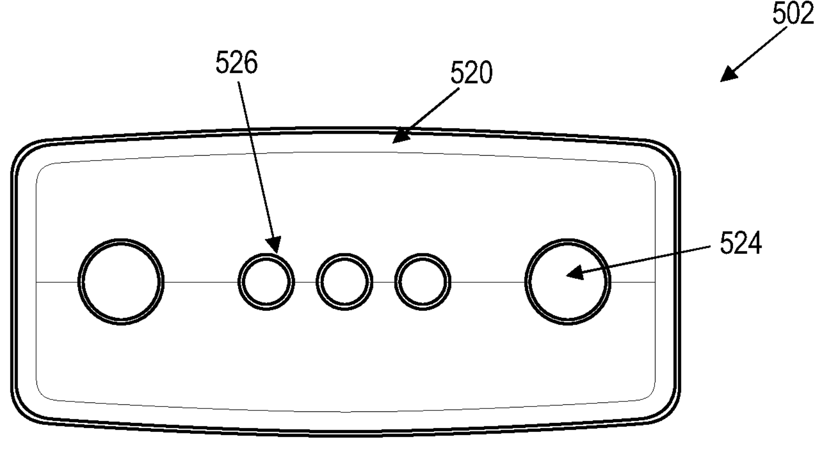
FIG. 10C shows a bottom view of an end cap module of a vaporizer device consistent with implementations of the current subject matter.
Figure 10D:
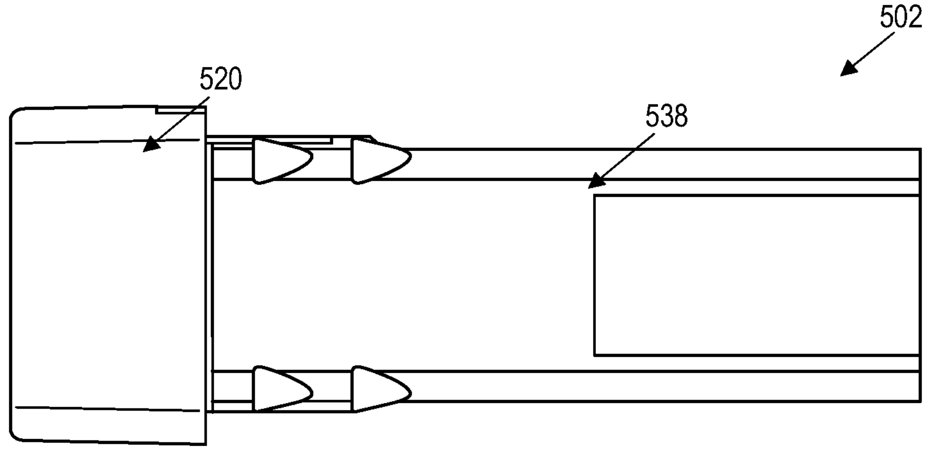
FIG. 10D shows a side view of an end cap module of a vaporizer device consistent with implementations of the current subject matter.
Figure 10E:
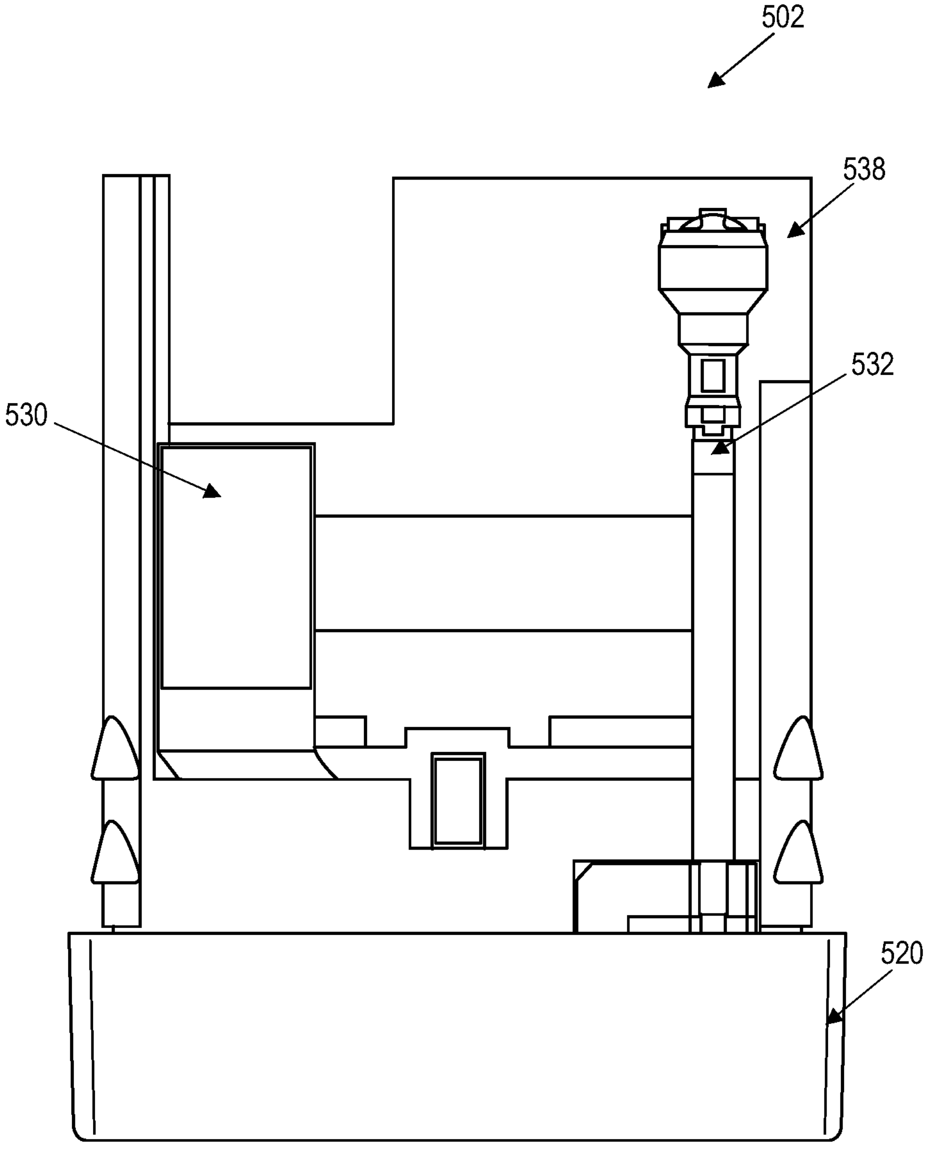
FIG. 10E shows a rear view of an end cap module of a vaporizer device consistent with implementations of the current subject matter.

The end cap module 502 provides an interface between the internal components of the vaporizer body 50, the outer shell 102, and an external power source. As explained in more detail below, the end cap module includes one or more charging contacts 524, and one or more illuminating devices (e.g., a light source), such as one or more light emitting diodes ("LEDs") 534 (see FIG. 10A). The charging contacts 524 can connect with an external power source to charge and/or recharge a power source of the vaporizer body 50. The light source 534 may provide various indicators to the user, such as via various lighting patterns and/or brightness levels.

FIG. 1A illustrates an example vaporizer body 50 including one or more modular components, in which the cartridge connector 106 is coupled with a skeleton 504. The cartridge connector 106, along with a part of the outer shell of the vaporizer body 50, forms the cartridge receptacle 69 of the vaporizer body 50. FIGS. 1B-1E illustrate an example vaporizer body 50 including one or more modular components.

Figure 1E:
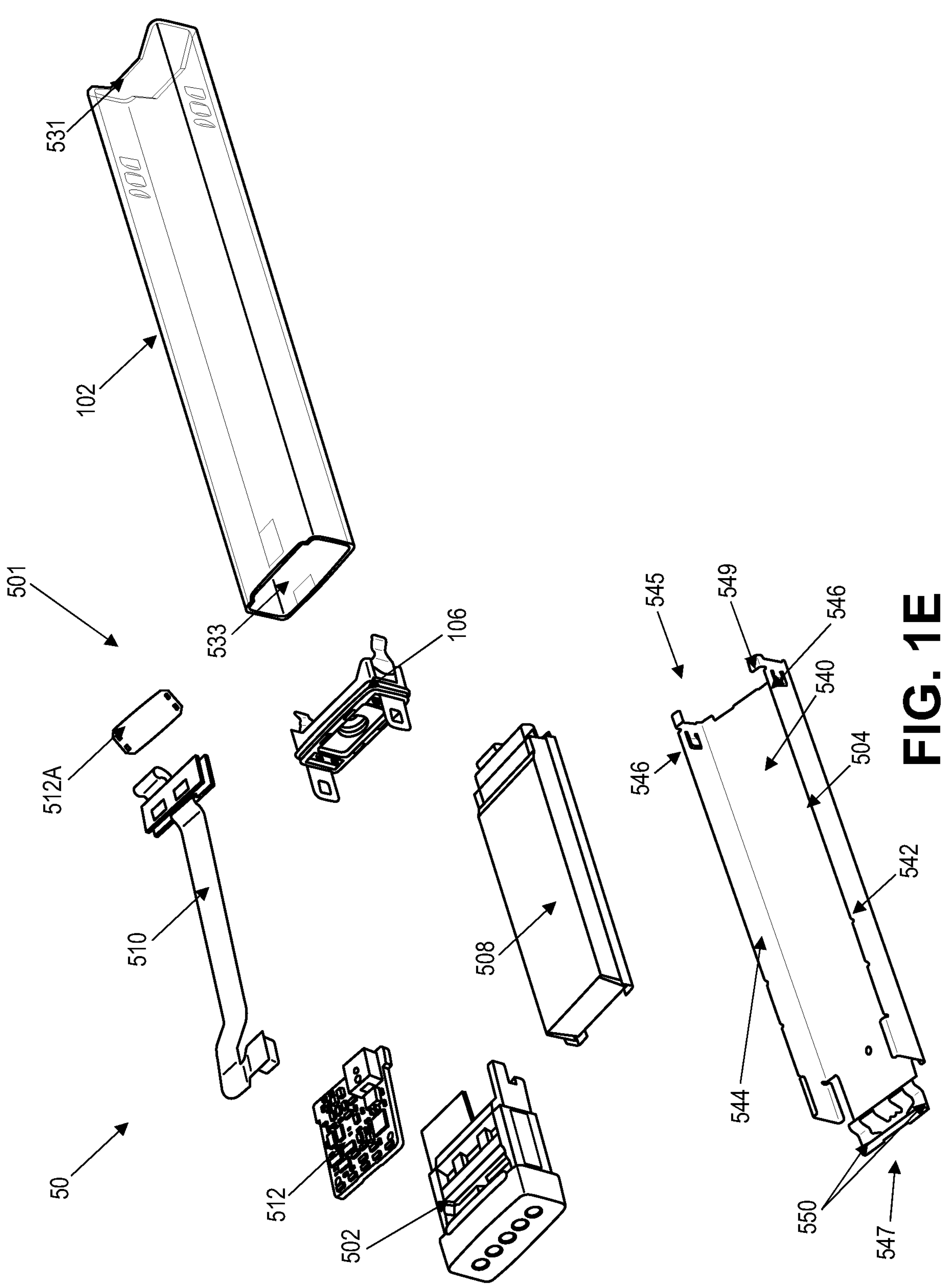
FIG. 1E shows an exploded view of a vaporizer device consistent with implementations of the current subject matter.

As shown in FIGS. 1B-1E, the vaporizer body 50 includes the outer shell 102 and a skeleton subassembly 501 (see FIG. 1E). The outer shell 102 includes a first end portion 531 and a second end portion 533, each of which define an opening. The opening of the first end portion 531 can receive one or more internal components of the vaporizer body 50, and can receive the vaporizer cartridge 52 in use. The opening of the second end portion 533 can receive one or more internal components of the vaporizer body 50, such as the skeleton subassembly 501. As described below, the second end portion 533 may be coupled with at least a portion of the skeleton subassembly 501, such as the end cap module 502.

Figure 8B:
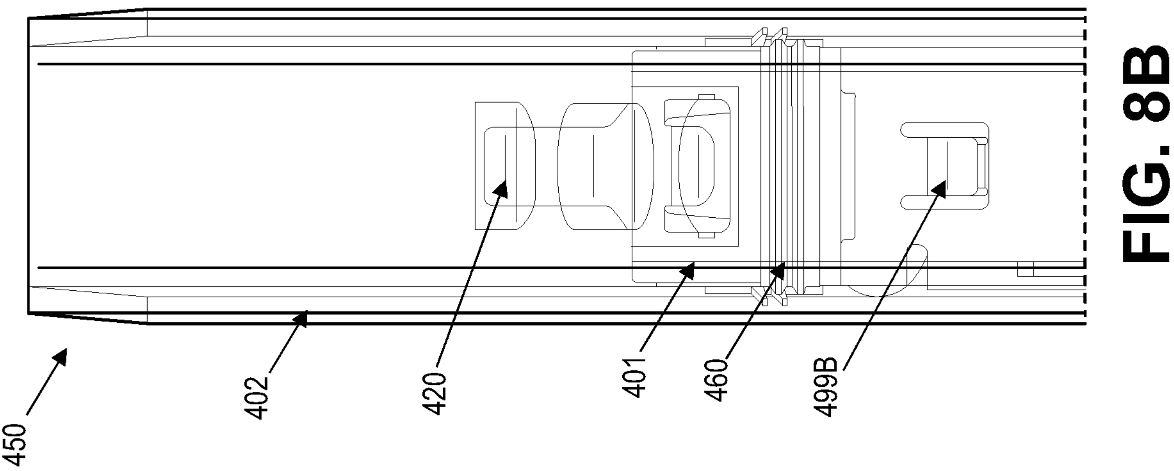
FIG. 8B shows a side view of a vaporizer device in which a cartridge connector is incorporated consistent with implementations of the current subject matter.
Figure 8A:
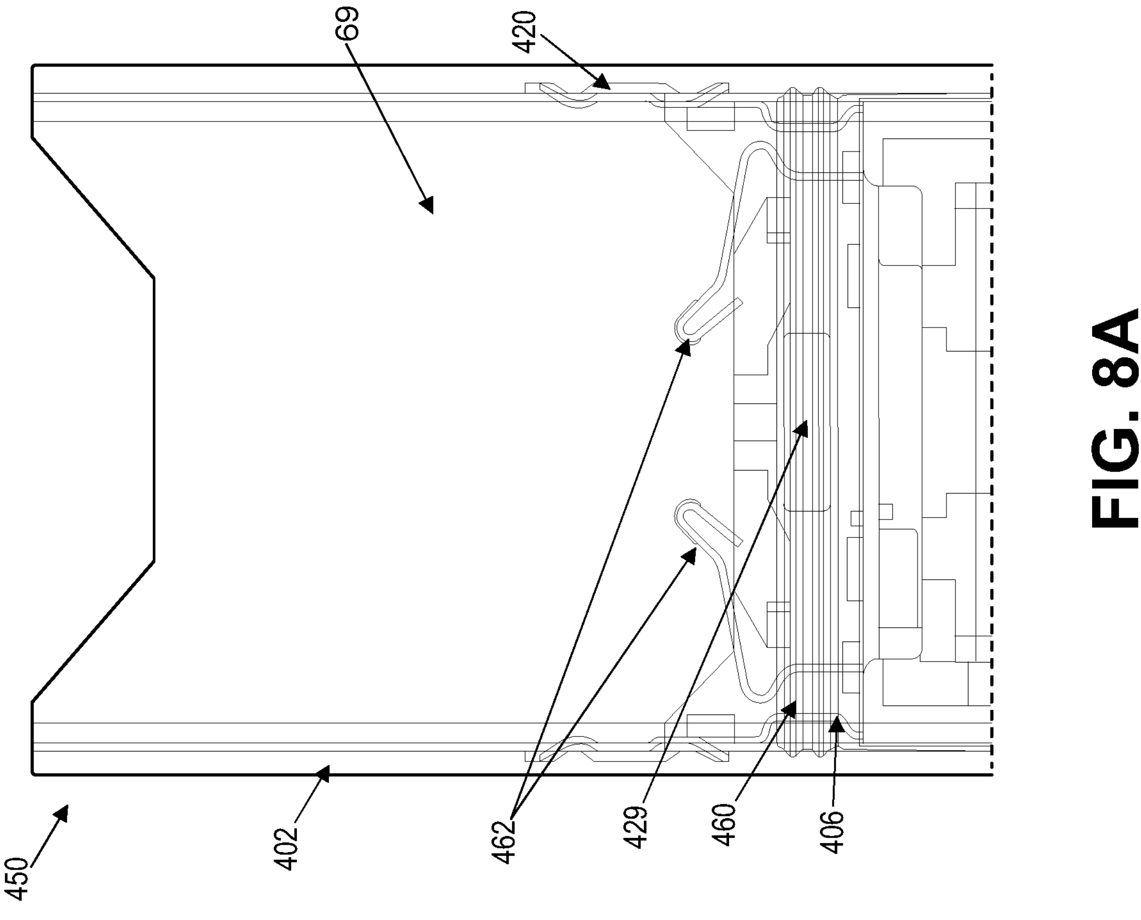
FIG. 8A shows a front view of a vaporizer device in which a cartridge connector is incorporated consistent with implementations of the current subject matter.
Figure 8D:
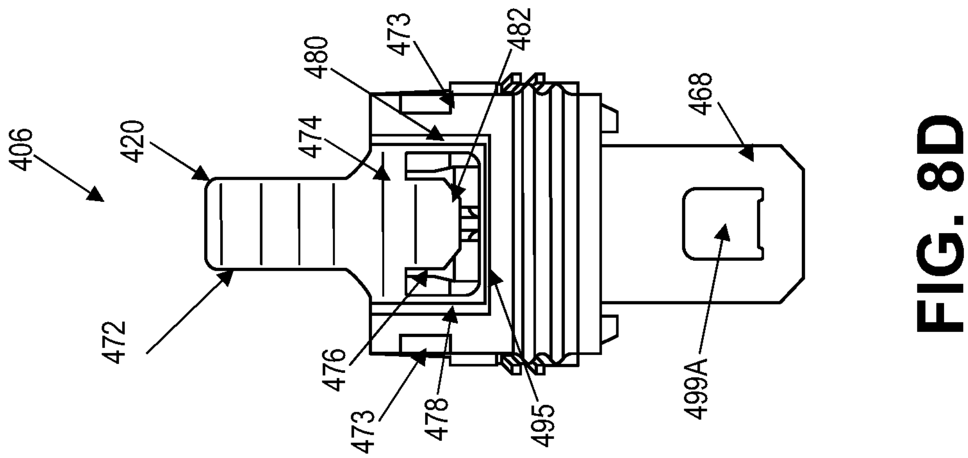
FIG. 8D shows a side view of a cartridge connector having a retaining feature and sidewall connection feature consistent with implementations of the current subject matter.
Figure 8C:
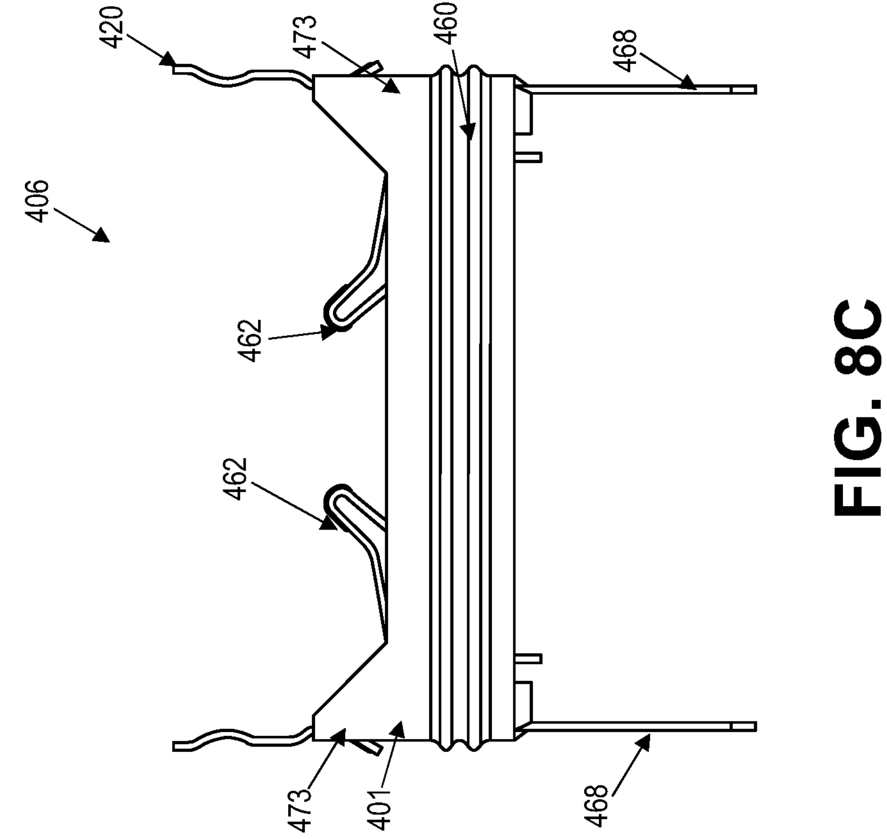
FIG. 8C shows a front view of a cartridge connector having a retaining feature and sidewall connection feature consistent with implementations of the current subject matter.
Figure 8F:
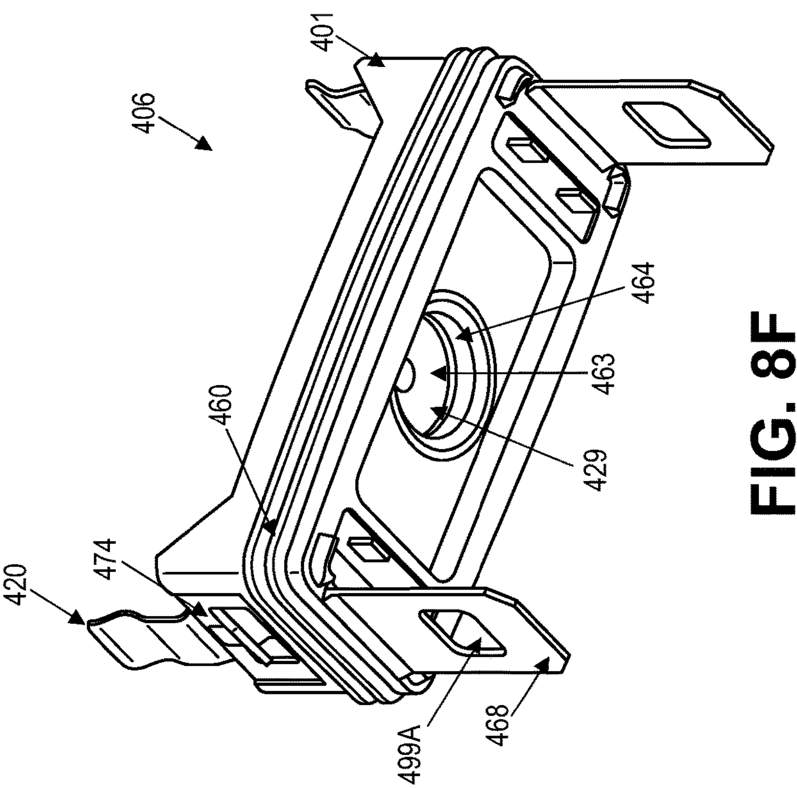
FIG. 8F shows a perspective view of a cartridge connector having a retaining feature and sidewall connection feature consistent with implementations of the current subject matter.
Figure 8E:
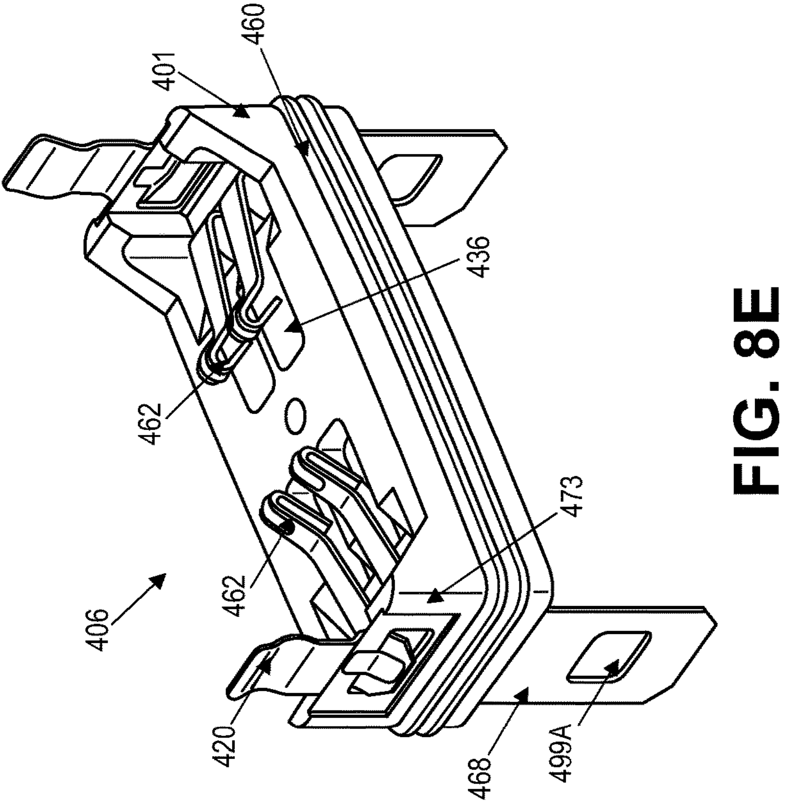
FIG. 8E shows a perspective view of a cartridge connector having a retaining feature and sidewall connection feature consistent with implementations of the current subject matter.
Figure 8G:
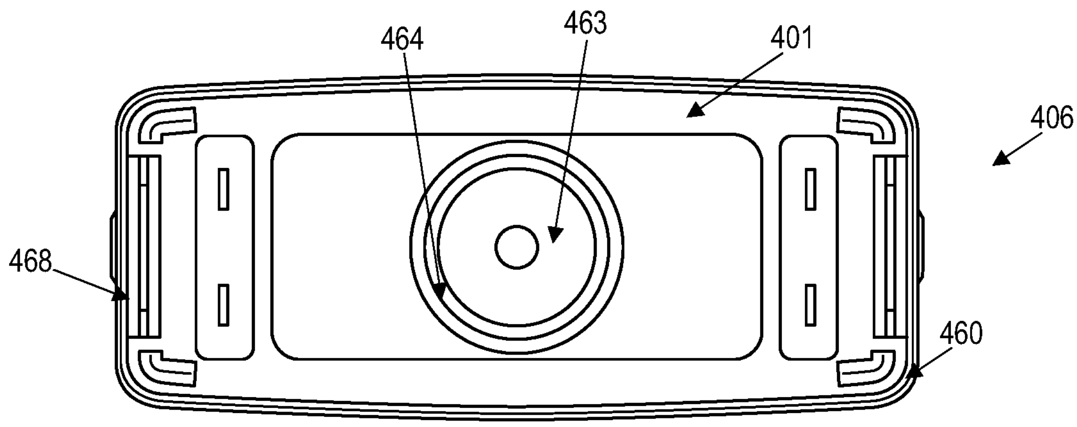
FIG. 8G shows a bottom view of a cartridge connector having a retaining feature and sidewall connection feature consistent with implementations of the current subject matter.
Figure 8H:
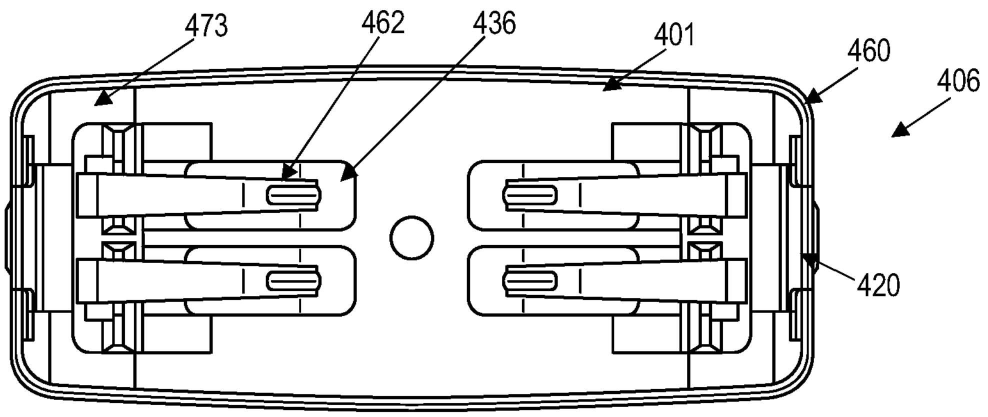
FIG. 8H shows a top view of a cartridge connector having a retaining feature and sidewall connection feature consistent with implementations of the current subject matter.

The outer shell 102 can have an approximately rectangular shape, as well as other shapes. The outer shell 102 includes opposing side walls that have one or more receiving features (see FIG. 8B). The one or more receiving features can couple with at least a portion of the skeleton subassembly 501, such as the cartridge connector 106. The receiving features include one or more recesses to couple with the cartridge connector 106, such as via a snap-fit arrangement, to retain the skeleton subassembly 501 within the outer shell 102.

In some implementations, the outer shell 102 can include certain materials, such as plastic, and/or a metal, such as stainless steel, extruded aluminum, etc. In some implementations, the outer shell 102 can include one or more windows 514 (see FIGS. 1B-1C) through which one or more LEDs and/or other indicators positioned in the vaporizer body 50 can be visible, such as a lower portion of the outer shell 102.

The skeleton subassembly 501 may include the skeleton 504, the end cap module 502, the cartridge connector 106, a power source, such as a battery 508, and electronic circuitry (e.g., a rigid flex 510, a printed circuit board assembly ("PCBA") 512, and a secondary PCBA 512A). The skeleton 504 defines a rigid tray structure that at least partially surrounds and secures the end cap module 502, the cartridge connector 106, the battery 508, the rigid flex 510, the PCBA 512, and the secondary PCBA 512A, and the other internal components of the vaporizer body 50. Thus, the modular components, such as at least the end cap module 502 and the cartridge connector 106, can be coupled to and reside within the skeleton 504 to form a subassembly that can then be coupled with the outer shell 102. As explained in more detail below, the skeleton subassembly 501 may be inserted into and removably coupled with the outer shell 102.

Referring to FIG. 1E, the skeleton 504 can include a rear wall 540, a first side wall 542, and a second side wall 544. The rear wall 540, the first side wall 542, and the second side wall 544 form a receiving region (e.g., an interior volume) in which at least portions of the other components of the skeleton subassembly 501 can be secured. Thus, the skeleton 504 forms a rigid tray structure that can secure the internal components of the vaporizer body 50. The skeleton 504 can be made of a metal, or other rigid material, such as a plastic.

The first and second side walls 542, 544 can include a retainer spring 546 at a first end portion 545 that can couple with and secure the cartridge connector 106 to the skeleton 504. The retainer springs 546 can extend inwardly from the first and second side walls 542, 544 of the skeleton 504 towards one another. The retainer springs 546 can be biased inwardly from the first and second side walls 542, 544 of the skeleton 504 towards one another to provide a spring-like function. As explained in more detail below, the retainer springs 546 can be coupled with a corresponding feature of the cartridge connector 106, such as via a snap-fit arrangement or biased arrangement. The first end portion 545 of the skeleton 504 may also include a cartridge connector securement member 549 that wraps around at least a portion of the cartridge connector 106 to better secure the cartridge connector 106 within the skeleton 504 and reduce movement of the cartridge connector 106 when assembled.

At a second end portion 547, the skeleton 504 can include end cap module connection features 550. The end cap module connection features 550 can extend from the second end portion 547 beyond the rear wall 540. The end cap module connection features 550 can couple with at least a portion of the end cap module 502. The end cap module connection features 550 can be configured to be positioned within a slot of the end cap module 502 to secure the end cap module 502 to the skeleton 504.

Figure 28:
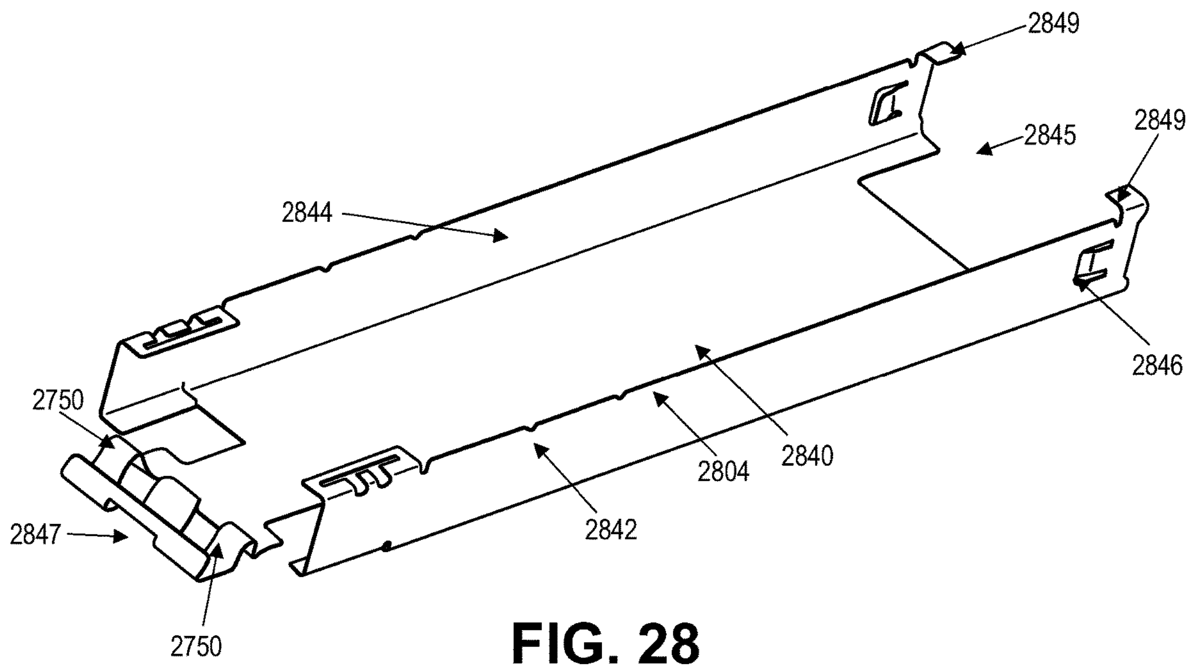
FIG. 28 shows a perspective view of a skeleton consistent with implementations of the current subject matter.
Figure 29B:
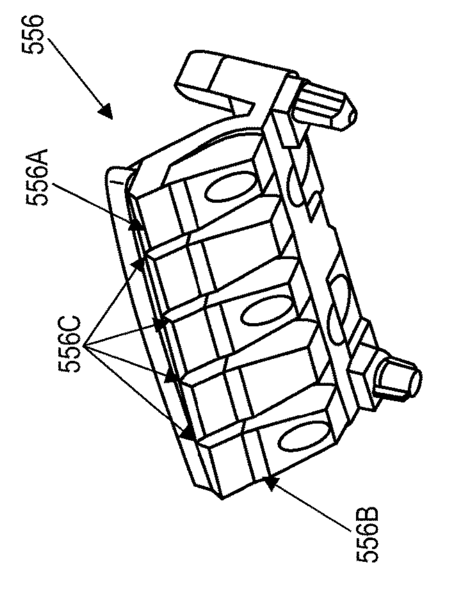
FIG. 29B shows a perspective view of a light pipe consistent with implementations of the current subject matter.
Figure 29D:
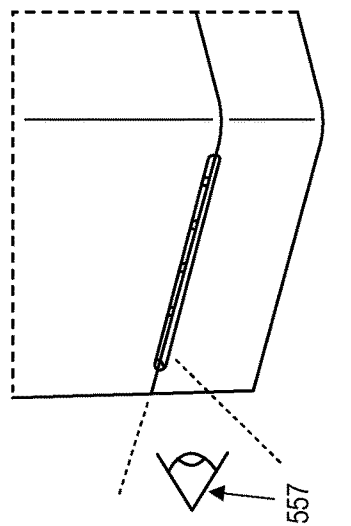
FIG. 29D shows a perspective view of a vaporizer body having a light pipe consistent with implementations of the current subject matter.
Figure 29A:
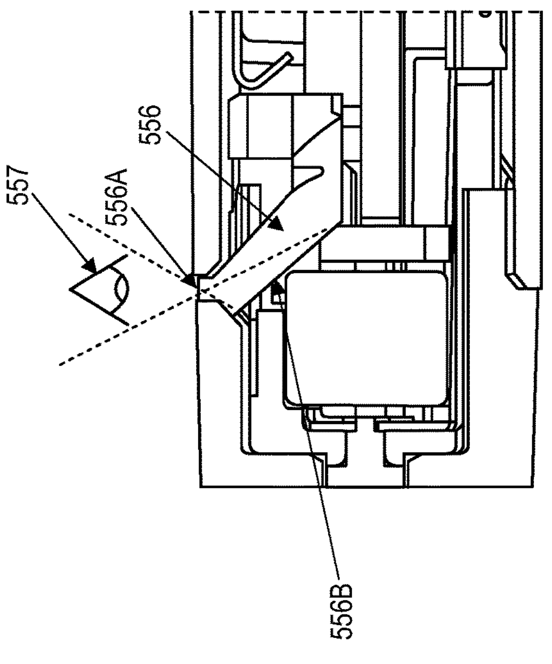
FIG. 29A shows a side cross-sectional view of a vaporizer body showing a light pipe consistent with implementations of the current subject matter.
Figure 29C:
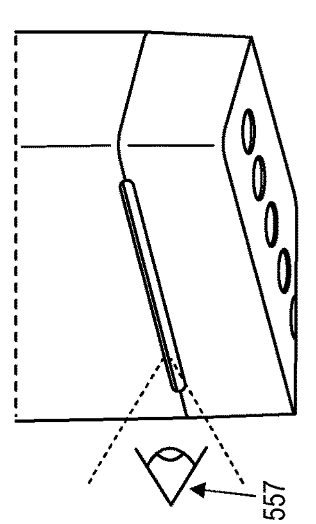
FIG. 29C shows a perspective view of a vaporizer body having a light pipe consistent with implementations of the current subject matter.

FIG. 28 illustrates another example of a skeleton 2804, which may include the same or similar properties and features as the skeleton 504. For example, the skeleton 2804 can include a rear wall 2840, a first side wall 2842, and a second side wall 2844. The rear wall 2840, the first side wall 2842, and the second side wall 2844 form a receiving region in which at least portions of the other components of the skeleton subassembly 2801 can be secured. Thus, the skeleton 2804 forms a rigid tray structure that can secure the internal components of the vaporizer body 50. The skeleton 2804 can be made of a metal, or other rigid material, such as a plastic.

The first and second side walls 2842, 2844 can include a retainer spring 2846 at a first end portion 2845 that can couple with and secure the cartridge connector 106 to the skeleton 2804. The retainer springs 2846 can extend inwardly from the first and second side walls 2842, 2844 of the skeleton 2804 towards one another. The retainer springs 2846 can be biased inwardly from the first and second side walls 2842, 2844 of the skeleton 2804 towards one another to provide a spring-like function. As explained in more detail below, the retainer springs 2846 can be coupled with a corresponding feature of the cartridge connector 106, such as via a snap-fit arrangement or biased arrangement. The first end portion 2845 of the skeleton 2804 may also include a cartridge connector securement member 2849 that wraps around at least a portion of the cartridge connector 106 to better secure the cartridge connector 106 within the skeleton 2804 and reduce movement of the cartridge connector 106 when assembled.

At a second end portion 2847, the skeleton 2804 can include end cap module connection features 2850. The end cap module connection features 2850 can extend from the second end portion 2847 beyond the rear wall 2840. The end cap module connection features 2850 can couple with at least a portion of the end cap module 2802. The end cap module connection features 2850 can be configured to be positioned within a slot of the end cap module 2802 to secure the end cap module 2802 to the skeleton 2804.

FIGS. 2A-4 illustrate examples of the cartridge connector 106 or portions of the cartridge connector 106 in accordance with implementations of the current subject matter. The cartridge connector 106 can include the cartridge connector body 101, the sealing mechanism 160, one or more receptacle contacts 62 and/or one or more retaining features 120.

Figure 2B:
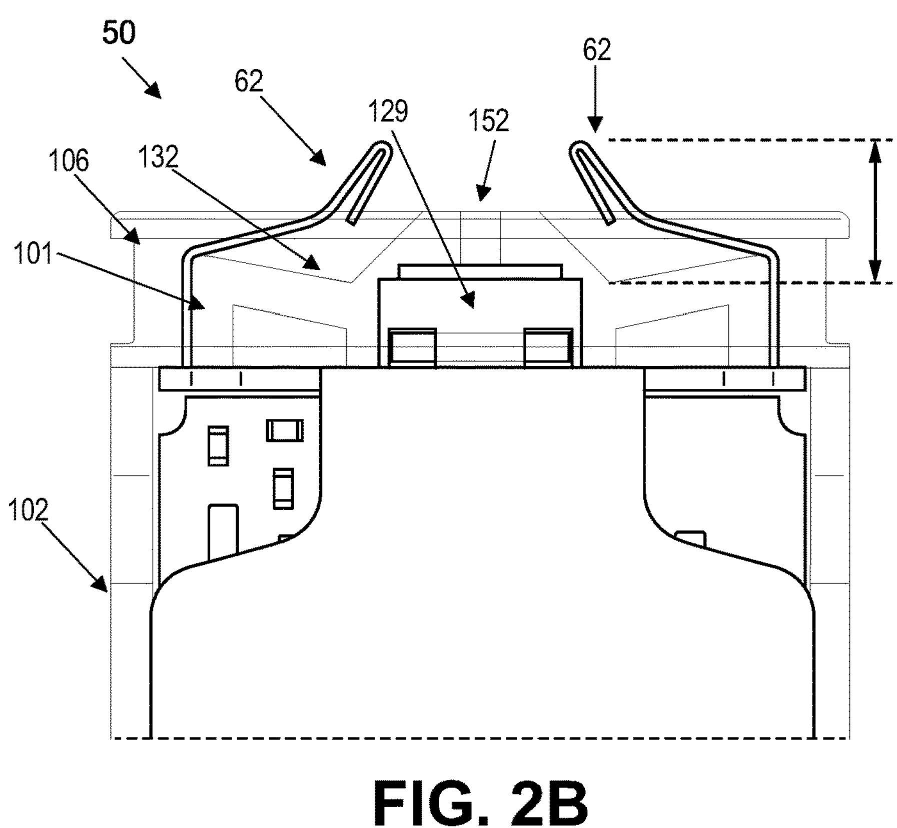
FIG. 2B shows a partial front cross-sectional view of a vaporizer device in which a cartridge connector is incorporated consistent with implementations of the current subject matter.
Figure 2C:
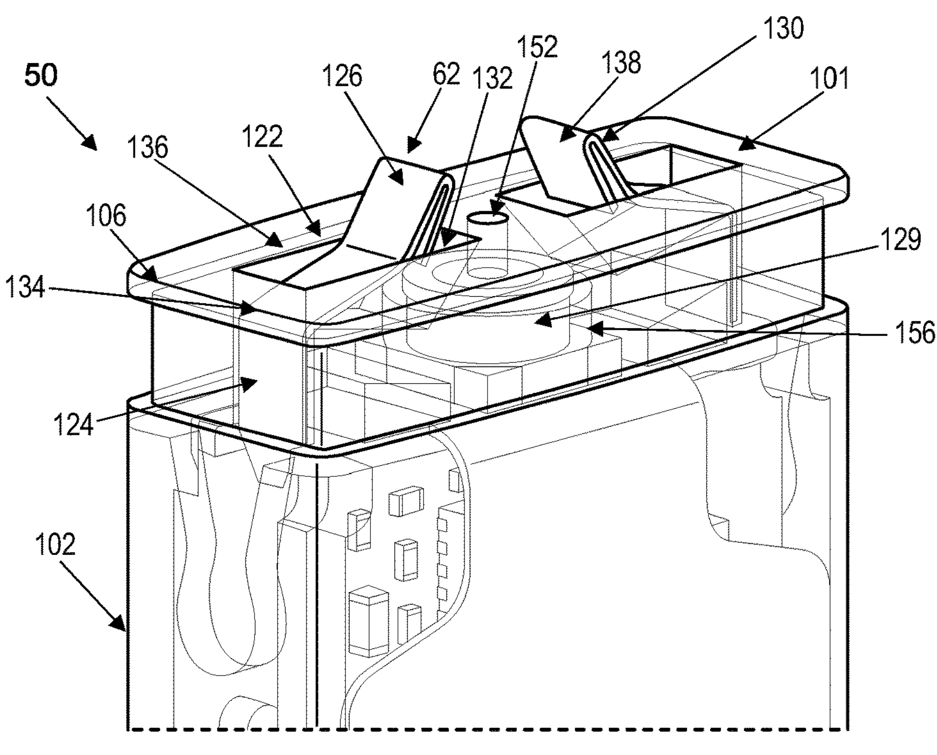
FIG. 2C shows a cutaway view of a vaporizer device in which a cartridge connector is incorporated consistent with implementations of the current subject matter.

FIGS. 2B and 2C show examples of the cartridge connector body 101 consistent with implementations of the current subject matter. As shown, the cartridge connector body 101 can include at least one connector slot 136 along the top portion 112 of the cartridge connector 106 that can receive at least a portion of a corresponding receptacle contact 62.

The connector slot 136 includes a platform 132. The platform 132 supports the receptacle contacts 62 when the vaporizer cartridge 52 is coupled with the outer shell 102. The platform 132, together with surrounding walls, may also help to reduce damage caused to the receptacle contacts 62, such as by a cleaning apparatus. The platform 132 can be approximately parallel to the upper surface of the cartridge connector 106. In some implementations, the platform 132 can be angled relative to the upper surface of the cartridge connector 106.

Figure 2D:
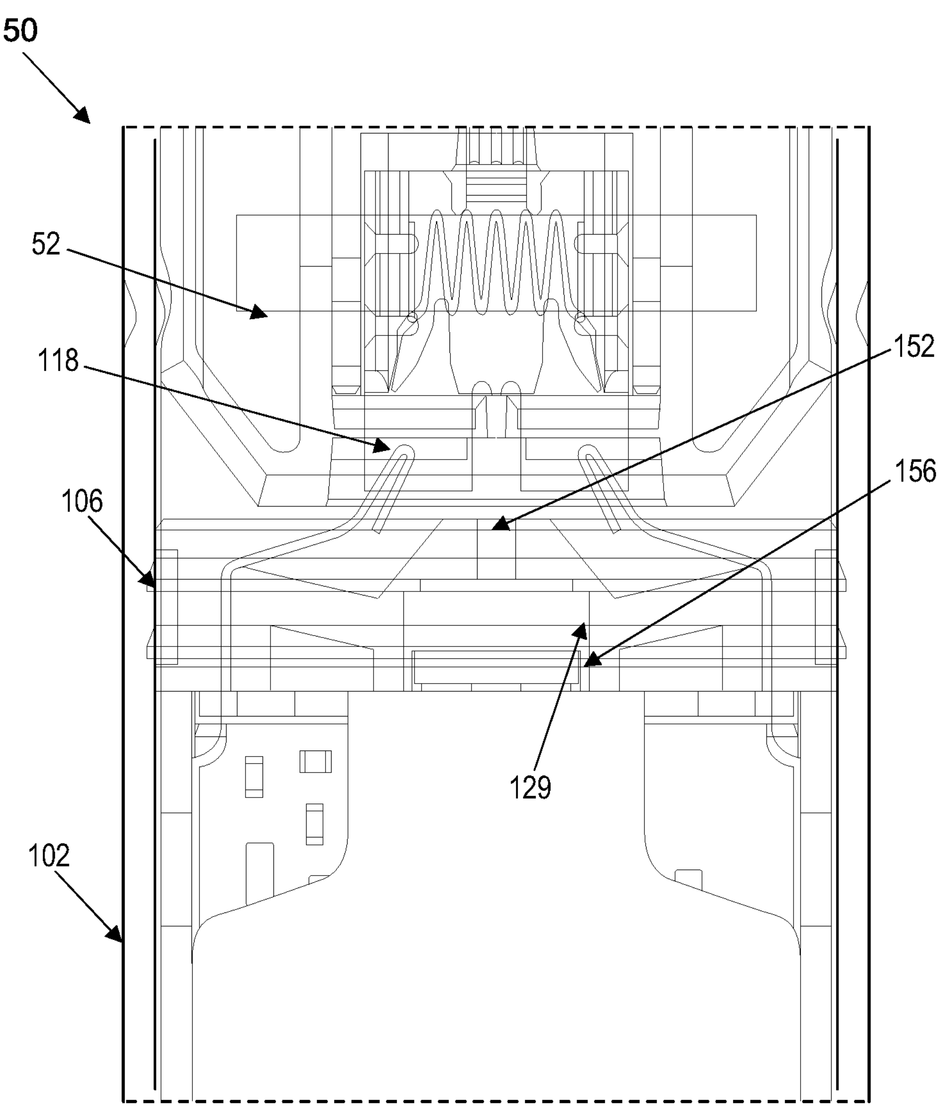
FIG. 2D shows a partial front cross-sectional view of a vaporizer device in which a cartridge connector is incorporated consistent with implementations of the current subject matter.
Figure 3:
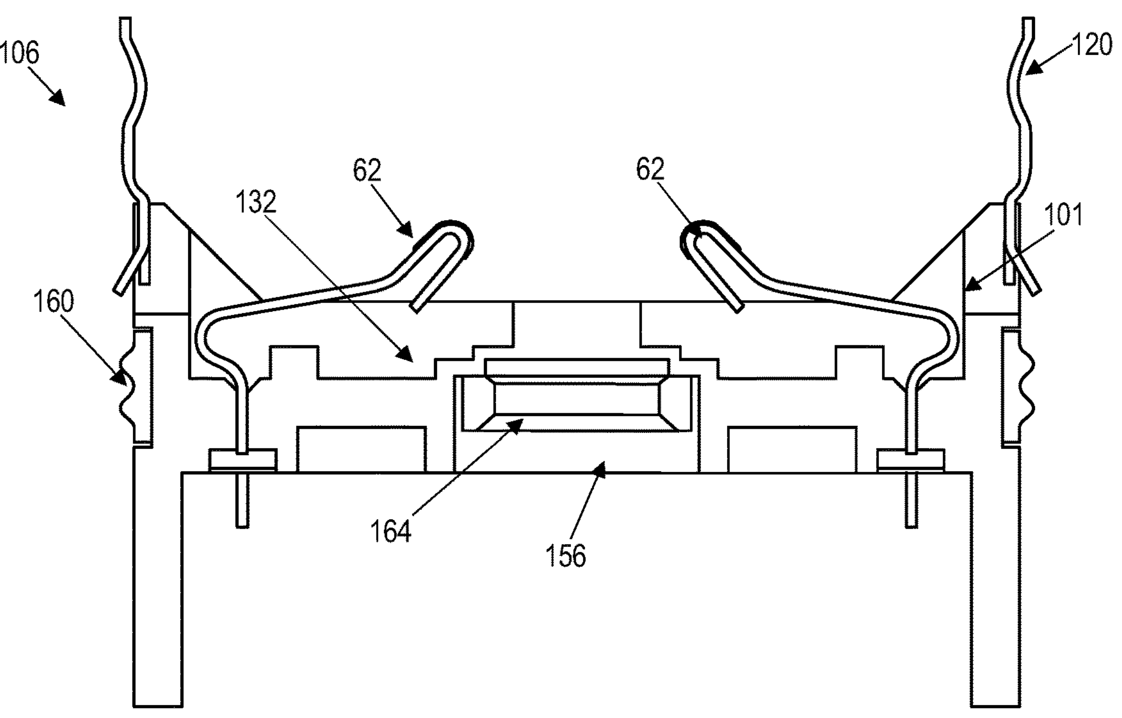
FIG. 3 shows a front cross-sectional view of a cartridge connector consistent with implementations of the current subject matter.
Figure 4:
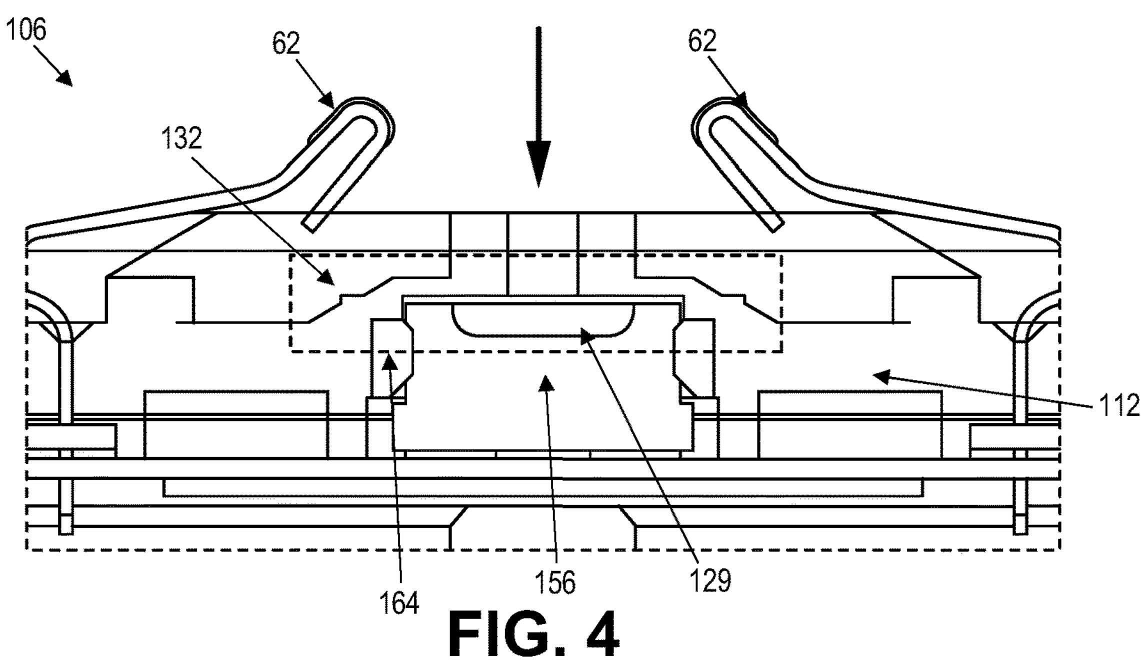
FIG. 4 shows a front cross-sectional view of a cartridge connector consistent with implementations of the current subject matter.
Figure 5A:
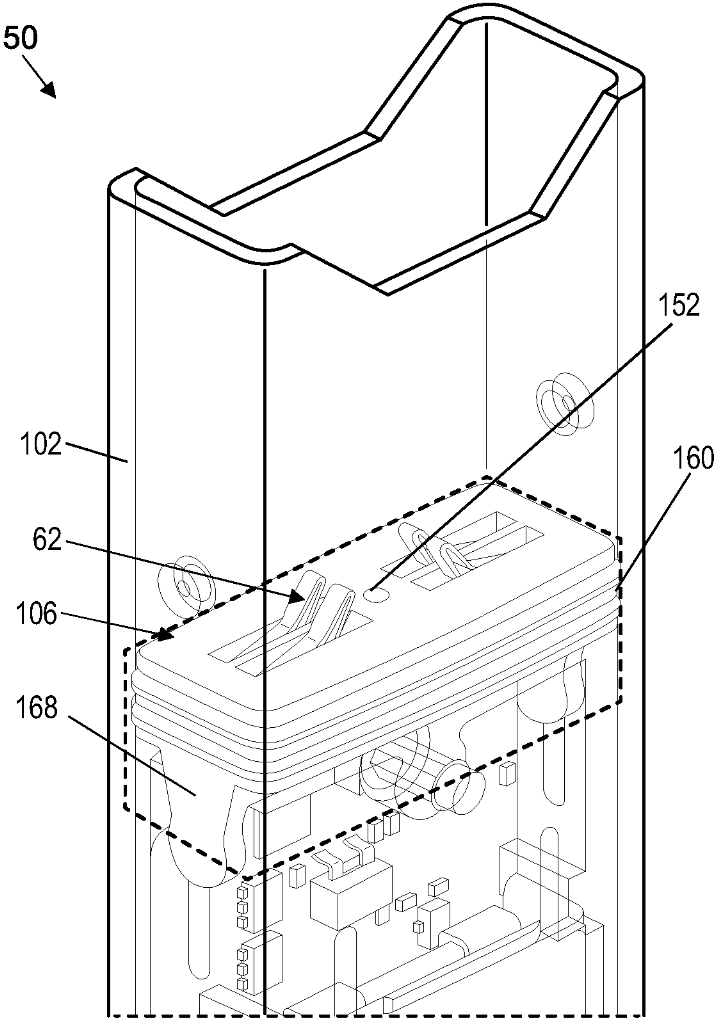
FIG. 5A shows a perspective view of a vaporizer device in which a cartridge connector is incorporated consistent with implementations of the current subject matter.
Figure 5B:
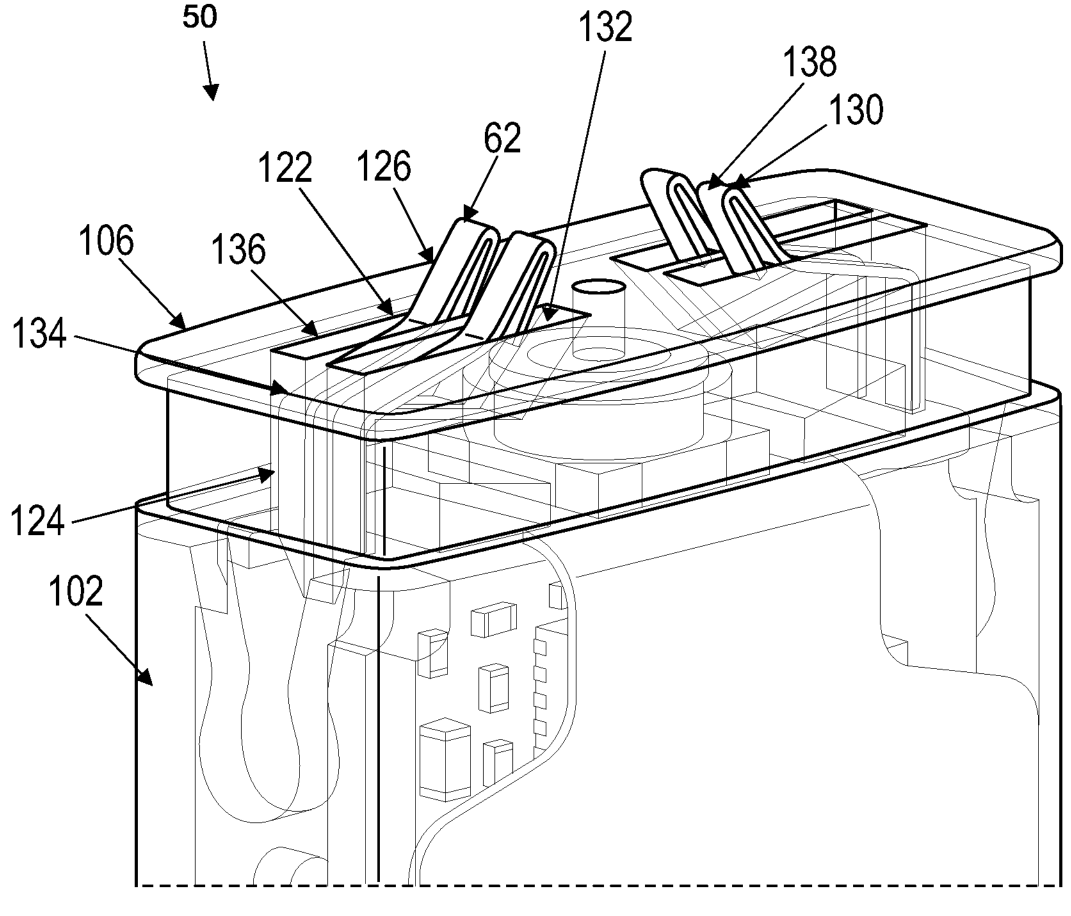
FIG. 5B shows a perspective view of a vaporizer device in which a cartridge connector is incorporated consistent with implementations of the current subject matter.
Figure 5J:
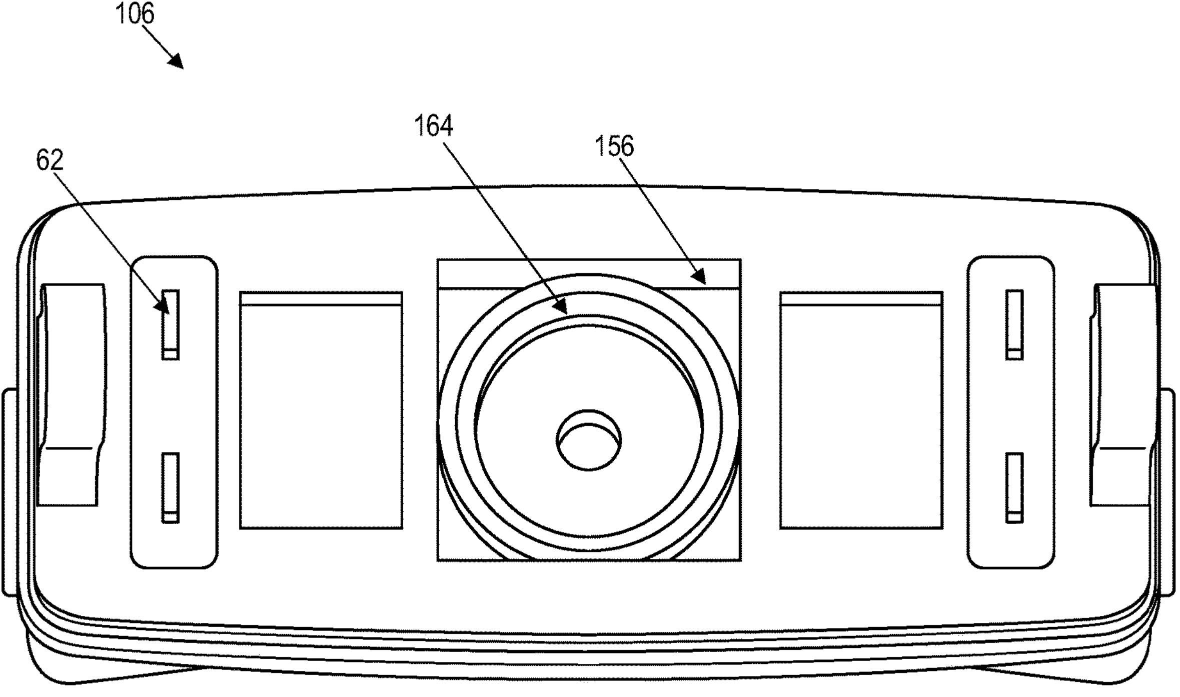
FIG. 5J shows a bottom view of a cartridge connector consistent with implementations of the current subject matter.

For example, as shown in at least FIGS. 2B and 2D, the platform 132 can be angled downwardly towards a central longitudinal axis of the cartridge connector 106. Such configurations can allow the receptacle contacts 62 to rotate and/or bend further into the cartridge connector 106 when the vaporizer cartridge 52 is assembled to the outer shell 102 and/or cartridge connector 106. Such configurations can desirably allow for a more secure connection between the receptacle contacts 62 and the cartridge contacts 65. The angled platforms 132 can desirably allow the receptacle contacts 62 to be positioned closer to the center of the cartridge connector 106 and/or farther from the sides of the cartridge connector 106. Such configurations can desirably provide additional space for a greater wall thickness along the sides of the cartridge connector 106 for additional reinforcement for the retaining features (described below). FIG. 2G illustrates an example of the platforms 132 consistent with implementations of the current subject matter, having one or more angled ramped sections. FIG. 3 illustrates an example of the platforms 132 consistent with implementations of the current subject matter, having one or more stepped sections. FIG. 4 illustrates an example of the platforms 132 consistent with implementations of the current subject matter, having one or more ramped sections and stepped sections.

The connector slots 136 can receive one or more receptacle contacts 62. In some implementations, the cartridge connector 106 can include at least two receptacle contacts 62. For example, FIGS. 2A-2K, 3, and 4 illustrate examples of the cartridge connector 106 incorporating at least two receptacle contacts 62. In some implementations, the cartridge connector 106 can include at least four receptacle contacts 62 (see, for example, FIGS. 5A-8H), or a greater or lesser number of receptacle contacts 62. The receptacle contacts 62 can be integrally formed with the cartridge connector 106, or be formed separately from the cartridge connector 106 and later coupled with the cartridge connector 106.

The receptacle contacts 62 can be positioned on a portion of the cartridge connector 106 that is configured to interface with a portion of the vaporizer cartridge 52. The receptacle contacts 62 are positioned along the top portion 112 of the cartridge connector 106. The receptacle contacts 62 may define portions of the cartridge connector 106 that extend upwardly from an upper surface of the top portion 112 of the receptacle contacts 62.

The receptacle contacts 62 can include certain material that enhances the properties of the receptacle contacts 62 and/or can help to maintain a better connection between the receptacle contacts 62 and the cartridge contacts 65. For example, the receptacle contacts 62 may include an alloy or metal, such as beryllium copper, titanium copper, steel, stainless steel, or the like, among other alloys or metals having one or more of a high strength, spring properties, corrosion resistance, high conductivity, and/or the like. At least a portion of the receptacle contacts 62 can be plated with a material, such as gold, to strengthen the plated portion of the receptacle contacts 62. For example, a bend between the lower and upper portion of the bend portion 134 can be gold plated.

The receptacle contacts 62 can increase performance of the vaporizer body 50 consistent with implementations of the current subject matter. In some implementations, the receptacle contacts can desirably have a life span lasting at least 10,000, 30,000, or greater cycles before fatigue. In some implementations, the materials of the receptacle contacts 62 can allow a maximum continuous current draw of 1 A or 2 A and/or a 2 A or greater maximum for short term current draw.

The receptacle contacts 62 can include a contact portion 122 and/or a coupling portion 124. At least a portion of the contact portion 122 can be configured to contact and/or electrically couple with the vaporizer cartridge 52. The coupling portion 124 can be coupled with the cartridge connector 106 and/or other components, such as a circuit board (e.g., a PCBA).

The contact portion 122 of the receptacle contacts 62 can include an outer surface 126 that can contact the vaporizer cartridge 52 when assembled. The outer surface 126 can be desirably shaped to provide a wide surface area for contacting the vaporizer cartridge 52. The wide surface area can provide a better and/or more secure contacting interface between the receptacle contacts 62 and the cartridge contacts 65 of the vaporizer cartridge 52. The outer surface 126 can be flat and/or rounded, among other configurations. The flat outer surface 126 can desirably provide a more secure contacting interface between the receptacle contacts 62 and the cartridge contacts 65 of the vaporizer cartridge 52.

The receptacle contacts 62 can define a biasing member, such as one or more springs. For example, in some implementations, the contact portion 122 can extend at an angle relative to a horizontal axis that is parallel to a top surface of the cartridge connector 106. The angled contact portion 122 can bias the receptacle contacts 62 away from a platform 132 positioned within the connector slot 136. In some implementations, the receptacle contacts 62 can be biased towards the vaporizer cartridge 52 when assembled, or towards an upper portion of the outer shell 102 of the vaporizer body 50.

The contact portion 122 can include a lower portion 128 and an upper portion 130. The lower portion 128 and/or the upper portion 130 can be angled upwardly away from the platform 132. In some implementations, the lower portion 128 can extend at an angle away from the platform 132 and the upper portion 130 can extend at an angle relative to the platform 132. The angle of the lower portion 128 can be less than the angle of the upper portion 130. Such configurations can provide a more secure connection between the receptacle contacts 62 of the cartridge connector 106 and the cartridge contacts 65 of the vaporizer cartridge 52. For example, when the vaporizer cartridge 52 is inserted into the outer shell 102 of the vaporizer body 50, the cartridge contacts 65 can contact the receptacle contacts 62. The cartridge contacts 65 can press down on the angled receptacle contacts 62, causing at least a portion of the contact portion 122 to rotate, bend and/or deflect from a neutral position to a compressed position towards the platform 132 about a bend portion 134 of the receptacle contacts 62. Such configurations can desirably help to ensure that the cartridge contacts 65 are securely in communication with the receptacle contacts 62 when assembled. In some implementations, the contact portion 122 can deflect up to or at least 1.2 mm from the neutral position to the compressed position. In some implementations, the receptacle contacts 62 can provide at least 80 to 110 g force at the fully compressed position.

In some implementations, the receptacle contacts 62 can include an anti-snag feature 138. The anti-snag feature 138 can be positioned at an end of the upper portion 130 of the contact portion 122 and include a portion of the receptacle contacts 62 that is bent underneath the outer surface of the upper portion 130 and/or otherwise blunted. The anti-snag feature 138 can desirably help to limit or prevent the vaporizer cartridge 52 from catching on the receptacle contacts 62. Such configurations can desirably lengthen the life of the receptacle contacts 62. The anti-snag feature 138 can help to limit or prevent catching on the receptacle contacts 62 during cleaning, for example.

As shown in at least FIGS. 2B-2D and 2G, the coupling portion 124 can extend downwardly from a lower portion of the contact portion 122. In some implementations, the coupling portion 124 can extend in a direction that is approximately parallel to a longitudinal axis of the cartridge connector 106 and/or to a side of the outer shell 102. In some implementations, the coupling portion 124 can extend at least partially within a coupling slot 140 of the cartridge connector 106. In some implementations, at least the coupling portion 124 can be insert molded, stitched, glued, adhered, press-fit, and/or post bent into at least the coupling slot 140 of the cartridge connector 106. An opening of the coupling slot 140 can be formed within the connector slot 136. The coupling slot 140 can extend through the cartridge connector 106 such that the coupling slot 140 includes an opening at an upper and lower end of the coupling slot 140. The bend portion 134 can be supported by an edge formed by the platform 132 and an inner sidewall of the coupling slot 140.

As mentioned above, the cartridge connector 106 can include a controller 19, which can be or include a circuit board 142, such as a flexible circuit board 142 and/or PCBA 512, among other configurations. A circuit board 142 can be coupled to the bottom portion 114 of the cartridge connector 106 via a rigid flex 510 and/or the secondary PCBA 512A. The circuit board 142 can be positioned below the cartridge connector 106 when the cartridge connector 106 is assembled with the outer shell 102. In some implementations, the circuit board 142 can include an upper portion that can be coupled to a lower surface of the cartridge connector 106. In some implementations, the circuit board 142 is adhered and/or mechanically coupled to the cartridge connector 106.

As shown in at least FIGS. 2H and 2I, the circuit board 142 can be coupled with the receptacle contacts 62. The receptacle contacts 62 can include a lower end portion that is soldered, crimped, mechanically coupled, and/or otherwise coupled with a lower surface of the cartridge connector 106 and/or the circuit board 142. In some implementations, the lower surface of the cartridge connector 106 can include solder pads for the receptacle contacts 62 to solder to. In some implementations, plastic, such as LDS, can be used to form traces that can be hot bar soldered to the circuit board 142, for example.

Soldering the receptacle contacts 62 to the cartridge connector 106 and/or the circuit board 142 can provide a direct path to the vaporizer cartridge 52 when assembled. Such configurations can desirably reduce error and/or defects in manufacturing and maintain a more secure connection between the circuit board and the vaporizer cartridge 52, prolonging the life of the body 50.

As previously mentioned, to reliably activate a portion of the atomizer component of the vaporizer cartridge 52, a pressure sensor 129 can be positioned in the air path and/or can be connected to the air path of the air being transmitted through the vaporizer device along an airflow path. In some examples, in association with a user's puff, the atomizer component may be activated, e.g., by automatic detection of the puff via a pressure sensor, such as the pressure sensor 129.

The pressure sensor 129 (shown in at least FIGS. 2B-2D and 4) can be positioned on a lower surface of the bottom portion 114 of the cartridge connector 106. In some implementations, the cartridge connector 106 can include a pressure sensor recess 156. The pressure sensor recess 156 can be positioned in the lower surface of the bottom portion 114 of the cartridge connector 106. The pressure sensor recess 156 can receive and/or retain the pressure sensor 129 and/or the pressure sensor sealing mechanism 164 (described below).

The pressure sensor recess 156 can be approximately rectangular (for example, FIG. 5J), squared, oval, circular, or other shapes. The pressure sensor recess 156 can be shaped and/or sized to receive the pressure sensor 129 and/or the pressure sensor sealing mechanism 164. The pressure sensor 129 can be adhered, soldered, mechanically coupled, and/or the like to the lower surface of the bottom portion of the cartridge connector 106 within the pressure sensor recess 156. In some implementations, the pressure sensor 129 can be insert molded into at least a portion of the cartridge connector 106 for additional support and/or stability. The pressure sensor 129 can be desirably positioned close to the interface between the vaporizer cartridge 52 and the cartridge connector 106. Such configurations can desirably reduce the length of the air path between the vaporizer cartridge 52 and the pressure sensor 129. This can help to reduce or limit inaccurate readings, leaks in the air path, and/or unwanted air or other materials from contacting the pressure sensor 129. Such configurations can desirably enhance performance of the vaporizer device 100.

As shown in at least FIGS. 2A-2K, 3, and 4, the cartridge connector 106 can include a pressure sensor port 152. The pressure sensor port 152 can define a passageway extending through a thickness of the cartridge connector 106. The passageway can provide an air path for air to pass to the pressure sensor 129, such as during the user's puff. The pressure sensor port 152 can be approximately aligned with the longitudinal axis of the cartridge connector 106. The pressure sensor port 152 can be positioned between the receptacle contacts 62. The pressure sensor port 152 can be positioned between the connector slots 136. An opening of the pressure sensor port 152 can be desirably positioned at the upper surface of the top portion 112 of the cartridge connector 106. Such configurations can desirably align with at least a portion of an air passageway of the vaporizer cartridge 52 when assembled to accurately determine when the user is taking a puff.

To accurately measure air pressure to determine whether the user is taking a puff, the pressure sensor 129 can optionally be desirably positioned away from the vaporizer cartridge 52 and/or sealed on one side of the cartridge connector 106 (e.g., the side away from the vaporizer cartridge 52 or opposite the cartridge receptacle 69 when assembled). Such a seal can desirably help to limit or prevent unwanted air or other material from passing the sides of the cartridge connector 106, allowing unwanted material to build up on internal components of the vaporizer body 50. It is desirable for the cartridge connector 106 to include a gasket or seal, such as the sealing mechanism 160 consistent with implantations of the current subject matter to limit liquid or air from passing by the pressure sensor 129 or cartridge connector 106 to the interior of the vaporizer body 50. This helps to limit or prevent ingress of unwanted material into the vaporizer body 50 for better reliability and improves the performance of the vaporizer body 50 by helping to ensure accurate pressure measurements are taken by the pressure sensor 129.

Referring to FIGS. 2B and 2C, the cartridge connector body 101 can include a sealing recess 163 (see, e.g., FIGS. 2B and 2C). The sealing recess 163 extends radially around a perimeter of the outer side surface of the cartridge connector body 101. The sealing recess 163 extends inwardly from the outer side surface of the cartridge connector body 101 to a recessed side surface of the cartridge connector body 101. The sealing recess 163 can be positioned offset from an upper surface of the top portion 112 and offset from a lower surface of the bottom portion 114 of the cartridge connector 106. The sealing recess 163 can be configured to receive at least a portion of the sealing mechanism 160 as explained in more detail below, to support the sealing mechanism 160 within the recess 163 when assembled. Such configurations can desirably reinforce the sealing mechanism 160 to better maintain and/or secure the seal formed between the cartridge connector 106 and the inner surface of the outer shell 102.

The sealing mechanism 160 can be positioned within the sealing recess 163 and extend radially around at least a portion of an outer side surface of the cartridge connector body 101. In some implementations, the sealing mechanism 160 can wrap around all sides of the outer side surface of the cartridge connector body 101 to seal the cartridge connector 106 on each side when positioned within the outer shell 102 of the vaporizer body 50.

The sealing mechanism 160 can include a variety of configurations. The scaling mechanism 160 can include a ribbed structure. The ribbed structure can desirably include at least one or two ribs that extend radially about the sealing mechanism 160. In some implementations, the ribbed structure can include two, three, four, five, or more ribs that extend radially about the sealing mechanism 160. The ribbed structure having at least one or two ribs provides a scaling structure that ensures and/or maintains a proper seal between the cartridge connector 106 and the outer shell 102. In some implementations, the sealing mechanism 160 can be compressed between the outer sealing surface of the sealing recess 163 and the inner wall of the outer shell 102 when assembled to reduce the likelihood that unwanted air and/or material will pass the scaling mechanism 160.

In some implementations, as shown in at least FIGS. 2F and 2G, the cartridge connector 106 can include a pressure sensor sealing mechanism 164. The pressure sensor sealing mechanism 164 can be positioned within the pressure sensor recess 156. The pressure sensor scaling mechanism 164 can be configured to surround at least a portion of the pressure sensor 129. For example, the pressure sensor 129 can be configured to at least partially fit within the pressure sensor sealing mechanism 164.

The pressure sensor sealing mechanism 164 can define a seal or gasket. The pressure sensor sealing mechanism 164 can radially extend along at least a portion of an outer circumference and/or perimeter of the pressure sensor recess 156. The pressure sensor sealing mechanism 164 can be bonded to the cartridge connector 106 using a primer, for example, co-molding, and/or other mechanical processes. The pressure sensor sealing mechanism 164 can include one, two, three, four, or more ribs. In some implementations, the pressure sensor scaling mechanism 164 can help to prolong the life of the pressure sensor 129 and/or the vaporizer body 50. The pressure sensor sealing mechanism 164 can help to provide an additional seal to further ensure that the pressure sensor 129 is properly sealed from the environment and/or the cartridge.

In some implementations, the sealing mechanism 160 and/or the pressure sensor sealing mechanism 164 can include an elastomer, such as silicone (e.g., a durometer, such as 10A to 80A durometer, silicone 70A and/or a food grade silicone, among other types), TPE, or other elastomers.

Referring to FIGS. 2E-2K, the cartridge connector 106 can include one or more sidewall connection features 168. The sidewall connection features 168 can extend downwardly from opposing sidewalls of the cartridge connector 106. In some implementations, the sidewall connection features 168 can at least partially couple the cartridge connector 106 to one or more sidewalls of the outer shell 102, by for example a snap-fit arrangement. The snap-fit arrangement can be desirably used in a plastic-plastic and/or metal-metal interface. Other coupling arrangements are contemplated using spot welding, and/or other adhesives FIGS. 5A-5J illustrate an example of a cartridge connector 106 consistent with certain implementations of the current subject matter, having four receptacle contacts 62. The cartridge connector 106 includes the same and/or similar properties and/or components as the cartridge connector 106 illustrated in FIGS. 1-4, and described herein. As shown in FIGS. 5A-5J, the cartridge connector 106 includes a cartridge connector body 101, four receptacle contacts 62 positioned within connector slots 136, a sealing mechanism 160 having a ribbed structure and extending around the cartridge connector body 101, a pressure sensor 129, a pressure sensor port 152, and/or a pressure sensor sealing mechanism 164 surrounding the pressure sensor 129, among other components.

As shown in FIGS. 5A-5J, the cartridge connector 106 includes four receptacle contacts 62. The receptacle contacts 62 can be positioned in pairs. For example, the cartridge connector 106 can include an axis that bisects the cartridge connector 106 and extends from a front of the cartridge connector 106 to the rear of the cartridge connector 106. In some implementations, two receptacle contacts 62 can be positioned on one side of the axis and the other two receptacle contacts 62 can be positioned on the other side of the axis. Each of the receptacle contacts 62 can be positioned approximately parallel to one another. The receptacle contacts 62 can include a contact portion 122. The contact portion 122 can include a lower portion 128 and an upper portion 130. The upper portion can be positioned closer to a center of the cartridge connector 106 than the lower portions.

As noted above, a vaporizer 100 consistent with implementations of the current subject matter may include a controller 19, which can implement logic (e.g., by processor-executed software, hardware-executed logic, circuitry, and/or a combination thereof) to cause certain operations of the vaporizer 100. These operations can optionally include functions of the heating element, functions of the LED display, and/or functions of other components or sets of components of the vaporizer.

In certain implementations of the current subject matter, the controller 19 may control a temperature of a heating element by monitoring a control signal representative of a temperature of the heating element (which can be disposed in a vaporizer cartridge 52 that is received in a cartridge receptacle 69 of a vaporizer body 50) and modulating power delivered to the heating element based on the monitored control signal. An example of a control signal is a measurement of a resistance of the heating element that is part of the atomizer 26. In some approaches, resistance of the heating element is measured by the controller via two receptacle contacts 62 of the vaporizer body 50 that form a circuit by respectively connecting to two cartridge contacts 65 of the vaporizer cartridge 52. This circuit can be referred to as a two-point connection as it involves connections between the vaporizer body 50 and the vaporizer cartridge 52 at two separate points (i.e. the connections between each of the two receptacle contacts 62 and its corresponding one of the two cartridge contacts 65). Such an arrangement can provide power to the heating element and also be used for measurement of the heating element resistance. To measure the resistance, a set of switches can be activated to temporarily cease providing electrical power for heating and to instead use a circuit including the two-point contacts for resistance measurements. An example of a hardware configuration capable of performing these functions is described in co-owned U.S. patent application Ser. No. 14/581,666, the disclosure of which is incorporated herein by reference.

In other implementations of the current subject matter, a four-point connection arrangement can provide both heating element power delivery and heating element resistance measurements via two sets of cartridge contacts 65, each of which connects, when the vaporizer cartridge 52 is inserted into the vaporizer body 50, to at least two receptacle contacts 62. The four-point connection arrangement enables measurement of the resistance of the heating element via a different circuit than the circuit that provides power to the heating element. For example, depending on the specific configuration of the controller (e.g., a processor executing firmware, a series of controllable switches on a circuit board, an integrated circuit or multiple integrated circuits, etc.), the controller 19 can cause electrical power for heating the heating element to flow from a first (of two or more) receptacle contact 62 that connects to a first (of two) cartridge contact 65, through the heating element, and back to a ground (or opposite polarity) in the vaporizer body 50 from a second (of two) cartridge contact to a first (of two or more) receptacle contact 62 that connects to the second cartridge contact 65. Second receptacle contacts 62 connected to each of the first and second cartridge contacts 65 can form a second circuit via which the controller can cause a resistance measurement to occur for the heating element. This approach (e.g., a four-point measurement) can be beneficial in that measurement of resistance on a circuit that does not include the contacts between the drive circuit for the heating element can be less likely to be susceptible to interferences of contact resistance in the measurement of the heating element resistance. Because a resistance measurement of the kind described here is often a measurement of a voltage required for a given current (using V=IR) as an indirect way of determining the resistance R, the measurement is effectively an integral of the resistance across all elements of the circuit. Oxidation or other factors that can be facilitated by large current loads across a metal-metal connection can lead to higher resistance at the metal-metal connection. If this contact resistance is part of a circuit upon which a heating element resistance measurement is occurring, the realized resistance may not be representative of the resistance (and therefore the temperature) of the heating element.

An approach to controlling a heater consistent with implementations of the current subject matter can include monitoring of two moving averages of a measured resistance of the heating element. Among other advantages, this approach may be used in identifying whether a vaporizer cartridge 52 inserted into a vaporizer body 50 has a heating element that was at a stable baseline temperature when inserted. This measurement can be useful in verifying a target heating profile, for example in a vaporizer 100 configured to control a heating element temperature to maintain that heating element temperature below some maximum safe operating temperature. Such a feature can be beneficial in a vaporizer 100 relative to various other currently available vaporizers in that control of a heating element temperature merely by limiting a delivery of electrical power to some value expected to keep the heating element at a proper operating temperature during vaporization of a liquid vaporizable material may cause the heating element temperature to significantly increase above the proper operating temperature if a user continues to attempt to operate the vaporizer after the reservoir containing liquid vaporizable material is sufficiently empty to cause the atomizer 26 to no longer be supplied with an expected amount of liquid vaporizable material for vaporization. This increase in temperature can occur because evaporation of the liquid vaporizable material is a significant source of heat loss from the heating element. Limiting of the electrical power delivery to sustain an operating temperature sufficient to vaporize the liquid vaporizable material when the liquid vaporizable material is present can lead to much higher heating element temperatures when the liquid vaporizable material is not present to be evaporated and thereby absorb and dissipate generated heat energy in the form of the latent heat of vaporization.

Some implementations of the current subject matter can address this concern using a measured heating element resistance, particularly in cases in which the heating element has a well-characterized thermal coefficient of resistivity ("TCR"), which is a coefficient relating the resistance of the heating element to a current temperature of the heating element. The controller of the vaporizer measures the heating element resistance as discussed elsewhere herein. The controller need not convert the measured resistance to an actual temperature value but can instead measure or calculate a baseline resistance for the heating element when the heating element is assumed to be at a "resting" or unheated temperature. A target heating element resistance, which may be used as a proxy for the target temperature (where the target heating element resistance and the target temperature can be related by the heating element TCR), can be calculated as a function of the baseline resistance of the heating element. For example, the target heating element resistance can be some fractional increase in resistance over the baseline (e.g., e.g., 3%, 5%, 10%, etc. depending on the desired target temperature and the specific TCR characteristics of the heating element). It will be understood that while this discussion is framed in terms of using the heating element of the vaporizer cartridge atomizer 26 as the component whose resistance is measured, implementations of the current subject matter may also include use of a resistance measurement of some other component, which is desirably located in a position where a representative temperature may be measured, such as a separate wire element, etc.

Figure 25A:
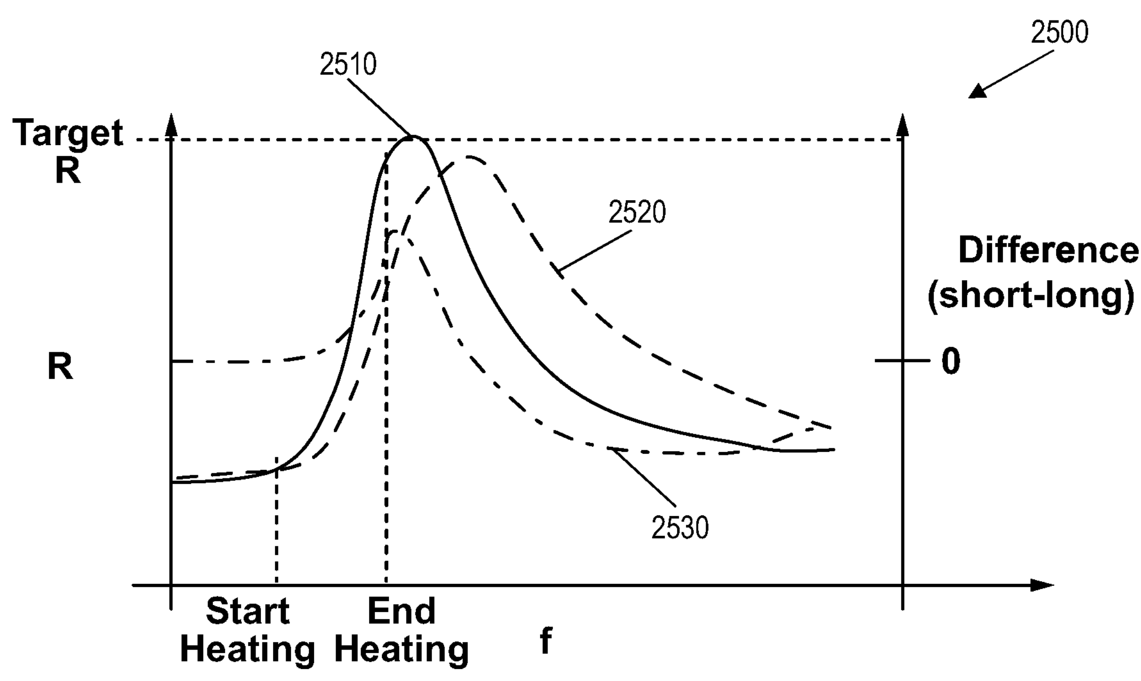
FIG. 25A and FIG. 25B show charts of measured resistance values related to implementations of the current subject matter.

Because the target resistance (e.g., e.g., of the heating element but also possibly of some other component as noted above) may be a function of the baseline resistance, a vaporizer consistent with implementations of the current subject matter may include functions for determining whether a stable baseline is present. As noted above, by calculating two moving averages of the measured resistance where the two moving averages have different averaging periods (one longer, one shorter), an unstable baseline may be detected by noting when the moving averages are relatively closely tracking each other and when they are not, for example by tracking a difference between the moving averages over time. FIG. 25A shows a chart 2500 with example data of a time series of these two moving averages. The first curve 2510 in the chart 2500 represents a first moving average with a shorter averaging time and the second curve 2520 represents a first moving average with a longer averaging time. The third curve 2530 represents the difference between the first curve 2510 and the second curve 2520. In the example shown, the in which the heating element of an inserted cartridge was not pre-heated before insertion, shows the first two curves 2510 and 2520 remaining nearly equivalent until the heating element is activated (e.g., e.g., by a user taking a puff, or some other user input or some other factor results in the controller causing electrical current to pass through the heating element), at which point the first curve 2510 diverges toward a higher average temperature faster than does the second curve 2520 due to the shorter averaging time of the first curve 2510. When the heating ceases (e.g., e.g., because the user puff stops, a fixed time interval for the heating expires, a user stops or changes the input, or the controller reacts to some other factor), the first curve 2510 again reacts more quickly that the second curve, resulting in a crossing of the first curve 2510 and the second curve 2520 while the temperature of the atomizer 26, and therefore the resistance of the heating element (or some other component whose resistance is measured as representative of the heating element temperature) is decreasing.

Measurement of the resistance of, for example, the heating element can occur upon first insertion of the vaporizer cartridge 52 in the cartridge receptacle 69 of the vaporizer device. This initial measurement can be used as a first check to determine whether the vaporizer 100 should transition to an active mode in which it is available for use in generating an inhalable aerosol. If the measured resistance is outside of an expected allowable range, this may indicate that the inserted vaporizer cartridge 52 is not making good electrical contacts with the vaporizer body 50, that a short circuit is occurring somewhere in the heating circuit, or that some other issue is present that should prevent normal operation. In one example, detection of an out of range resistance can indicate an attempt to use a non-standard vaporizer cartridge 52. This determination can be used to trigger an error, which can optionally include disabling the vaporizer 100 for some period of time.

Figure 25B:
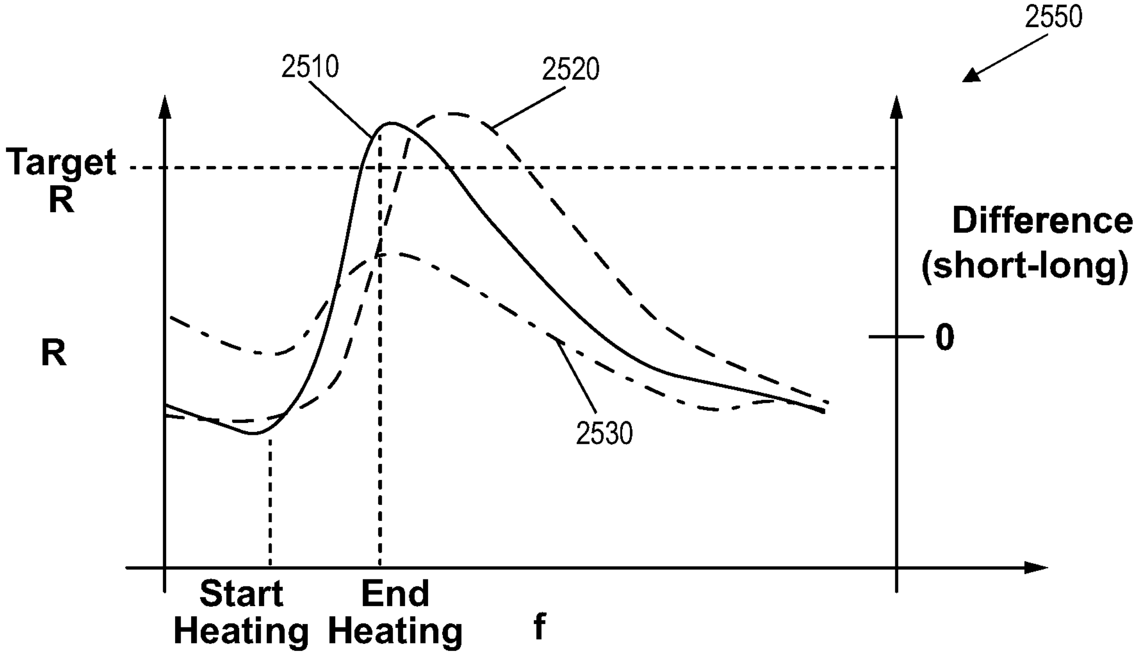
Figure 26B:
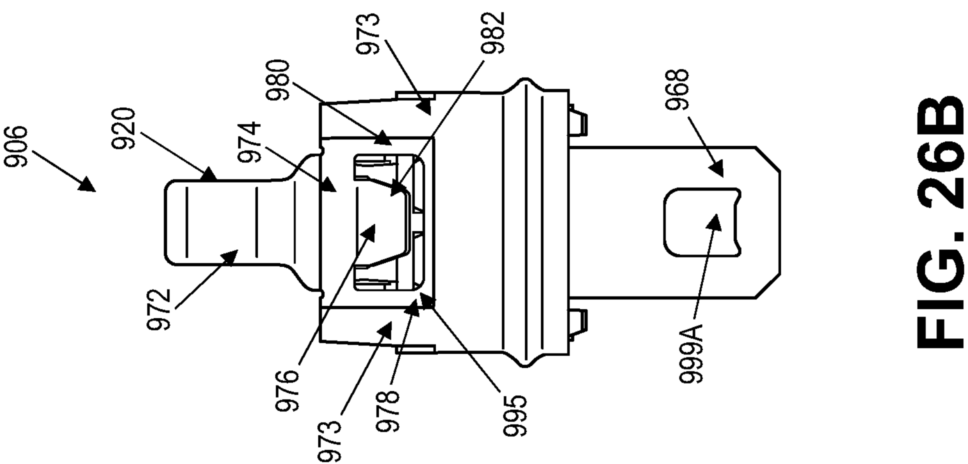
FIG. 26B shows a side view of a cartridge connector having a retaining feature and sidewall connection feature consistent with implementations of the current subject matter.
Figure 26A:
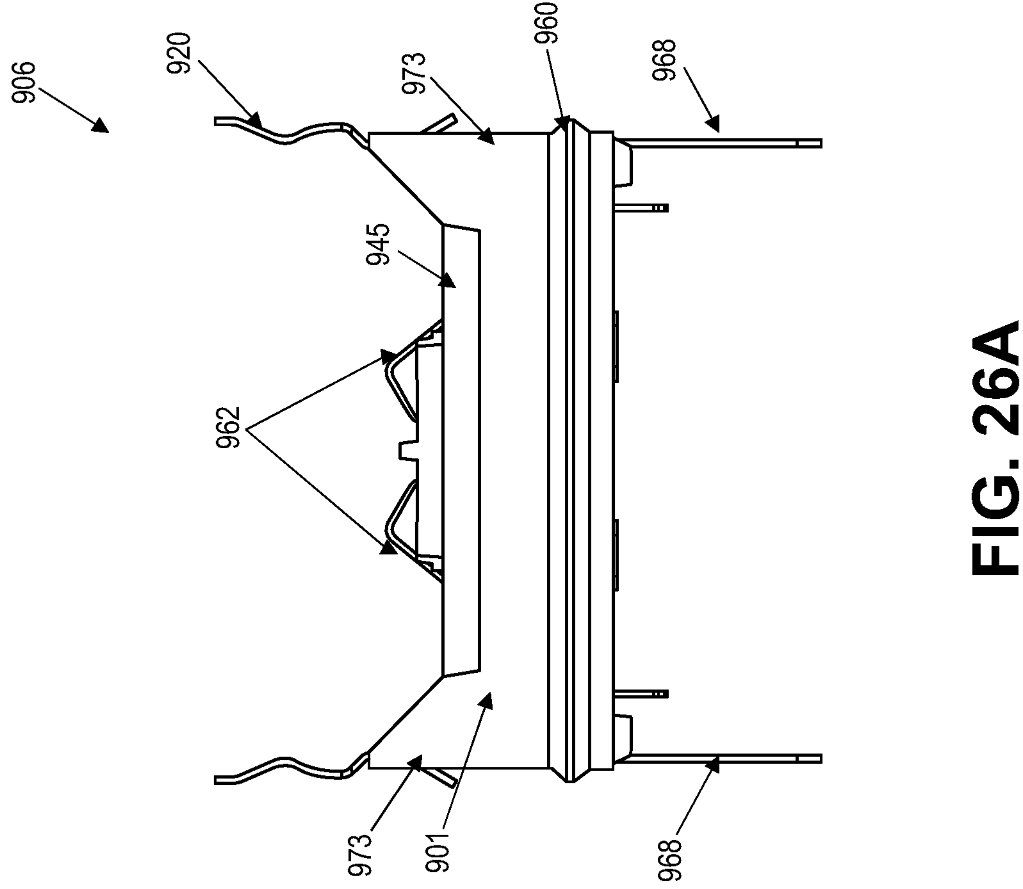
FIG. 26A shows a front view of a cartridge connector having a retaining feature and sidewall connection feature consistent with implementations of the current subject matter.
Figures 26C, 26D:
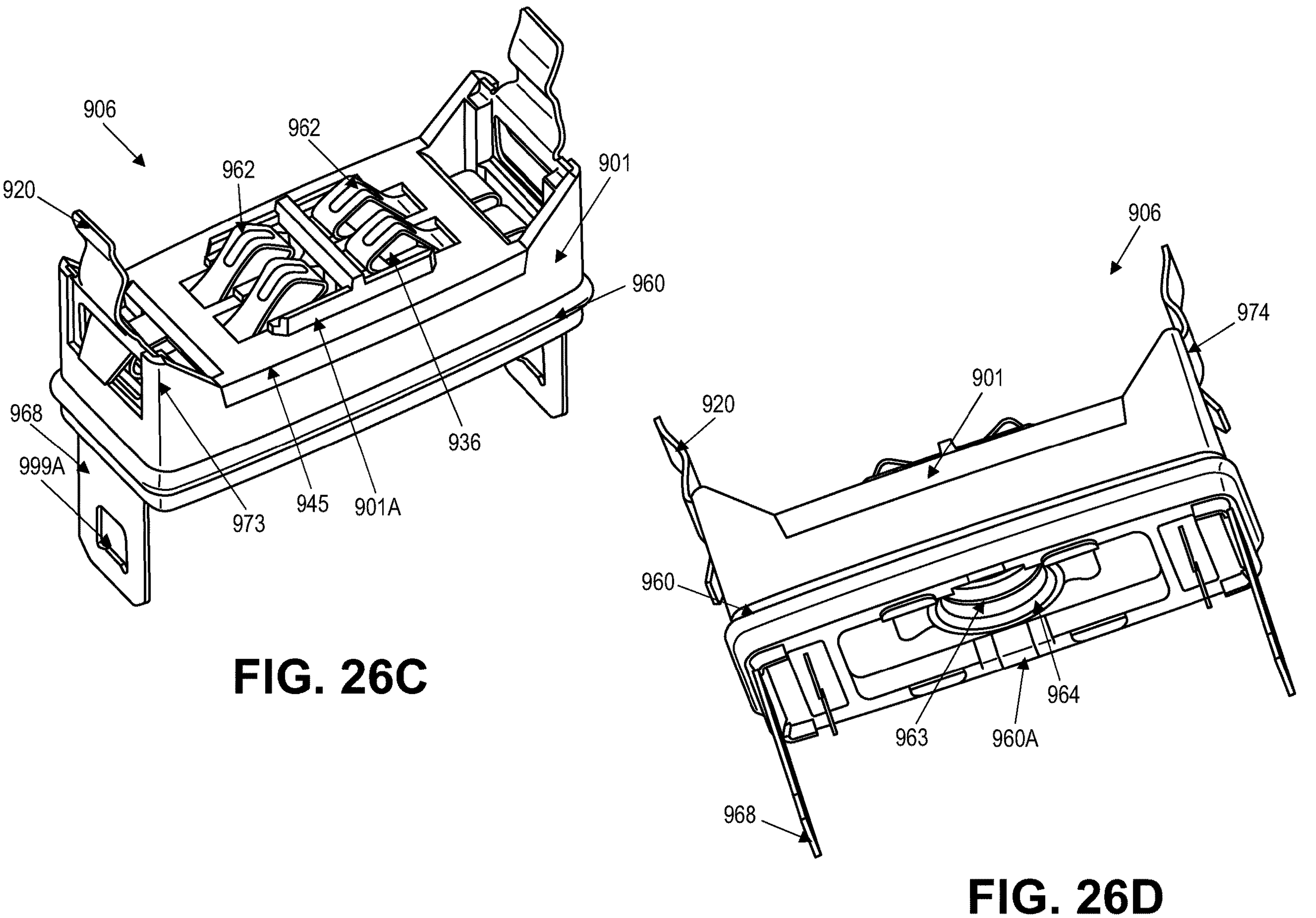
FIG. 26C shows a perspective view of a cartridge connector having a retaining feature and sidewall connection feature consistent with implementations of the current subject matter.
FIG. 26D shows a perspective view of a cartridge connector having a retaining feature and sidewall connection feature consistent with implementations of the current subject matter.
Figure 26E:
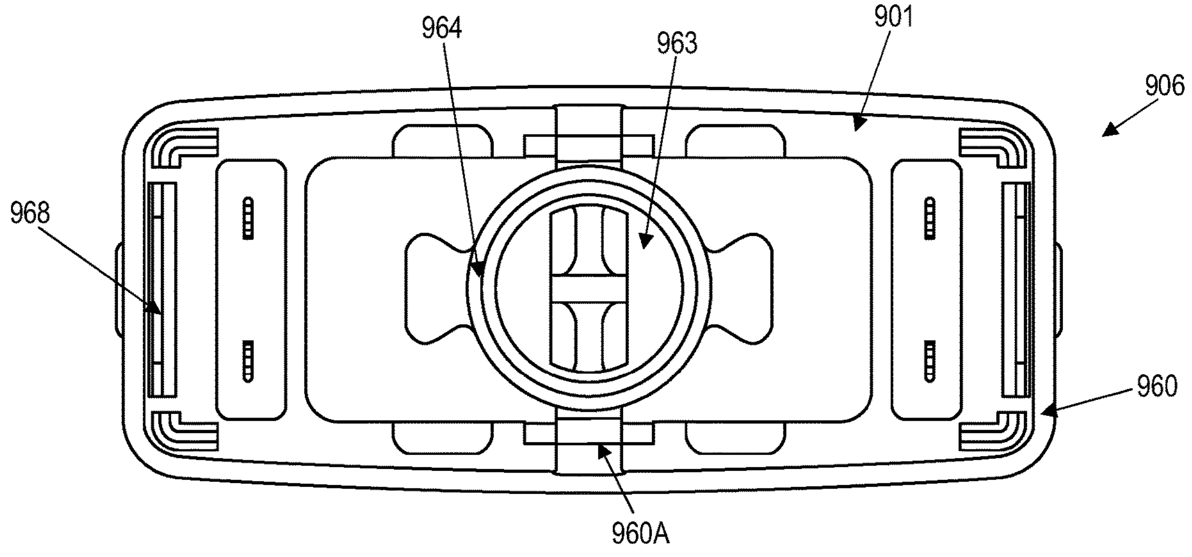
FIG. 26E shows a bottom view of a cartridge connector having a retaining feature and sidewall connection feature consistent with implementations of the current subject matter.
Figure 26F:
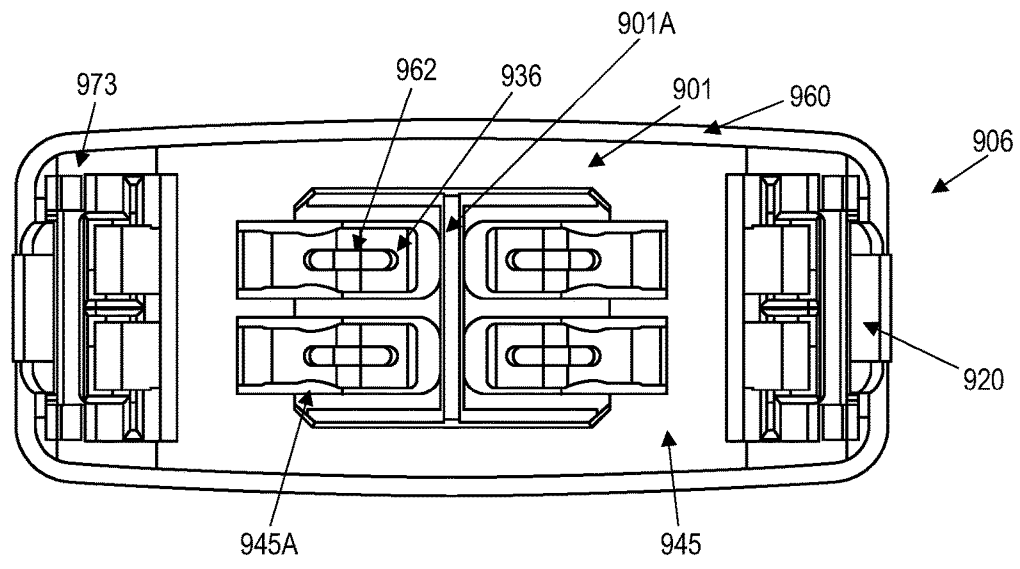
FIG. 26F shows a top view of a cartridge connector having a retaining feature and sidewall connection feature consistent with implementations of the current subject matter.

Upon measurement of the resistance, the two moving averages as noted above can be calculated. In an example in which an inserted vaporizer cartridge 52 was recently used with another vaporizer body 50, the vaporizer cartridge 52 may be inserted in an already heated state. As such, it can be undesirable to calculate the baseline resistance as the initial resistance. The two moving averages and the differences therebetween can be used to identify a transient cooling condition and to correct the baseline and therefore the target resistance for heat control in reaction to this determination. FIG. 25B shows a chart 2550 in which the first curve 2510 representing the shorter period moving average is trending downward faster than the second curve 2520 representing the longer period moving average. The difference between the first curve 2510 and the second curve 2520 therefore is not temporally stable when the vaporizer cartridge 52 is first inserted but instead trends downward. The controller or other logic executed by the vaporizer 100 can detect this condition and therefore adjust the baseline and target resistances accordingly.

In addition to measuring the difference between the two moving averages of differing averaging periods, certain implementations of the current subject matter may also include tracking a variance between the two moving averages. Use of the variance may be beneficial in allowing detection of not only the level, but the amount of variation in a signal as a way to detect the stability of the signal.

The arrangements of the vaporizer body 50 consistent with the current subject matter (e.g., including arrangements of the two- and/or four-point connections via the receptacle contacts according to implementations of the current subject matter for providing power to the heating element and for measuring heating element resistance) may be implemented alone, or together with the hardware, software or combination of hardware and software, including embodiments of the vaporizer device (e.g., vaporizer body contacts, cartridge contacts, etc.), the vapor control system (which can enable vaporizing functionality of the vaporizer device), and/or the power management unit, (which includes a heater control and can perform functionality of the vapor control system (e.g., by improving power supply management, reducing power requirements, providing flexible heater control, lowering the number of discrete components thereby reducing variation in performance, and the like)) described and shown herein and in U.S. Application Nos. 62/689,774, filed on Jun. 25, 2018, and Ser. No. 16/449,278, filed on Jun. 21, 2019, the entirety of each of which is incorporated by reference herein. In other words, the vaporizer device 100 including the vaporizer body 50 may use the vapor control system, the power management unit (such as the heater control), the vaporizer body contacts, the cartridge contacts, etc., described and shown herein and in at least FIGS. 31-39, to provide electrical power for heating (e.g., to the vaporizer cartridge 52), to measure resistance (e.g., heating element, contact resistance, etc.), or the like.

Configurations of the receptacle contacts 62 other than those described above (such as receptacle contacts 62 having a different size, shape, material, or form) are contemplated. For example, the receptacle contacts 62 can include spring pins that provide a fixed and/or sliding seal to the gasket. Such configurations can protect the spring pin assembly from ingress of unwanted liquids and/or solids which may degrade performance (e.g., low resistance electrical connection) of and/or within the spring pin. In implementations having a fixed seal to the gasket, the gasket can deflect and to some extent provide spring force for better electrical connection between the pin head and the cartridge contacts 65 of the vaporizer cartridge 52.

In some implementations, the receptacle contacts 62 can include formed sheet metal contacts (e.g., drawn, stamped, bent) that are soldered and/or spot welded to a flexible printed circuit or rigid circuit board such as the primary PCBA 512 and/or the secondary PCBA 512A.

In some implementations, the receptacle contacts 62 can include insert molded formed metal spring contacts. Insert molding spring contacts or pins may be desirable to provide a more robust seal (e.g., to limit or prevent vaporizable material from passing into the circuitry/battery region).

In some implementations, the receptacle contacts 62 can include insert molded pins and/or pin receptacles with formed cartridge-contacting spring contacts that are welded (spot or laser), soldered, or pressed on after injection molding. On the non-air path side of the gasket, pins (or pin receptacles) may be connected via wires, leaf springs, spring contacts, flexible printed circuit, pin receptacles, and/or other connectors (or pins) to the control and measurement circuitry. A conductor can be coupled with the pins via soldering, welding (spot or laser), press fit, and/or spring contact connection, among other coupling methods.

In some implementations, the receptacle contacts 62 can include rigid pins and/or formed metal contacts that, when mounted to the gasket, rely to some extent on gasket deflection to provide a spring force and/or reliable connection to the vaporizer cartridge 52. On the non-air path side of the gasket, pins can be connected to the control and measurement circuitry via soldering, welding (spot or laser), press fit, and/or spring contact connection, among other coupling methods.

In some implementations, the receptacle contacts 62 can include a connection to the vaporizer cartridge 52 via a formed or turned metal part (e.g., sheet metal or "pin" respectively) or assembly of metal parts. The spring contacts or spring contact assemblies can be coupled with the secondary PCBA 512A or primary PCBA 512 with traces routing to control circuitry via spring force, spot weld, laser weld, solder, press fit, or retention ring geometry and/or the like.

In some implementations, spring force and/or compliance can be provided via one or more of elastic deformation of: metal (e.g., coil spring(s) or leaf spring(s)), elastomeric material (e.g., silicone), and/or plastic, among others. Spring force can ensure a secure electrical connection. Compliance can help to account for assembly tolerance stack-ups.

In some implementations, spring contacts may be wiping contacts. For example, one or more contact in each device/cartridge mating contact pair can have sliding and/or translating electrical contact points when the vaporizer cartridge 52 is inserted into the vaporizer body 50. Wiping contacts can provide a more reliable connection. For example, if the cartridge contacts 65 of the vaporizer cartridge 52 have oxidation or residual material that may prevent or hinder contact with the receptacle contacts 62, the wiping contacts could wipe a surface of the cartridge contacts 65 upon insertion of the vaporizer cartridge 52 into the vaporizer body 50. Wiping the surface of the cartridge contacts 65 would make it more likely that the receptacle contacts 62 make proper contact with the cartridge contacts 65 by reducing or preventing undesirable material from being in the contact area.

Figure 6A:
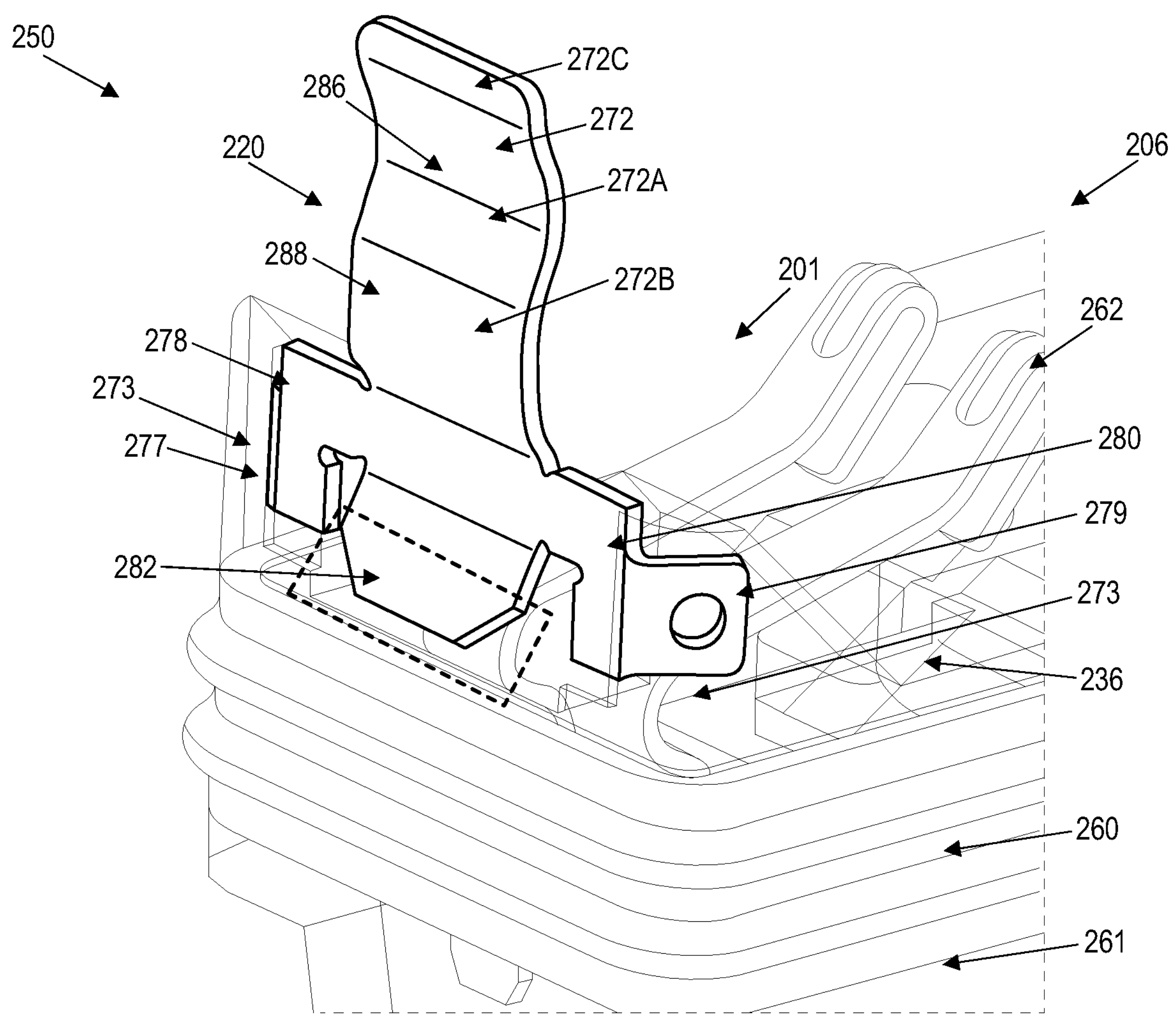
FIG. 6A shows a perspective view of a cartridge connector in which a retaining feature is incorporated consistent with implementations of the current subject matter.
Figure 6B:
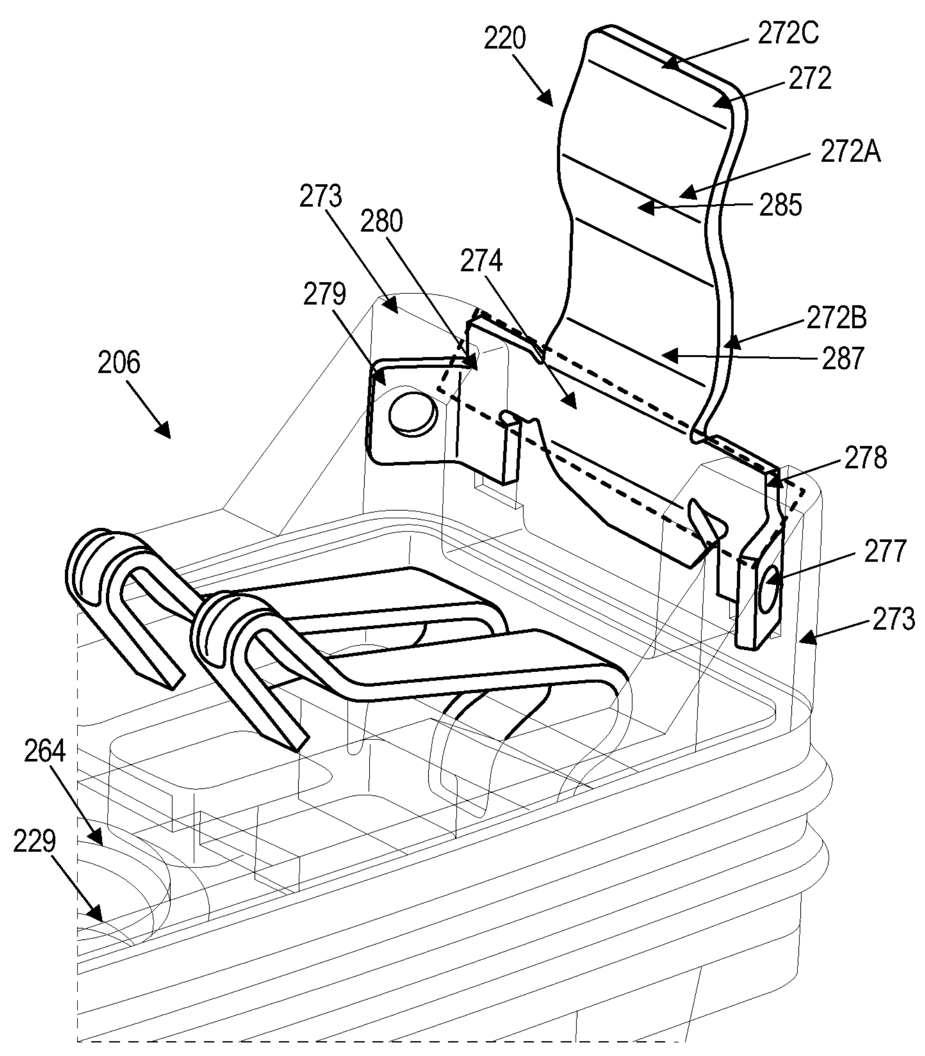
FIG. 6B shows a perspective view of a cartridge connector in which a retaining feature is incorporated consistent with implementations of the current subject matter.
Figure 6C:
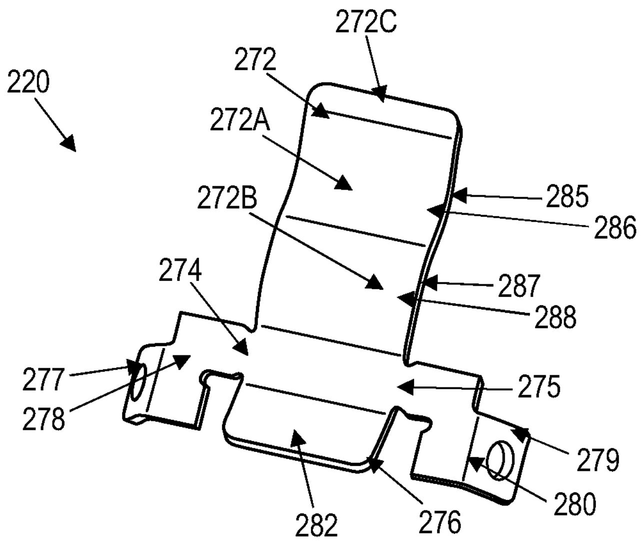
FIG. 6C shows a perspective view of a retaining feature of a cartridge connector consistent with implementations of the current subject matter.

FIGS. 6A-6C illustrate an example of a cartridge connector 206 consistent with certain implementations of the current subject matter, showing a retaining feature 220. The cartridge connector 206 optionally includes one or moresame and/or similar properties and/or components as the cartridge connectors 106 illustrated in FIGS. 1-5J, and described herein. As shown in FIGS. 6A-6C, the cartridge connector 206 includes a cartridge connector body 201, four receptacle contacts 262 positioned within connector slots 236, a sealing mechanism 260 having a ribbed structure and extending around the cartridge connector body 201 such as in a sealing recess 261, a pressure sensor 229, a pressure sensor port, and/or a pressure sensor sealing mechanism 264 surrounding the pressure sensor 229, among other components, which are respectively the same and/or similar to the cartridge connector 106 including the cartridge connector body 101, receptacle contacts 62 positioned within connector slots 136, the sealing mechanism 160 having the ribbed structure and extending around the cartridge connector body 101 such as in the sealing recess 163, the pressure sensor 129, the pressure sensor port 152, and/or the pressure sensor sealing mechanism 164 surrounding the pressure sensor 129.

FIGS. 6A and 6B illustrate examples of a retaining feature 220 coupled with the cartridge connector 206. The retaining feature may be integrally formed with at least a portion of the cartridge connector 206 and/or insert molded with at least a portion of the cartridge connector 206, such as the cartridge connector body 101. The retaining feature 220 can couple the cartridge connector 206 to the outer shell 202 of the vaporizer body 250. The retaining feature 220 can couple the cartridge 204 to the outer shell 202 of the vaporizer body 250 and/or the cartridge connector 206. The retaining feature 220 can include one, two, three, or four or more retaining features 220. For example, the retaining feature 220 can include at least two retaining features 220 positioned on opposing sides of the cartridge connector body 201

The cartridge connector body 201 can include opposing upwardly extending members 273 that extend upwardly from the top portion 213 of the cartridge connector 206. The upwardly extending members 273 are separated by an opening in which at least a portion of the retaining feature 220 is positioned. As shown in FIGS. 6A and 6B, the retaining feature 220 can be coupled to the cartridge connector 206 via at least the upwardly extending members 273.

FIG. 6C illustrates a perspective view of the retaining feature 220 of a cartridge connector 206 consistent with implementations of the current subject matter. The cartridge connector 206 includes a longitudinal member 272, a lateral member 274, and/or a prong portion 276, among other components. In some implementations, the longitudinal member 272, the lateral member 274 and/or the prong portion 276 are integrally formed.

The prong portion 276 includes a first side leg 278, a second side leg 280, and/or a central leg 282, among other portions. The central leg 282 may form a portion of the longitudinal member 272. The first side leg 278 extends from one end portion of the lateral member 274. The second side leg 280 extends from another end portion of the lateral member 274, such as an opposing end portion. The first and second side legs 278, 280 extending in a generally downwards direction when the retaining feature 220 is coupled with the cartridge connector 206 and/or the outer shell 202.

The first side leg 278 can include a first tabbed portion 277 and the second side leg 280 can include a second tabbed portion 279. The first and second tabbed portions 277, 279 can extend at an angle relative to the first and second side legs 278, 280. The first and second tabbed portions 277, 279 can extend outwardly away from the first and second side legs 278, 280. The first and second tabbed portions 277, 279 can extend outwardly away from an outer surface of the retaining features 220 that is configured to face and/or otherwise interface with an interior wall of the outer shell 202. The first and second tabbed portions 277, 279 can be shaped to match a shape of the corresponding portion of the cartridge connector 206.

In some implementations, at least the first and second tabbed portions 277, 279 can be coupled with the cartridge connector 206 and/or can be integrally formed with the cartridge connector 206. For example, in some implementations, at least the first and second tabbed portions 277, 279 and/or at least a portion of the first and second side legs 278, 280 can be injection molded with at least one of the upwardly extending members 273 of the cartridge connector 206. Such configurations can desirably strengthen the connection between the retaining features 220 with the cartridge connector 206. Such configurations can desirably secure the retaining features 220 to the cartridge connector 206.

The first and second legs 278, 280 can be laterally spaced apart by the lateral member 274. In some implementations, the lateral member extends in a direction that is approximately parallel to at least one side of the cartridge connector 206. In some implementations, the lateral member extends in a direction that is approximately perpendicular to at least the longitudinal member 272.

In some implementations, the lateral member 274 can be reinforced. For example, the lateral member 274 can include a crossbar 275 positioned along an interior surface and/or exterior surface of the lateral member 274. The crossbar 275 can include the same or different material as the lateral member 274. In some implementations, the crossbar 275 can include metal, and/or plastic, among other materials. The crossbar 275 can strengthen the retaining features 220. The crossbar 275 can help to provide additional support and/or limit bending about the lateral member 274. In some implementations, at least a portion of the lateral member 274 is configured to be positioned between upwardly extending members 273 of the cartridge connector 206. Such configurations can desirably support the retaining features 220 within the cartridge connector 206. The upwardly extending members 273 can help to limit lateral movement of the retaining features 220 within the cartridge connector 206.

The central leg 282 can extend from the lateral member 274. In some implementations the central leg 282 extends from a portion of the lateral member 274 between the first and second side legs 278, 280. The central leg 282 can extend in a generally downwards direction. The central leg 282 can extend at an angle from the lateral member 274. In some implementations, the central leg 282 can extend at an angle outwardly from the lateral member 274 and/or is configured to extend towards the interior wall of the outer shell 202 when assembled. As explained in more detail below with reference to an example of the retaining feature illustrated in FIGS. 7A-7C, the central leg 282 can be configured to couple with a central receiving feature positioned along the interior wall of the outer shell 202.

The central leg 282 can include a lower portion. The lower portion can be chamfered such that side portions of the lower portion of the central leg 282 can be angled inwardly. The chamfered profile can allow the retaining features 220 to be more easily coupled to the outer shell 202 of the vaporizer body 250.

As shown in at least FIGS. 6A-6C, the longitudinal member 272 can extend from the lateral member 274. The longitudinal member 272 can extend in a generally upwards direction from the lateral member 274. The longitudinal member 272 can extend in an approximate S-shape, among other shapes. For example, the longitudinal member 272 can include an outwardly facing convex portion 272A, an inwardly facing convex portion 272B, and/or a tab portion 272C. The longitudinal member 272 can smoothly transition between the outwardly facing convex portion 272A, the inwardly facing convex portion 272B, and/or the tab portion 272C.

The outwardly facing convex portion 272A can include an outer surface 285 and an inner surface 286. The inwardly facing convex portion 272B can include an outer surface 287 and an inner surface 288. In some implementations, at least the tab portion 272C and/or the outer surface 287 of the outwardly facing convex portion 272A can be configured to secure the cartridge connector 206 to the outer shell 202 via corresponding receiving features 290 of the outer shell 202, as described in more detail below. In some implementations, at least the inner surface 286 of the inwardly facing convex portion 272B can be configured to secure the cartridge 204 to the cartridge connector 206 via corresponding receiving features of the cartridge 204, such as the detents, as described in more detail below.

In some implementations, all or a portion of the retaining features 220 can be made of one or more materials, such as a metal including stainless steel, a plastic, and/or other materials. The retaining features 220 can be manufactured via stamping, molding, cutting, and/or other manufacturing process.

Figure 7A:
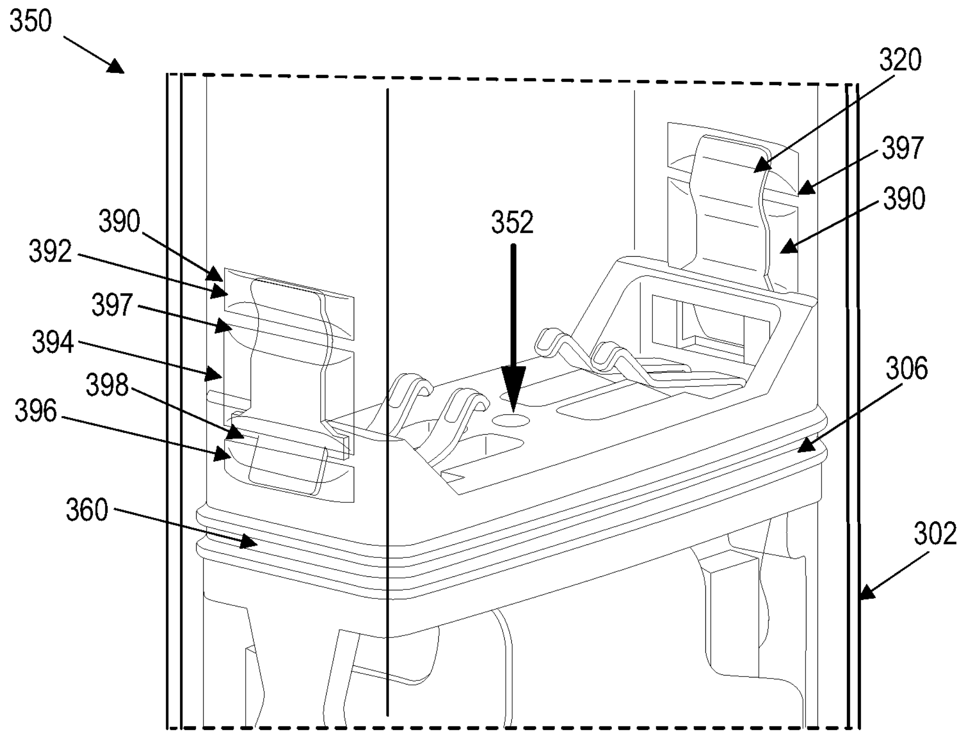
FIG. 7A shows a perspective view of a vaporizer device in which a cartridge connector and a retaining feature are incorporated consistent with implementations of the current subject matter.
Figure 7B:
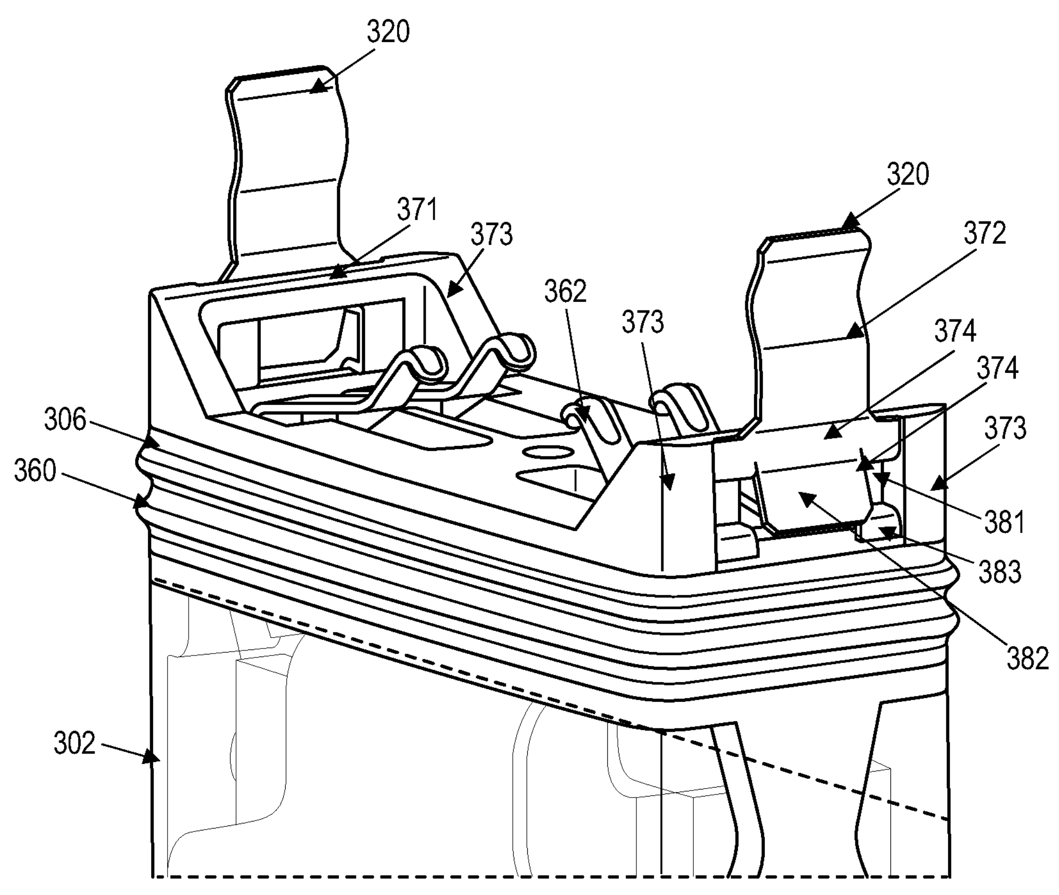
FIG. 7B shows a perspective view of a cartridge connector in which a retaining feature is incorporated consistent with implementations of the current subject matter.
Figure 7C:
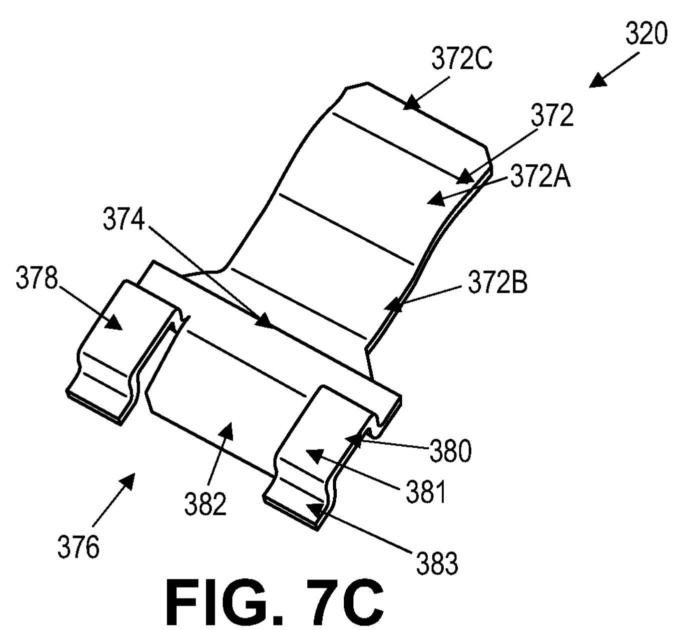
FIG. 7C shows a perspective view of a retaining feature of a cartridge connector consistent with implementations of the current subject matter.

FIGS. 7A-7C illustrate an example of a cartridge connector 306 consistent with certain implementations of the current subject matter, showing another example of a retaining feature 320. The cartridge connector 306 optionally includes one or more same and/or similar properties and/or components as the cartridge connectors 106, 206 illustrated in FIGS. 1-6C, and described herein. As shown in FIGS. 7A-7C, the cartridge connector 306 includes a cartridge connector body 301, four receptacle connectors 362 positioned within connector slots 336, a scaling mechanism 360 having a ribbed structure and extending around the cartridge connector body 301 such as in a scaling recess 363, a pressure sensor 329, a pressure sensor port, and/or a pressure sensor scaling mechanism 364 surrounding the pressure sensor 329, among other components, which are respectively the same and/or similar to the cartridge connector including the cartridge connector body, receptacle contacts positioned within connector slots, the sealing mechanism having the ribbed structure and extending around the cartridge connector body such as in the sealing recess, the pressure sensor, the pressure sensor port, and/or the pressure sensor scaling mechanism surrounding the pressure sensor shown in FIGS. 1-6C and described herein.

FIGS. 7A-7C illustrates an example of a retaining feature 320 of the cartridge connector 306 consistent with implementations of the current subject matter. The retaining features 320 shown in FIGS. 7A-7C can include the same and/or similar properties and/or components as the retaining features 220 illustrated in FIGS. 6A-6C, and described herein. As shown in FIGS. 7A-7C, the retaining features 320 can include a longitudinal member 372, a lateral member 374, and/or a pronged portion 376, among other components. The pronged portion 376 can include a first side leg 378, a second side leg 380, and/or a central leg 382, among other components.

The longitudinal member 372 includes a tapered region that extends between the lateral member 374 and the inwardly facing convex portion 372B. The tapered region can include sidewalls that are tapered from the lateral member 374 to the inwardly facing convex portion 372B.

The lateral member 374 can be coupled with a crossbar 371 of the cartridge connector body 301. The crossbar 371 extends between the upwardly extending members 373. The crossbar 371 of the cartridge connector 306 can provide additional support and/or rigidity to the retaining features 320. The retaining feature 320 can be adhered, mechanically coupled to, and/or molded with the cartridge connector 306.

In some implementations, the first and second side legs 378, 380 can include a protrusion portion 381 and a support portion 383. The protrusion portion 381 can extend inwardly from the lateral member 374. The protrusion portion 381 can be configured to be positioned between the crossbar 371 of the cartridge connector 306 and another portion of the cartridge connector 306, such as a ledge and/or an upper surface of the top portion of the cartridge connector 306. The protrusion portion can be configured to fit between the crossbar 371 of the cartridge connector 306 and another surface of the cartridge connector 306 to provide additional support to the retaining feature 320. The protrusion portion can help to limit or prevent longitudinal movement of the retaining features 320 relative to the cartridge connector 306.

The support portion 383 of the first and second side legs 378, 380 can help to secure the retaining features 320 to the cartridge connector 306. The support portion 383 can provide a surface that at least partially wraps around a portion of the cartridge connector 306.

Referring to FIG. 7A, the cartridge connector 306 is coupled to the outer shell 302 of the vaporizer body 350 via the retaining features 320. As shown, the outer shell 302 can include one or more receiving features 390. The receiving features 390 can be configured to secure and/or retain the corresponding portions of the retaining features 320. The receiving features 390 can be configured to secure and/or retain the cartridge connector 306 within the outer shell 302. In some implementations, at least one of the retaining features 320 can be configured to snap to and/or otherwise couple with at least one of the receiving features 390 of the outer shell 302 to secure the cartridge connector 306 and/or the cartridge 304 within the outer shell 302.

The receiving features 390 can include an upper receiving feature 392, a central receiving feature 394, and/or a lower receiving feature 396, among other portions. The upper receiving feature 392, the central receiving feature 394, and/or the lower receiving feature 396 can define recesses formed in at least one of the interior side walls of the outer shell 302. The outer shell 302 can include the receiving features 390 in at least two opposing side walls of the outer shell 302. The outer shell 302 can include an upper protrusion feature 397 and/or a lower protrusion feature 398. The upper protrusion feature 397 and/or the lower protrusion feature 398 can extend inwardly toward the interior volume of the outer shell 302 from the interior surface of the receiving features 390. The upper protrusion feature 397 can be at least partially positioned in the upper receiving feature 392 and/or the central receiving feature 394. The lower protrusion feature 398 can be at least partially positioned in the central receiving feature 394 and/or the lower receiving feature 396.

As shown in at least FIG. 7A, when the retaining features 320 are coupled to the receiving features 390, tab portion 372C can be positioned within and/or snapped to the upper receiving feature 392. In some implementations, at least a portion of the outwardly facing convex portion 372A can contact at least a portion of the upper protrusion feature 397. The outer surface 387 of the inwardly facing convex portion 372B can be secured to the central receiving feature 394. In some implementations, at least a portion of an outer surface of the central leg 382 can be secured to the lower protrusion feature 398. In some implantations, at least a portion of the central leg 382, such as a lower portion of the central leg 382 can be positioned within and/or secured to the lower receiving feature 396. The cartridge 304 (not shown) can be secured to at least a portion of the inner surface of the retaining features 320. Such configurations can help to provide a more secure connection between the cartridge connector 306 and the outer shell 302 of the vaporizer body 350. Such configurations can help to provide a more secure connection between the cartridge 304 and the outer shell 302. The retaining features 320 can desirably help to provide for better tolerances in manufacturing and/or can help to limit manufacturing issues.

FIGS. 8A-8H illustrate an example of a cartridge connector 406 consistent with certain implementations of the current subject matter, showing another example of a retaining feature 420 and sidewall connection features 468. The cartridge connector 406 optionally includes one or more same and/or similar properties and/or components as the cartridge connectors 106, 206, 306 illustrated in FIGS. 1-7C, and described herein. As shown in FIGS. 8A-8H, the cartridge connector 406 includes a cartridge connector body 401, four receptacle contacts 462 positioned within connector slots 436, a sealing mechanism 460 having a ribbed structure and extending around the cartridge connector body 401 such as in a sealing recess 463, a pressure sensor 429, a pressure sensor port, and/or a pressure sensor sealing mechanism 464 surrounding the pressure sensor 429, among other components, which are respectively the same and/or similar to the cartridge connector including the cartridge connector body, receptacle contacts positioned within connector slots. The sealing mechanism may have the ribbed structure and extend around the cartridge connector body such as in the sealing recess. The pressure sensor, the pressure sensor port, and/or the pressure sensor sealing mechanism may surround the pressure sensor shown in FIGS. 1-7C and described herein.

FIGS. 8A-8H illustrates an example of a retaining feature 420 of the cartridge connector 406 consistent with implementations of the current subject matter. The retaining features 420 shown in FIGS. 8A-8H can include the same and/or similar properties and/or components as the retaining features 220, 320 illustrated in FIGS. 6A-7C, and described herein. As shown in FIGS. 8A-8H, the retaining features 420 can include a longitudinal member 472, a lateral member 474, and/or a pronged portion 476, among other components. The pronged portion 476 can include a first side leg 478, a second side leg 480, and/or a central leg 482, among other components. The first and second side legs 478, 480 can together form a support leg 495 that surrounds the central leg 482. The support leg 495 can be positioned in a slot formed between upwardly extending members 373. The support leg 495 can provide addition reinforcement and support to the retaining features 420 by allowing for a greater length of the retaining features 420 to be engaged with and/or otherwise coupled to the cartridge connector body 401. The support leg 495 can be injection molded with, and/or adhered to the cartridge connector body 401.

Referring to FIGS. 8A-8H, the cartridge connector 406 can include one or more sidewall connection features 468. The sidewall connection features 468 can extend downwardly from opposing sidewalls of the cartridge connector 406 and can include an opening 499A to receive a corresponding protrusion member 499B that extends from the outer shell 402 and/or another component of the vaporizer body 450, such as the skeleton 504. In some implementations, the sidewall connection features 468 can at least partially couple the cartridge connector 406 to one or more sidewalls of the outer shell 402 or another component of the vaporizer body 450, by for example a snap-fit arrangement. The snap-fit arrangement can be desirably used in a plastic-plastic and/or metal-metal interface to securely and easily engage the cartridge connector 406 with the outer shell 402 or other component of the vaporizer body 450. Other coupling arrangements are contemplated including welding and/or adhesives.

FIGS. 9A-9L illustrate an example of a cartridge connector 606 consistent with certain implementations of the current subject matter. The cartridge connector 606 optionally includes one or more same and/or similar properties and/or components as the cartridge connectors 106, 206, 306, 406 illustrated in FIGS. 1-8H, and described herein. As shown in FIGS. 9A-9L, the cartridge connector 606 includes a cartridge connector body 601, four receptacle contacts 662 positioned within connector slots 636, a sealing mechanism 660, a pressure sensor port, a retaining feature 620, and a sidewall connection feature 668, which are respectively the same and/or similar to the cartridge connector including the cartridge connector body, receptacle contacts positioned within connector slots, the sealing mechanism, the pressure sensor, the pressure sensor port, the retaining feature, and the sidewall connection feature shown in FIGS. 1-8H and described herein.

The retaining features 620 shown in FIGS. 9A-9L can include the same and/or similar properties and/or components as the retaining features 220, 320, 420 illustrated in FIGS. 6A-8H, and described herein. For example, the retaining features 620 include a longitudinal member 672, a lateral member 674, and a pronged portion 676. The longitudinal member 672 provides a spring-force to secure the cartridge connector 606 to the outer shell of the vaporizer body 650. The pronged portion 676 includes a first side leg 678, a second side leg 680, and a central leg 682, among other components. The first and second side legs 678, 680 together form a support leg 695 that surrounds the central leg 682. The support leg 695 is positioned in a slot formed between upwardly extending members 673.

Referring to FIGS. 9A-9L, the cartridge connector 606 also includes one or more sidewall connection features 668 that include an opening 699A to receive a corresponding protrusion member 699B that extends from the outer shell 602 and/or another component of the vaporizer body 650, such as the skeleton 504. The sidewall connection features 668 are the same or similar to the sidewall connection features 668 shown in FIGS. 8A-8H described above.

FIGS. 9A-9L illustrate an example of the cartridge connector 606 having a sealing mechanism 660. The sealing mechanism 660 includes a seal or gasket that extends around the cartridge connector body 601. The seal or gasket can define a single-ribbed structure. The seal or gasket may be integrally formed with and/or coupled to a pressure sensor sealing mechanism 664 that is configured to extend around at least a portion of a pressure sensor 629. The seal or gasket may be connected to the pressure sensor sealing mechanism 664 by a sealing connection arm 660A that wraps around a side wall of the cartridge connector body 601.

The cartridge connector 606 may include one or more features that allow for the cartridge connector 606 to be more easily cleaned using a cleaning apparatus. For example, the cartridge connector 606 includes a wall extension 601A that extends from an upper portion of the cartridge connector body 601. The wall extension 601A may have an "H-shape" or other shape with a central cutout to surround the pressure sensor port and extend upwardly from the connector slots 636 to surround at least a portion of the receptacle contacts 662. The wall extension 601A protects the receptacle contacts 662 at least in part by making it more difficult for the cleaning apparatus to get caught on a receptacle contact 662 and/or deform a receptacle contact 662. The receptacle contacts 662 may include an upper portion that is elongated to limit deformation caused by a cleaning apparatus or other apparatus.

Figure 9B:
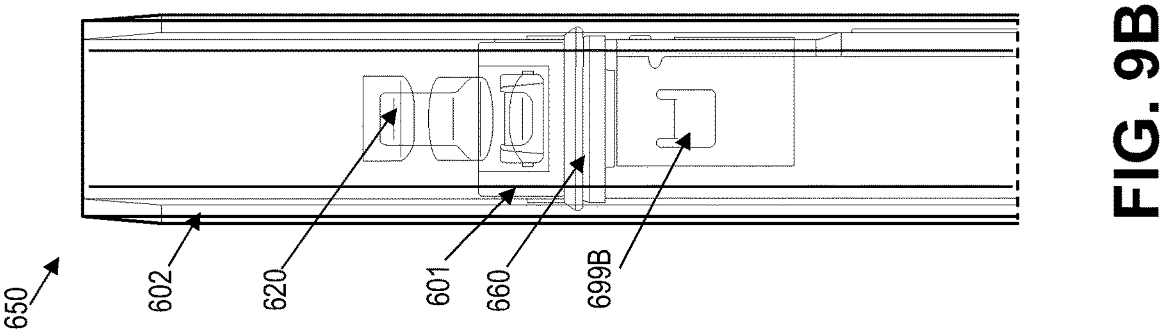
FIG. 9B shows a side view of a vaporizer device in which a cartridge connector is incorporated consistent with implementations of the current subject matter.
Figure 9A:
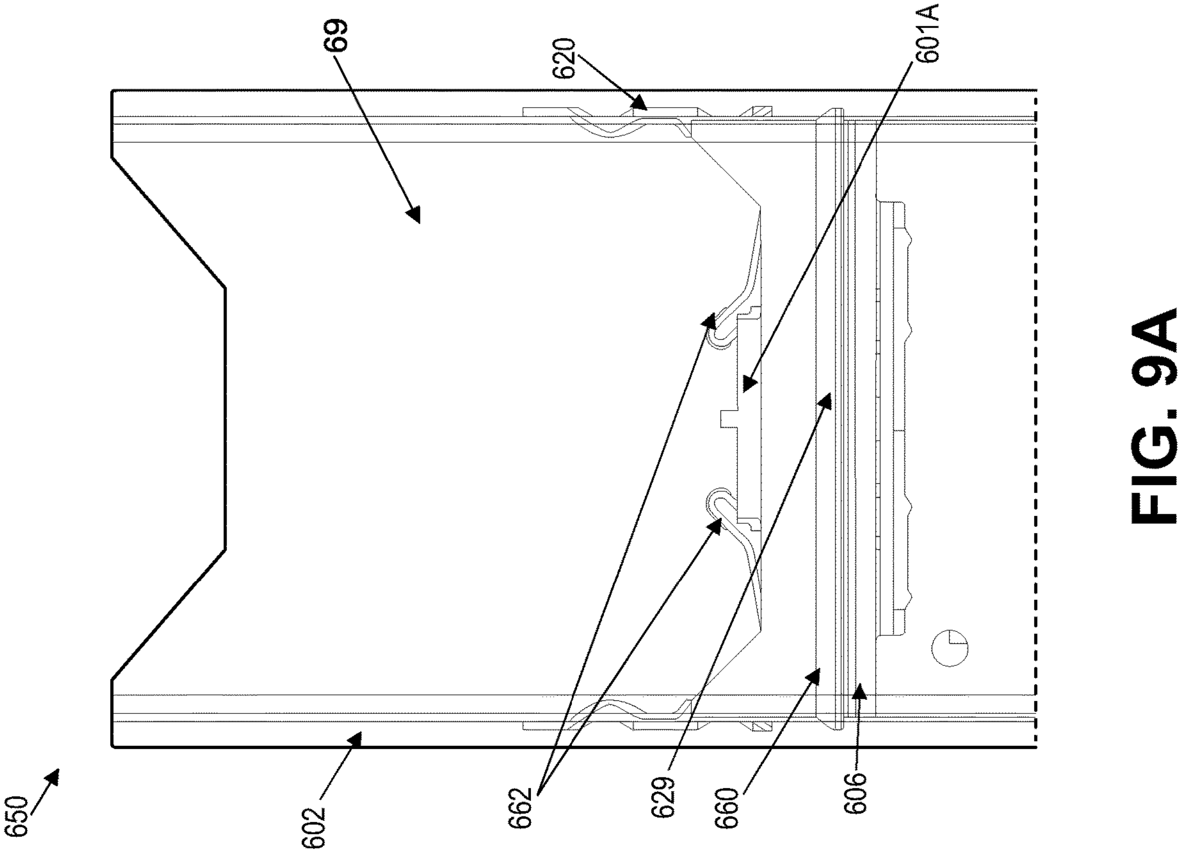
FIG. 9A shows a front view of a vaporizer device in which a cartridge connector is incorporated consistent with implementations of the current subject matter.
Figure 9D:
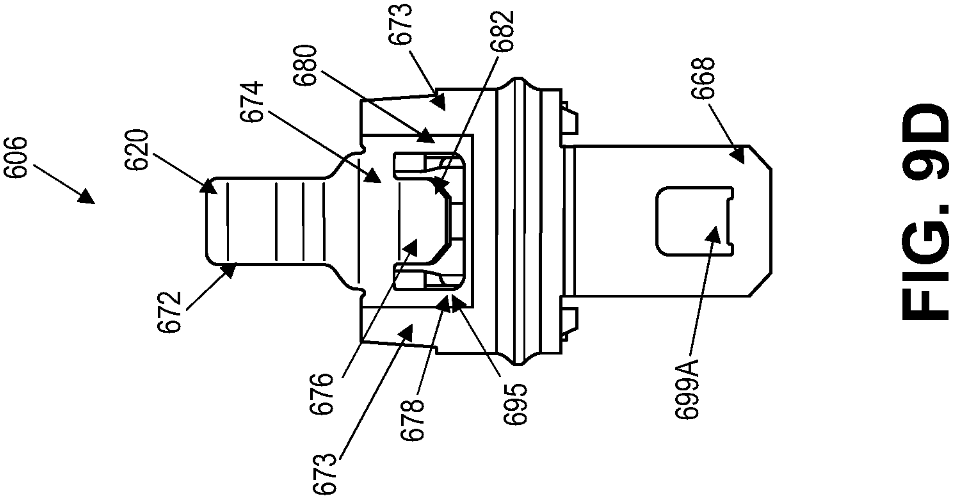
FIG. 9D shows a side view of a cartridge connector having a retaining feature and sidewall connection feature consistent with implementations of the current subject matter.
Figure 9C:
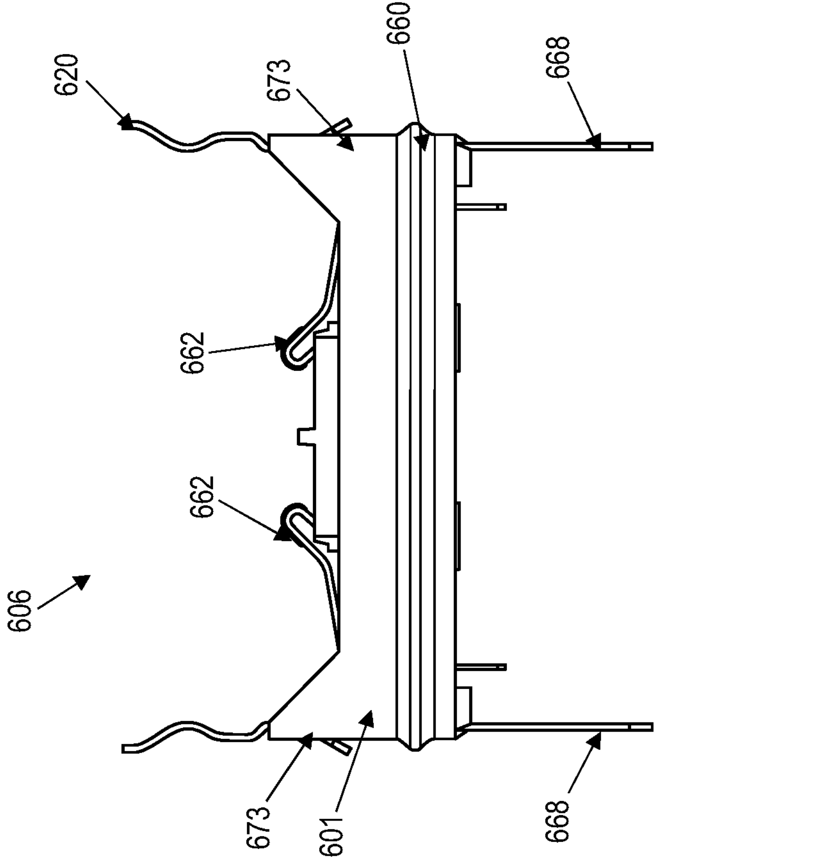
FIG. 9C shows a front view of a cartridge connector having a retaining feature and sidewall connection feature consistent with implementations of the current subject matter.
Figures 9E, 9F:
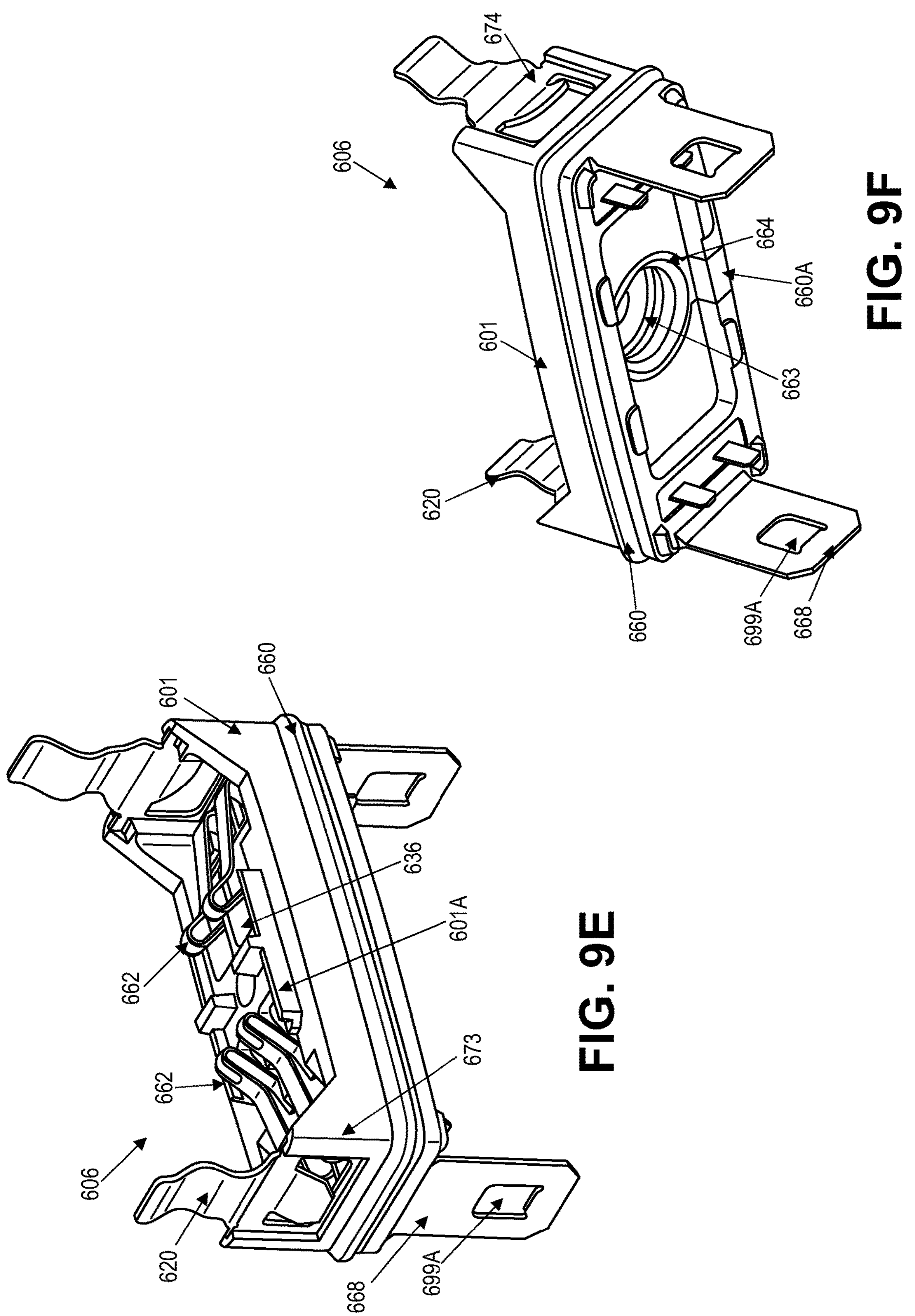
FIG. 9E shows a perspective view of a cartridge connector having a retaining feature and sidewall connection feature consistent with implementations of the current subject matter.
FIG. 9F shows a perspective view of a cartridge connector having a retaining feature and sidewall connection feature consistent with implementations of the current subject matter.
Figure 9G:
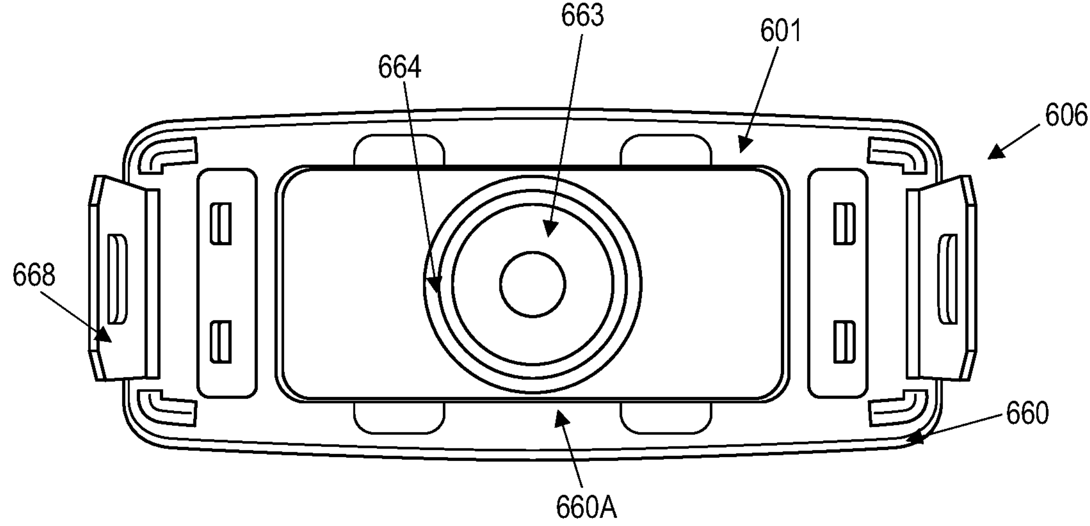
FIG. 9G shows a bottom view of a cartridge connector having a retaining feature and sidewall connection feature consistent with implementations of the current subject matter.
Figure 9H:
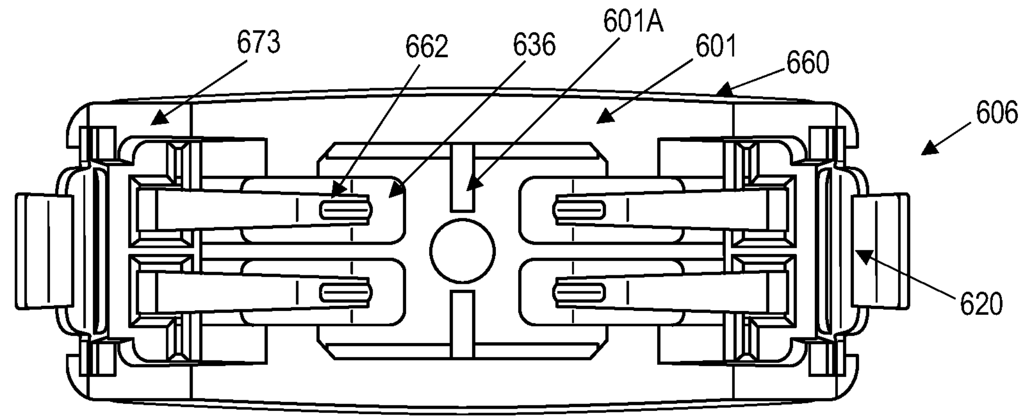
FIG. 9H shows a top view of a cartridge connector having a retaining feature and sidewall connection feature consistent with implementations of the current subject matter.
Figure 9I:
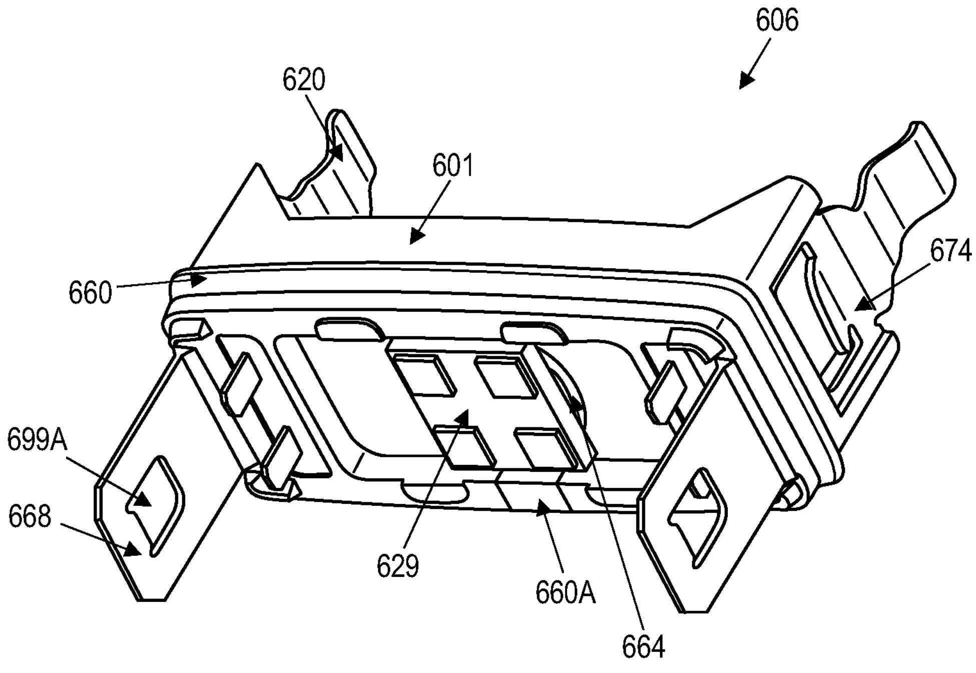
FIG. 9I shows a perspective view of a cartridge connector having a retaining feature and sidewall connection feature consistent with implementations of the current subject matter.
Figure 9J:
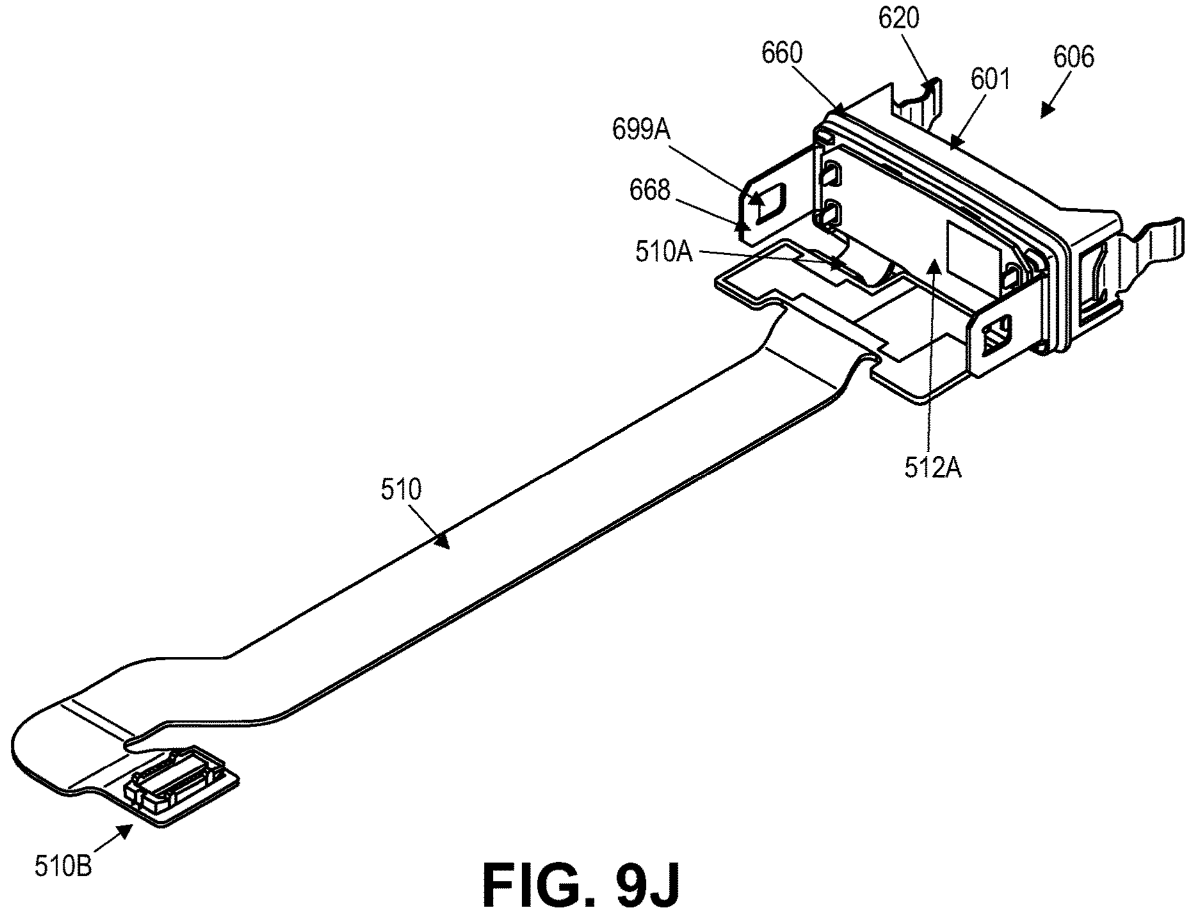
FIG. 9J shows a perspective view of a cartridge connector coupled with a flex consistent with implementations of the current subject matter.

FIG. 9J illustrates an example of the cartridge connector 606 coupled with the rigid flex 510. In the example shown in FIG. 9J, the rigid flex 510 is coupled with a secondary circuitry board (e.g., a PCBA) or pod interface board 512A at a first end 510A and is configured to be coupled with the primary PCBA 512 via a second end 510B of the flex 510. The rigid flex 510 may be coupled with the primary PCBA 512 and/or the secondary PCBA 512A via soldering, a press fit and/or snap fit arrangement (see FIGS. 9M-9N). For example, the primary PCBA 512 and/or the secondary PCBA 512A may be pressed and/or snapped onto the flex 510 and/or a portion of the battery to establish an electrical connection. In some implementations, the primary PCBA 512 and/or the secondary PCBA 512A may additionally or alternatively be soldered to the flex or a portion of the battery. As shown, the secondary PCBA 512A is nested against the bottom surface of the cartridge connector 606 and contacts the bottom of the receptacle contacts 662 that are configured to contact the cartridge 52. This configuration allows the primary PCBA 512 to remotely control the supply of power from the power source 508 to the receptacle contacts 662 via the secondary PCBA 512A. In some implementations, the power source 508, the primary PCBA 512 and/or the secondary PCBA 512A includes one or more thermoprotection features. The thermoprotection features may limit or prevent the power source 508 from charging or discharging, such as when the thermoprotection features detect that the power source 508 has a temperature that is higher than or equal to an upper threshold and/or lower than or equal to a lower threshold.

Positioning the connection between the power source 508 and the PCBA near the receptacle contacts 662 at the first end 510A of the flex 510, the path between the power source 508 and the receptacle contacts 662 can be kept short. The short power source path can increase heating efficiency of the vaporizer device and allow a greater number of puffs to be taken by the user per charge of the power source. The short power source path allows shorter traces to be used in the connection between the power source 508 and the receptacle contacts 662, which reduces resistance and limits heating losses.

Figure 9K:
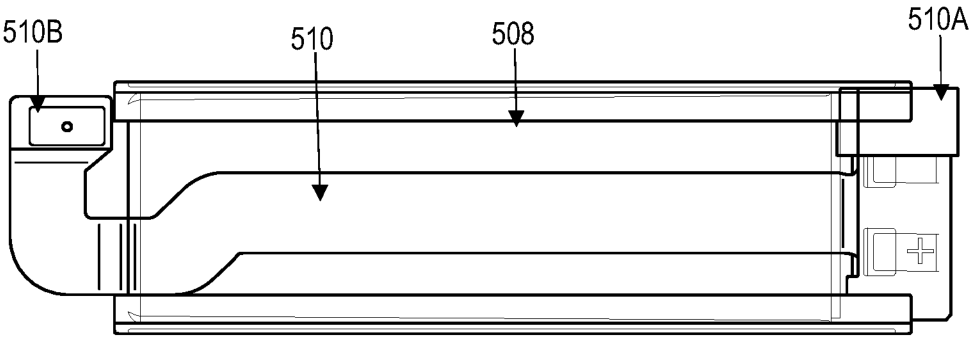
FIG. 9K shows a front view of a power source coupled with a flex consistent with implementations of the current subject matter.
Figure 9L:
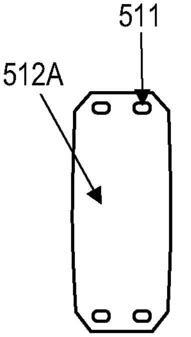
FIG. 9L shows a top view of a secondary PCBA consistent with implementations of the current subject matter.
Figure 9M:
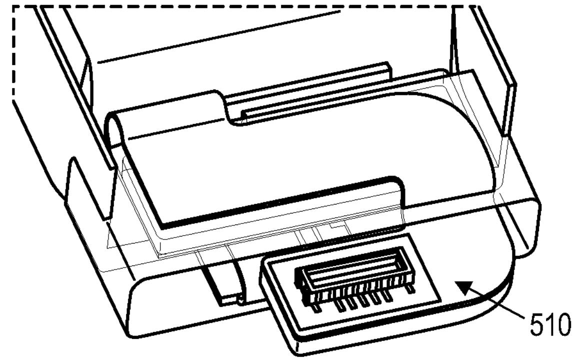
FIG. 9M shows an example flex consistent with implementations of the current subject matter.
Figure 9N:
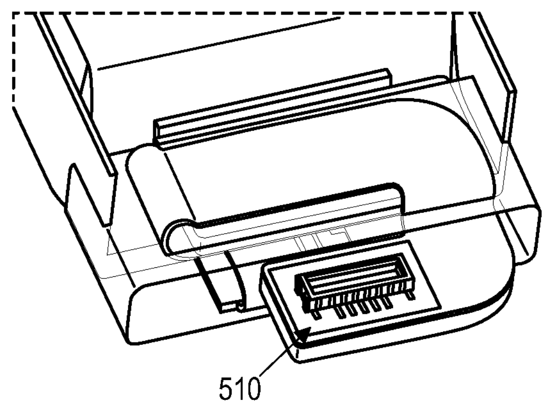
FIG. 9N shows an example flex consistent with implementations of the current subject matter.

FIGS. 9K-9L illustrate another example of the secondary PCBA 512A that is configured to be separately coupled with the cartridge connector 606, as described in more detail below. As shown in FIG. 9K, the rigid flex 510 is coupled with the power source 508, and includes a first end 510A configured to be coupled with the secondary PCBA 512A and a second end 510B configured to be coupled with the primary PCBA 512. The power source 508 includes one or more connectors to allow the power source 508 to be connected to a portion of the flex 510 leading to the second end 510B and a portion of the flex coupled with the second end 510B.

The secondary PCBA 512A shown in FIG. 9L includes slots 511 that correspond to coupling portions of each of the receptacle contacts 662. The secondary PCBA 512A may be nested against the bottom surface of the cartridge connector 606 and contact the coupling portions of the receptacle contacts 662. This configuration allows the primary PCBA 512 to remotely control the supply of power from the power source 508 to the receptacle contacts 662 via the secondary PCBA 512A. Positioning the connection between the power source 508 and the secondary PCBA 512A near the receptacle contacts 662 allows the path between the power source 508 and the receptacle contacts 662 to be kept short. The short power source path can increase heating efficiency of the vaporizer device and allow a greater number of puffs to be taken by the user per charge of the power source. The short power source path allows shorter traces to be used in the connection between the power source 508 and the receptacle contacts 662, which reduces resistance and limits heating losses.

FIGS. 26A-26F illustrate another example of a cartridge connector 906 consistent with certain implementations of the current subject matter. The cartridge connector 906 optionally includes one or more same and/or similar properties and/or components as the cartridge connectors 106, 206, 306, 406, 606 illustrated in FIGS. 1-9L, and described herein. As shown in FIGS. 26A-26F, the cartridge connector 906 includes a cartridge connector body 901, four receptacle contacts 962 positioned within connector slots 936, a sealing mechanism 960, a pressure sensor port, a retaining feature 920, and a sidewall connection feature 968, which are respectively the same and/or similar to the cartridge connector including the cartridge connector body, receptacle contacts positioned within connector slots, the sealing mechanism, the pressure sensor, the pressure sensor port, the retaining feature, and the sidewall connection feature shown in FIGS. 1-9L and described herein.

The retaining features 920 shown in FIGS. 26A-26F can include the same and/or similar properties and/or components as the retaining features 220, 320, 420, 620 illustrated in FIGS. 6A-9L, and described herein. For example, the retaining features 920 include a longitudinal member 972, a lateral member 974, and a pronged portion 976. The longitudinal member 972 provides a spring-force to secure the cartridge connector 906 to the outer shell of the vaporizer body 950. The pronged portion 976 includes a first side leg 978, a second side leg 980, and a central leg 982, among other components. The first and second side legs 978, 980 together form a support leg 995 that surrounds the central leg 982. The support leg 995 is positioned in a slot formed between upwardly extending members 973.

Referring to FIGS. 26A-26F, the cartridge connector 906 also includes one or more sidewall connection features 968 that include an opening 999A to receive a corresponding protrusion member 999B that extends from the outer shell 902 and/or another component of the vaporizer body 950, such as the skeleton 504. The sidewall connection features 968 are the same or similar to the sidewall connection features shown in FIGS. 8A-9L described above.

FIGS. 26A-26F illustrate an example of the cartridge connector having a scaling mechanism 960. The sealing mechanism 960 includes a seal or gasket that extends around the cartridge connector body 901. The seal or gasket can define a single-ribbed structure. The seal or gasket may be integrally formed with and/or coupled to a pressure sensor sealing mechanism 964 that is configured to extend around at least a portion of a pressure sensor 929. The seal or gasket may be connected to the pressure sensor sealing mechanism 964 by a sealing connection arm 960A that wraps around a side wall of the cartridge connector body 901.

The cartridge connector 906 may include one or more features that allow for the cartridge connector 906 to be more easily cleaned using a cleaning apparatus. For example, the cartridge connector 906 includes a wall extension 901A that extends from an upper portion of the cartridge connector body 901. The wall extension 901A may have an "H-shape" or other shape with a central cutout to surround the pressure sensor port and extend upwardly from the connector slots 936 to surround at least a portion of the receptacle contacts 962. The wall extension 901A protects the receptacle contacts 962 at least in part by making it more difficult for the cleaning apparatus to get caught on a receptacle contact 962 and/or deform a receptacle contact 962. The receptacle contacts 962 may include an upper portion that is elongated to limit deformation caused by a cleaning apparatus or other apparatus.

The cartridge connector 906 may include a receptacle contact cover 945. The receptacle contact cover 945 may surround at least a portion of the receptacle contacts 962, such as a loose end of the receptacle contacts 962, to help to limit or prevent damage caused to the receptacle contacts 962. For example, the receptacle contact cover 945 may include one or more (e.g., four or more) openings 945A, each of which surround a corresponding receptacle contact 962. Interior walls of each opening can help to reduce damage caused to the receptacle contacts 962, such as by a cleaning apparatus, by, for example, limiting the ability for the cleaning apparatus to reach into the opening 945A and/or get caught on the loose end of the receptacle contacts 962. The receptacle contact cover 945 may help to limit or prevent the loose end of the receptacle contacts 962 from being readily reachable or bent by the cleaning apparatus.

The receptacle contact cover 945 may be glued, snapped-fit into, molded into, and/or press-fit into the cartridge connector body 901, among other assembly means.

FIGS. 27A-27H illustrate another example of a cartridge connector 2706 consistent with certain implementations of the current subject matter. The cartridge connector 2706 optionally includes one or more same and/or similar properties and/or components as the cartridge connectors 106, 206, 306, 406, 606, 906 illustrated in FIGS. 1-9L and 26A-26F, and described herein. As shown in FIGS. 27A-27H, the cartridge connector 2706 includes a cartridge connector body 2701, four receptacle contacts 2762 positioned within connector slots 2736, a scaling mechanism 2760, a pressure sensor port, a retaining feature 2720, and a sidewall connection feature 2768, which are respectively the same and/or similar to the cartridge connector including the cartridge connector body, receptacle contacts positioned within connector slots, the sealing mechanism, the pressure sensor, the pressure sensor port, the retaining feature, and the sidewall connection feature shown in FIGS. 1-9L and 26A-26F, and described herein.

Figure 27B:
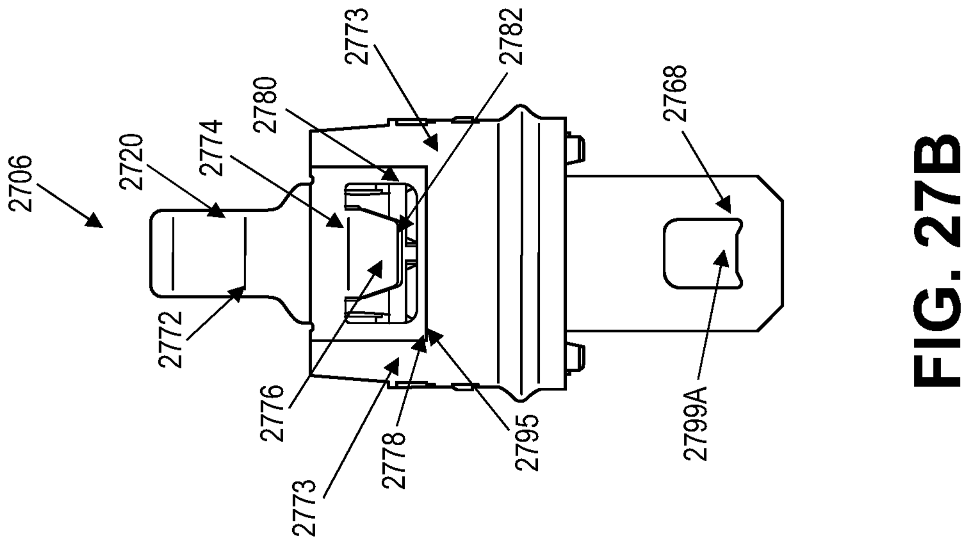
FIG. 27B shows a side view of a cartridge connector having a retaining feature and sidewall connection feature consistent with implementations of the current subject matter.
Figure 27A:
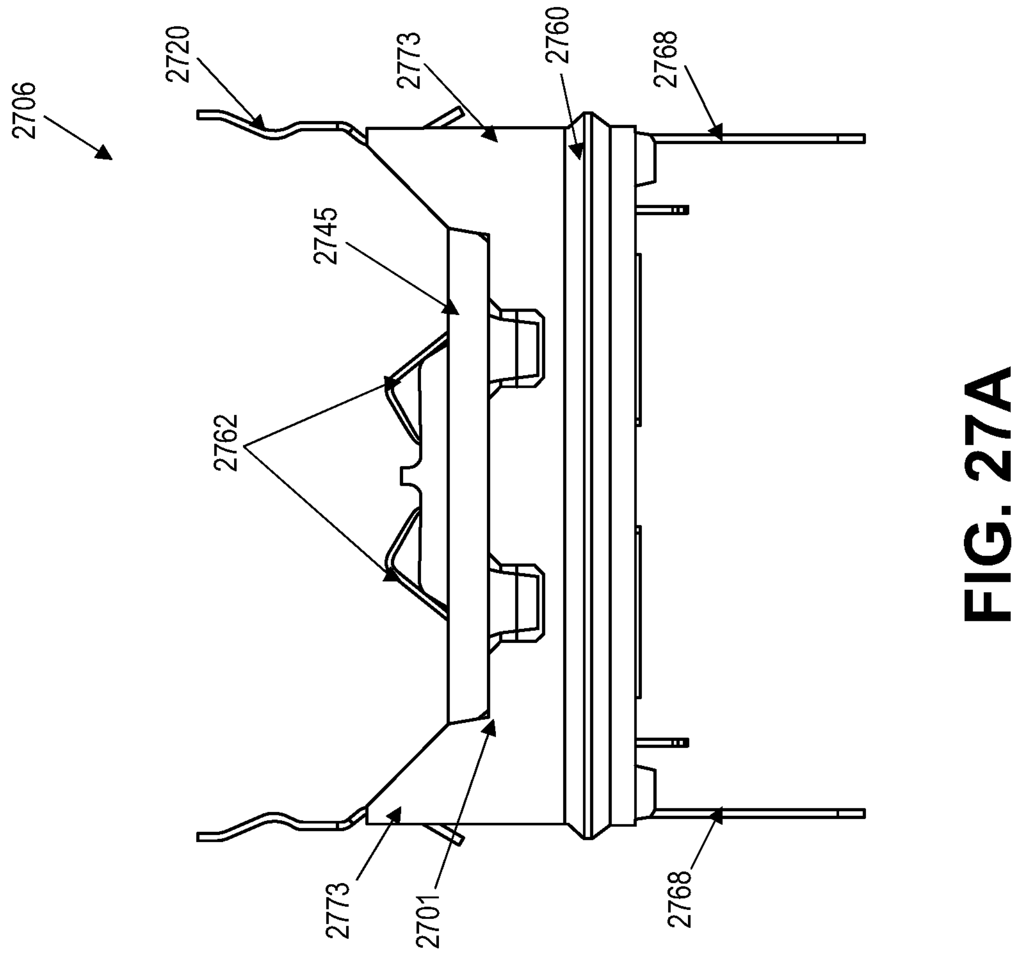
FIG. 27A shows a front view of a cartridge connector having a retaining feature and sidewall connection feature consistent with implementations of the current subject matter.
Figure 27D:
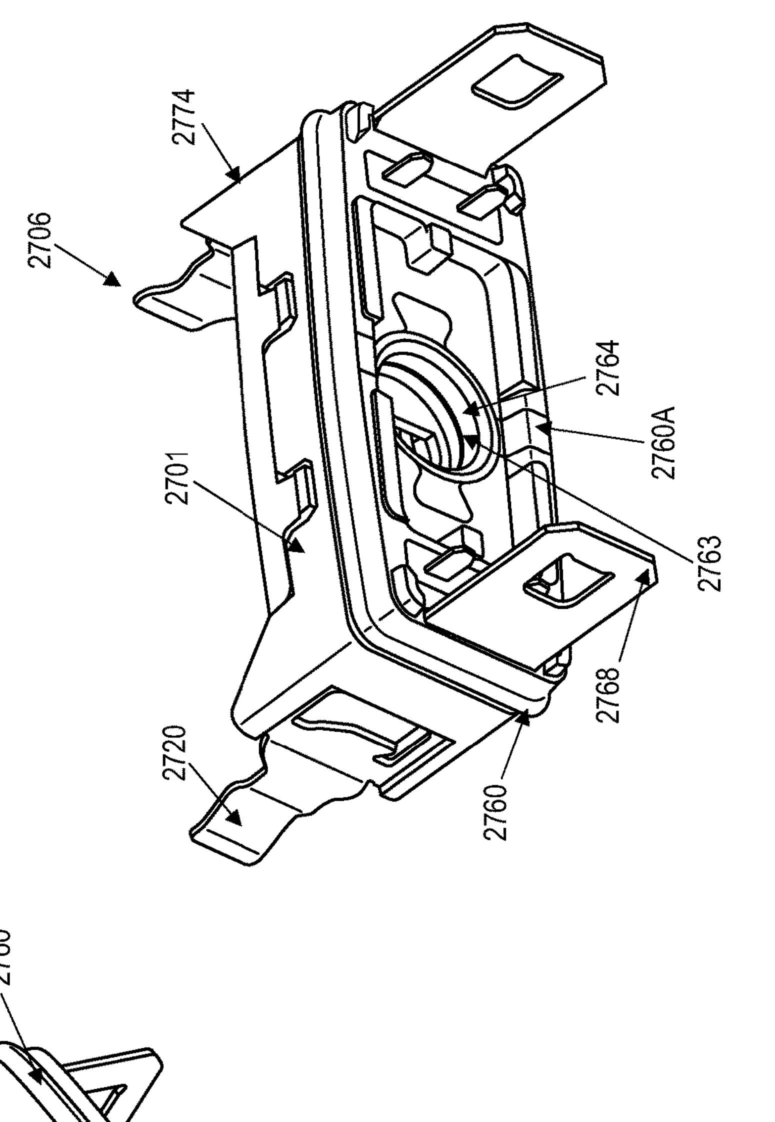
FIG. 27D shows a perspective view of a cartridge connector having a retaining feature and sidewall connection feature consistent with implementations of the current subject matter.
Figure 27C:
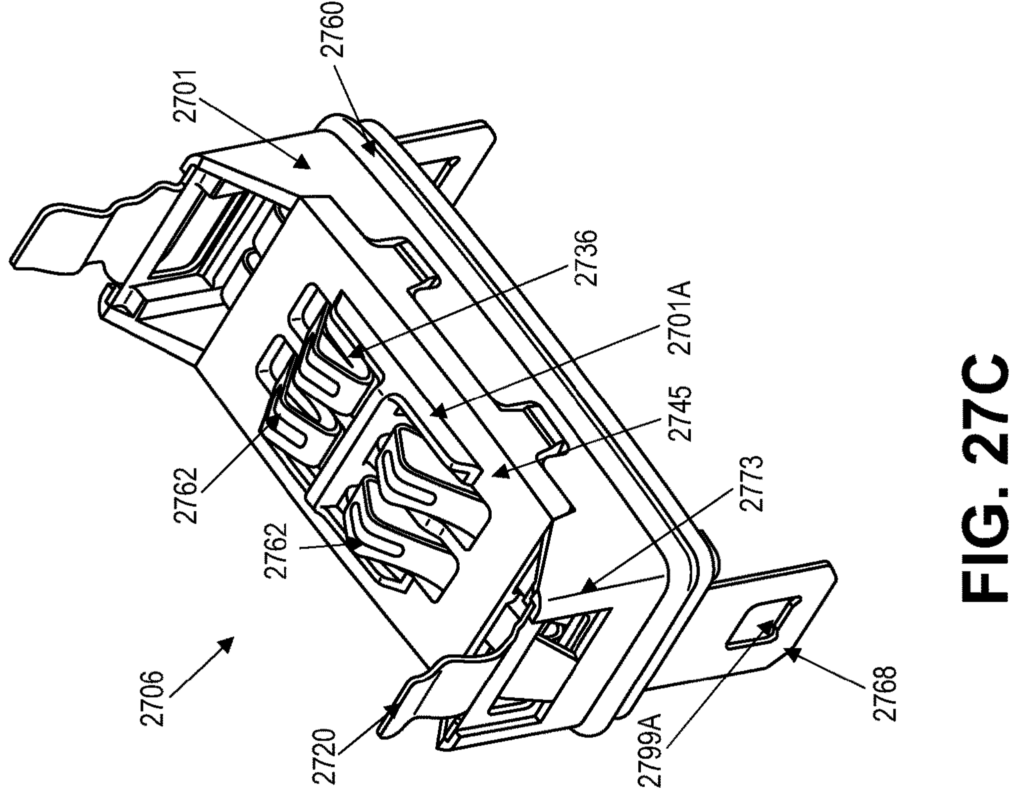
FIG. 27C shows a perspective view of a cartridge connector having a retaining feature and sidewall connection feature consistent with implementations of the current subject matter.
Figure 27E:
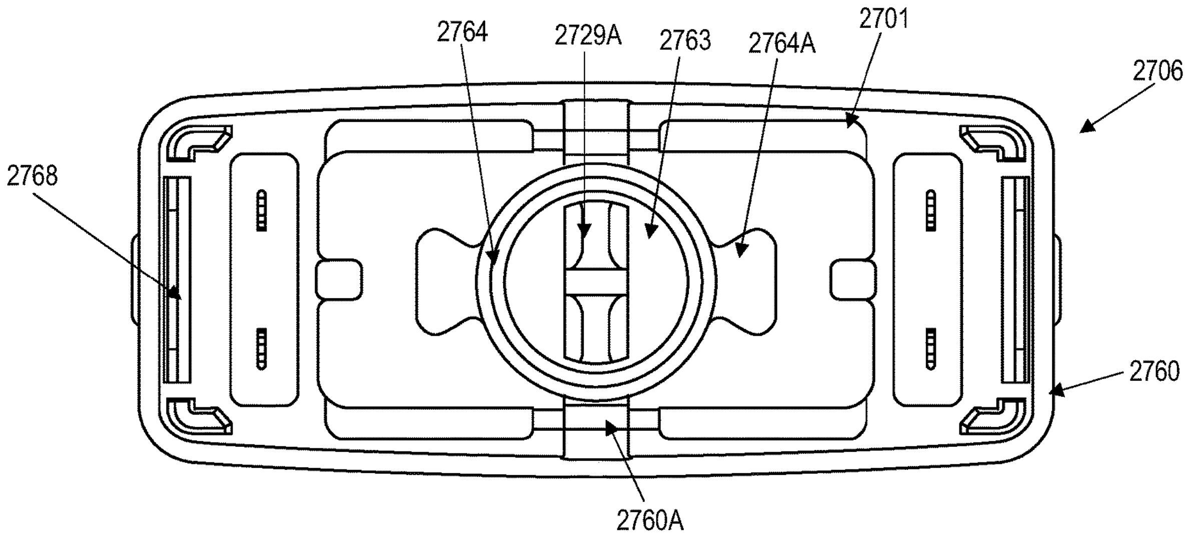
FIG. 27E shows a bottom view of a cartridge connector having a retaining feature and sidewall connection feature consistent with implementations of the current subject matter.
Figure 27F:
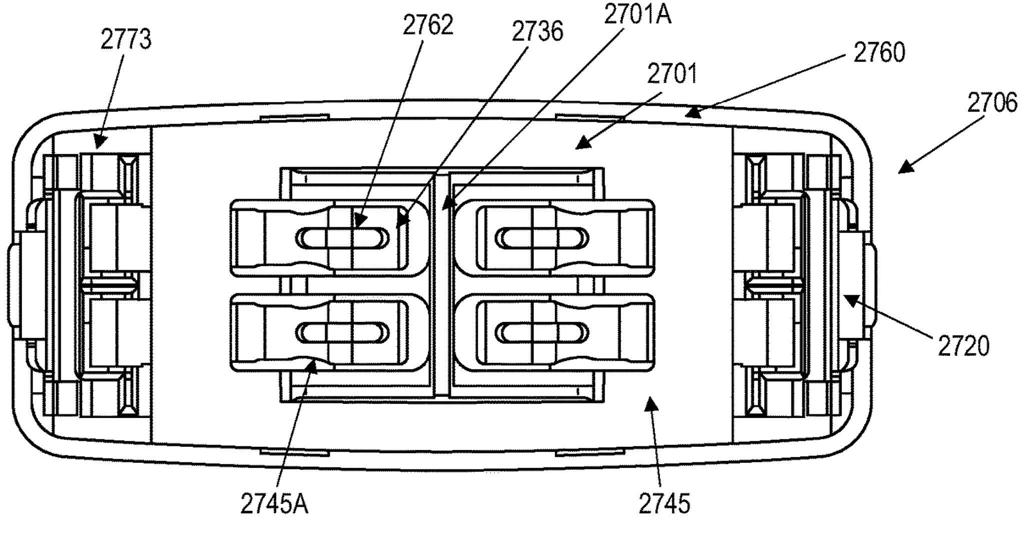
FIG. 27F shows a top view of a cartridge connector having a retaining feature and sidewall connection feature consistent with implementations of the current subject matter.

The retaining features 2720 shown in FIGS. 27A-2GF can include the same and/or similar properties and/or components as the retaining features 220, 320, 420, 620, 920 illustrated in FIGS. 6A-9L and 26A-26F, and described herein. For example, the retaining features 2720 include a longitudinal member 2772, a lateral member 2774, and a pronged portion 2776. The longitudinal member 2772 provides a spring-force to secure the cartridge connector 2706 to the outer shell of the vaporizer body 2750. The pronged portion 2776 includes a first side leg 2778, a second side leg 2780, and a central leg 2782, among other components. The first and second side legs 2778, 2780 together form a support leg 2795 that surrounds the central leg 2782. The support leg 2795 is positioned in a slot formed between upwardly extending members 2773.

Referring to FIGS. 27A-27H, the cartridge connector 2706 also includes one or more sidewall connection features 2768 that include an opening 2799A to receive a corresponding protrusion member 2799B that extends from the outer shell 2702 and/or another component of the vaporizer body 2750, such as the skeleton 504. The sidewall connection features 2768 are the same or similar to the sidewall connection features shown in FIGS. 8A-9L and 26A-26F described above.

FIGS. 27A-27H illustrate an example of the cartridge connector having a scaling mechanism 2760. The scaling mechanism 2760 includes a seal or gasket that extends around the cartridge connector body 2701. The seal or gasket can define a single-ribbed structure. The seal or gasket may be integrally formed with and/or coupled to a pressure sensor sealing mechanism 2764 that is configured to extend around at least a portion of a pressure sensor 2729. The seal or gasket may be connected to the pressure sensor sealing mechanism 2764 by a scaling connection arm 2760A that wraps around a side wall of the cartridge connector body 2701. The cartridge connector body 2701 may include a slot 2729A for securing the pressure sensor 2729. The slot 2729A may help to reduce the likelihood of materials building up over the pressure sensor 2729 and/or from clogging the air path coupled with the pressure sensor 2729.

The pressure sensor sealing mechanism 2764 may include one or more (e.g., two, three, four, etc.) anchors 2764A that help to secure the pressure sensor sealing mechanism 2764 to the cartridge connector body 2701. The anchors 2764A may be adhered to, mechanically secured to, and/or pressure fit into the cartridge connector body 2701, among other securement means. The anchors 2764A provide additional surface area for the pressure sensor sealing mechanism 2764 to contact and secure to the cartridge connector body 2701.

The cartridge connector 2706 may include one or more features that allow for the cartridge connector 2706 to be more easily cleaned using a cleaning apparatus. For example, the cartridge connector 2706 includes a wall extension 2701A that extends from an upper portion of the cartridge connector body 2701. The wall extension 2701A may have an "H-shape" or other shape with a central cutout to surround the pressure sensor port and extend upwardly from the connector slots 2736 to surround at least a portion of the receptacle contacts 2762. The wall extension 2701A protects the receptacle contacts 2762 at least in part by making it more difficult for the cleaning apparatus to get caught on a receptacle contact 2762 and/or deform a receptacle contact 2762.

Figure 27G:
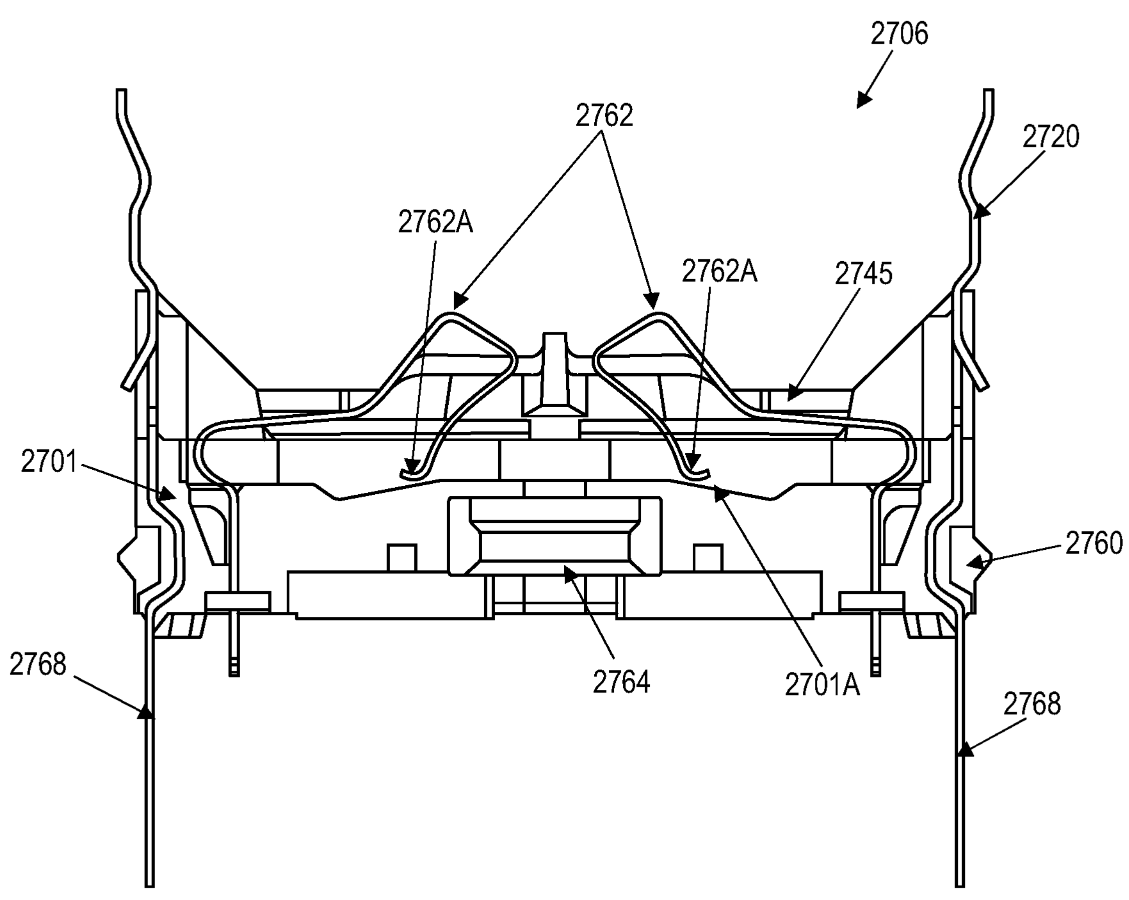
FIG. 27G shows a side cross-sectional view of a cartridge connector having a retaining feature and sidewall connection feature consistent with implementations of the current subject matter.
Figure 27H:
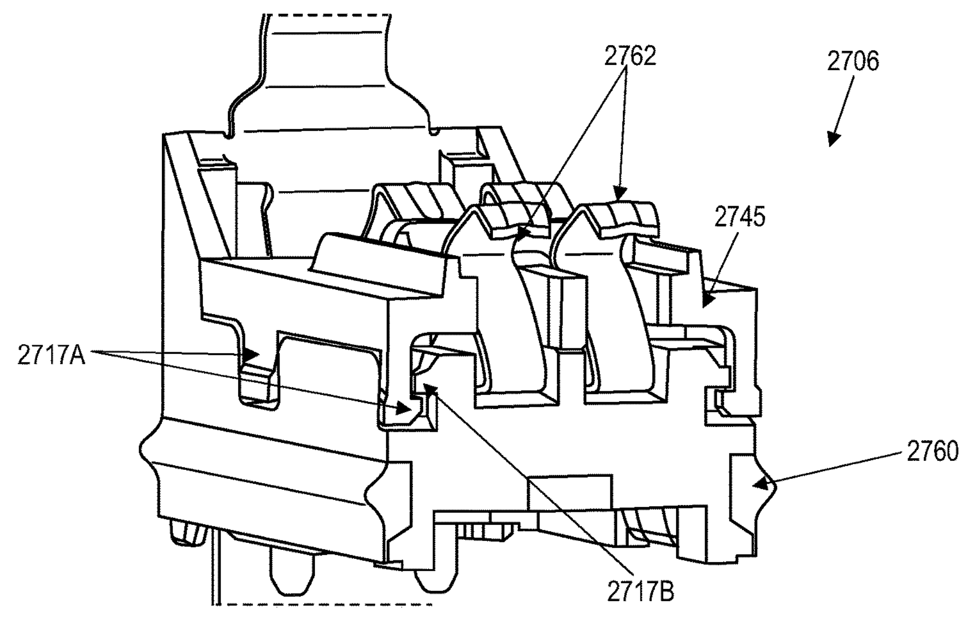
FIG. 27H shows a side cross-sectional view of a cartridge connector having a snap feature consistent with implementations of the current subject matter.

The receptacle contacts 2762 may include an upper portion that is elongated to limit deformation caused by a cleaning apparatus or other apparatus. FIG. 27G shows a side cross-sectional view of the cartridge connector 2706 consistent with implementations of the current subject matter. As shown, an end portion 2762A of the receptacle contacts 2762 may be configured to contact an inner surface 2701B of the cartridge connector body 2701, such as when a force is applied to the receptacle contacts 2762 (e.g., when a vaporizer cartridge is connected with the vaporizer body). Contact between the end portion 2762A of the receptacle contacts 2762 and the inner surface 2701B may create a redundancy in forces (e.g., one or more spring forces). For example, a force applied to the receptacle contacts 2762, such as by contact with the vaporizer cartridge, causes a spring force to act in the opposite direction of the force to push back on the vaporizer cartridge and maintain contact between the receptacle contacts 2762 and the vaporizer cartridge. Contact between the end portion 2762A and the inner surface 2701B when a force is applied, such as when the vaporizer cartridge contacts the receptacle contracts 2762, causes a second force (e.g., a normal force) to be applied in the opposite direction of the force. The second force may further secure and maintain contact between the receptacle contacts 2762 and the vaporizer cartridge in use to ensure that the receptacle contacts 2762 and cartridge contacts 65 are consistently in communication in use. The second force may help to secure and maintain contact between the receptacle contacts 2762 and the vaporizer cartridge.

In some implementations, the receptacle contacts 2762 have a width that helps to reduce stress on the receptacle contacts 2762 and that may help to increase the magnitude of the spring force and/or the second force. Increasing the magnitude of the spring force and/or the second force helps to secure the receptacle contacts 2762 to the vaporizer cartridge in use and maintain communication between the receptacle contacts 2762 and the vaporizer cartridge. The width of the receptacle contacts 2762 may additionally or alternatively help to limit or prevent damage caused to the receptacle contacts 2762, such as by a cleaning apparatus. For example, an increased width of the receptacle contacts 2762 may limit or prevent the cleaning apparatus from passing the sides of the receptacle contacts, thereby reducing the likelihood that the cleaning apparatus would bend or otherwise damage the receptacle contacts.

The cartridge connector 2706 may also include a receptacle contact cover 2745. The receptacle contact cover 2745 may surround at least a portion of the receptacle contacts 2762, such as a loose end of the receptacle contacts 2762, to help to limit or prevent damage caused to the receptacle contacts 2762. For example, the receptacle contact cover 2745 may include one or more (e.g., four or more) openings 2745A, each of which surround a corresponding receptacle contact 2762. Interior walls of each opening can help to reduce damage caused to the receptacle contacts 2762, such as by a cleaning apparatus, by, for example, limiting the ability for the cleaning apparatus to reach into the opening 2745A and/or get caught on the loose end of the receptacle contacts 2762. The receptacle contact cover 2745 may help to limit or prevent the loose end of the receptacle contacts 2762 from being readily reachable or bent by the cleaning apparatus.

The receptacle contact cover 2745 may be glued, snapped into, molded into, and/or press-fit into the cartridge connector body 2701, among other assembly means. For example, as shown, the receptacle contact cover 2745 may be coupled with the cartridge connector body 2701 via one or more connecting features 2717A, such as snap hooks, which may couple with corresponding features 2717B, such as bump features, to secure the receptacle contact cover 2745 to the cartridge connector body 2701. The bump features 2717B help to prevent the receptacle contact cover 2745 from being separated from the cartridge connector body 2701.

FIGS. 10A-12C illustrate an example of the end cap module 502 consistent with implementations of the current subject matter. The end cap module 502 defines a modular component that can be coupled with the skeleton 504. The end cap module 502 includes an end cap 520, an antenna carrier 522, a flex cable 528, a separator 538, a coax cable 532, a PSA 530, a magnet 536 for magnetically connecting to an external power supply, and a light source 534 such as an LED 534.

The end cap module 502 includes circuitry that can allow the vaporizer device to be wirelessly connected with other devices, such as via Bluetooth, among other configurations. The antenna carrier 522 can include one or more charging contacts 524 and one or more data pins 526. The antenna can include a grounding pin to ground the charging contacts to the outer shell of the vaporizer body directly to increase efficiency of antenna performance.

The charging contacts 524 can be configured to electrically communicate with an external power source to provide a charging interface between the battery 508 and the power source. As shown in at least FIGS. 10A-12C, the charging contacts 524 and the data pins 526 can have a circular shape. Charging contacts 524 and/or data pins 526 having other shapes are also contemplated. In some implementations, the charging contacts 524 and the data pins 526 have the same shape (see FIGS. 13A-13C, 13E-13F). In some embodiments, the charging contacts 524 and the data pins 526 have different shapes and/or sizes (see FIGS. 10A-12C and 13D). For example, FIGS. 13A-13F illustrate example vaporizer bodies 50 having end cap modules 502. The charging contacts 524 can have a square shape, a square shape with rounded corners (see FIG. 13A), an oval shape (see FIG. 13B), a rounded rectangle shape (see FIG. 13C), a semi-circle shape (see FIG. 13D), and/or a circle shape (see FIG. 13E, 13F), among others. The data pins 526 can have a square shape, a square shape with rounded corners (see FIGS. 13A, 13D), an oval shape (see FIG. 13B), a rounded rectangle shape (see FIG. 13C), a semi-circle shape, and/or a circle shape (see FIG. 13E, 13F), among others.

Referring to FIGS. 10A-12C, the end cap 520 can include one or more charging contact apertures 525 that receive corresponding charging contacts 524, and one or more data pin apertures 527 that receive corresponding data pins 526, when assembled. As shown in at least FIGS. 11A-11B, and 13A-13F, the charging contact apertures 525 and the data pin apertures 527 can have a depth that is approximately equal to a depth of the corresponding charging contacts 524 and data pins 526. The outer end surface of the charging contacts 524 and/or data pins 526 can be approximately flush with an outer surface 523 of the end cap 520. In some implementations, when assembled, the outer end surface of the charging contacts 524 and/or data pins 526 is recessed and/or protrudes relative to the outer surface 523 of the end cap 520.

The end cap 520 can include a cutout region 535 on a front side of the end cap 520. The cutout region can be configured to surround at least a portion of the light source 534.

Figures 11A, 11B:
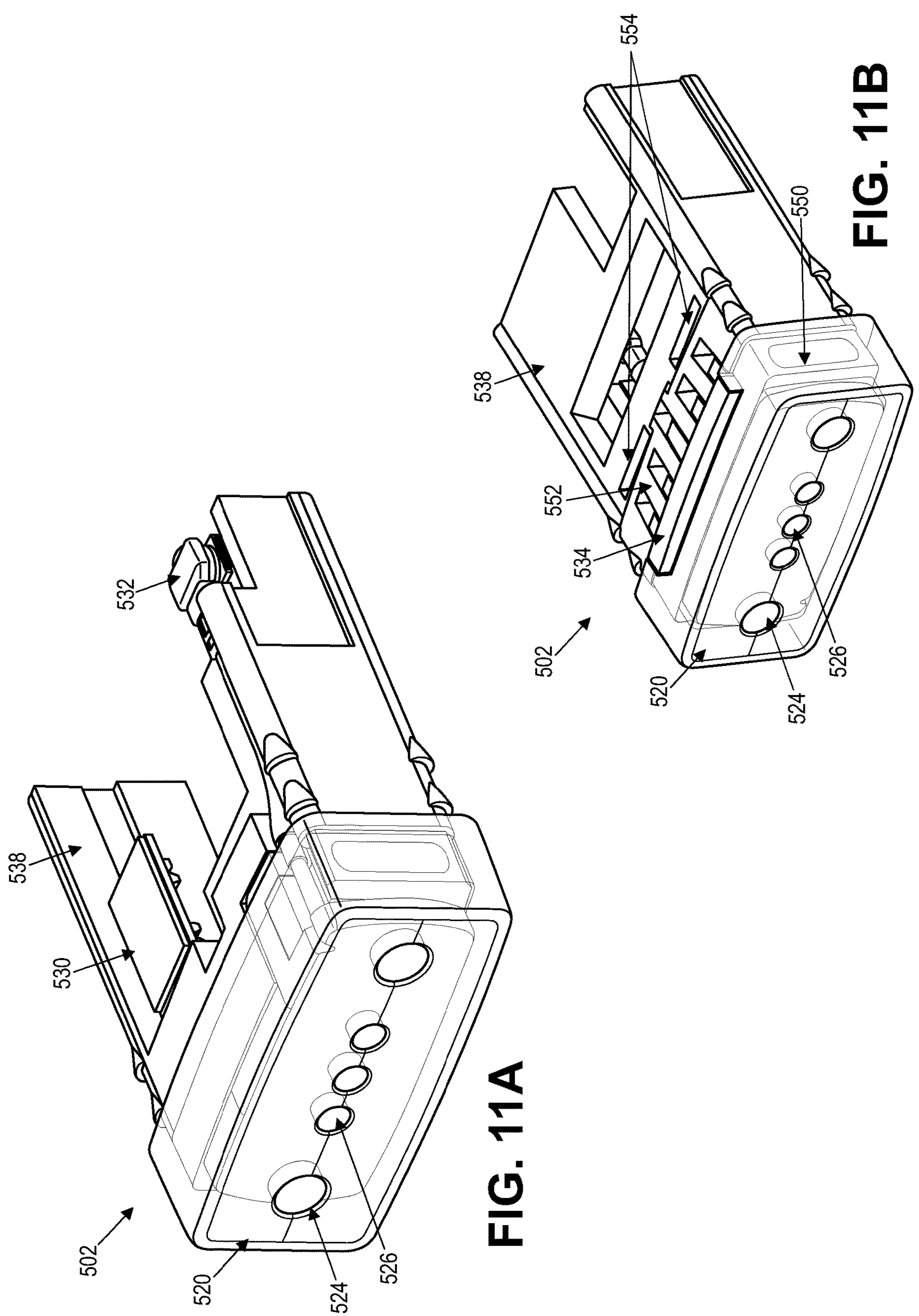
FIG. 11A shows a perspective view of an end cap module of a vaporizer device in which an end cap is transparent consistent with implementations of the current subject matter.
FIG. 11B shows a perspective view of an end cap module of a vaporizer device in which an end cap is transparent consistent with implementations of the current subject matter.
Figure 12A:
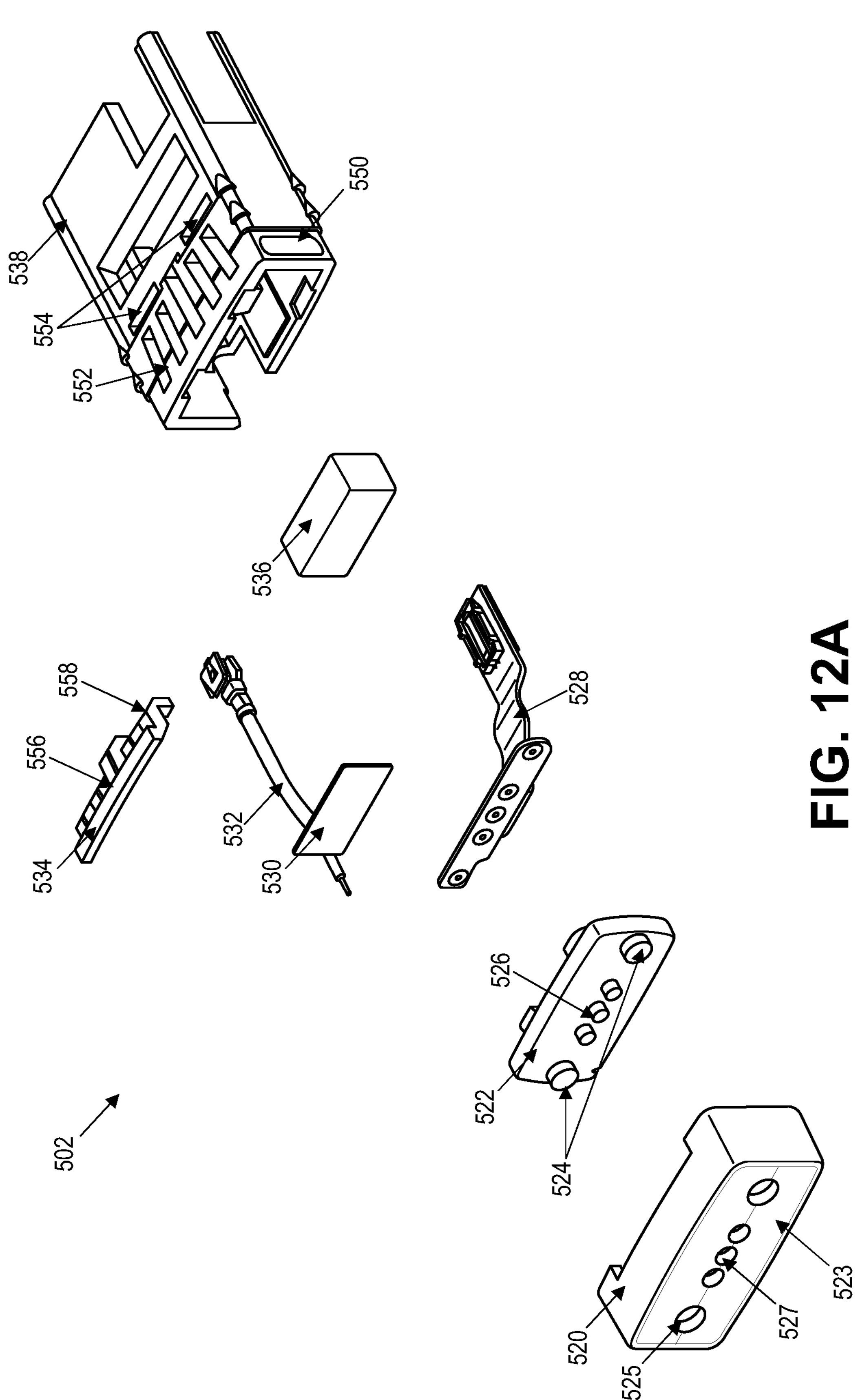
FIG. 12A shows an exploded view of an end cap module of a vaporizer device consistent with implementations of the current subject matter.

The separator 538 is configured to house at least some of the internal components of the end cap module 502. For example, the separator 538 can surround and/or secure at least some of the internal components of the end cap module 502. FIG. 12 shows an example of the separator 538 that houses at least some of the internal components of the end cap module 502. As shown in FIG. 12, the end cap 520 can be placed over an end of the separator 538 to secure the internal components within the separator 538. FIGS. 11 and 11B illustrate an example of the end cap module 502 in which the end cap 520 is shown as transparent to show certain internal components of the end cap module 502.

The separator 538 may include coupling recesses 548 that can secure the end cap 520 to the separator 538. The coupling recesses 548 can be receive an adhesive, such as glue, to adhere the end cap 520 to the separator 538. The coupling recesses 548 allow for a strong bond to form between the end cap 520 and the separator. The adhesive can adhere to the surfaces of the coupling recesses 548 to provide multiple adhering surfaces and strengthen the bond between the end cap 520 and the separator 538.

The separator 538 may include adhesive channels 548A that can secure the end cap module 502 to the outer shell 102, as described below. The adhesive channels 548A can receive an adhesive, such as glue, to adhere the end cap module 502 to the outer shell 102. The adhesive can adhere to the surfaces of the adhesive channels 548A to provide multiple adhering surfaces and strengthen the bond between the end cap 520 and the outer shell 102.

The separator 538 can include one or more light source receiving slots 552. The light source receiving slots 552 can be configured to receive at least a portion of the light source 534 to couple the light source 534 to the separator 538. The light source 534 and the separator 538 can be coupled via a snap-fit arrangement, and/or the light source 534 and the separator 538 can be adhered to one another via an adhesive, chemical bonding process, or mechanical bonding process.

The separator 538 can also include skeleton attachment features 554. The skeleton attachment features 554 can be configured to receive at least a portion of the skeleton 504, such as one or more of the end cap module connection features 550. The light source 534 and the end cap module connection features 550 can be coupled via a snap-fit arrangement, and/or the end cap module connection features 550 and the separator 538 can be adhered to one another via an adhesive, chemical bonding process, or mechanical bonding process.

Referring to FIGS. 10A-12C, the one or more illuminative devices (e.g., the light source 534) can include a light pipe 556 and a light source attachment feature 558. The light source attachment feature 558 can include one or more prongs that can be configured to be inserted into the light source receiving slots 552. The light source receiving slots 552 can be configured to separate the light emitting from the light pipe 556 of the light source 534. As mentioned above, the light source attachment feature 558 and the separator 538 can be coupled via a snap-fit arrangement, and/or the light source attachment feature 558 and the separator 538 can be adhered to one another via an adhesive, chemical bonding process, or mechanical bonding process.

The light pipe 556 can include one or more LEDs, such as five LEDs. The light pipe 556 can be at least partially or fully illuminated to provide an indicator to the user. For example, the light source 534 can be configured to provide a variety of indicators to the user, such as a charging level, a state of charge of the battery 508, a puff being taken, a need to recharge the vaporizer device, among other indicators. The light source 534 can provide the indicators in a variety of patterns such as animations, and/or brightness levels.

For example, in some implementations of the current subject matter, the controller 19 can cause one or more illuminating devices 534 on the vaporizer 100 (and in some examples on the vaporizer body 50) to illuminate and dim one or more individually controllable illuminating devices according to various patterns, where the lighting, the temporal and/or the spatial pattern can indicate a certain state, transition between states, condition, or the like of the vaporizer 100. Consistent with come implementations of the current subject matter, a vaporizer 100 can have one or more (and in one example 4 or 5) illuminating devices arranged in a pattern (e.g., e.g., a line, a square, a rectangle, a circle, a triangle, a pill-shape, etc.). In some implementations of the current subject matter, the illuminating device or devices can be or include one or more light emitting diodes (LEDs).

In some implementations, the light source includes at least two illuminating devices. In some implementations, each of the at least two illuminating devices includes at least one LED. In some implementations, the light source includes at least five illuminating devices. In some implementations, the vaporizer includes an opening through which the light source is visible. In some implementations, the opening includes a pill-shape, as noted above. For example, the opening may include a first side, a second side approximately parallel to the first side, a third side may extend between the first side and the second side, and a fourth side may extend between the first side and the second side. Each of the first side and the second side may be longer than each of the third side and the fourth side. In some implementations, the third and fourth sides may be rounded.

In some implementations, each of the at least two illuminating devices are separated from one another.

In one example consistent with implementations of the current subject matter, the controller 19 can access an illumination pattern library (e.g., e.g., firmware, other code, or the like) to determine how to adjust the brightness of one or more illuminating devices positioned on the vaporizer 100 to be visible to a user of the vaporizer 100. The illumination pattern library can include a list of target brightness and/or color values for use in managing transitions of the one or more illuminating devices over a period of time. Chaining of a series of the target brightness and/or color values together may be result in creation of an animation profile for a set of illuminating devices.

As an example of the above, a visible "blip" may be displayed on the one or more illuminating devices when a vaporizer cartridge is inserted into a cartridge receptacle 69 of a vaporizer body 50. The "blip" may be created by the following sequence of operations: first, a transition to zero (or some other reduced level of) brightness or to some starting color value may occur, followed by a transition to 100% brightness (or some other brightness or color value) over a ramp up time period (e.g., (0.1 sec), and then followed by a transition back to the zero (or some other reduced level of) brightness or to some starting color value over a ramp down period (e.g., 0.1 second), which need not be a same time period as the ramp up time period.

Some implementations of the current subject matter relate to an approach for handling such transitions in which a second transition or an "animation" to be displayed by the one or more illuminating devices is triggered while a first transition or animation is in progress.

A few options consistent with the current subject matter can occur in this case, depending on which transition or animation is playing (e.g., the first transition or animation), and what the new, requested transition or animation (e.g., the second transition or animation) requires. In one option, the first transition or animation can be paused at its current point upon a command for the second first transition or animation to occur being received, or some triggering event being detected, that triggers the second transition or animation. The second transition or animation can be executed followed by resuming the first transition or animation where it was paused. In another option, the first transition or animation can be stopped upon receipt of a command for (e.g., some triggering event causing) the second transition or animation to occur. The second transition or animation can be executed, but when the second first transition or animation completes, the remainder of the first transition or animation is canceled instead of resuming where it was stopped. In yet another option, upon receipt of a command for (e.g., some triggering event causing) the second transition or animation to occur, execution of the second transition or animation can be deferred until the first transition or animation is completed, and then the second transition or animation executes. In still another option, the second transition or animation can be overlayed upon concurrent execution of the remainder of the first transition or animation (e.g., the first transition or animation can continue, but the changes in brightness or color specified by the second transition or animation can be executed atop those changes in brightness or color specified by the first transition or animation continuing from the part of the first transition or animation at which the second transition or animation was triggered. In yet another option, if a command for (e.g., some triggering event causing) a second transition or animation results while a first transition or animation is in progress, the second transition or animation can be ignored. In other words, the controller may refuse or ignore commands or triggers for some new transition or animation until a currently in progress transition or animation is completed.

In certain examples, when interrupting a first transition or animation with a second transition or animation, the current value of each illuminating device (e.g., an LED, etc.) may fade smoothly to the start value of required for the second transition or animation over some (e.g., a short) time period, and then fade back into the first transition or animation (if applicable) according to the option for dealing with two colliding requested or triggered transitions or animations.

To display the options for illumination of the one or more illuminating devices, the light pipe 556 can include an externally facing portion of the light source 534. As mentioned above, the externally facing portion of the light pipe 556 can have a variety of shapes, sizes, and configurations. For example, as shown in FIGS. 10A-12C, the light pipe 556 of the light source 534 can have a rectangular shape. FIGS. 13A-13F illustrate example vaporizer bodies 50 having light sources 534 in a variety of configurations. For example, the externally facing portion of the light pipe 556 (and/or opening in the vaporizer body) of the light sources 534 can have an oval or pill shape (see FIGS. 13A-13D, 13F), a trapezoidal shape (see FIG. 13E), a square shape, or a circle shape, among other shapes. In some implementations, the externally facing portion of the light pipe 556 of the light source 534 is positioned flush with the external surface of the end cap 520, such as at the cutout region 535, and/or outer shell 102 (see FIGS. 10A-12C, 13A-13B) or is positioned recessed relative to the external surface of the end cap 520 and/or outer shell 102 (see FIGS. 13C-13E, 13F). In some configurations, such as is shown in FIGS. 13C and 13D, the externally facing portion of the light pipe 556 can extend inwardly towards a center of the end cap module 502. The externally facing portion of the light pipe 556 may also include various widths. For example, the light pipe 556 may be 0.45 mm wide, among other widths.

In some implementations (not shown), the light pipe 556 may include separate segments rather than a unitary body. Each segment may include a separate LED or other light source.

FIGS. 29A-29D illustrate an example light pipe 556 consistent with implementations of the current subject matter, that may be implemented in the vaporizer device described herein. The light pipe 556 may include an externally facing portion 556A coupled with a backpane 556B. As noted above, the light pipe 556 may also include one or more LEDs that are positioned on and/or coupled with the externally facing portion 556A. The light pipe 556 may include a divider 556C that separates one or more of the LEDs on the externally facing portion 556A (see FIG. 29B). In some implementations, at least a portion of the LEDs, the divider 556C, and/or the backpane 556B may be visible when assembled with the vaporizer device.

The light pipe 556 may include a tapered portion 557 that connects the backpane 556B with the externally facing portion 556A. The tapered portion 557 extending from the backpane 556B to the externally facing portion 556A may help to limit light defects, such as edge brightness and/or dark edges, from being externally visible, thereby providing a well-defined and consistent illuminated appearance.

Figure 12B:
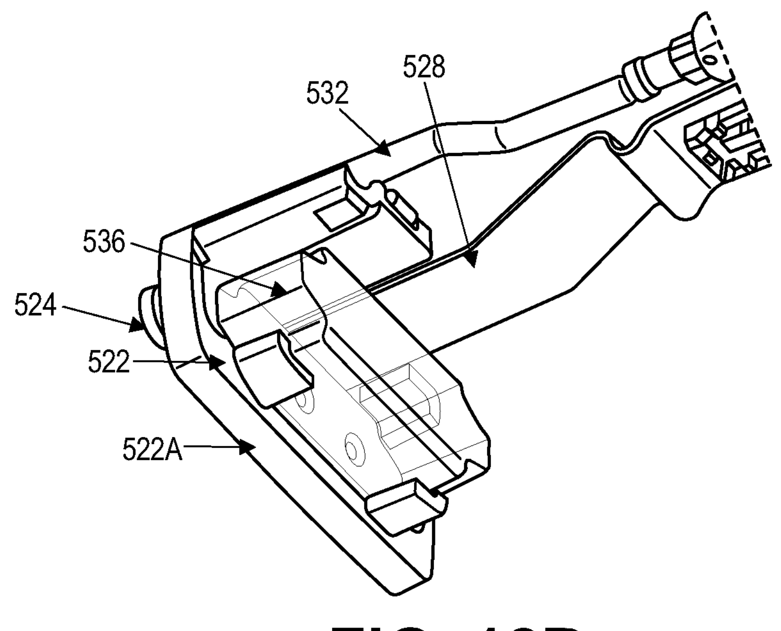
FIG. 12B shows a sub-assembly of an end cap module showing an antenna carrier and magnet of a vaporizer device consistent with implementations of the current subject matter.
Figure 12C:
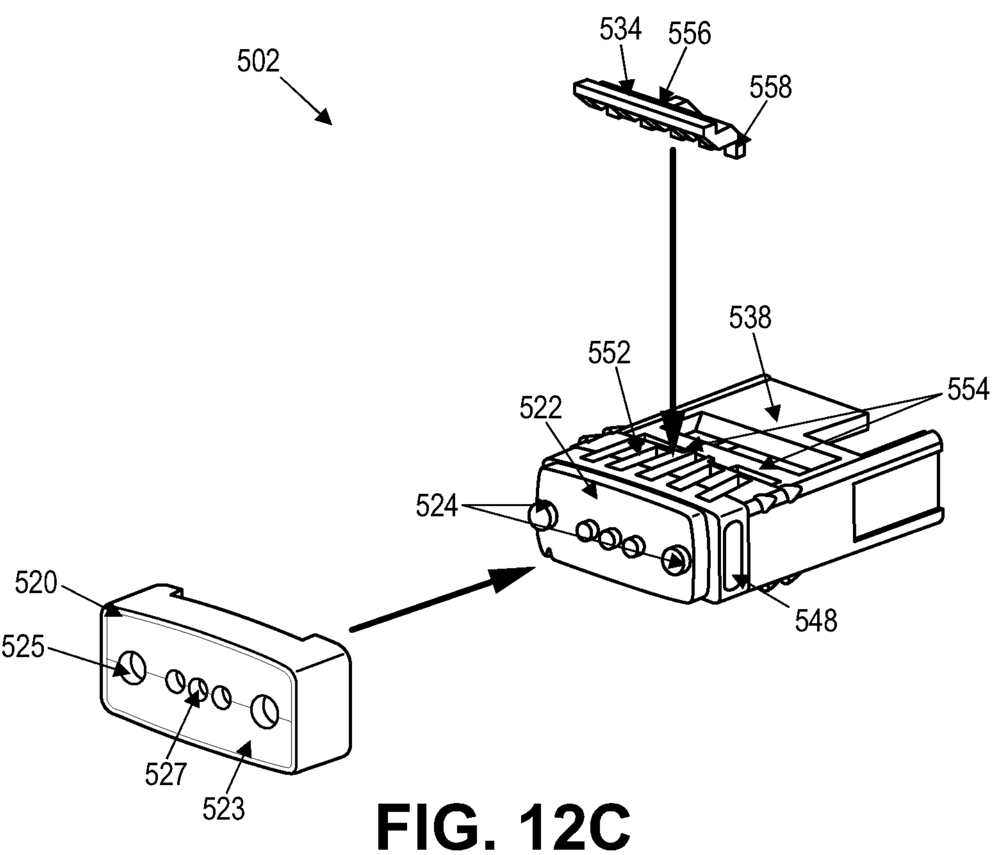
FIG. 12C shows a partial exploded view of an end cap module of a vaporizer device consistent with implementations of the current subject matter.
Figures 13A, 13B, 13C:
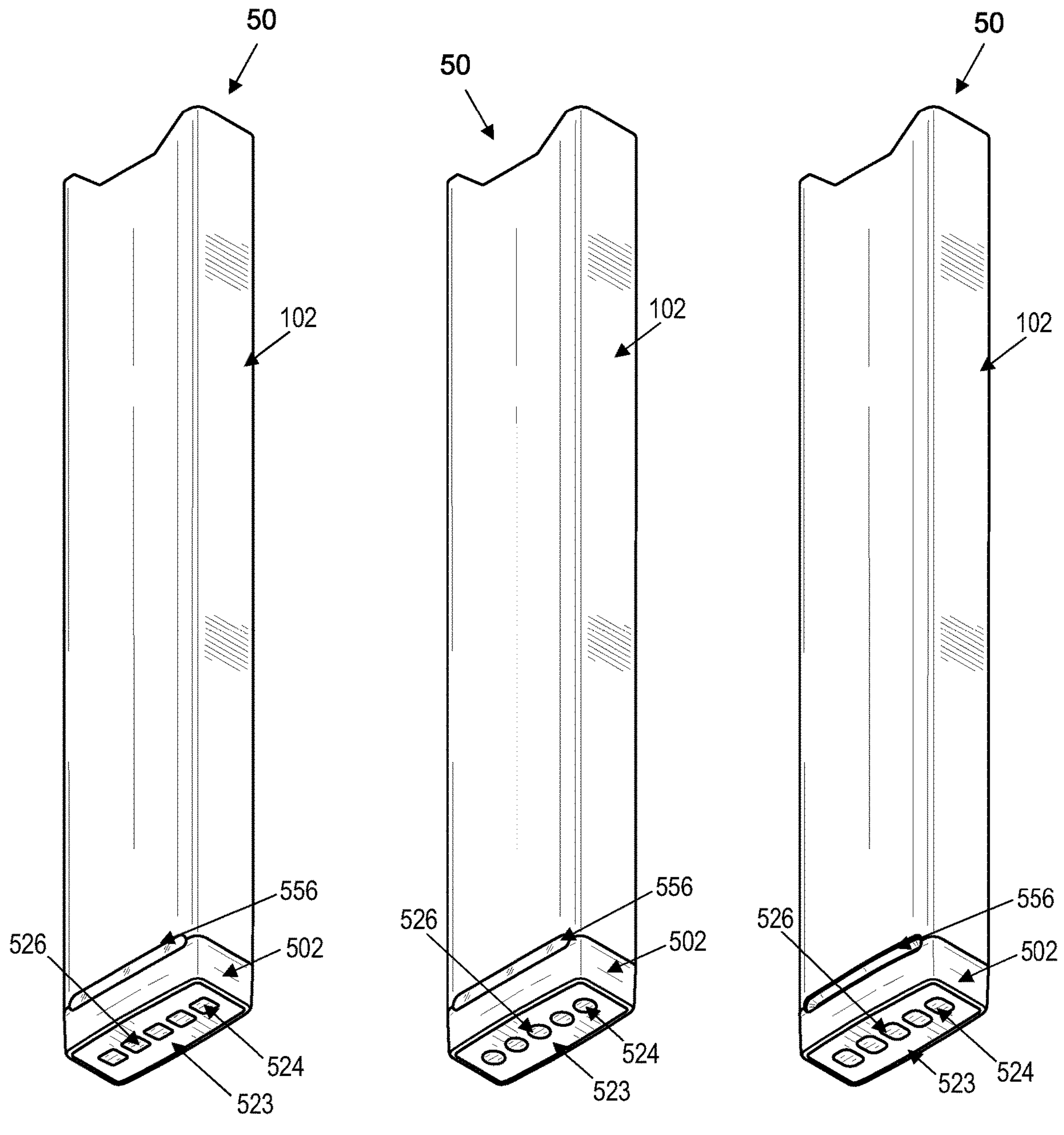
FIGS. 13A-13F illustrate examples of a vaporizer device having an end cap module with various charging contact and light source configurations consistent with implementations of the current subject matter.
Figures 13D, 13E, 13F:
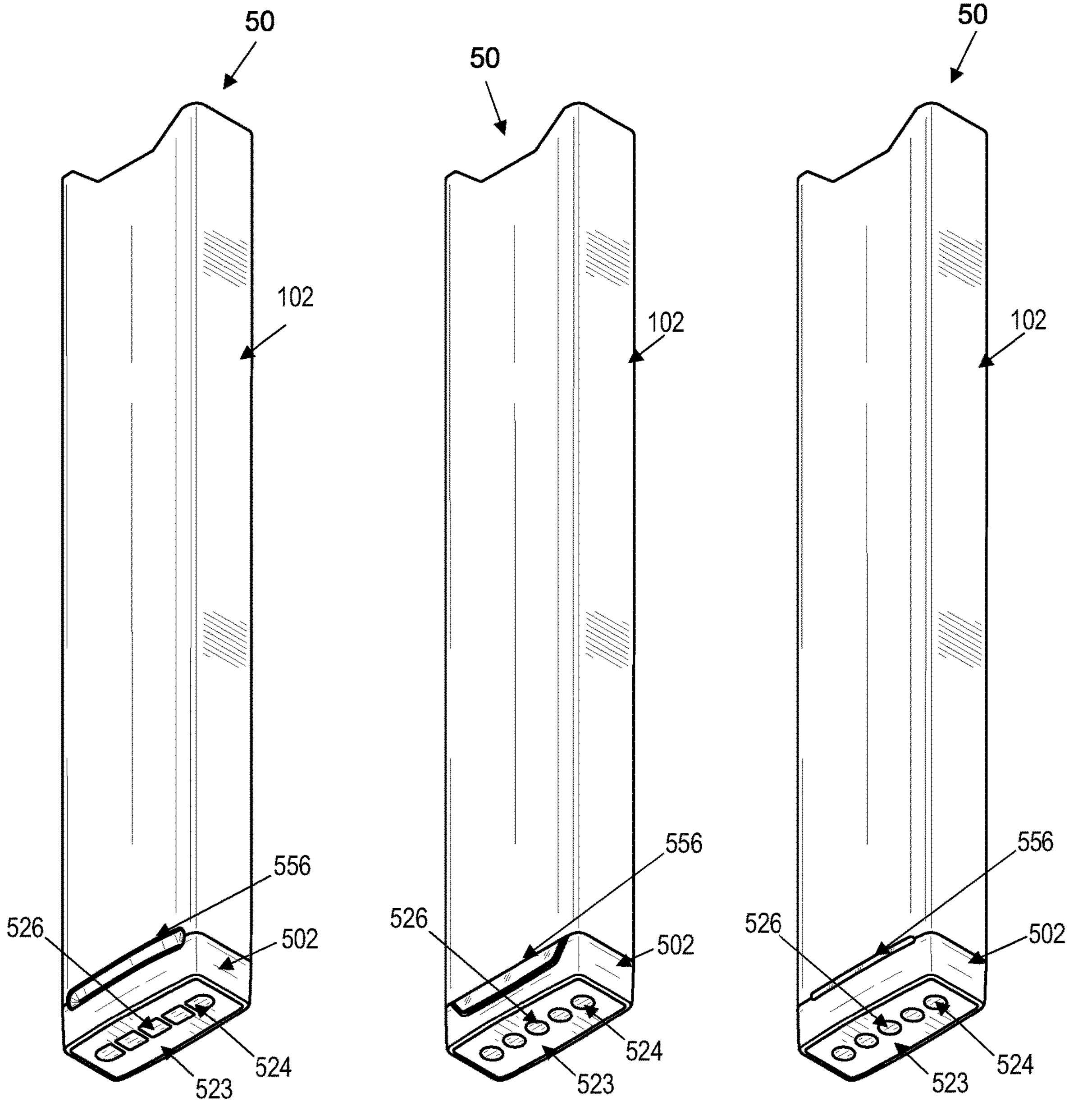
Figure 14B:
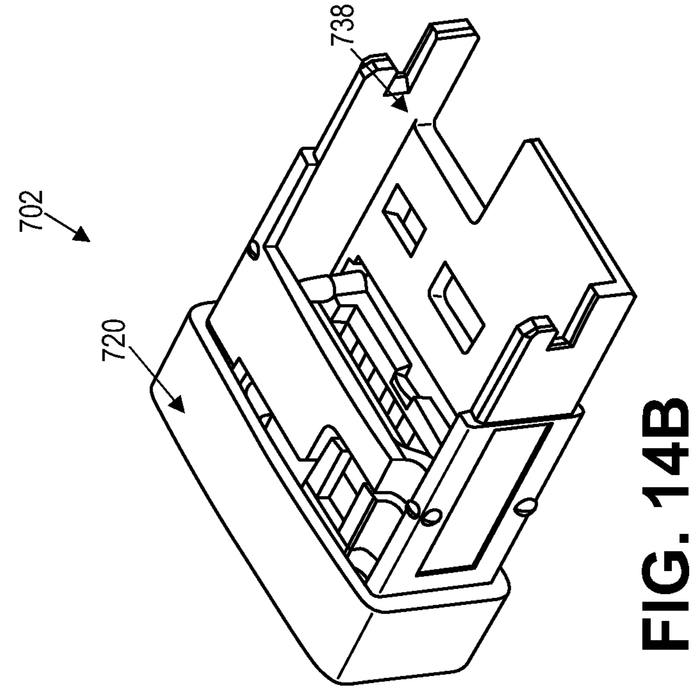
FIG. 14B shows a perspective view of an end cap module of a vaporizer device consistent with implementations of the current subject matter.
Figure 14A:
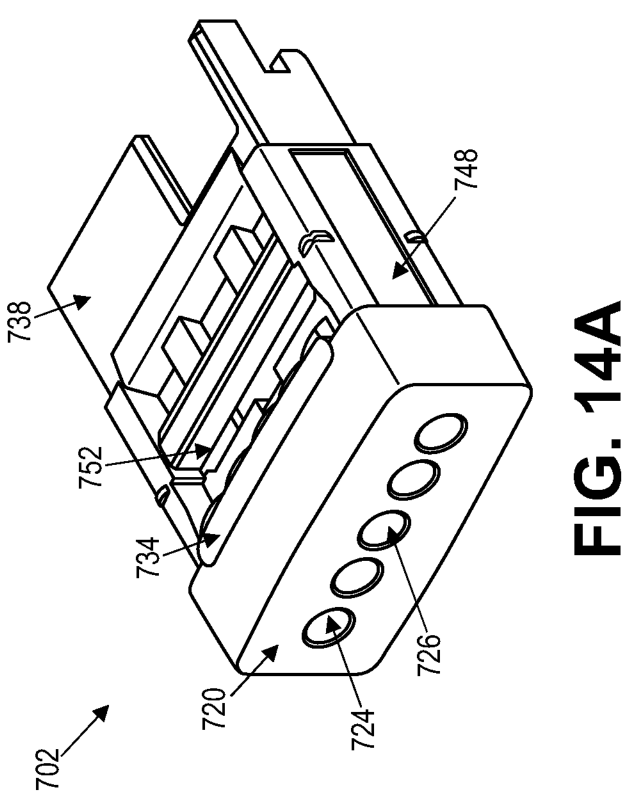
FIG. 14A shows a perspective view of an end cap module of a vaporizer device consistent with implementations of the current subject matter.
Figure 14C:
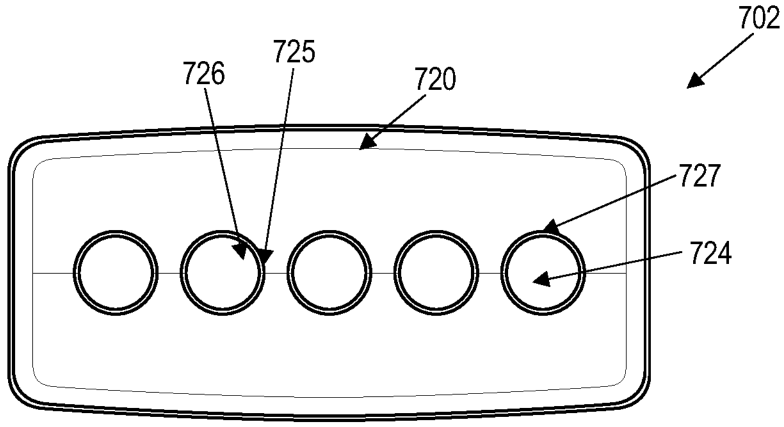
FIG. 14C shows a bottom view of an end cap module of a vaporizer device consistent with implementations of the current subject matter.
Figure 14D:
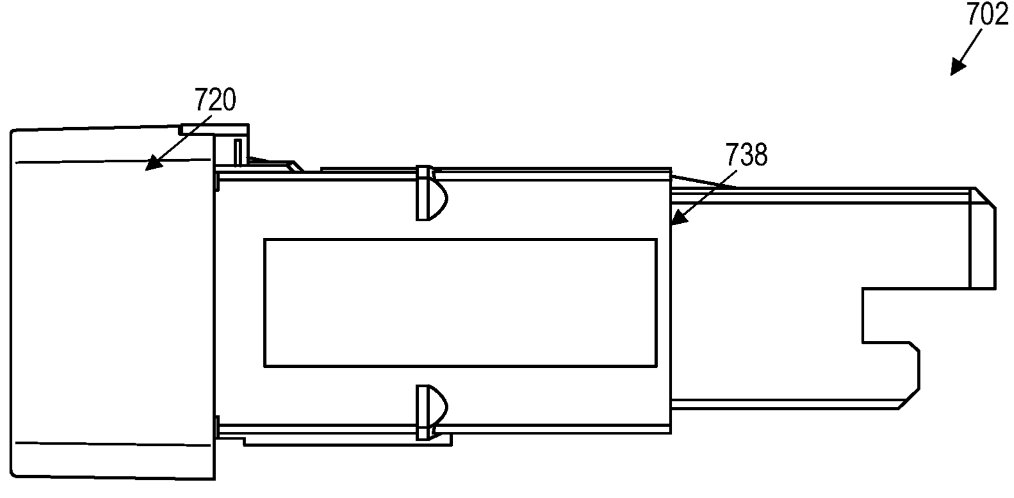
FIG. 14D shows a side view of an end cap module of a vaporizer device consistent with implementations of the current subject matter.
Figure 14F:
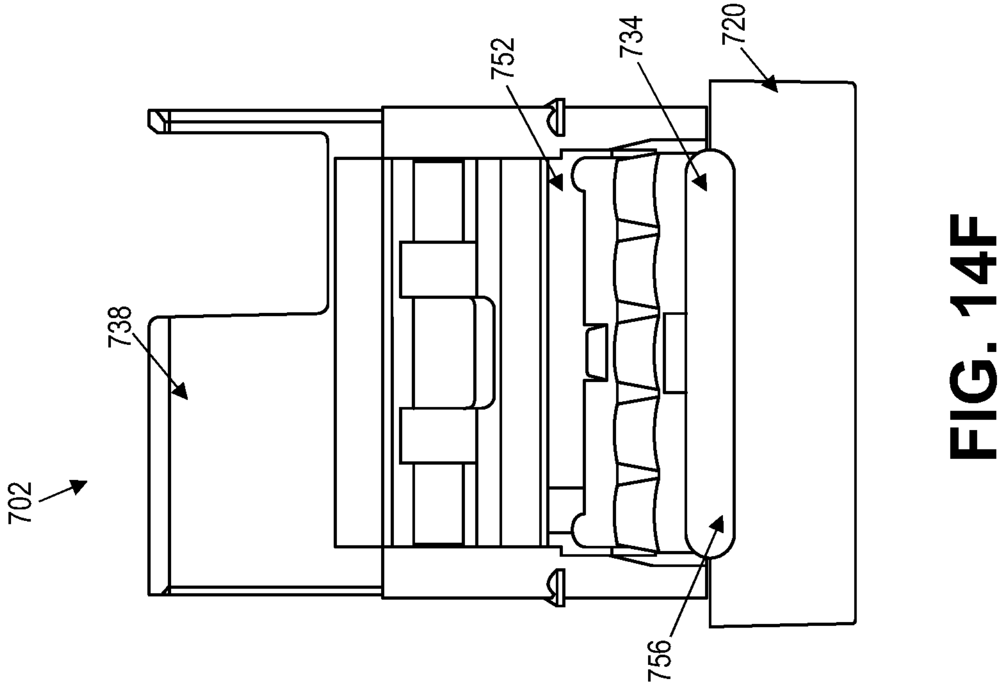
FIG. 14F shows a front view of an end cap module of a vaporizer device consistent with implementations of the current subject matter.
Figure 14E:
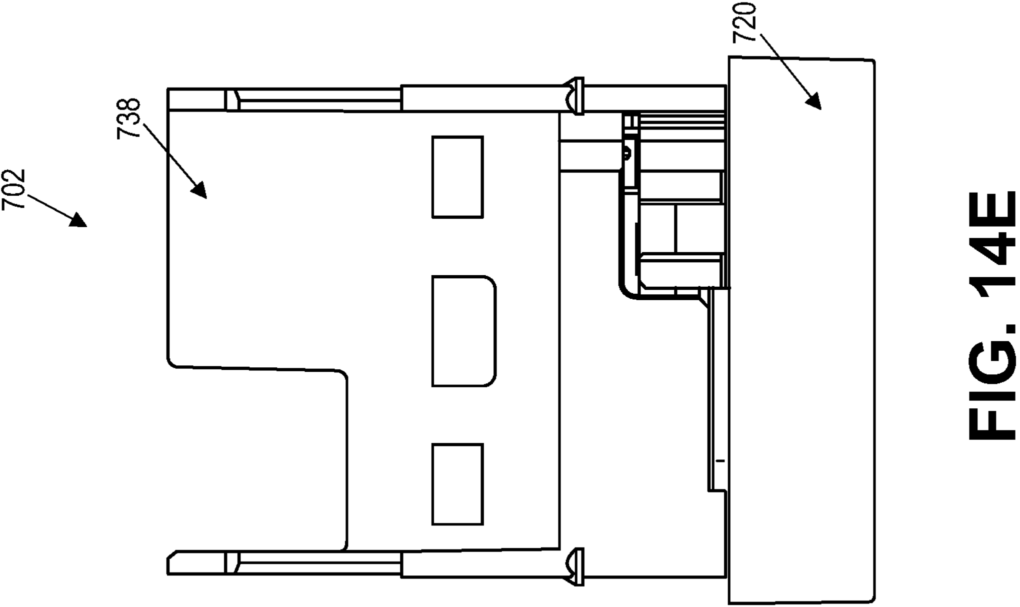
FIG. 14E shows a rear view of an end cap module of a vaporizer device consistent with implementations of the current subject matter.

Referring to FIG. 12B, the end cap module 502 includes the antenna carrier 522. The antenna carrier 522 includes an antenna 522A while minimizing the amount of material (e.g., plastic) that supports the antenna. The antenna carrier 522 beneficially isolates the antenna 522A from the metal housing for efficient RF radiation. For example, the antenna carrier 522 helps to decouple the charging contacts 524 from the PCBA 512, as the charging contacts 524 interfere with the antenna transmissions due to the inductive and passive coupling between the charging contacts 524 and the antenna carrier 522 and antenna 522A via the flex 528 from the PCBA 512. Additionally, the antenna carrier 522 helps to maintain the position of the magnet 536 opposite the charging contacts 524 and apart from the antenna 522A. The antenna carrier 522 may also support a shorting leg or grounding clip as explained below to allow for tuning of the antenna 522A to the vaporizer body 50. Thus, the antenna carrier 522 together with the antenna 522A, and/or the positioning of the components of the end cap module 502 enhances performance and allows for the radiation efficiency of the antenna 522A to be at least approximately 15-20% or higher. Such a radiation efficiency may allow for a wireless communication with an external device positioned up to, or greater than, 25 feet away from the vaporizer body 50.

The antenna carrier 522 can include various materials. For example, the antenna carrier 522 may include injection molded plastic, and may include a portion that is laser etched and/or gold plated, such as around an outer diameter of the antenna carrier 522. The antenna carrier 522 can include a radiating element, such as an antenna 522A. The antenna 522A may be formed at least in part by the laser etched pattern and a matching network. The antenna 522A may wrap around an outer perimeter of the interior components of the vaporizer body 50. The perimeter of the vaporizer body 50 provides a path length (e.g., ¼ of a wavelength of 2.4 gHz) to tune the antenna.

The antenna 522A of the antenna carrier 522 includes a shorting leg. The shorting leg can directly connect the outer shell 102 to a surface of the antenna carrier 522 via a grounding material (e.g., a grounding clip). The coupling of the shorting leg of the antenna 522A to the outer shell 102 may allow for the inductive and capacitive coupling of the antenna 522A (which controls the impedance presented to the antenna) with the outer shell 102 to be controlled near the attachment of the coax cable 532.

As shown in FIG. 12B, the coax cable 532 may be coupled with the antenna carrier 522. The coax cable 532 excites the antenna 522A with RF energy from the main controller. The antenna carrier 522, which mounts the coax cable 532 allows the coax cable 532 to couple with the antenna 522A and enhance the structural integrity of the cable connection between the coax cable 532 to the antenna carrier 522. The grounding clip, together with the coax cable 532, allows the antenna carrier 522 or the antenna 522A to be tested independently or together with other components of the vaporizer body 50. Such configurations facilitate improved manufacturing efficiency and more consistent RF radiation performance. As shown in FIG. 12B, the charging contacts 524 are positioned adjacent the antenna 522A on the antenna carrier 522. Thus, the antenna 522A may be inductively and/or capacitively coupled with the charging contacts 524 and/or data pins 526. The inductive and/or capacitive coupling occurs due to the orientation and proximity of the data pins 526 and/or the charging contacts 524 to the antenna.

The data pins 526 and/or the charging contacts 524 may include a series filter circuit (e.g., a series and/or a parallel inductive and/or capacitive element) to decouple and/or limit RF radiation from back-coupling through the flex into the primary PCBA 512. In some implementations, the series filter circuit minimizes the effect of coupling RF energy from the antenna 522A towards the internal components of the vaporizer body 50, which may undesirably reduce RF efficiency and/or reduce performance of the vaporizer body 50.

As shown in FIG. 12B, the magnet 536 may be positioned adjacent to and/or interface with the antenna carrier 522. The magnet 536 may be configured to detachably magnetically couple the vaporizer body 50 to an external charging device.

FIGS. 14A-14F illustrate an example of an end cap module 702 consistent with certain implementations of the current subject matter. The end cap module 702 includes the same and/or similar properties and/or components as the end cap module 502 illustrated in FIGS. 10A-12C, and described herein. As shown in FIGS. 14A-14F, the end cap module 702 includes an end cap 720, a separator 738, a light source 734, an antenna carrier, a flex cable, a coax cable, a PSA, and a magnet, which are respectively the same or similar to the end cap module 502 including the end cap, separator 738, light source, antenna carrier, flex cable, coax cable, PSA, and magnet shown in FIGS. 10A-13F and described herein. In the example of the end cap module 702 shown in FIGS. 14A-14F, the externally facing portion of the light pipe 756 of the light source 534 is oval shaped. The charging contact and data pin apertures 725, 727 and charging contacts and data pins 724, 726 have the same shape (e.g., circular) and are evenly spaced.

As shown in FIGS. 14A-14F, the separator 738 can include a single light source receiving slot 752. The light source 734 and the separator 738 can be coupled via a snap-fit arrangement, and/or the light source 734 and the separator 738 can be adhered to one another via an adhesive, chemical bonding process, or mechanical bonding process. The light source 734 can include reflective surfaces to separate the light emitted via the light pipe 756.

The separator 738 may include adhesive channels 748 that can secure the end cap module 702 to the outer shell 102, as described below. The adhesive channels 748 can receive an adhesive, such as glue, to adhere the end cap module 702 to the outer shell 102. The adhesive can adhere to the surfaces of the adhesive channels 748 to provide multiple adhering surfaces and strengthen the bond between the end cap 520 and the outer shell 102.

Figure 15:
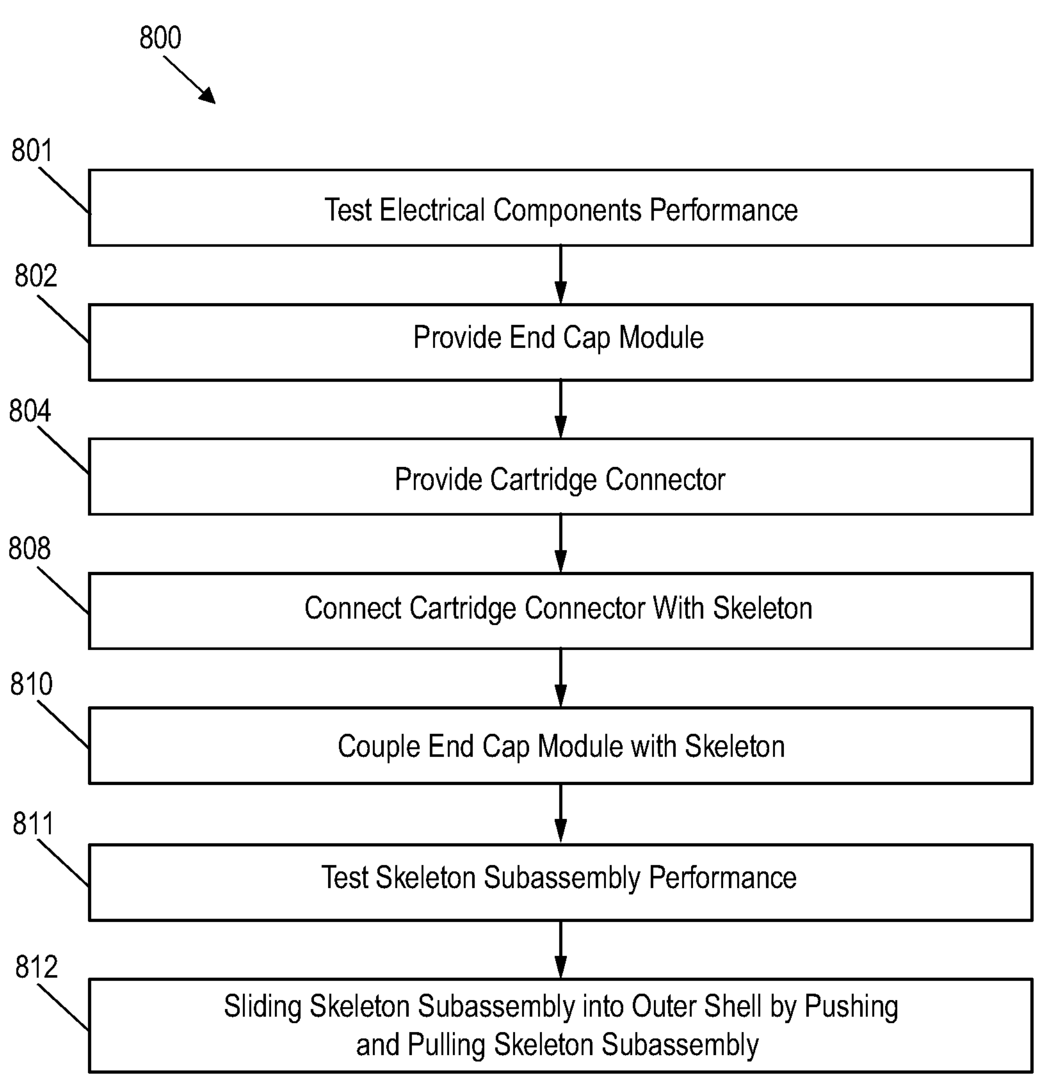
FIG. 15 shows an example method of assembling a vaporizer device consistent with implementations of the current subject matter.

FIG. 15 illustrates an example process 800 for assembling a vaporizer device consistent with implementations of the current subject matter. The process 800 can include assembling certain modular components that have been separately assembled, such as the end cap module 502, 702 and the cartridge connector 406, 606. Assembling the modular components can provide a simpler and more efficient assembly process. For example, the skeleton subassembly 501 can be assembled and later coupled with the outer shell. While FIGS. 16A-21A, 22, 23A, and 24A illustrate an example of the vaporizer body 450 being assembled, other components from other examples of the vaporizer body may be assembled in the same or similar manner.

At 801, certain electrical components may be tested before assembling the components into the modularized components of the vaporizer body 50.

For example, the primary PCBA 512 may be tested. The primary PCBA 512 may include a heater measurement circuit, a microcontroller, user interface circuit, accelerometer, and charger circuitry. In some implementations, a panel of PCBAs 512 including two or more PCBAs 512 are tested to determine the performance level of each of the PCBAs before assembling the PCBAs 512 into the end cap module 502. In some implementations, the heater measurement circuitry may be tested using a simulation load. For example, the circuit may be calibrated to ensure the resistance measurements correlated to a hypothetical temperature of a cartridge 52. The microcontroller may be tested, for example, by testing the light intensity of the LEDS 534 or other light sources, and/or by ensuring the microcontroller begins a boot sequence at device startup. The user interface may be tested by testing the microphone. The charger circuitry may be tested by determining whether the circuitry terminates charge at the correct charging level and at the low temperature shut off level.

In some implementations, the power source 508 and protection circuitry module (PCM) may be tested. The power source 508, such as the battery 508, may be tested alone before connecting with the PCM and/or after the battery 508 is connected with the PCM. For example, the battery 508 may be tested to ensure the battery produces the correct voltage readings. Generally, the PCM prevents or reduces the likelihood that the battery will discharge or overcharge. Thus, the PCM may be tested to determine whether the battery 508 powers off when the PCM short circuits the battery 508. The battery 508 and PCM may also be tested to calibrate the fuel gauge so that the fuel gauge accurately reads the amount of charge left in the battery 508.

In some implementations, the secondary PCBA 512A is tested. For example, the pressure sensor(s) (e.g., the ambient pressure sensor and/or the puff pressure sensor) positioned on the secondary PCBA 512A may be tested to ensure that the sensors accurately read the corresponding air pressure. The ambient pressure sensor may be tested to ensure that the sensor accurately measures atmospheric pressure. The ambient and puff pressure sensors may also be tested to ensure that the readings between the two pressure sensors are not skewed before being assembled. The secondary PCBA 512A may be tested before and/or after assembly into the vaporizer body 50. For example, it may be beneficial to test the secondary PCBA 512A after assembly with the cartridge connector 606 to ensure that the secondary PCBA 512A has not been damaged during assembly.

At 802, the end cap module 502 may be provided to form a testable subassembly such that the core functionality and/or performance of the end cap module may be tested before being assembled with the remaining components or other modules of the vaporizer body 50. The ability to test the performance of the end cap module 502 as a single module provides several benefits. For example, the performance of the end cap module 502, and components of the end cap module 502, such as the antenna 522A, may be tested without interference caused by other components of the vaporizer body 50. Thus, the end cap module 502 may be more accurately tested without degrading RF performance. In some implementations, modular testing of the end cap module 502 before assembly with other modules or components of the vaporizer body 50 may help to reduce or prevent the building of poor performing vaporizer devices, as a poor performing end cap module 502 can simply be discarded before assembly of the vaporizer body 50. The source of any potential issues causing poor performance may also be more easily located, as the end cap module 502 is modularly tested.

Figure 16A:
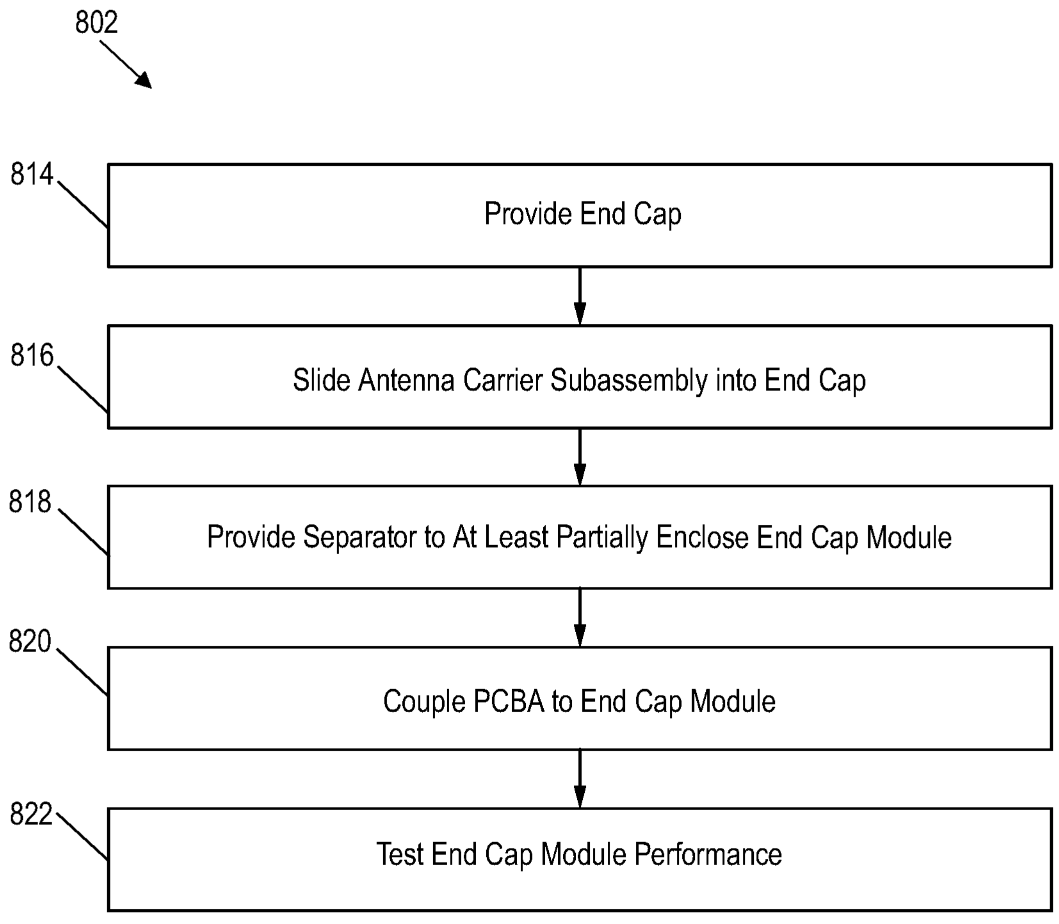
FIG. 16A shows an example method of assembling an end cap module consistent with implementations of the current subject matter.

FIG. 16A illustrates an example method 802 for assembling the end cap module 502 consistent with implementations of the current subject matter. At 814, the end cap 520 may be provided. At 816, the antenna carrier assembly, which includes the antenna carrier 522, the antenna 522A, the charging contacts 524, the magnet 536, the coax cable 532, and the flex 528, slides into the end cap 520 (see FIG. 16B). At 818, the separator 538 is provided to at least partially enclose the end cap module, and slide into the end cap 520. The separator 538 may be adhered to the end cap 520, snap into the end cap 520, and/or may be otherwise coupled with the end cap 520 to secure the antenna carrier assembly.

Figure 16B:
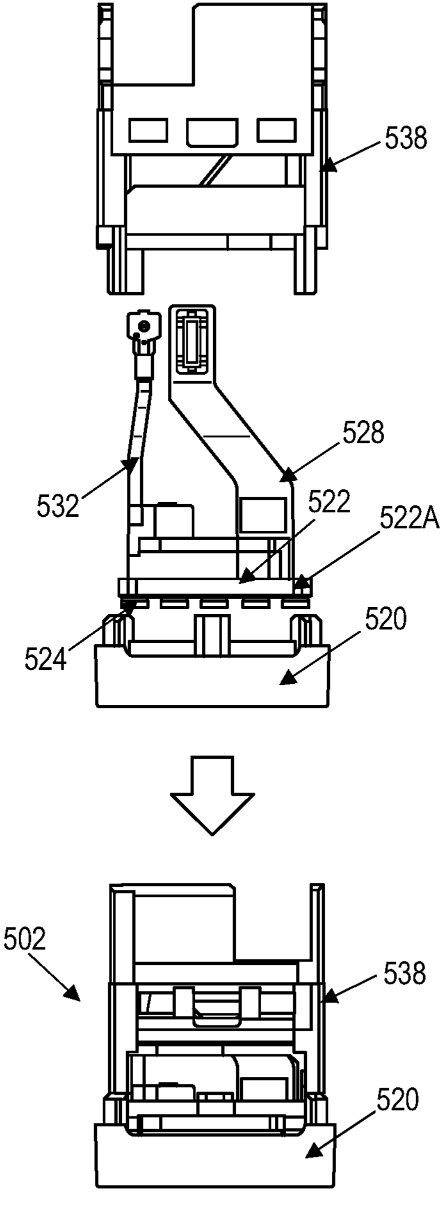
FIG. 16B shows an end cap module of a vaporizer device consistent with implementations of the current subject matter.

As shown in FIG. 16B, the antenna carrier assembly may be nested between the end cap 520 and the separator 538. The antenna 522A, among other components, may be very sensitive and/or easily damaged. Nesting the antenna 522A between the end cap 520 and the separator 538 provides a more robust and/or less damageable antenna structure. The nested antenna carrier assembly may result in less stress on the antenna 522A, thereby reducing the likelihood that the antenna 522A will crack or otherwise become damaged.

At 820, the PCBA 512 can be installed onto the end cap module 502. For example, FIG. 16 illustrates an example of the end cap module 502 in which the PCBA 512 has been installed. The PCBA 512 may be coupled with the separator 538 via chemical or mechanical means. The PCBA 512 may be electrically coupled with one or more other components of the end cap module 502, such as the coax cable 532.

At 822, the performance of the end cap module 502 may be tested. In some implementations, a network analyzer may be used to test components of the end cap module 502, such as the antenna 522A. For example, a S11 test, among other tests, is performed to ensure the antenna 522A is transmitting and/or receiving waveforms at the correct frequency or wavelength.

Referring to FIG. 15, at 804, the cartridge connector 406 can be provided and at 808, the cartridge connector 406 can be coupled with the skeleton 504.

Figure 17A:
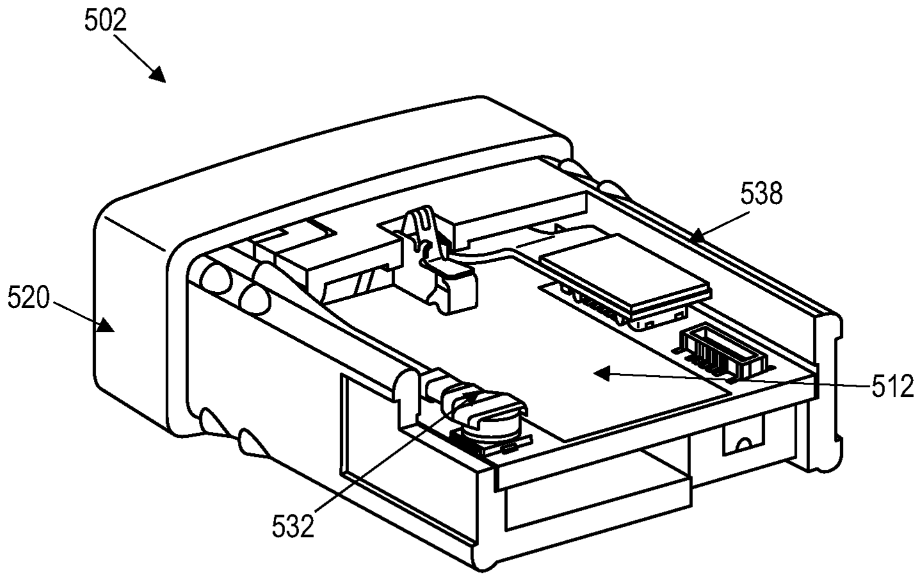
FIG. 17A shows a sub-assembly of a vaporizer device having an end cap module and a PCBA consistent with implementations of the current subject matter.
Figure 17B:
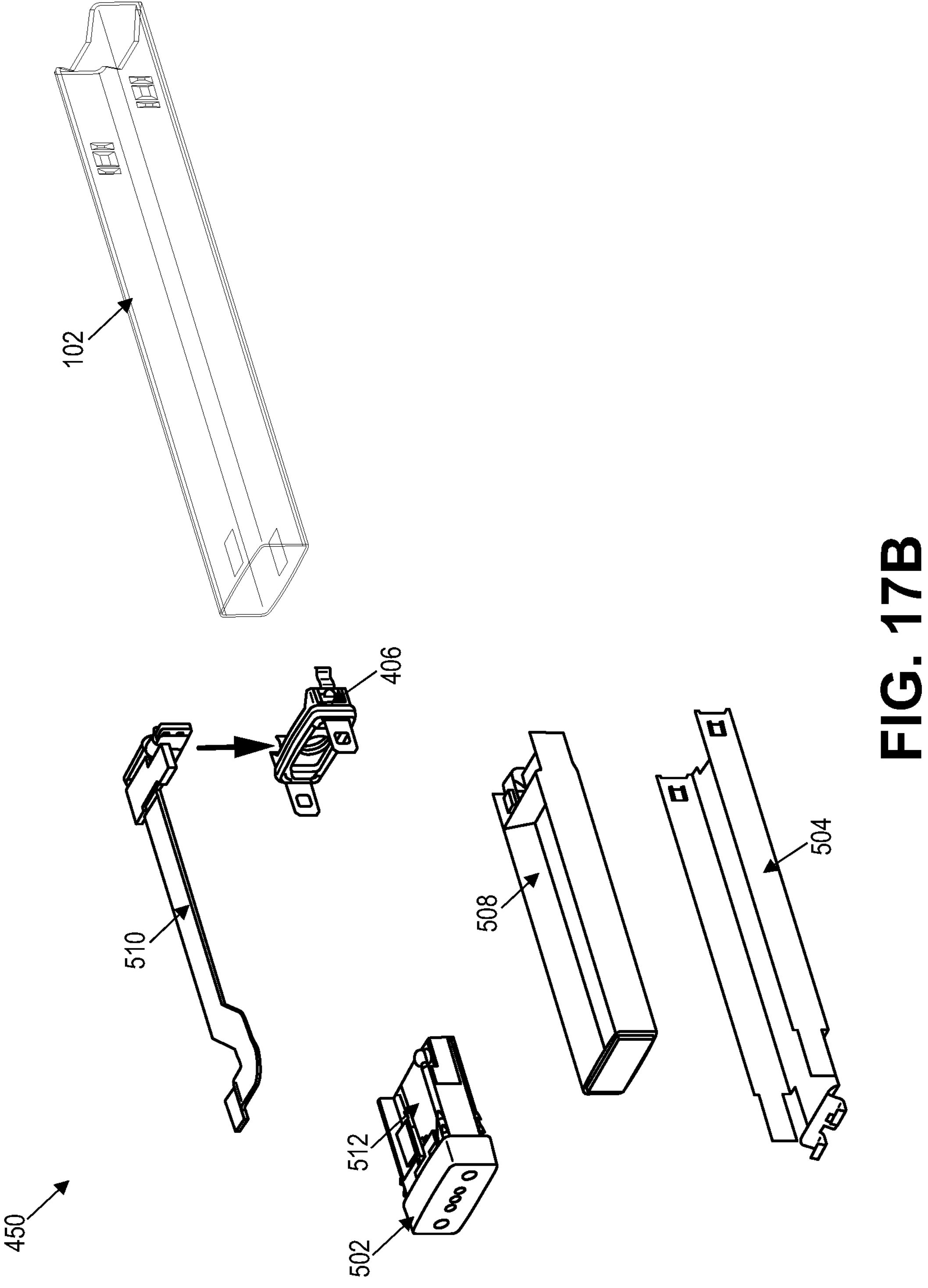
FIG. 17B shows a partial exploded view of a vaporizer device consistent with implementations of the current subject matter.
Figure 18:
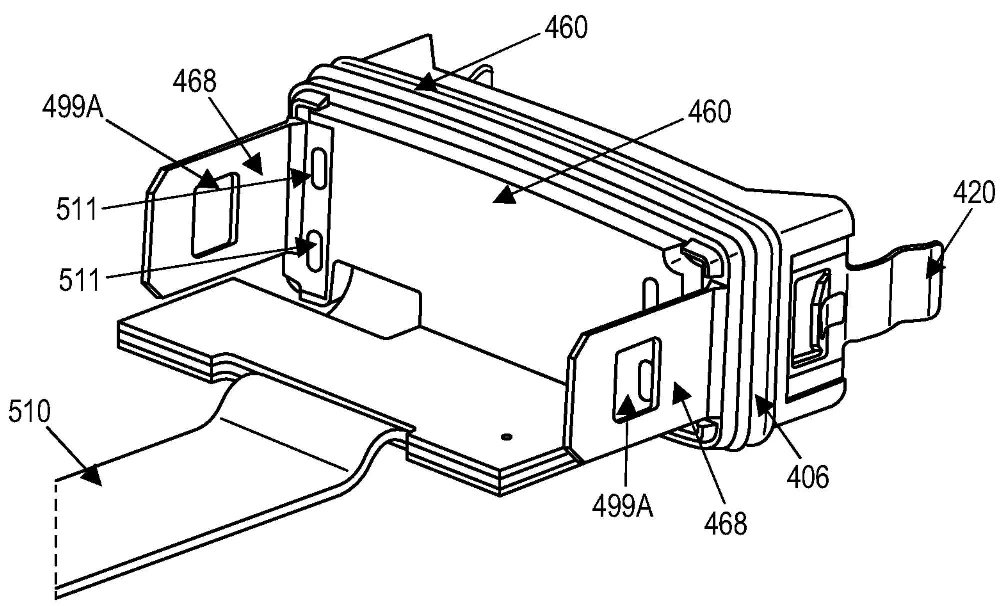
FIG. 18 shows a sub-assembly of a vaporizer device having a cartridge connector and a flex consistent with implementations of the current subject matter.

In some implementations consistent with the current subject matter in which the flex 510 is coupled with the secondary PCBA 512A, such as in the configuration shown in FIG. 9J, the cartridge connector 406 may be coupled with another component, such as with the flex 510 (see FIGS. 17 and 18). The flex 510 can include a coupling portion 513 that has the pressure sensor 429. The pressure sensor 429 can be coupled with the cartridge connector 406 by inserting the pressure sensor 429 into the sealing recess 463 of the cartridge connector 406.

The coupling portion 513 can include one or more (e.g., two or four or more) slots 511 that can receive a coupling portion of the receptacle contacts 462 of the cartridge connector 406. In some implementations, the coupling portion of the receptacle contacts 462 are soldered or otherwise adhered to the slots 511 in which they reside. The coupling portion 513 can provide an electrical interface between the flex 510 and the receptacle contacts 462.

Figure 19A:
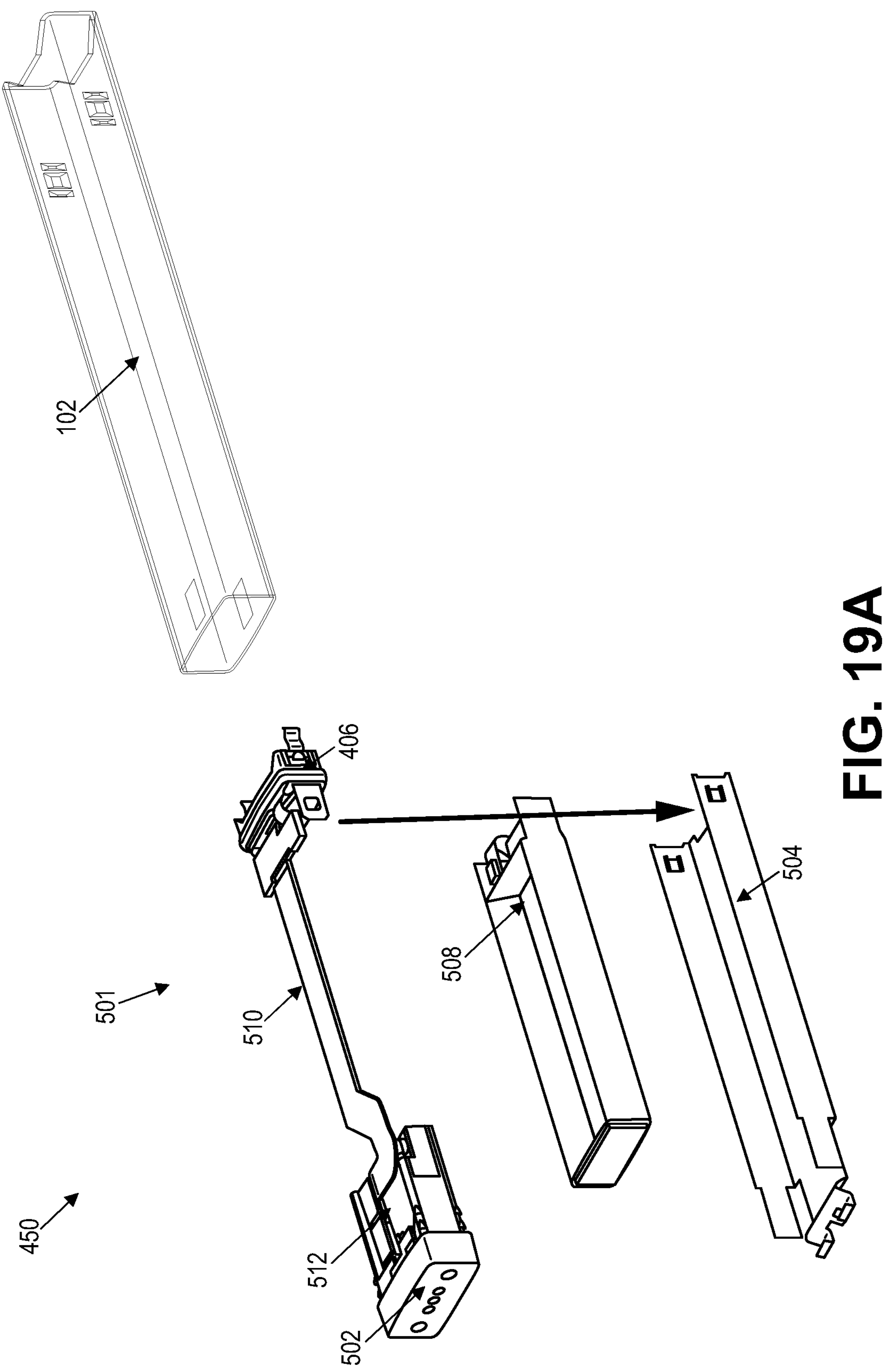
FIG. 19A shows a partial exploded view of a vaporizer device consistent with implementations of the current subject matter.
Figure 19B:
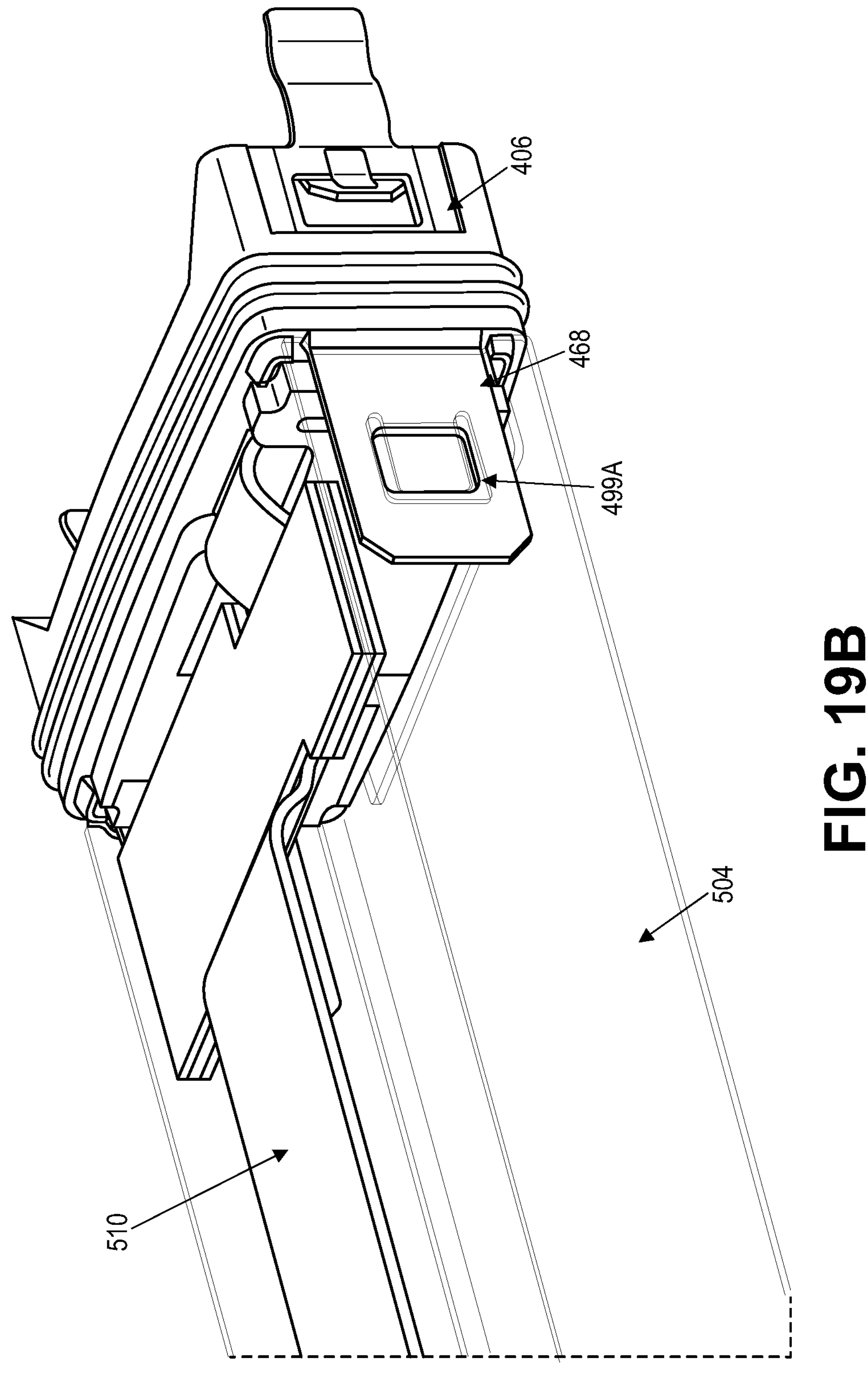
FIG. 19B shows a sub-assembly of a vaporizer device having a cartridge connector, a flex, and a skeleton consistent with implementations of the current subject matter.

The cartridge connector 406 can be coupled with the skeleton 504. For example, FIGS. 19A and 19B show the cartridge connector 406 being coupled to the skeleton 504. As mentioned above, the cartridge connector 406 can include one or more sidewall connection features 468. The sidewall connection features 468 can extend downwardly from opposing sidewalls of the cartridge connector 406 and can include an opening 499A to receive a corresponding component that extends from the outer shell 402 and/or another component of the vaporizer body 450, such as the skeleton 504.

The retainer springs 546 can extend inwardly from the first and second side walls 542, 544 of the skeleton 504 towards one another. The retainer springs 546 can be biased inwardly from the first and second side walls 542, 544 of the skeleton 504 towards one another to provide a spring-like function. Accordingly, the retainer springs 546 can be coupled with the cartridge connector 406, such as via a snap-fit arrangement. For example, the opening 499A of the sidewall connection features 468 can slide between the biased retainer springs 546. The retainer springs 546 can snap into place and/or otherwise be held in place without the opening 499A. In some implementations, when the retainer springs 546 are positioned within the opening 499A, the retainer springs 546 can be adhered to the skeleton 504, such as via spot-welding.

Figure 20A:
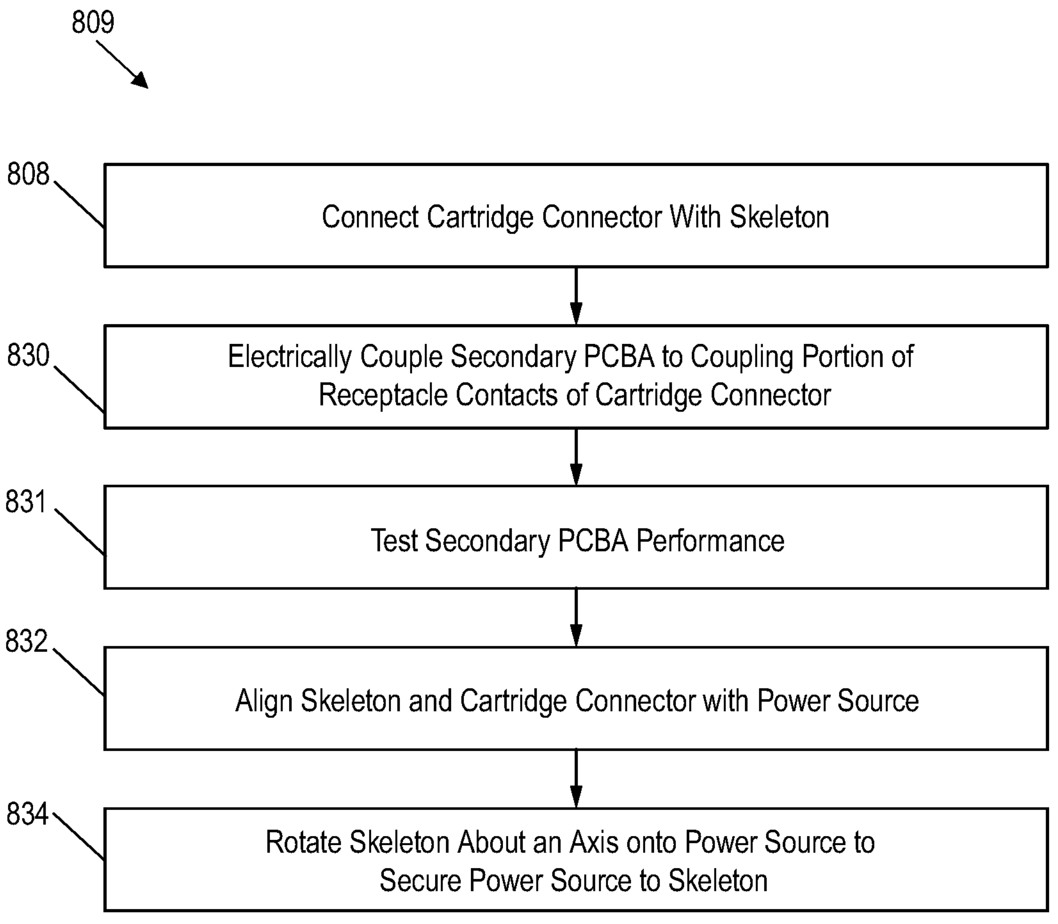
FIG. 20A shows an example method of assembling a skeleton, a cartridge connector, a secondary PCBA, and a power source of a vaporizer device consistent with implementations of the current subject matter.
Figure 20B:
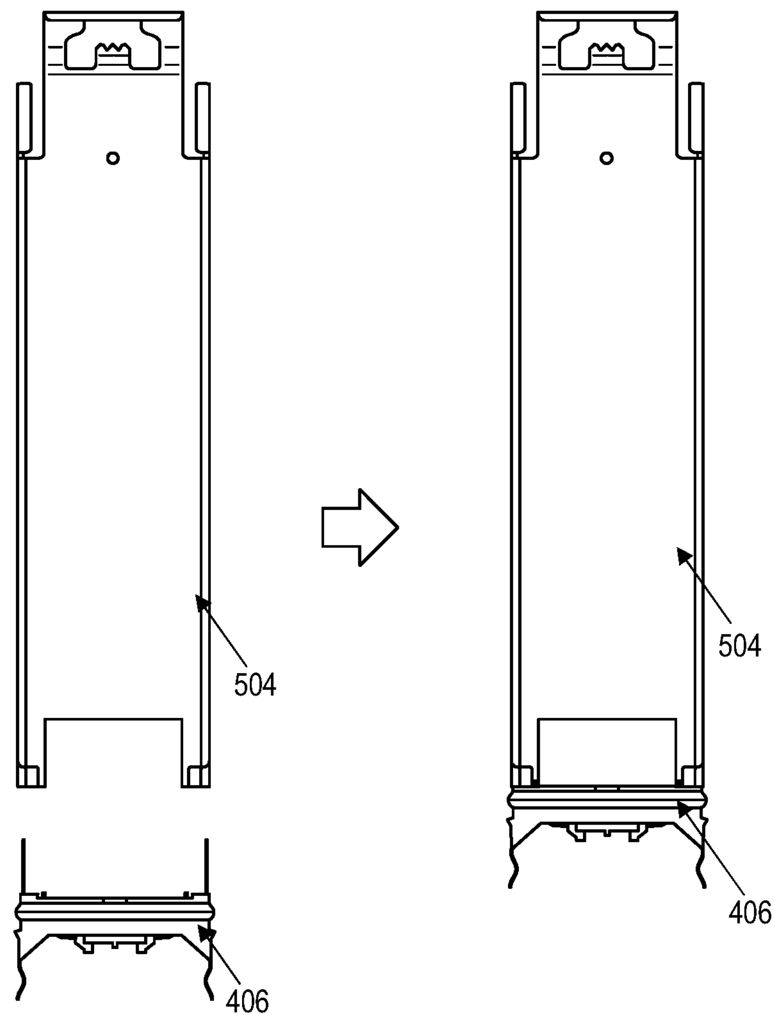
FIG. 20B shows a sub-assembly of a vaporizer device having a cartridge connector and a skeleton consistent with implementations of the current subject matter.

In some implementations consistent with the current subject matter in which the flex 510 is first coupled to the power source 508 and the secondary PCBA 512A is separately coupled with the cartridge connector 406, such as in the configuration shown in FIGS. 9K-9L, the cartridge connector 406 may be first coupled with another component, such as with the skeleton 504 (see FIG. 20B). FIG. 20A shows an example process 809 of assembling the cartridge connector 406, the skeleton 504, the secondary PCBA 512A, and the power source 508.

As mentioned above, at 808, the cartridge connector 406 may be coupled (e.g., mechanically coupled) with the skeleton 504. The cartridge connector 406 can include one or more sidewall connection features 468. The sidewall connection features 468 can extend downwardly from opposing sidewalls of the cartridge connector 406 and can include an opening 499A to receive a corresponding component that extends from the outer shell 402 and/or another component of the vaporizer body 450, such as the skeleton 504.

The retainer springs 546 can extend inwardly from the first and second side walls 542, 544 of the skeleton 504 towards one another. The retainer springs 546 can be biased inwardly from the first and second side walls 542, 544 of the skeleton 504 towards one another to provide a spring-like function. Accordingly, the retainer springs 546 can be coupled with the cartridge connector 406, such as via a snap-fit arrangement. For example, the opening 499A of the sidewall connection features 468 can slide between the biased retainer springs 546. The retainer springs 546 can snap into place and/or otherwise be held in place without the opening 499A. In some implementations, when the retainer springs 546 are positioned within the opening 499A, the retainer springs 546 can be adhered to the skeleton 504, such as via spot-welding. In some implementations, one or more sidewall connection features 468 may be overmolded with the first and second side walls 542 of the skeleton 504 to form an integral body.

At 830, after the cartridge connector 406 has been coupled with the skeleton 504, the secondary PCBA 512A may be coupled (e.g., electrically coupled) with the cartridge connector 406. As mentioned above, the secondary PCBA 512A can include one or more (e.g., two or four or more) slots 511 that can receive a coupling portion of the receptacle contacts 462 of the cartridge connector 406. The secondary PCBA 512A may be dropped into the bottom surface of the cartridge connector 406. In some implementations, the coupling portion of the receptacle contacts 462 are soldered or otherwise adhered to the slots 511 in which they reside. For example, the coupling portion of the receptacle contacts 462 may be laser soldered to the slots 511 in which they reside. During the laser soldering process, the skeleton-cartridge connector subassembly may be rotated approximately 20 degrees from a vertical axis to laser solder each of the slots 511 to provide a secure electrical connection between the secondary PCBA 512A and the receptacle contacts 462. At 831, the performance of the secondary PCBA 512A may be tested as described above.

At 832, the skeleton 504 and cartridge connector 406 assembly may be aligned with the power source 508 (e.g., the skeleton 504 may be positioned approximately 90 degrees relative to the power source 508) and at 834, the skeleton 504 may be rotated about an axis onto the power source 508 to secure the power source 508 to the skeleton 504. The skeleton 504 may include a pressure sensitive adhesive (not shown) positioned on the skeleton that is activated when the skeleton 504 contacts the power source 508. When the skeleton 504 rotates and presses down on the power source 508, the pressure sensitive adhesive fully activates, adhering the power source 508 to the skeleton 504.

Figure 20C:
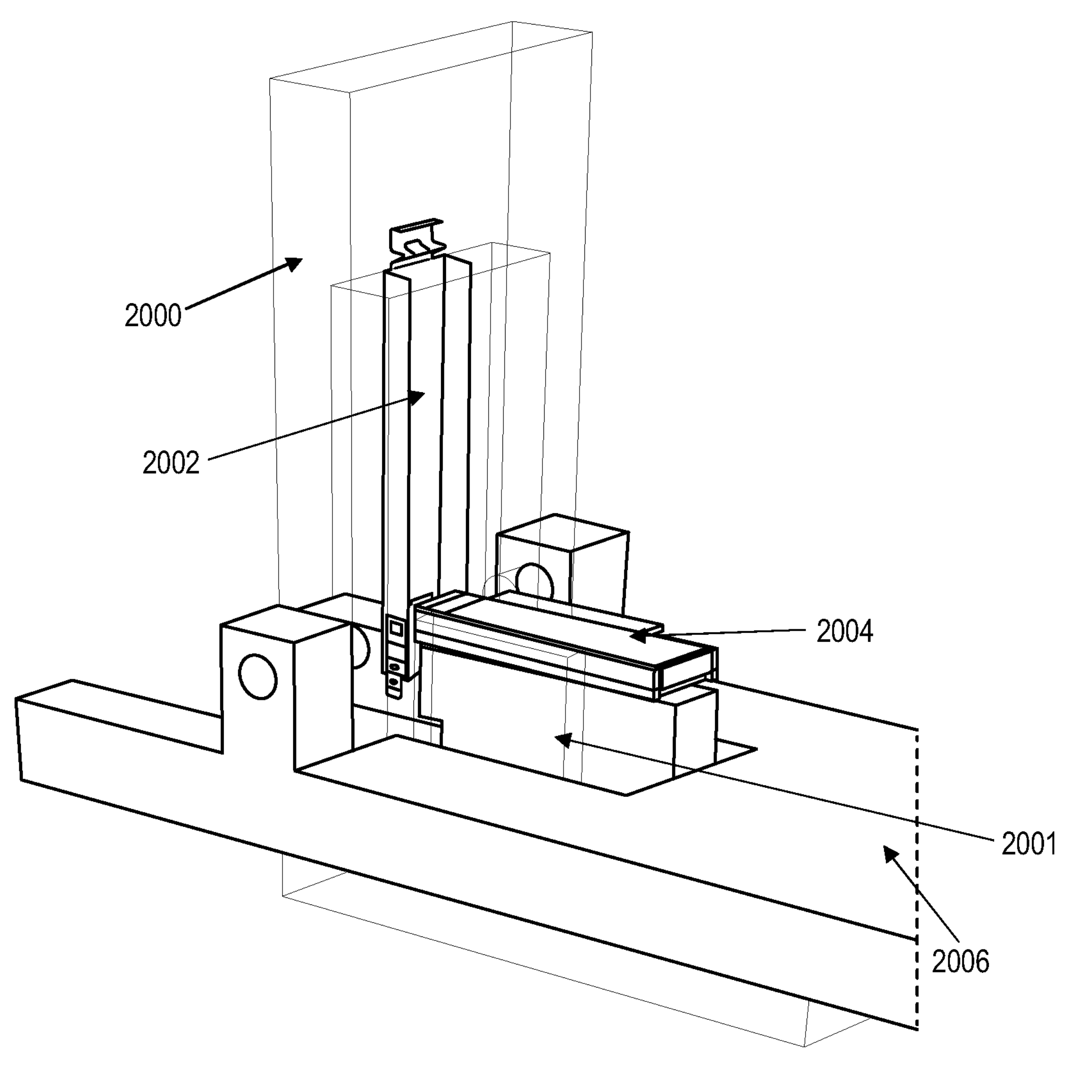
FIGS. 20C-20E show an example method of assembling sub-assemblies of a vaporizer device consistent with implementations of the current subject matter.
Figure 20D:
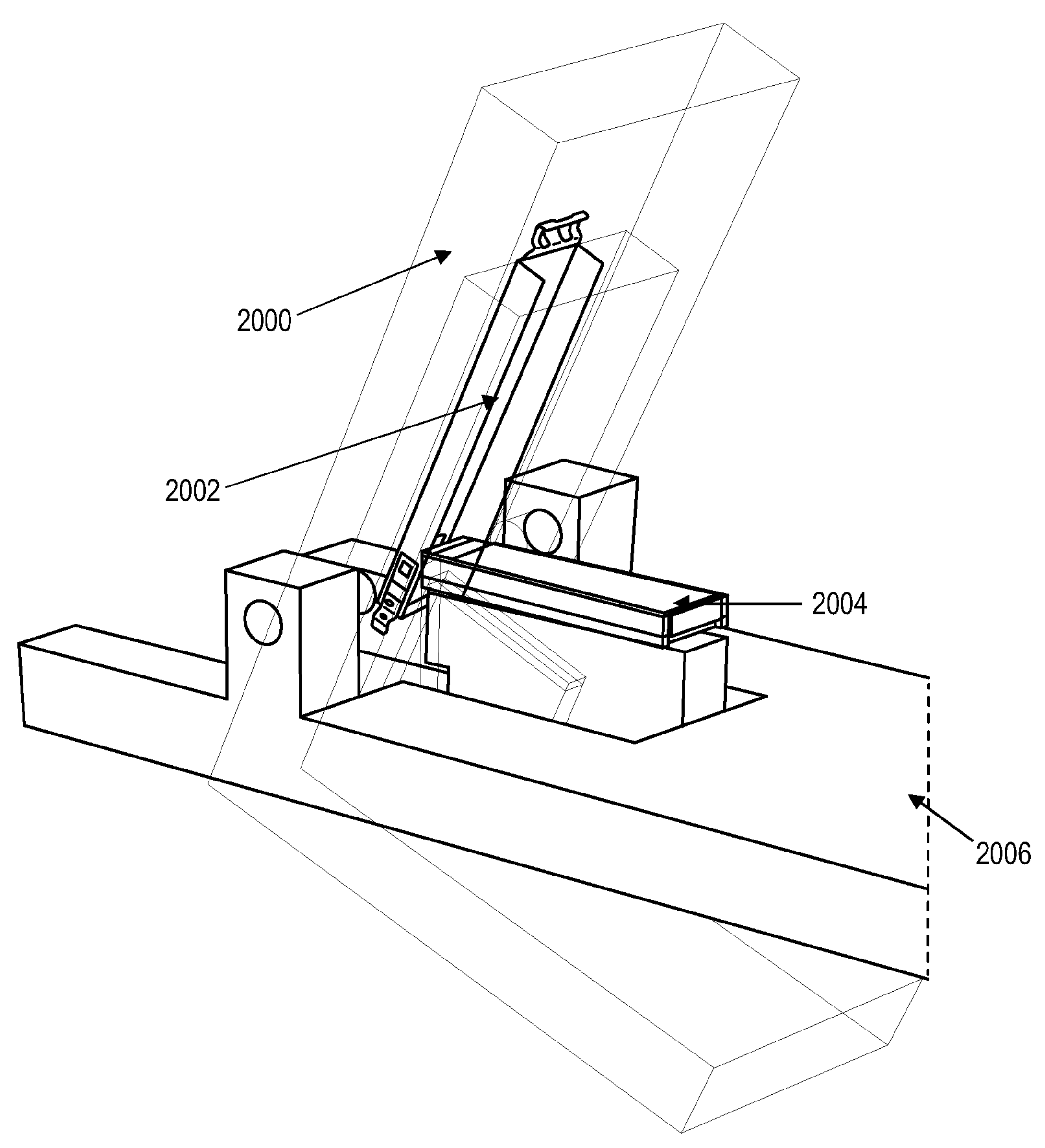
Figure 20E:
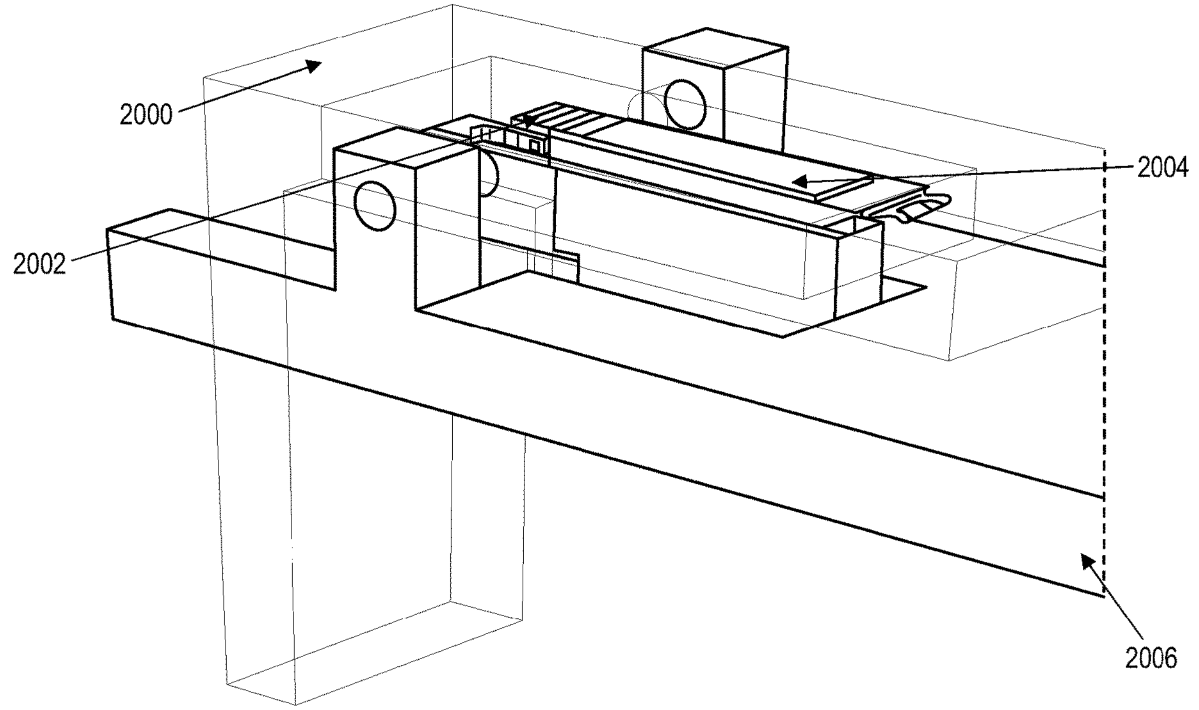

For example, FIGS. 20B-20D illustrate an example process of coupling the power source-PCM subassembly 2004 to the skeleton-cartridge connector subassembly 2002. As shown in FIGS. 20B-20D, the skeleton-cartridge connector subassembly can be positioned within a slot formed in a pivotable component 2000, while the power source-PCM subassembly 2004 rests on a stationary platform component 2006. As shown in FIG. 20B, the first end 510A of the flex 510, which is coupled with the power source 508, is aligned with the secondary PCBA 512A, which is coupled with the cartridge connector. The pivotable component 2000 includes side arms 2001 to maintain the position of the power source-PCM subassembly 2004.

As the pivotable component 2000 pivots, the skeleton-cartridge connector subassembly 2002 folds downwardly onto the power source-PCM subassembly 2004, and the side arms 2001 pivot away from the power source-PCM subassembly 2004 (see FIGS. 20C and 20D). A pressure sensitive adhesive positioned on the skeleton (not shown) is activated when the skeleton contacts the power source to adhere the skeleton to the power source. Once the pivotable component 2000 fully pivots as shown in FIG. 20D, the pressure sensitive adhesive activates as the power source-PCM subassembly 2004 becomes fully adhered to the skeleton-cartridge connector subassembly 2002. Other adhesives may be used to couple the two subassemblies. The pivotable component 2000 and stationary platform component 2006 helps to reduce damage caused to the power source, secondary PCBA, and/or other electrical components during assembly by maintaining alignment and reducing the number of moving components.

Figure 21A:
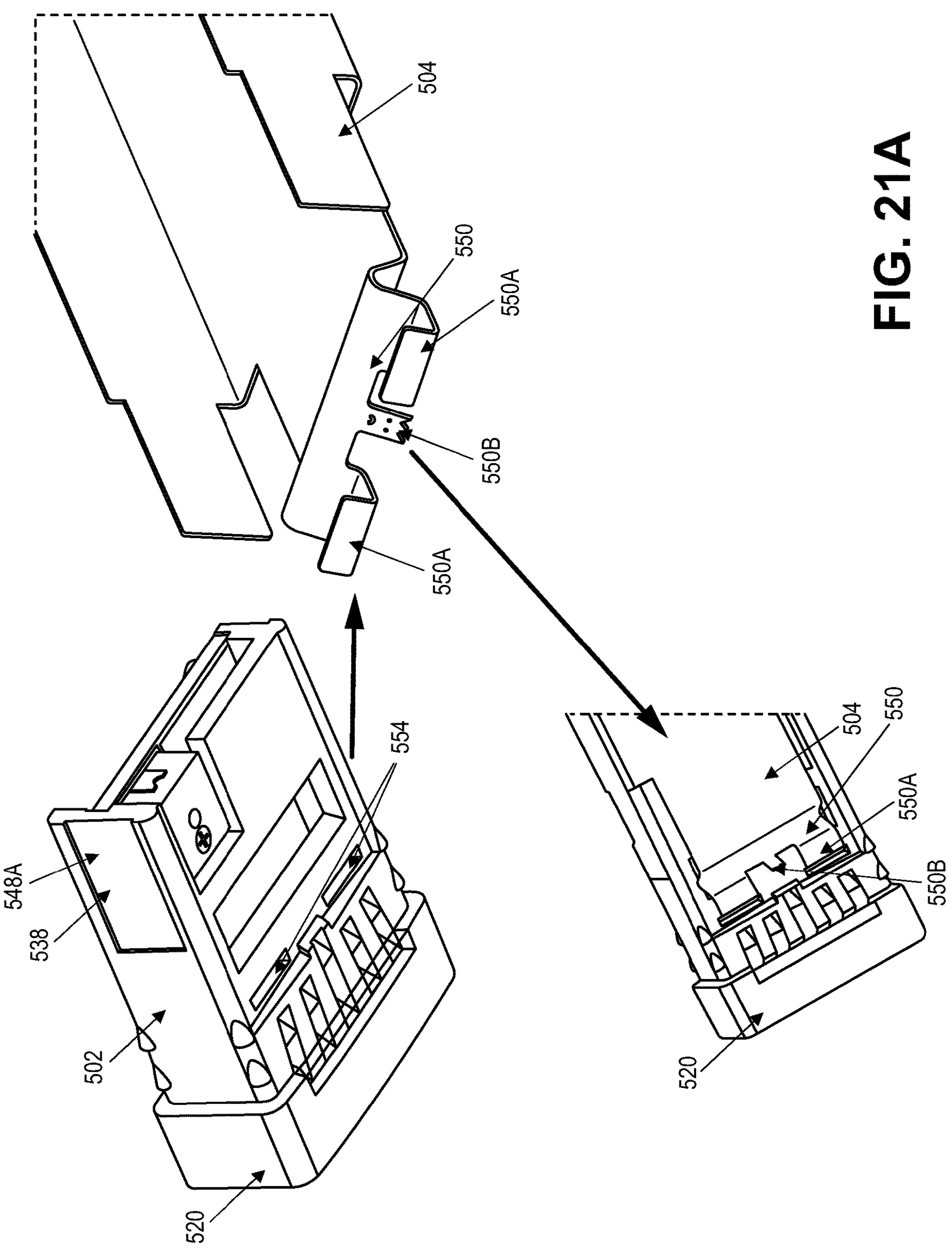
FIG. 21A shows an end cap module and a skeleton of a vaporizer device consistent with implementations of the current subject matter.

At 810, the end cap module 502 can be coupled with a skeleton 504. For example, as shown in FIG. 21A, the end cap module 502 has skeleton attachment features 554 such as slots that can receive at least a portion of the skeleton 504, such as one or more of the end cap module connection features 550. The end cap module connection features 550 can include one or more side arms 550A that can be inserted into the slots 554. The end cap module connection features 550 can include a central arm 550B that can rest against a portion of the separator 538 to bias the separator 538 and retain the side arms 550A within the slots 554.

Figure 21B:
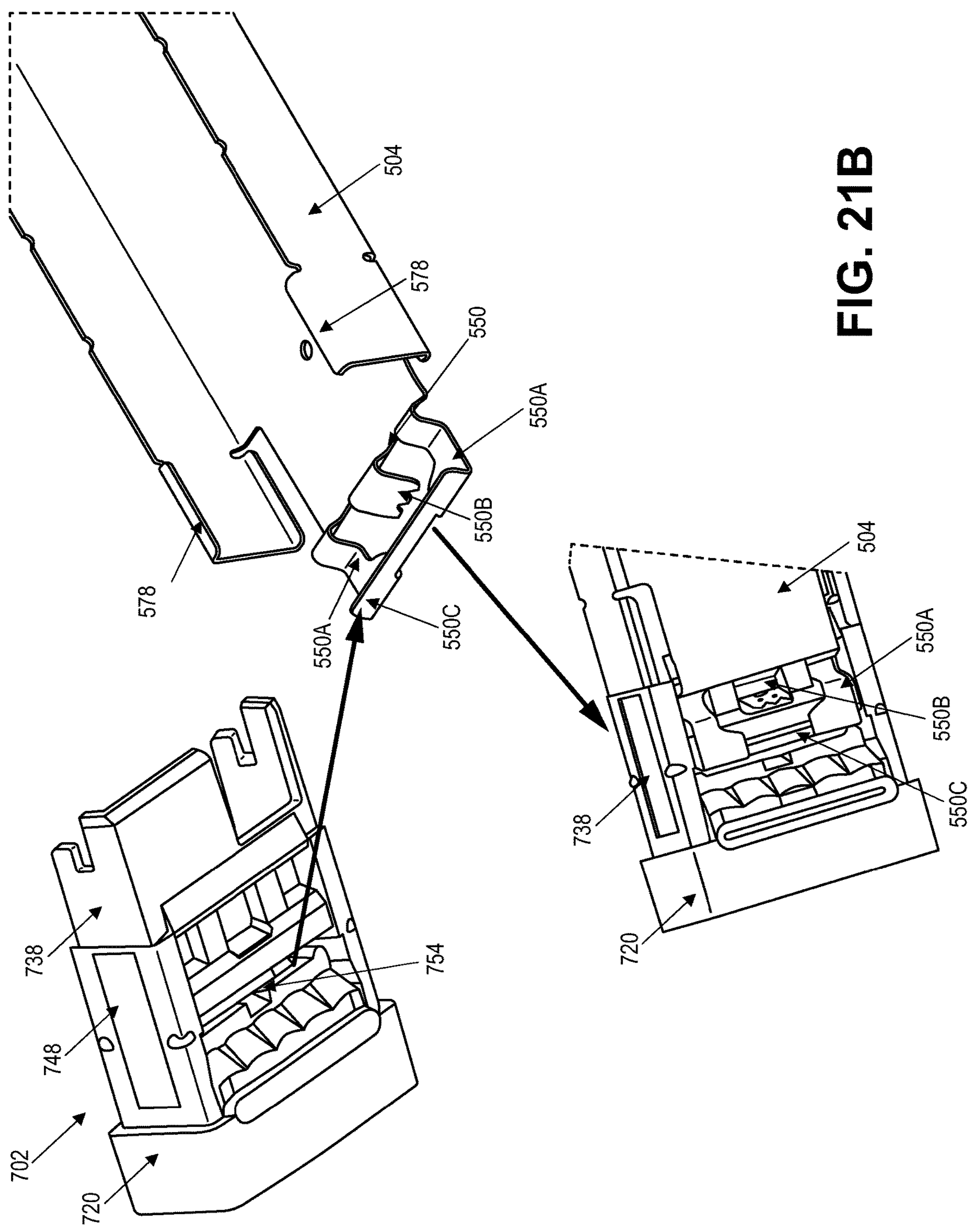
FIG. 21B shows an end cap module and a skeleton of a vaporizer device consistent with implementations of the current subject matter.
Figure 22:
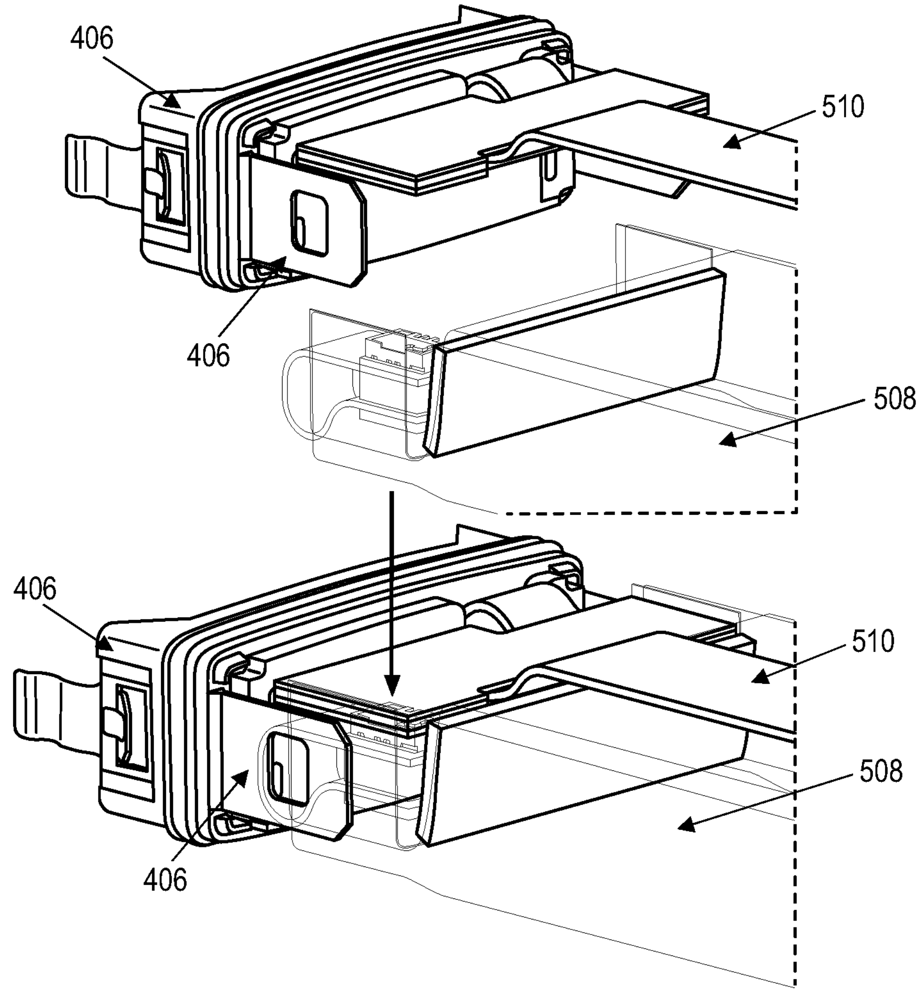
FIG. 22 shows a method of positioning a power source and a cartridge connector of a vaporizer device consistent with implementations of the current subject matter.

FIG. 21B illustrates an example of the end cap module 702 being coupled with the skeleton 504. For example, as shown in FIG. 21B, the end cap module 702 has skeleton attachment features 754, such as a slot that can receive at least a portion of the skeleton 504, such as one or more of the end cap module connection features 550. The end cap module connection features 550 can include one or more side arms 550A and a connection member 550C that can be inserted into the slot 754. The end cap module connection features 550 can include a central arm 550B that can rest against a portion of the separator 538 to bias the separator 538 and retain the side arms 550A within the slot 754. The end cap module connection features 550 create a spring force in tension that secures the end cap module 702 to the skeleton 504. The end cap module connection features 550 allow the joint between the end cap module 702 and the edge of the outer shell 102 to be flush by taking up the tolerance. The skeleton 504 also includes securement members 578 that wrap around at least a portion of the end cap module 702 to better secure the end cap module 702 within the skeleton 504. FIG. 22 illustrates another example of the battery 508 being positioned between the skeleton 504 and the cartridge connector 406/flex 510 subassembly. The battery 508 can fit between inner surfaces of the retainer springs 546. In some implementations, the retainer springs 546 can be biased towards the sides of the battery 508 to hold the battery 508 in place. In some implementations, the battery 508 is wider than the space between opposing retainer springs 546 to hold the battery in place between the retainer springs 546.

Figure 23B:
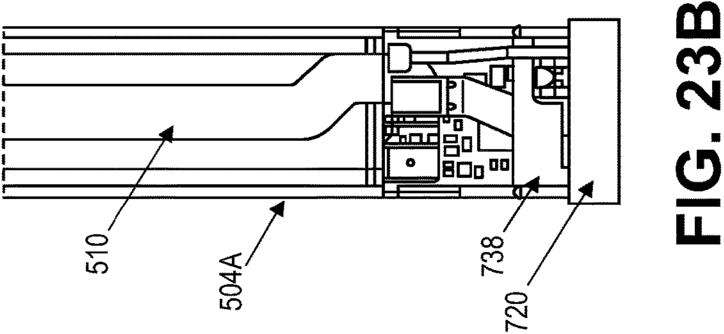
FIG. 23B shows a sub-assembly of a vaporizer device having an end cap module, a PCBA, a flex, and a skeleton consistent with implementations of the current subject matter.
Figure 23A:
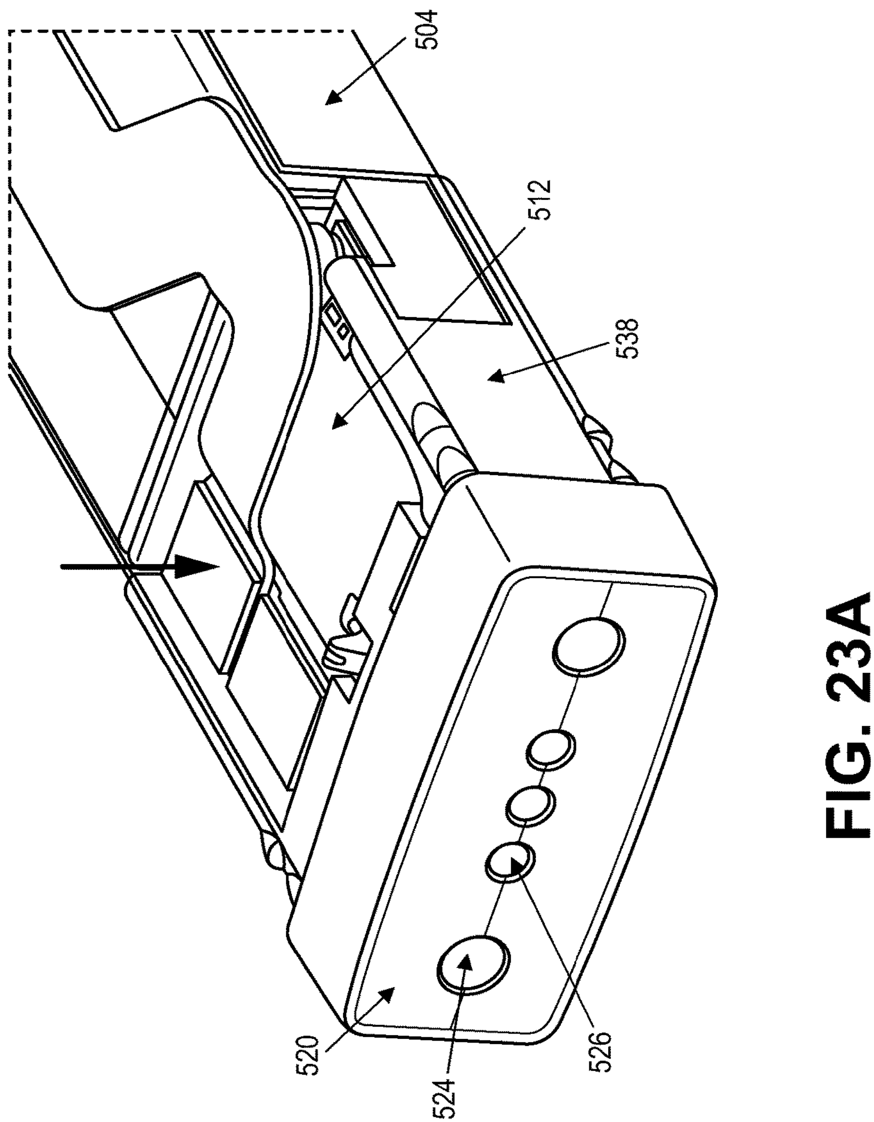
FIG. 23A shows a sub-assembly of a vaporizer device having an end cap module, a PCBA, a flex, and a skeleton consistent with implementations of the current subject matter.

FIG. 23A illustrates an example of the flex 510 being electrically coupled with the end cap module 502. The flex 510, which may have been previously coupled to the cartridge connector 406 at one end, can be coupled with the end cap module 502 at the other end. The flex 510 can be coupled with the PCBA 512 to establish electrical communication between the flex 510 and the PCBA 512. FIG. 23B illustrates another example of the flex being electrically coupled with the end cap module 702.

At 811, the performance of the skeleton subassembly 501 may be tested before the skeleton subassembly 501 is inserted into the outer shell 102. For example, various validation tests may be performed on the modules to ensure that performance of each module has not changed during assembly of the vaporizer body 50. In some implementations, the validations tests may include testing the skeleton subassembly 501 using theoretical resistances. For example, the skeleton subassembly 501 may be coupled with a circuit including at least five parallel resistances (e.g., different resistances) to test the heater circuitry of the skeleton subassembly 501. The testing at various resistance levels can provide an accurate representation of a vaporizer cartridge coupled with the vaporizer body in use under different conditions. Performing the validation testing before inserting the skeleton subassembly 501 into the outer shell 102 can help to reduce the likelihood that the vaporizer body 50 will fail and/or poorly perform when assembled.

Figure 24A:
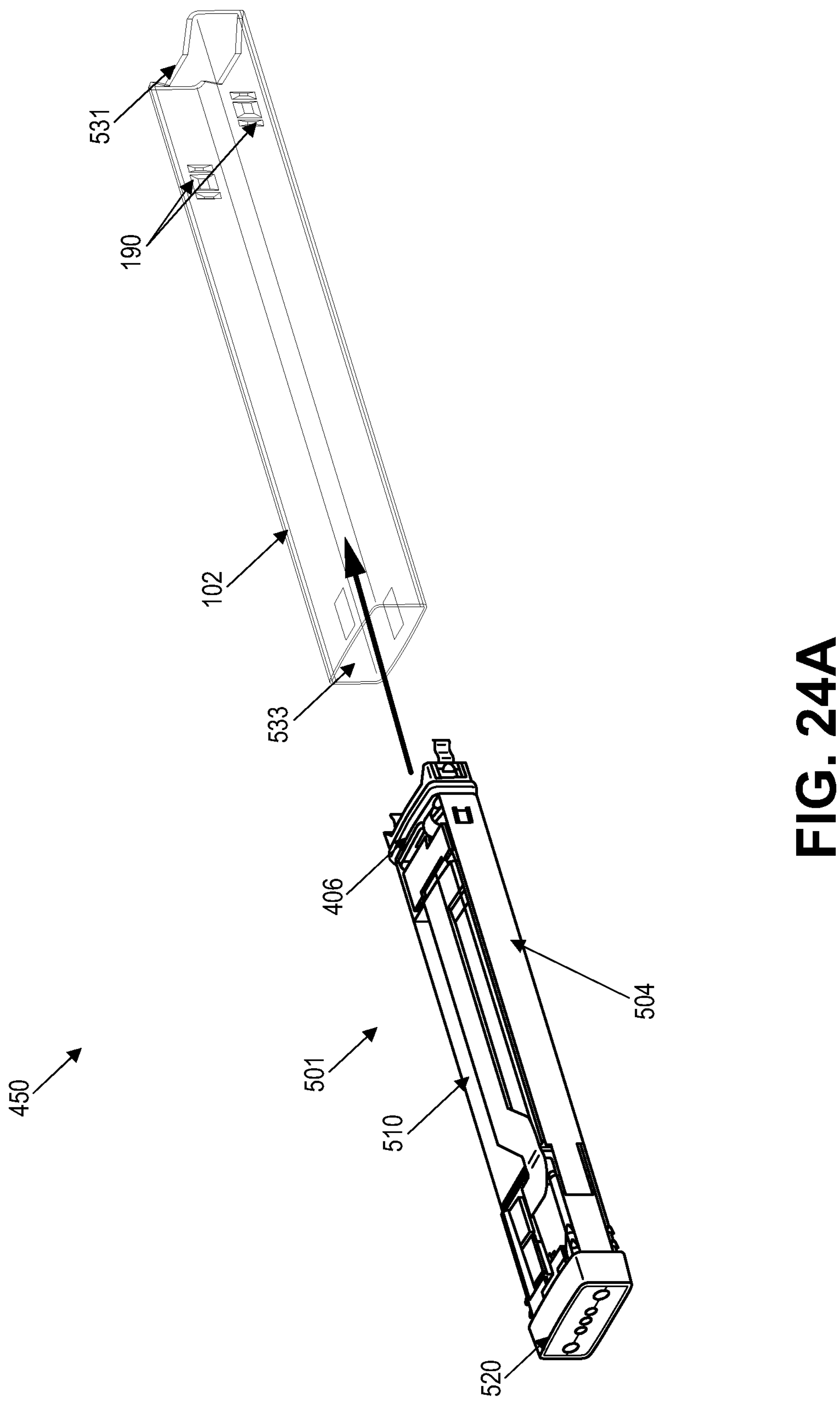
FIG. 24A shows a skeleton subassembly and an outer shell of a vaporizer device consistent with implementations of the current subject matter.
Figure 24B:
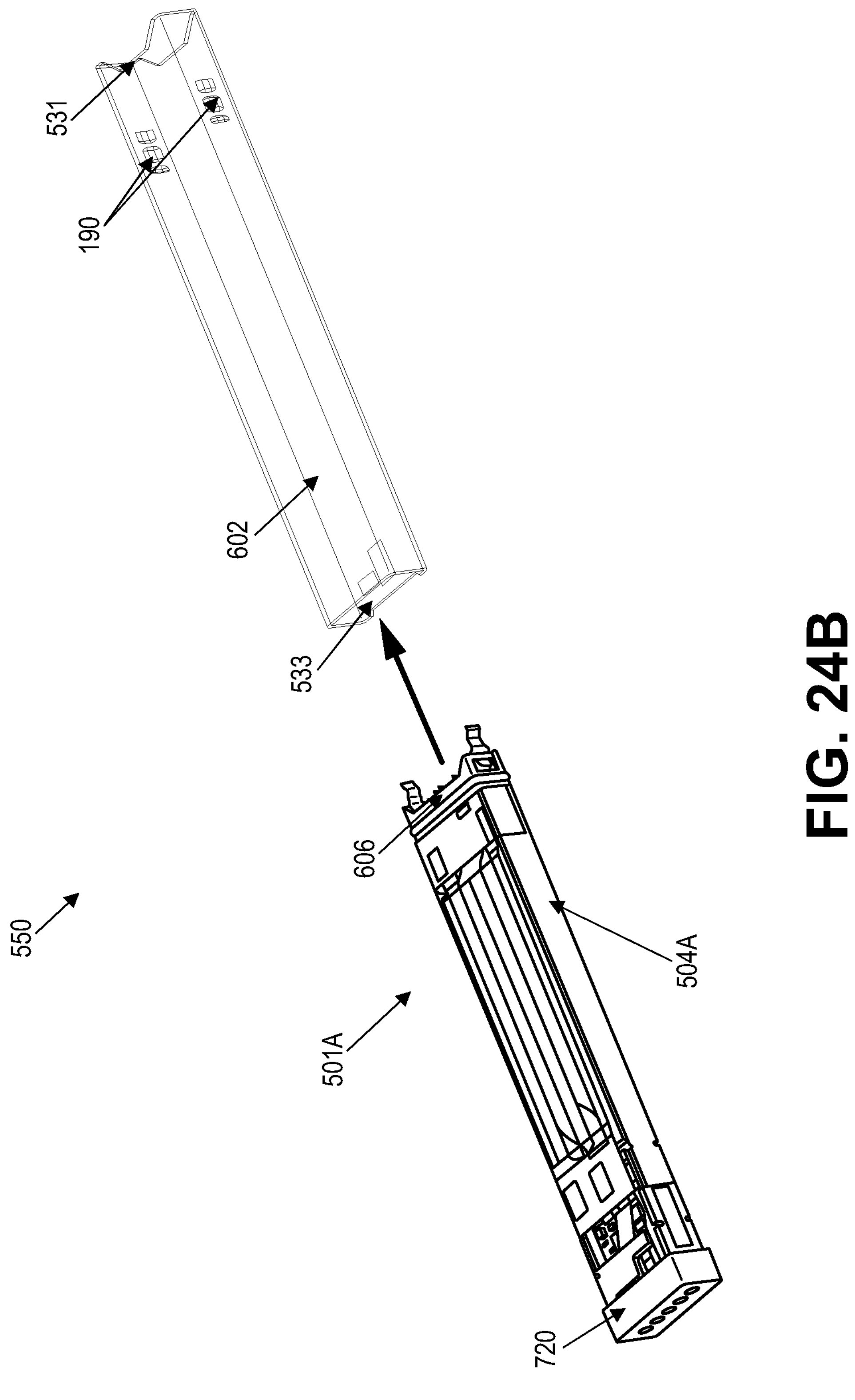
FIG. 24B shows a skeleton subassembly and an outer shell of a vaporizer device consistent with implementations of the current subject matter.

At 812, the skeleton subassembly 501 can be inserted into the outer shell 102 as shown in FIG. 24A-24B. The skeleton subassembly 501 may be pushed and/or pulled into the outer shell 102 using one or more tools.

When the skeleton subassembly 501 is fully inserted into the outer shell 102, the end cap 520 is positioned adjacent the second end portion 533 of the outer shell 102. Yet, in some implementations, at least a portion of the end cap 520, 720 is spaced from the second end portion 533 of the outer shell 102, 602 when the skeleton subassembly 501 is inserted into the outer shell 102. The space between the end cap 520, 720 and the outer shell 102, 602 may desirably define a vent. The vent allows for air to flow in, out, and/or around the end cap. The vent allows for ambient ventilation at the second end portion 533, thereby providing ambient airflow for pressure sensing.

The skeleton subassembly 501 can be coupled to the outer shell 102 consistent with implementations of the current subject matter. For example, as described above, the retaining features of the cartridge connector can be coupled with, such as by snapping into one or more portions of the receiving features 190 of, the outer shell 102. In use, when the vaporizer body 50 is assembled, the vaporizer cartridge 52 can be inserted into the opening of the first end portion 531 of the outer shell 102 to communicate with cartridge connector 406. FIG. 24B illustrates another example of the skeleton subassembly 501 being inserted into the outer shell.

Figures 30A, 30B:
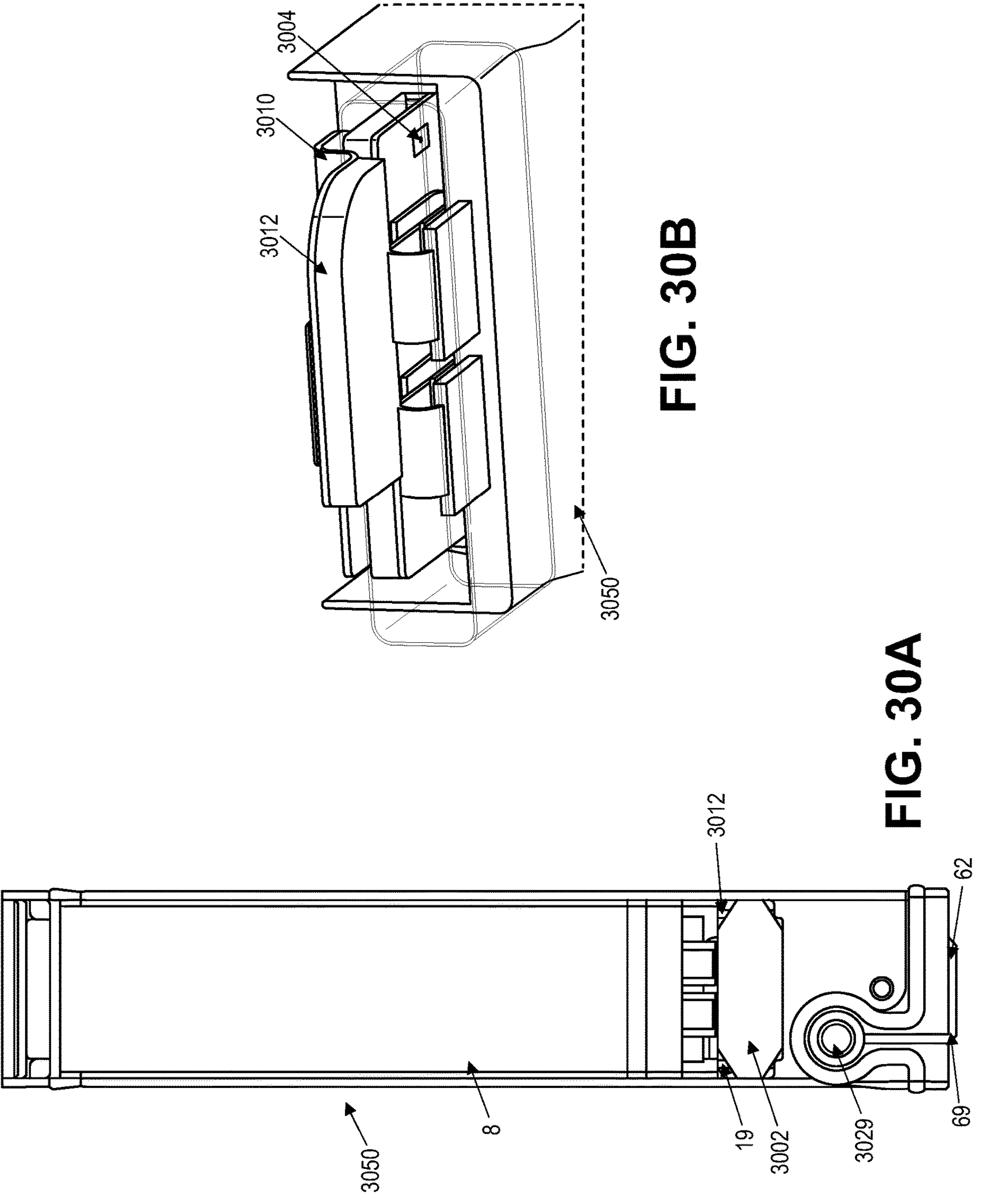
FIG. 30A shows an example of a vaporizer body consistent with implementations of the current subject matter.
FIG. 30B shows an example flex and PCBA consistent with implementations of the current subject matter.

FIGS. 30A and 30B illustrate another example of a vaporizer body 3050 consistent with implementations of the current subject matter. The vaporizer body 3050 includes one or more of the same or similar features of the vaporizer body 50 described above. For example, the vaporizer body 3050 includes the power source 8 (such as a battery which may be a rechargeable battery), the controller 19 (e.g., a PCBA 3012), one or more sensors, charging contacts, and the cartridge receptacle 69 configured to receive a vaporizer cartridge 52 for coupling with the vaporizer body 3050 through one or more of a variety of attachment structures.

The one or more sensors may include a pressure sensor 3029 (as well as any other sensors 3029). The pressure sensor 3029 may be positioned parallel relative to the receptacle contacts 62. The pressure sensor 3029 may be positioned on or coupled (e.g., electrically or electronically connected, either physically or via a wireless connection) to the PCBA 3012. For example, the pressure sensor 3029 may communicate with the PCBA 3012 via a rigid flex 3010. FIG. 30B illustrates an example of the rigid flex 3010 coupled with the PCBA 3012. As noted above with respect to the rigid flex 510, the rigid flex 3010 may be coupled with the PCBA 3012 via soldering, a press fit and/or a snap fit arrangement (see, e.g., FIGS. 9M-9N and 30B). In some implementations, the PCBA 3012 may be pressed and/or snapped onto the rigid flex 3010 and/or a portion of the power source 8 to establish an electrical connection. The snap fit arrangement may help to establish a more secure connection between the rigid flex 3010 and the PCBA 3012. The snap fit arrangement may help to case assembly of the PCBA 3012 and rigid flex 3010, and help to limit or prevent damaging the PCBA 3012 and/or the rigid flex 3010 during assembly. In some implementations, the PCBA 3012 may additionally or alternatively be soldered to the flex or a portion of the battery.

In some implementations, the vaporizer body 3050 includes a spacer 3002. The spacer 3002 may be made of various materials, including foam. The spacer 3002 may be positioned between the power source 8 and the outer shell of the vaporizer body 3050 to help to secure the connection between the rigid flex 3010 and the PCBA 3012, and reduce the likelihood that the connection between the rigid flex 3010 and the PCBA 3012 will disconnect. For example, the spacer 3002 may help to reduce the likelihood that the connection between the rigid flex 3010 and the PCBA 3012 will disconnect during testing (e.g., drop testing, vibration testing, etc.) of the vaporizer body 3050.

As shown in FIG. 30B, the rigid flex 3010 may include a negative temperature coefficient (NTC) thermistor 3004. The NTC thermistor 3004 may also help to detect temperature changes of the power source from the PCBA, at least in part by measuring a current flowing through the NTC thermistor 3004. The thermistor 3004 may be positioned along the PCBA, such as at an end of the PCBA, and may be located adjacent to the power source, to obtain accurate temperature measurements of the power source.

In an aspect, a system includes a current source circuit; a system power input; and load switching circuitry coupling the current source circuit and the system power input to an output configured to couple to a vaporizer heating element. The current source circuit, the system power input, and the load switching circuitry form part of an integrated circuit.

One or more of the following features can be included in any feasible combination. For example, the system can includes protection circuitry configured to compare an operational parameter of a vaporizer device to a predetermined condition and, in response to determining that the operational parameter satisfies the condition, output an alarm signal. The protection circuitry can form part of the integrated circuit. The operational parameter can include voltage, current, temperature, current limit, and electrical short. The predetermined condition can include a predetermined threshold, the system further including at least one register storing the predetermined threshold. The protection circuitry can include a comparator circuit configured to compare the operational parameter of the vaporizer device and the predetermined threshold, the comparator circuit configured to output a signal indicative of the comparison. The protection circuitry can be configured to detect for heater timeout, temperature of subsystems within the vaporizer device, over voltage (OVP) protection, over current protection (OCP), under-voltage-lockout (UVLO), electrical shorts, current exceeding a limit, multi-level throttling, brown-out, and/or a heater-stop inhibit signal. The protection circuitry can include a watchdog timer circuit, and/or a redundant clock source.

The system can include control logic coupled to the protection circuitry and configured to receive the alarm signal and, in response to receiving the alarm signal, cause modification of operation of the vaporizer device including disconnecting at least one circuit within the vaporizer device from a power supply, modifying a clock speed of the at least one circuit, and/or modifying a power rail voltage of the at least one circuit.

The system can include a current monitor coupled to the first output and configured to couple to the vaporizer heating element, the current monitor configured to sense a current at the first output; a voltage monitor coupled to a second output configured to couple to the vaporizer heating element, the voltage monitor configured to sense a voltage across the vaporizer heating element; and control logic coupled to the current monitor and the voltage monitor, the control logic configured to receive data characterizing the sensed current at the first output, the sensed voltage across the vaporizer heating element and adjust operation of the load switching circuitry to adjust a temperature of the vaporizer heating element, the adjusting based on the received data.

The system can include an integrated boost converter configured to provide higher voltage to the load switching circuitry. The system can include power management unit circuitry including at least one low dropout regulator, a direct current rectifier, and a switching step-down down-converter; an analog to digital converter; a light emitting diode driver; and input-output circuitry.

The system can include a vaporizer device body including a vaporization chamber and a mouthpiece; a power source coupled to the power management unit circuitry; a controller coupled to the power management unit circuitry; an antenna; memory; an ambient pressure sensor; and an accelerometer.

The system can include circuitry configured to vary a duty cycle of a signal at the output based on a draw profile and/or a vapor profile, the draw profile characterizing duty cycle and draw strength, the vapor profile characterizing duty cycle and vapor production. The system can include a multiplexer including at least one switch, the multiplexer configured to switch an input between the load switching circuitry and a voltage monitor. The system can include a multiplexer including a first input connected to the load switching circuitry, a second input connected to a voltage monitor, a third input connected to the voltage monitor, a fourth input connected to a reference node, and four outputs, at least one of the four outputs connected to the output.

Systems and methods consistent with this approach are described as well as articles that comprise a tangibly embodied machine-readable medium operable to cause one or more machines (e.g., computers, microcontrollers, or the like, which may include general and/or special purpose processors or circuitry, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Some aspects of the current subject matter relates to integrated power management and heater control circuitry for vaporizer devices. The current subject matter can provide circuitry that enables improved vaporizer operation including improved heater performance and failsafe features thereby improving the vaporizer device. Some implementations of the current subject matter can include an integrated power management unit including heater control circuitry implemented as an integrated circuit (e.g., on a chip such as an application specific integrated circuit (ASIC)). By implementing some aspects of the current subject matter as an application specific integrated circuit, some aspects of the current subject matter can improve power supply management, reduce power requirements, provide flexible heater control, lower the number of discrete components thereby reducing variation in performance, and the like. Other advantages are possible.

Examples of vaporizer devices consistent with implementations of the current subject matter include electronic vaporizers, Electronic nicotine delivery systems (ENDS), and the like, such as the vaporizers described above and shown in FIGS. 1-30B. As noted above, the vaporizers described above and shown in FIGS. 1-30B may optionally include one or more of the features of the vaporizer devices described below and shown in FIGS. 31-39.

Figure 31:
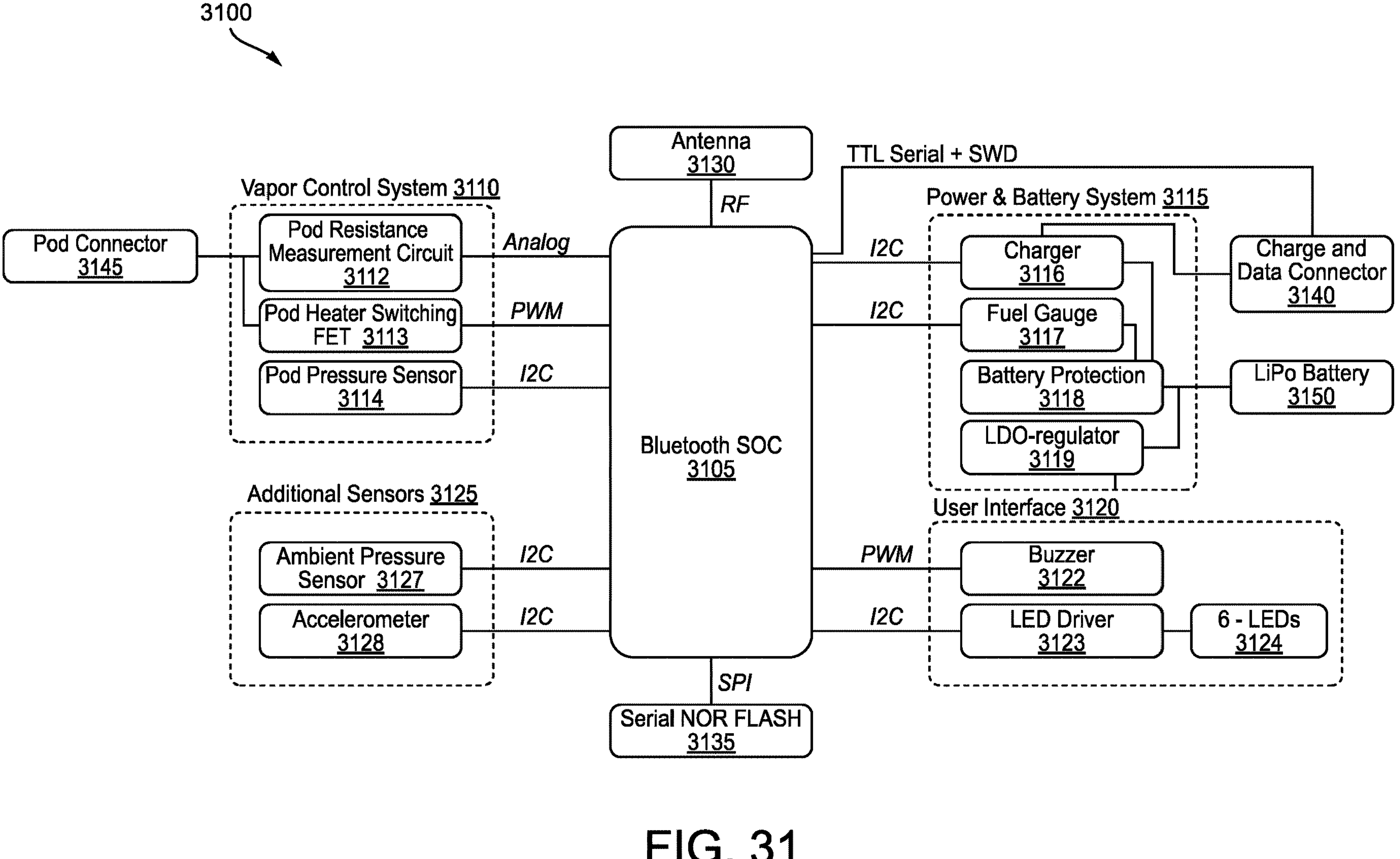
FIG. 31 is a system block diagram of an example vaporizer device that can include integrated power and/or heater control according to some aspects of the current subject matter.

FIG. 31 is a system block diagram of an example vaporizer device 3100 that can include integrated power and/or heater control according to some aspects of the current subject matter. The example vaporizer device 3100 includes a controller 3105 with wireless (e.g., Bluetooth) support system on a chip (SOC) coupled to a vapor control system 3110, power and battery system 3115, user interface 3120, additional sensors 3125, antenna 3130, memory 3135, and connector 3140. The example vaporizer device 3100 further includes a power source 3150 (such as a lithium battery) and a pod connector 3145 for connecting with a pod that can include a heating element (e.g., electrically modeled as a resistor) and which contains vaporizable material.

The vapor control system 3110 can enable vaporizing functionality of the device and includes a pod resistance measurement circuit 3112, a pod heater switching field effect transistor (FET) 3113, and a pod pressure sensor 3114. The pod resistance measurement circuit 3112 and pod heater switching FET 3113 can operate to measure a temperature of a heating element of the pod (e.g., by briefly and intermittently interrupting a flow of current to the heating element, measuring a resistance of the heating element during these brief interruptions, and using a thermal resistance coefficient to obtain temperature from the measured resistance). The pod pressure sensor 3114 can monitor pressure to detect any of a start, an end, or a continuation of a puff.

The power and battery system 3115 operates to provide other systems of the device with power from the power source 3150. The power and batter system 3115 can include a charger 3116, fuel gauge 3117, battery protection 3118, and low-dropout (LDO) regulator 3119. The charger 3116 can include charging circuitry, which may be controlled by the controller 3105, and in some implementations can include an inductive charger and/or a plug-in charger. For example, a universal serial bus (USB) connection may be used to charge the vaporizer device 3100 and/or to allow communication over a wired connection between a computing device and the controller 3105. The charger 3116 may charge the power source 3150. The fuel gauge 3117 can monitor battery information such as voltage, current, estimated state of charge, estimated capacity, cycle count, battery authentication, and the like. Fuel gauge 3117 can provide this information to the controller 3105 for use, e.g., to indicate battery status via user interface 3120. The battery protection 3118 can include switches to switch cells (such as lithium cells, or other cells, discrete power storage units, and the like of the power source 3150) in and out of the circuit to protect the device 3100 against overcharge, over-discharge, overly-rapid discharge, and the like. The LDO regulator 3119 can regulate the output voltage of the lithium battery 3150 in order to provide power to the rest of the vaporizer device 3100.

User interface 3120 includes a buzzer 3122 (also referred to as a speaker), light emitting diode (LED) driver 3123, and LEDS 3124. The buzzer 3122 can provide sonic and/or tactile feedback (e.g., vibration) and the LED driver 3123 and LEDS 3124 can provide visual feedback to the user.

Additional sensors 3125 include an ambient pressure sensor 3127, and accelerometer 3128. The accelerometer 3128 can enable detection of a rapid movement (such as a shaking motion) of the vaporizer device 3100, which may be interpreted by the controller 3105 (e.g., through receipt of a signal from the accelerometer 3128) as a user command to begin communication with a user device that is part of a vaporizer system and that can be used for controlling one or more operations and/or parameters of the vaporizer device 3100. Additionally or alternatively, detection of a rapid movement (such as a shaking motion) of the vaporizer device 3100 may be interpreted by the controller 3105 as a user command to cycle through a plurality of temperature settings to which the vaporizable material held within a cartridge is to be heated by action of the vapor control system 3110.

Figure 32A:
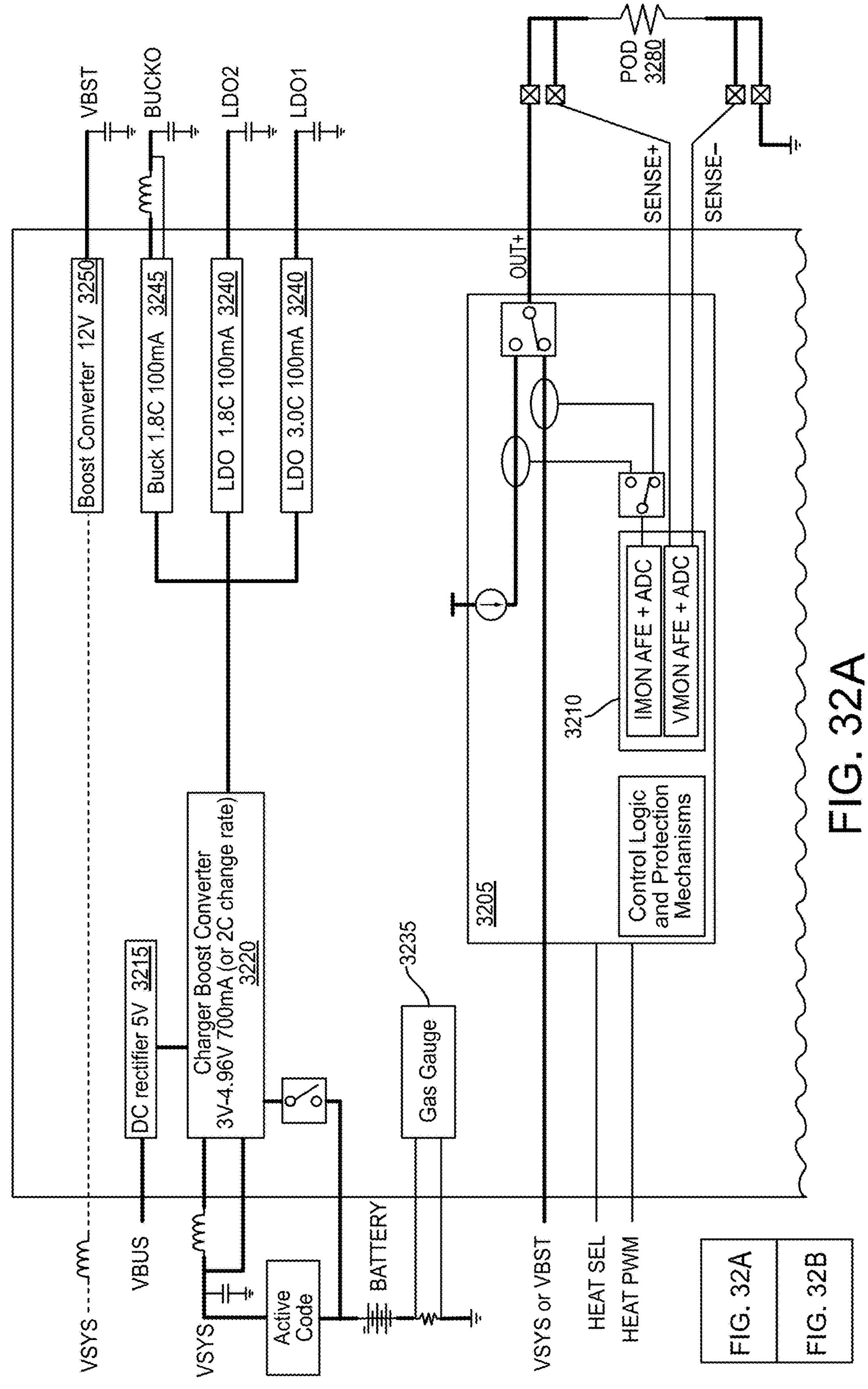
FIG. 32A is a system block diagram of an example integrated power management unit according to some aspects of the current subject matter.
Figure 32B:
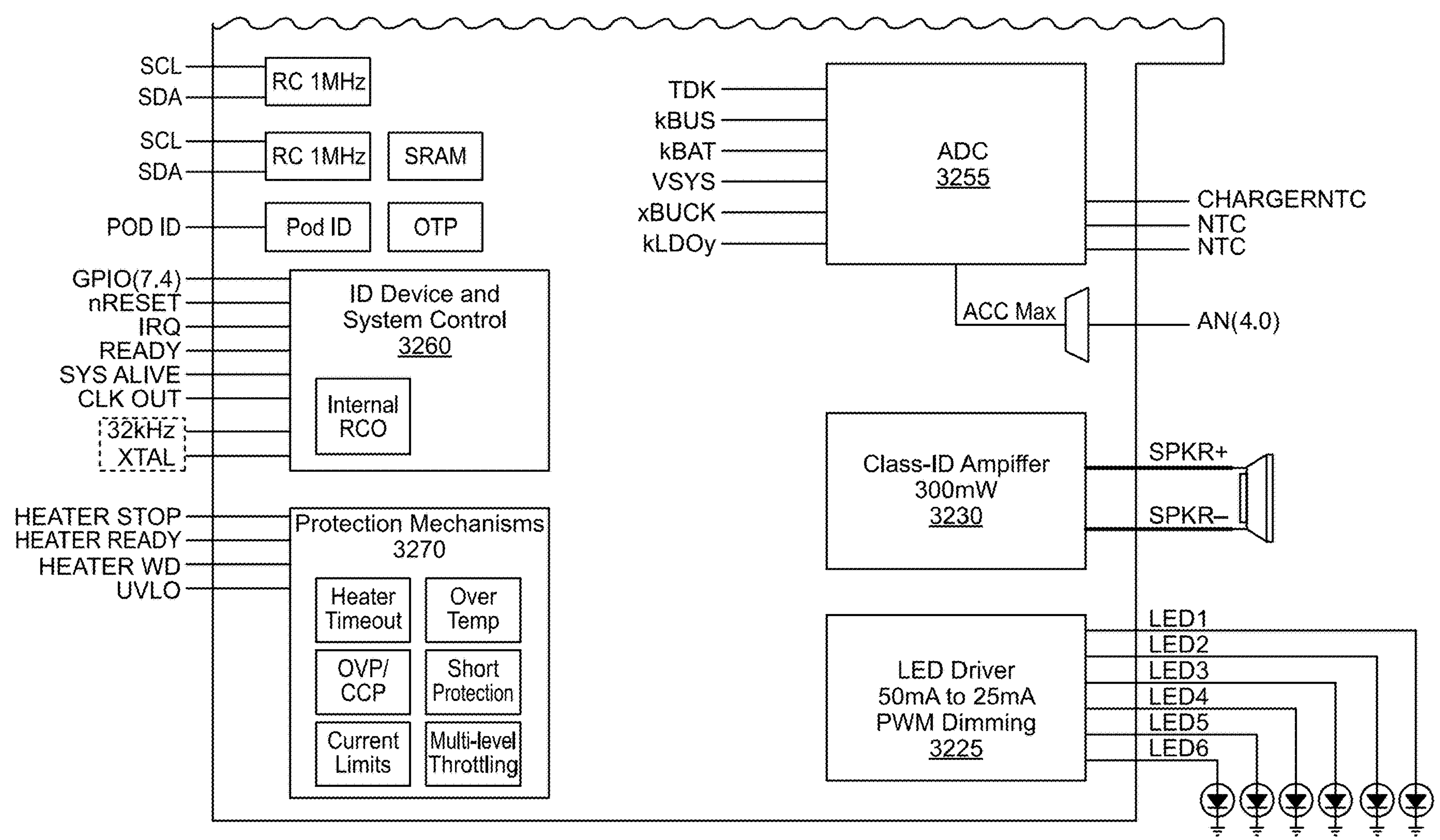
FIG. 32B is a system block diagram of an example integrated power management unit according to some aspects of the current subject matter.

FIG. 32 is a system block diagram of an example integrated power management unit 3200 according to some aspects of the current subject matter, which can improve power supply management, reduce power requirements, provide flexible heater control, lower the number of discrete components thereby reducing variation in performance, and the like. The example integrated power management unit 3200 can perform functionality of the vapor control system 3110; power and battery system 3115; and user interface 3120. The example integrated power management unit 3200 can interface with microcontroller 3105 and integrates analog and power subsystems on a main board and high power flex.

The example integrated power management unit 3200 includes heater control 3205, measurement circuit 3210, DC rectifier 3215, charger 3220, system power rails (not shown), LED driver 3225, buzzer driver 3230, and gas gauge 3235 subsystems. In some implementations, the example integrated power management unit 3200 does not integrate sensors (accelerometer, pressure sensors) and additional supporting components such as the pod connector 3145, antenna 3130, connector 3140, and memory 3135.

The integrated power management unit 3200 can include LDO regulators 3240, switching step-down down-converter 3245 (e.g., buck), and boost converter 3250. The integrated power management unit 3200 can include analog to digital converter (ADC) 3255 for monitoring of system voltages and currents as provided by the power management unit 3200. The ADC 3255 can monitor the die and remote NTC temperatures monitoring system temperatures in order to implement protection mechanisms, as described more fully below.

The integrated power management unit 3200 can include input/output (IO) device and system control 3260, which enables controller 3105 to modify operation (e.g., configure) the integrated power management unit 3200. The IO and system control 3260 can include an internal oscillator as well as connections for an external oscillator for driving the system clock.

Figure 33:
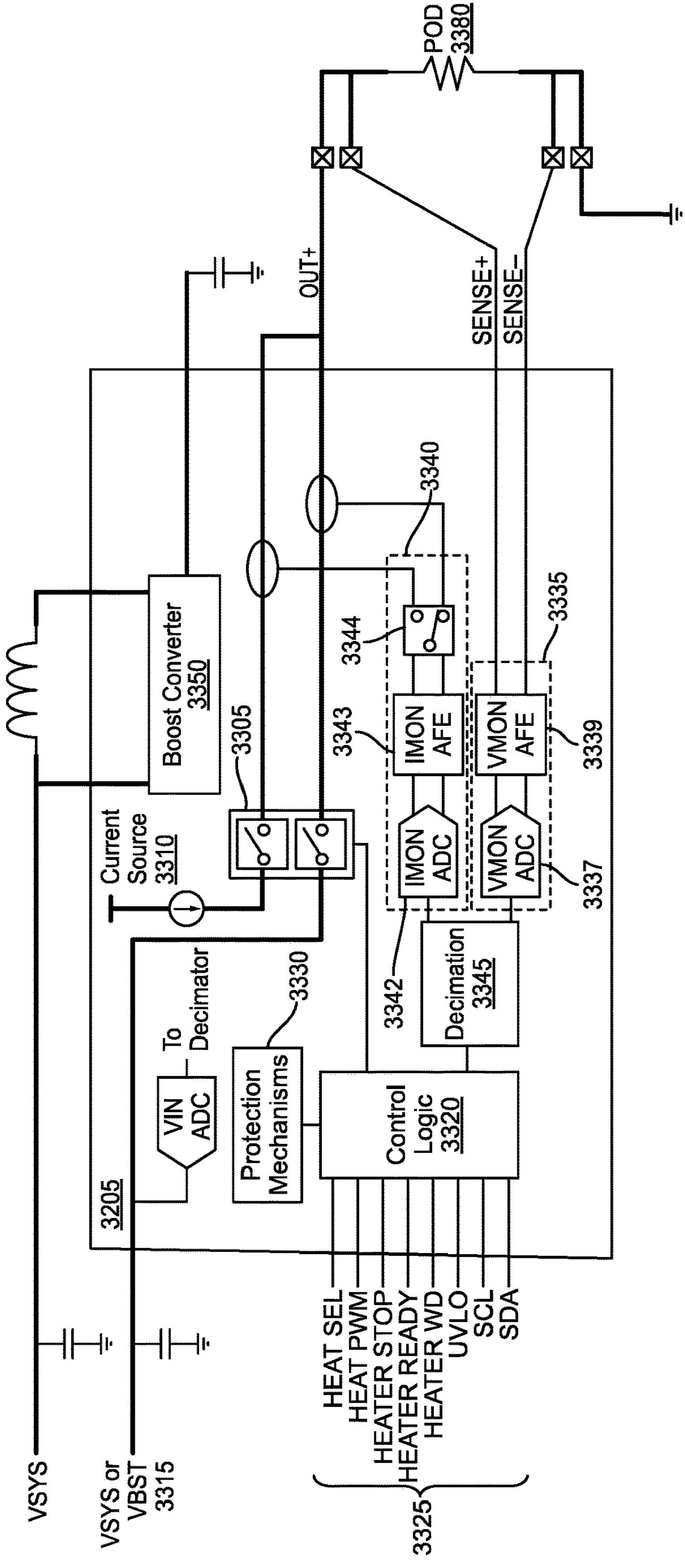
FIG. 33 is a system block diagram illustrating an example heater control according to some implementations of the current subject matter.

Heater control 3205 can provide an integrated heat path and current source for heating of the pod heating element 3280 (also referred to as the pod load), which is located within a pod. FIG. 33 is a system block diagram illustrating an example heater control 3205 according to some implementations of the current subject matter. The heater control 3205 can include a heat path that can include load switches 3305 (e.g., switches as illustrated, a half-bridge topology, and the like) that controls the application of a current source 3310 or external voltage 3315 (denoted as VSYS/VBST) to the pod load 3280 via drive line (denoted as out+). Load switches 3305 can have non-overlap circuitry to guarantee timing (e.g., no risk of backpowering). Load switches can be controlled by controlled by control logic 3320, which can be programmed and/or configured to adjust load switches 3305 to heat the pod heater 3280 to heat a vaporizable material contained in the pod. Control logic 3320 can include one or more input terminals 3325 or pins, which may receive signals from a device controller 3105 or other system within the vaporizer device or integrated heater control 3205. Similarly, current source 3310 can be programmable and controlled by control logic 3320. Load switches 3305 can also be controlled by protection mechanism circuitry 3330, described more fully below.

In some implementations, load switches 3305 can be implemented as a half-bridge topology in which a DC battery voltage into a waveform ranging from 0 volts to battery voltage by varying the pulse width modulation frequency. This variable voltage/power waveform can be used to drive the pod heater 3280. The half-bridge implementation can allow for higher inductance loads since the current free-wheels during off time.

Integrated heater control 3205 can include integrated voltage monitor 3335 and current monitor 3340 coupled to the control logic 3320 via a decimation block 3345. Integrated voltage monitor 3335 can include an ADC 3337 and analog front-end 3339 that can connect to the pod via sense+ and sense− connections to measure voltage across the pod heating element 3280. The integrated current monitor 3340 can include an ADC 3342, analog front end 3343, and switch 3344 coupled to the drive line (out+) to measure current through the drive line (out+). Switch 3344 may be configured to connect the integrated current monitor 3340 to either the current source 3310 or the external voltage 3315, according to a mode of operation of the device. Voltage monitor 3335 and current monitor 3340 can provide their respective measurements, via decimation block 3345, to the control logic 3320 for processing and analysis. By utilizing integrated voltage monitor 3335 and integrated current monitor 3340, which can provide real time and synchronous voltage and current sensing, faster control loop response time and higher accuracy temperature control can be possible. Signal conditioning and filtering via analog front ends 3338, 3343 provides lower noise measurements.

In some implementations guaranteed performance can be possible (e.g., absolute accuracy, gain variance, group delay, and the like). In some implementations, a dedicated inter-integrated circuit (I2C) port can be included for uninterrupted data polling (e.g., 8 kHz) to controller 3105.

In some implementations, integrated heater control 3205 can include an integrated boost converter 3350. The boost converter 3350 can provide an optional source to the heater load switches 3305 and can be disabled/bypassed. Inclusion of boost converter 3350 can allow for flexible power delivery ranges for different pod resistances at high efficiency. In some implementations, the boost converter 3350 can support programmable output voltage and current limits.

In some implementations, the integrated heater control 3205 can include remote voltage sensing utilizing 4-wire sensing that compensates for losses caused by parasitic resistances and pod contact resistances. Such an approach can provide accurate and consistent measurements of the pod for higher accuracy temperature control. In some implementations, a multiplexer (mux) can be included to switch one line of the voltage monitor 3335 between one or more of the four pod connections. For example, a mux can be implemented that can switch a first connection of the voltage monitor 3335 between sense+ and out+.

Figure 34:
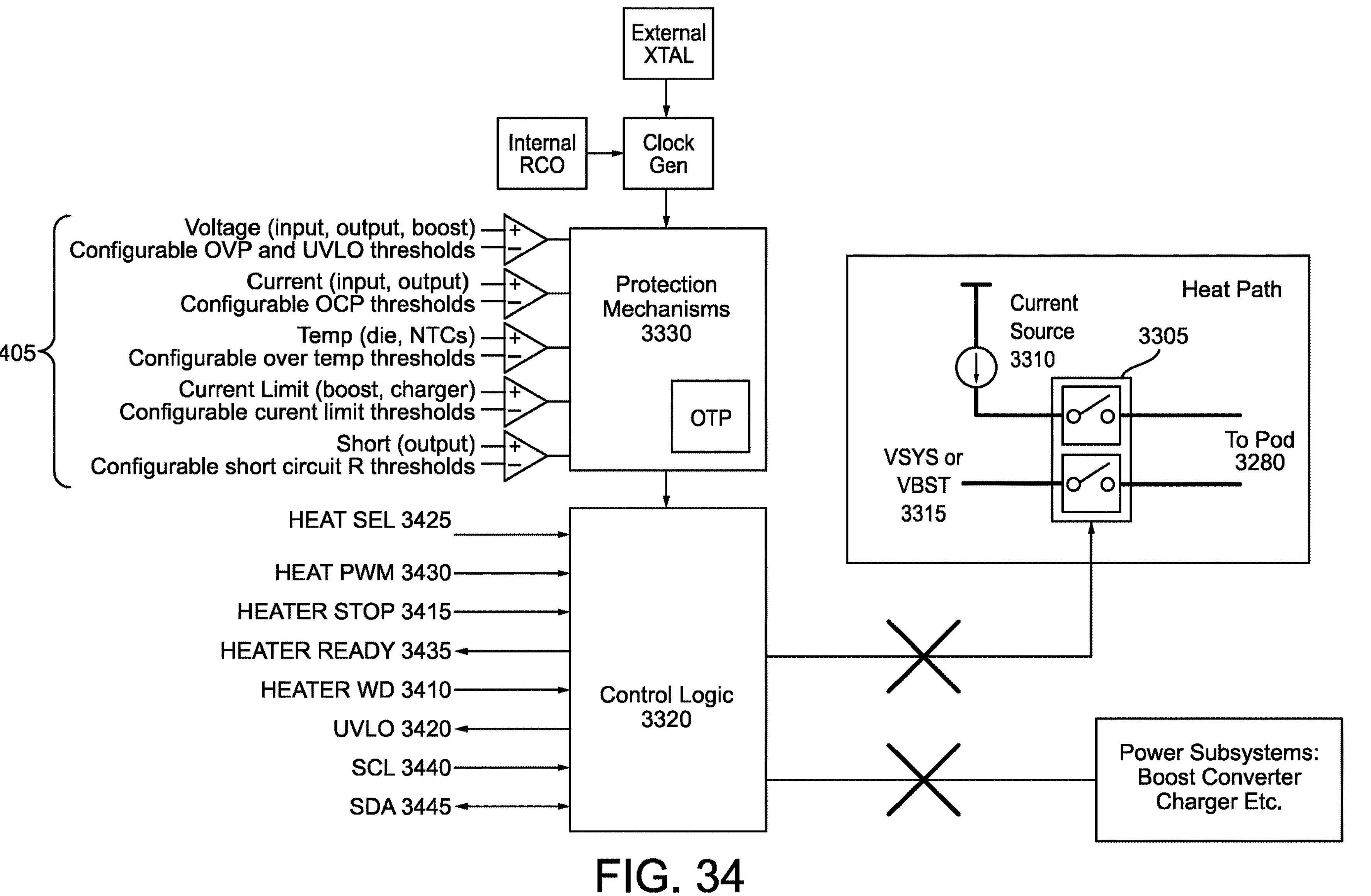
FIG. 34 is a system block diagram illustrating an example protection mechanism circuitry in more detail.

Integrated heater control 3205 can include one or more protection mechanisms circuitry 3330. FIG. 34 is a system block diagram illustrating an example protection mechanism circuitry 3330 in more detail. The protection mechanisms can also be referred to as fail safe and safety mechanism circuitry. The protection mechanisms circuitry 3330 can be operatively coupled with the system clock, the control logic 3320, and can include configurable protection comparators 3405 that compare predetermined thresholds (e.g., stored in registers), to operational parameters of the vaporizer device. These operational parameters can include voltage (e.g., pod input, pod output, boost), current (e.g., pod input, pod output), temperature (e.g., die, negative temperature coefficient resistors (NTCs)), current limit (e.g., boost, charger), and short (e.g., output). During operation of the vaporizer device, the operational parameters, which may be obtained via one or more sensors or sensing circuitry, can be compared to their respective thresholds to determine whether the operational parameter is above or below the threshold. If an operational parameter is determined to be abnormal (e.g., above a high-threshold or below a low-threshold), the protection mechanisms can signal an alarm to control logic 3320. In response to receiving an alarm signal from the protection mechanism circuitry 3330, the control logic 3320 can modify operation of the device, for example, can cut-off certain subsystems from power (e.g., disconnect circuitry or features of the vaporizer device). For example, if the temperature of the pod is determined to be too high and the protection mechanism circuitry 3330 generates an alarm, control logic 3320 can disconnect the heat path (e.g., the current source 3310, load switches 3305) from providing current to the pod heater 3280.

Another example protection mechanism (e.g., failsafe) can include a heater timeout. The protection mechanism circuitry 3330 can include a hardware timer that can disable continuous heating of the pod heating element 3280 (e.g., coil) to protect against firmware or sensor hangs. In some implementations, the timeout durations can be programmable (e.g., 5 s, 10 s, 20 s, 40 s, and the like).

Another example protection mechanism (e.g., failsafe) can include over temperature protection. The protection mechanism circuitry 3330 can implement a thermal based protection scheme that utilizes various thermal sensors in the vaporizer device to throttle and/or disable various subsystems. These thermal sensors can include negative temperature coefficient resistors (NTCs) that allow for temperature monitoring at different system locations for feature throttling and protection, dedicated battery NTC for charging based throttling and protection, on die temperature monitoring to prevent silicon damage, and the like. In the event the protection mechanisms circuitry 3330 determine that a temperature reading within the vaporizer device is too high, control logic 3320 can alter operation of the vaporizer device to reduce heat generation. Reducing heat generation can be performed, for example, by changing clock speed; power voltage levels; powering down certain subsystems or portions of the device and/or circuitry; and the like.

Another example protection mechanism (e.g., failsafe) can include over voltage/current protection (OVP/OCP) and under-voltage-lockout (UVLO). The protection mechanism circuitry 3330 can disable subsystem and functionality if voltage and currents are outside of expected operating range (e.g., as detected by protection comparators 3405, which can include fast reacting comparator based triggers). In some implementations, OVP/OCP and UVLO can be implemented on heater path signals and high power subsystems.

Another example protection mechanism (e.g., failsafe) can include short protection. The protection mechanism circuitry 3330 can disable outputs of different subsystems when electrical shorts are detected (e.g., current draw can increase and a short can be detected by a protection comparator 3405). In some implementations, short protection can be implemented for output power rails for charger, DCDC converters, LED driver, speaker (e.g., buzzer) amplifier, and the like. In some implementations, short protection can be implemented for pod heater 3280 output with programmable resistance thresholds.

Another example protection mechanism (e.g., failsafe) can include current limits. The protection mechanism circuitry 3330 and protection comparators 3405 can detect a maximum current threshold (e.g., cap) in order to prevent exceeding ratings of external devices/components. In some implementations, these current limit thresholds can be programmable.

Another example protection mechanism (e.g., failsafe) can include multi-level throttling and brownout protection. The protection mechanism circuitry 3330 and protection comparators 3405 can perform real time monitoring of system voltages and temperatures. The control logic 3320 can, in response to protection mechanism circuitry 3330 determining that an alarm is triggered, inhibit functionality of different subsystems of the vaporizer device depending on system conditions (e.g., disable heating in cold, disable charging in hot, and the like). In some implementations, these thresholds and behaviors can be programmable.

Another example protection mechanism (e.g., failsafe) can include a redundant clock source. The protection mechanism circuitry 3330 can include an internal RCO and optional external 32 kHz XTAL. Such a redundant clock source can guarantee functionality of the real-time clock (RTC) that controls the heater timeout safety feature so that the RTC is not dependent on an external component, which may be more susceptible to failures.

Another example protection mechanism (e.g., failsafe) can include a hardware watchdog timer. The protection mechanism circuitry 3330 can include an external clocking pin 3410 required to keep heat path capability functional. Such a hardware watchdog timer can protects against firmware or hardware (e.g., sensor) latch ups (e.g., hands, freezes, and the like). In some implementations, the clock rate timing thresholds can be programmable.

Another example protection mechanism (e.g., failsafe) can include a heater stop inhibit pin 3415. The protection mechanism circuitry 3330 can include an open drain architecture that allows other subsystems (e.g., controller 3105) to disable the heater (e.g., fault from a sensor). In some implementations, disabling the heater includes a programmable delay time.

Another example protection mechanism (e.g., failsafe) can include a UVLO pin 3420. The protection mechanism circuitry 3330 can include an additional UVLO output pin 3420 to notify the system of low voltage, which can allow other external subsystems to independently handle low voltage conditions.

Another example protection mechanism (e.g., failsafe) can include fast and graceful shutdown behavior. The protection mechanism circuitry 3330 can cause shutdown behavior caused by fault conditions or protection mechanisms handled gracefully in hardware without need of firmware control. For example, for OVP, OCP, short detection over temp, the heater and/or high power subsystems can be immediately shut down (e.g., within 10 μs to 100 μs) in a manner that does not rely on ADC sampling to determine fault conditions. In some implementations, each subsystem can have a respective shutdown mechanism and/or circuitry. For example, faults on the heater control 3205 can disable the heater block and no other portions of the system.

In some implementations, one or more parameters, settings, or values can be configured to be one time programmable (OTP). Various described timeout and safety features can be hard programmed via manufacture or customer OTP. Desired settings that are OTP can be specified once and then cannot be reprogrammed or reconfigured afterwards. OTP can prevent misconfiguration or user error and core fail-safe related values not susceptible to undesired modification (e.g., after market modification).

In some implementations, integrated heater control 3205 can include additional pins connected to control logic 3320 for causing operation of the integrated heater control 3205. For example, these pins can include a heat select pin 3425, a heat pulse width modulation (PWM) pin 3430, a heater ready pin 3435, a clock line (SCL) pin 3440, and a data line (SDA) pin 3445. Heat select pin 3425 can enable selection between current source and load switch to drive the pod. Heat PWM 3430 can enable load switch to vary power delivered to the pod heater 3280 for temperature control. Heat ready pin 3435 can include an enable pin for the heater control 3205. Heater stop pin can include an inhibit pin to disable the heater control 3205. SCL pin 3440 and SDA pin 3445 can enable a dedicated I2C bus to poll heater voltage and current sense data.

In some implementations, and as noted above, the integrated heater control can 3205 include registers for configuring operational parameters (including performance and safety parameters) such as overvoltage protection (OVP), overcurrent protection (OCP), current limits, hardware timeouts, and the like.

In some implementations, an integrated heater control 3205 can provide many technical advantages. For example, an integrated heater control 3205 can reduce the number of discrete external components required in a vaporizer device, which can reduce variation in device performance due to component tolerance and mismatch. Further, an integrated heater control 3205 can include a fast startup from sleep (e.g., 5 ms) and fast measurement settling times (e.g., <100 μs).

Referring again to FIG. 32, in some implementations, the integrated power management unit 3200 includes protection mechanisms 3270. Protection mechanisms 3270 can be implemented in the heater control 3205, as described with respect to FIG. 33, or within the power management unit 3200 as a logic block separate from the heater control 3205. Protection mechanisms can act on all blocks independently and can respond similarly, e.g., shutdown on a short detection.

In some implementations, the integrated power management unit 3200 can include pod ID 3265. Pod ID 3265 can store calibration data and pod information that can feed into a better user experience through more detailed and accurate usage information (which pods device has seen, nicotine consumption log, pod fill level estimates, and the like). In some implementations, an identifier of the POD is factory programmed and prevents counterfeiting. Communication can be wireless, signal over power, or signal wire interface.

Some implementations of the current subject matter can provide for electrical improvements to vaporizer devices. For example, some implementations of the current subject matter can include a linear charger for feature parity (e.g., can achieve feature parity for charging performance in terms of charge time and efficiency) or a switching charger for faster charge rates and lower hot spots. Some implementations can include integrated voltage and/or current monitoring on xBUS/xBAT/xSYS lines, which can be voltage and current measurements of a USB port, battery, and system; hardware adjustable current limit (ILIM), charge current, termination voltage, and the like; Japanese Electronics and Information Technology Industries Association (JEITA) compliant; can include remote NTCs temperature monitoring; and can include an integrated input DC rectifier.

In some implementations, the LED driver is suitable to drive 6 LEDs with increased performance when compared to a discrete driver. Some implementations of the LED driver can drive current in the 50 uA to 25 mA range, include 11 bit current step resolution with PWM dimming, without CP required. In some implementations, the LED driver can detect when the LED is short and/or open, when LED is over voltage and over current. In some implementations, blue tooth low energy (BLE) performance can meet or exceed known systems.

In some implementations, the speaker/buzzer driver can include a full H-bridge topology enabling the buzzer to run forwards and backwards. Sample rates can include 8 kHz or 16 kHz with 8 bit or 12 bit resolution. The speaker/buzzer driver can include pulse density modulation (PDM) input, short protection, and internal ram loaded with a waveform and supporting looping capability.

Some implementations of the current subject matter enables lower power consumption. For example, an integrated SoC/PMU can provide full power state control over all subsystems. Power states can be configurable by SoC or wake sources. A pod ID wake source can be utilized to keep device in lowest power state possible without pod such that device operates in ultra-low power (e.g., hibernation) mode when a pod is not connected. In some implementations, hibernation mode can draw 1.1 uA, sleep mode can draw 5 uA (various sleep/pod detect modes and without BLE), and BLE advertising mode can draw 1.7 mA, which can power a device for ~1 week in some implementations.

Some implementations of the current subject matter includes internal ADCs for all internal power rails that can enable thorough and extensive inline factory testing and can enable full system monitoring during usage. Self-testing can reduce the need for complex test fixture assemblies and test procedures. Reduced test time and increased units per hour (UPH). Some implementations can enable simplified surface mount assembly (SMA) with fewer ICs, discrete components, and passives.

Some implementations of the current subject matter can include a single package chip scale package (CSP) that can replace 16 or more discrete ICs; reduce the number of points of failure; lower number of external passives components; and can be implemented with a 0.35 mm (or other sized) pitch.

Referring again to FIG. 31, some implementations of the current subject matter can include a vaporizer device that utilizes a standalone heater control, such as or similar to the heater control 3205 described with reference to FIGS. 32-34, in place of discrete vapor control system 3110 without replacing power and battery system 3115 or user interface 3120 with integrated circuitry. Some implementations of the current subject matter can include a vaporizer device that utilizes an integrated power management unit, such as or similar to the integrated power management unit 3200 described with reference to FIGS. 31-34, in place of discrete power and battery system 3115, user interface 3120, and vapor control system 3110. Other implementations and variations are possible.

Figure 35:
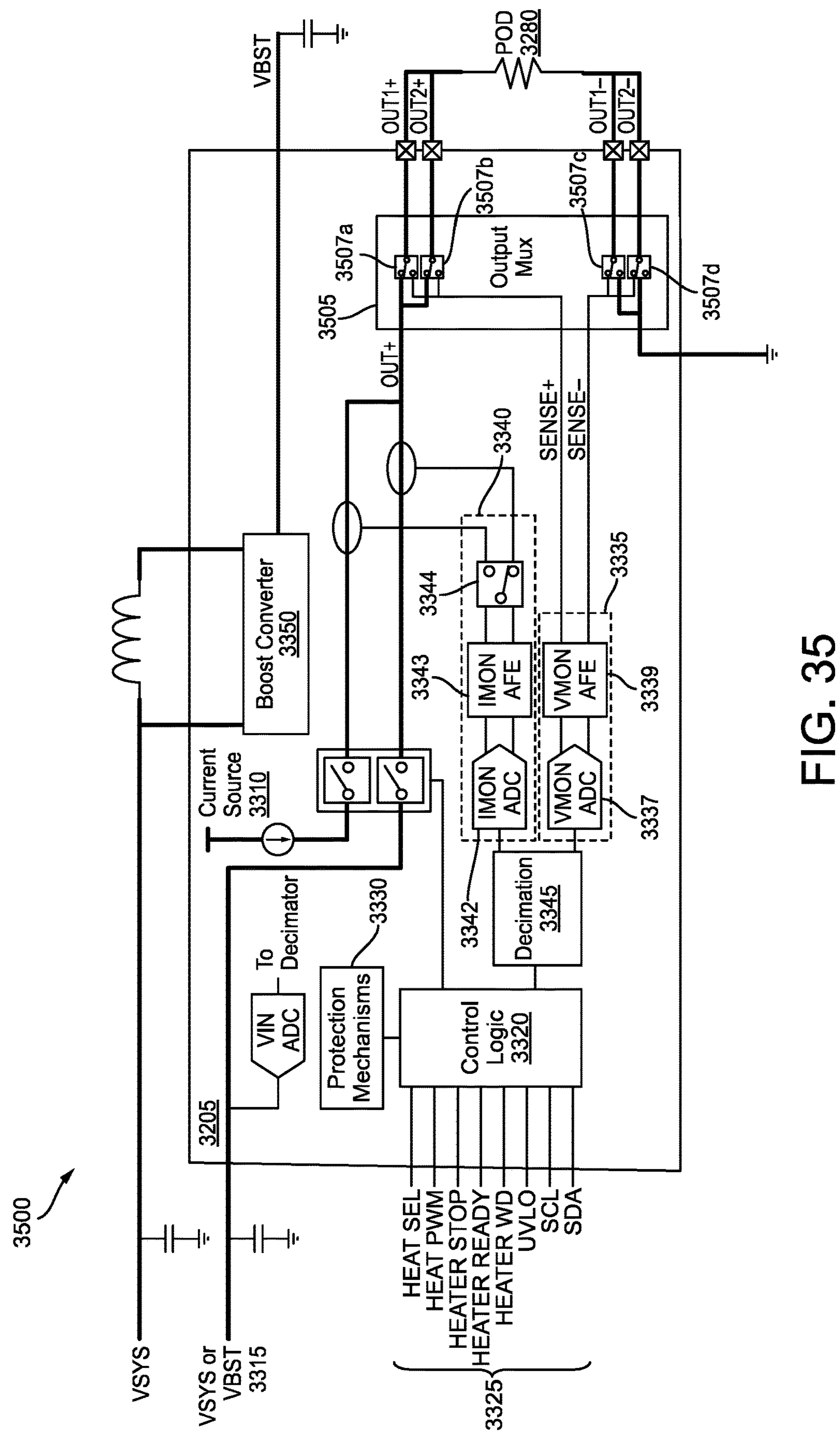

FIG. 35 is a system block diagram illustrating another example heater control 3500 according to some implementations of the current subject matter. The illustrated example includes an integrated output mux 3505 for switching the drive (out+) and sense (sense+, sense−), which can be performed to measure and compensate for poor pod contacts. The mux 3505 can receive out+, sense+, sense−, and a fourth line (e.g., ground) and provide four outputs (out1+, out2+, out1−, and out2−). The mux 3505 can allow for heating on both contacts or taking a remote 4 point voltage measurement on both combinations of contacts. For example, if the mux 3505 is connecting the sense+ line to out2+ and it is determined that the contact associated with the out2+ line is faulty, the mux 3505 can switch the sense+ (e.g., voltage monitor) to the out 1+ line in order to continue operation. The example mux 3505 illustrated in FIG. 35 includes four switches (3507*a*, 3507*b*, 3507*c*, and 3507*d*), two multiplexing out+ and sense+ (3507*a*, 3507*b*); and two switches multiplexing sense− and ground (3507*c*, 3507*d*).

Figure 36:
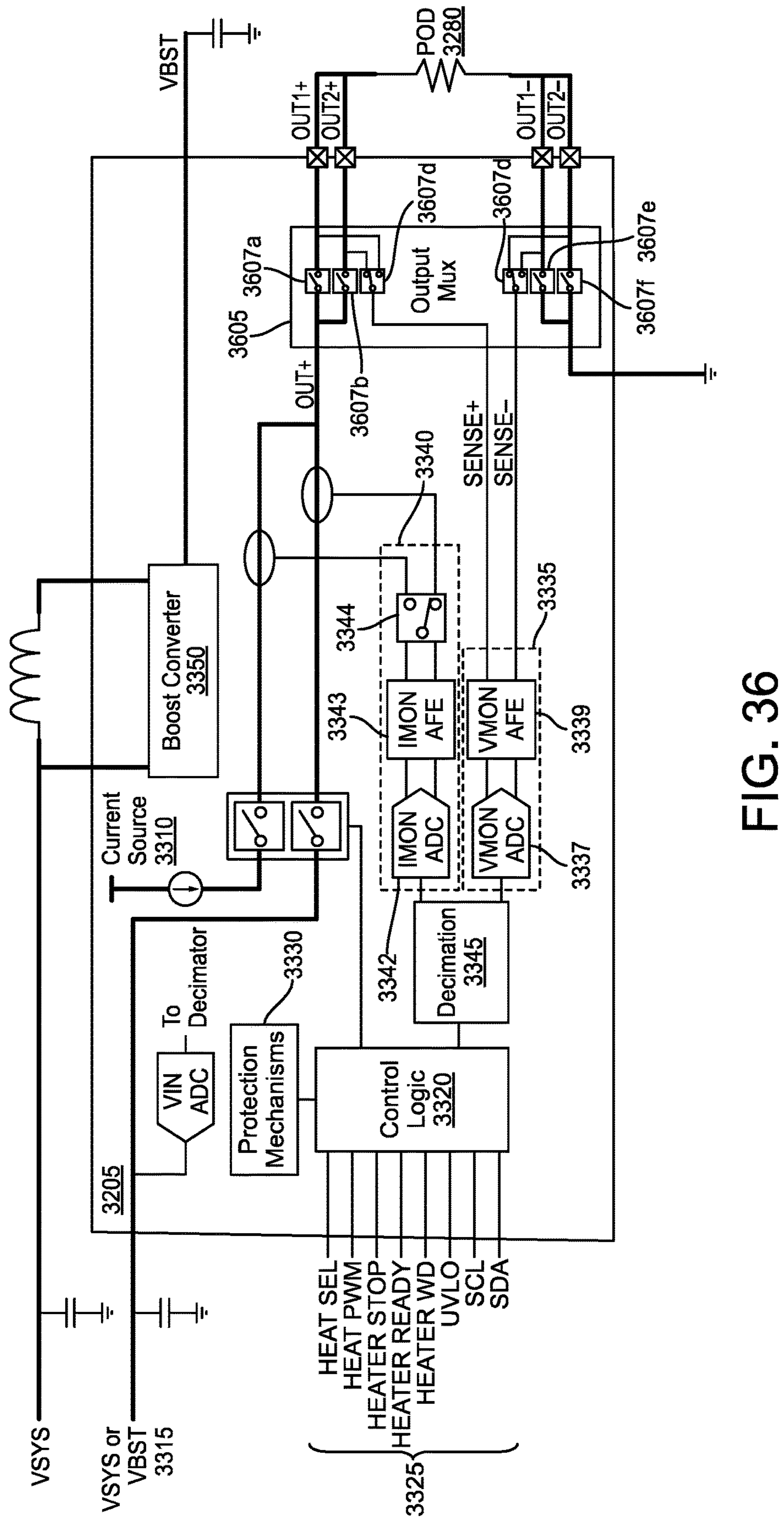

FIG. 36 is a system block diagram illustrating another example heater control according to some implementations of the current subject matter. The mux 3605 in the illustrated example includes three switches multiplexing out+ and sense+ (3607*a*, 3607*b*, and 3607*c*); and three switches multiplexing sense− and ground (3607*d*, 3607*e*, 3607*f*). The example illustrated in FIG. 36 can be advantageous in that it can allow for taking voltage measurement on both combinations of contacts.

In some implementations, the integrated output muxing enables remote 4-wire voltage sensing to be performed on either pair of output lines for compensation of poor contact resistance to the pod and can enable local 2-wire voltage sensing for compensation of parasitic routing resistance.

Figure 37:
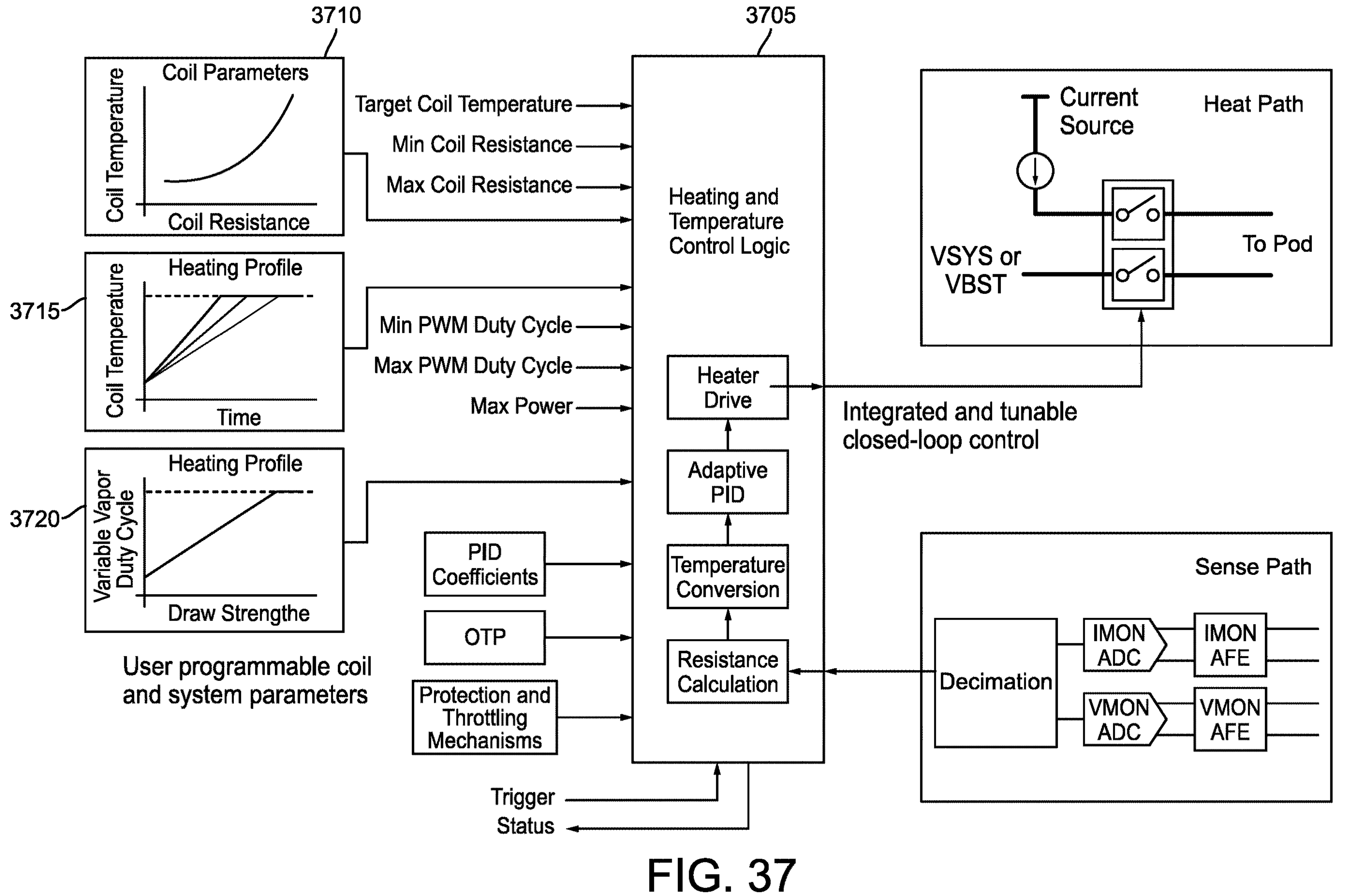

FIG. 37 is a system block diagram according to some implementations of the current subject matter. In the example of FIG. 37, a heating and temperature control logic 3705 can include and/or enable additional functionality including user programmable coil and system parameters such as use of coil parameters 3710, heating profiles 3715, and draw profiles 3720. The example heater control can enable an integrated and tunable closed-loop control. The heating temperature and control logic 3705 can receive the measurements taken by the voltage and current monitors, perform resistance calculation, temperature conversion, adaptive PID, and heater drive to control the load switches in the heat path.

The heating and temperature control logic 3705 can utilize coil parameters 3710, which relates coil resistance to temperature (thus the temperature of the coil (e.g., pod heating element 3280) may not be directly measured, but determined from the measured voltage and current). Heating and temperature control logic 3705 can utilize a heating profile 3715, which can characterize coil temperature over time. The heating profile 3715 can enable the heating and temperature control logic 3705 to appropriately drive the pod heater 3280 (e.g., coil) in order to achieve the target temperature. Heating and temperature control logic 3705 can utilize a draw profile 3720, which can characterize the amount of vapor (e.g., variable vapor duty cycle) to create based upon draw strength of a puff. The draw profile 3720 can be used to implement dynamic and/or variable vapor production.

In some implementations, the heating and temperature control logic 3705 can include user programmable coil parameters. These user programmable coil parameters can include target coil resistance (TCR), which can allow for accurate coil temperature estimation for a wide range of pods (which can be implemented in a lookup table, as a mathematical function, and the like); target regulation temperature for vaporization; and minimum and maximum expected coil resistance range for fault checking and for measurement range optimization.

In some implementations, the heating and temperature control logic 3705 can include user programmable system parameters. These can include a heating profile 3715 that allows for a more consistent vapor experience; a draw profile 3720 that allows for a more customizable and realistic vapor experience; a minimum and maximum duty cycle to bound hardware behavior across different (e.g., all) operating conditions; maximum power which can provide a more consistent heating profile and can protect the system across different (e.g., all) operating conditions; and PID coefficients for tuning of closed-loop algorithm.

In some implementations, the heating and temperature control logic can include one time programmable settings and protection/throttling mechanisms that can guarantee safe operation independent of control loop behavior; output of closed-loop temperature control block can adjust the heater block to an appropriate drive level; input for the closed-loop temperature control block can be taken for coil/system parameters and the dedicated coil voltage and current sensing monitors; and can include flexible trigger sources such as an option to provide a fixed draw/vapor production level and/or an option to provide a level dependent trigger that can provide variable vapor production based on draw strength.

Figure 38:
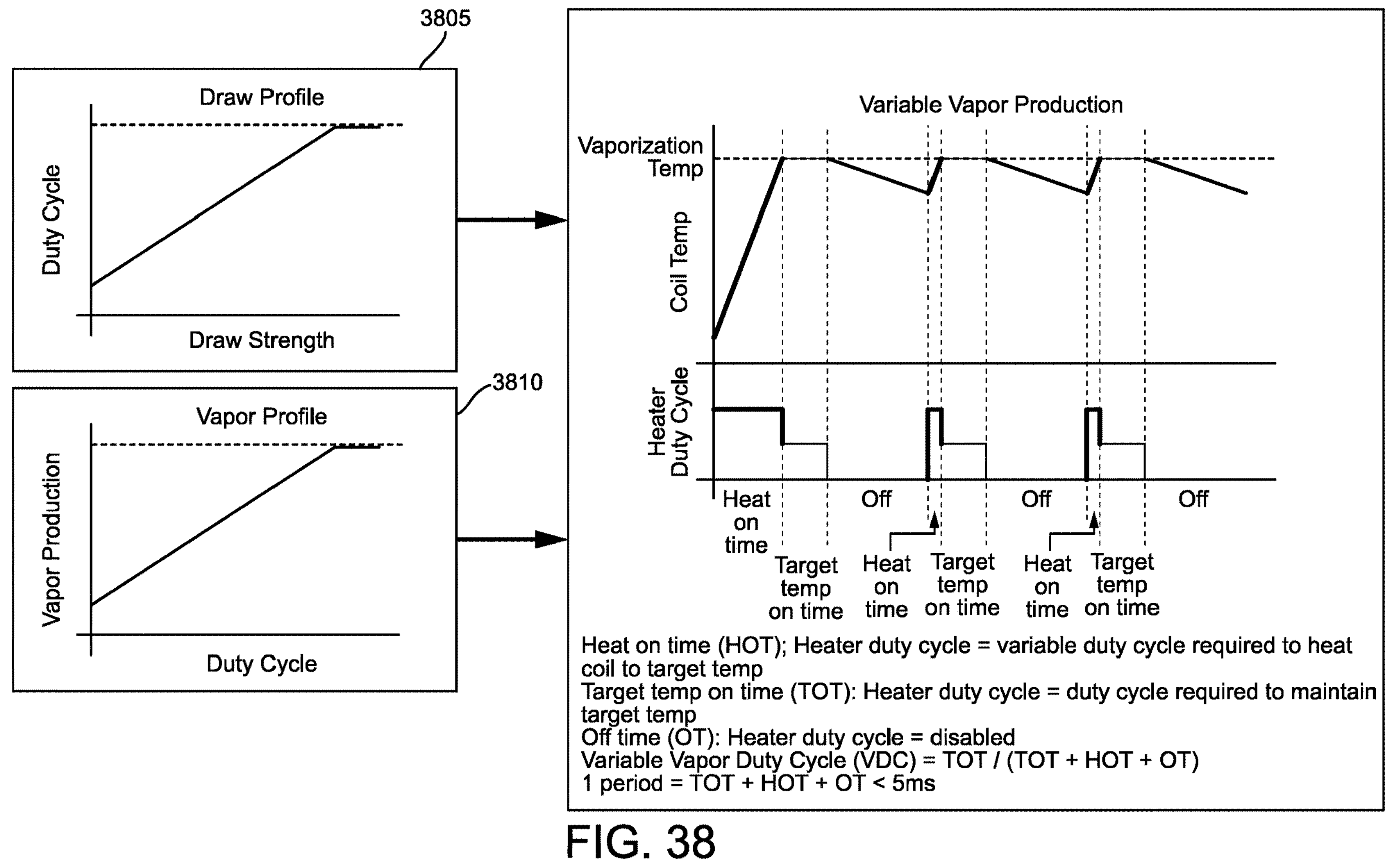

FIG. 38 illustrates an example of variable vapor production. A draw profile (which can relate draw strength and duty cycle) 3805 and vapor profile 3810 (which can relate vapor production and duty cycle) can be utilized to create variable vapor production. In variable vapor production, duty cycle of the heater can be varied to control coil temperature to achieve a target temperature on time. This can include heat times that will achieve the target temperature on time (e.g., the time in which the pod is at the vaporization temperature) and off time (e.g., the time in which the pod is below the vaporization temperature) such that multiple on and off periods can occur within a single puff. By having variable length on-off periods, the amount of vapor produced can be controlled. Utilizing this approach a user can specify certain vapor amounts (e.g., dial down or up) that will be created during a puff.

In some implementations, variable vapor production can provide the user with a more customizable and/or realistic vapor profile. Variable vapor can be produced by duty cycling the time at which the coil temperature is regulated to the vaporization temperature. The amount of vapor produced can be fixed via a user application or dynamically changed in real time based on draw strength. A draw profile (e.g., duty cycle for a given draw strength) and vapor profile (vapor production for a given duty cycle) can be used to create this variable vapor profile. The frequency of the variable vapor duty cycle can be high enough to cause no discernable gaps in vaporization and low enough so that the heat PWM has enough cycles to regulation to the vaporization temperature.

Figure 39:
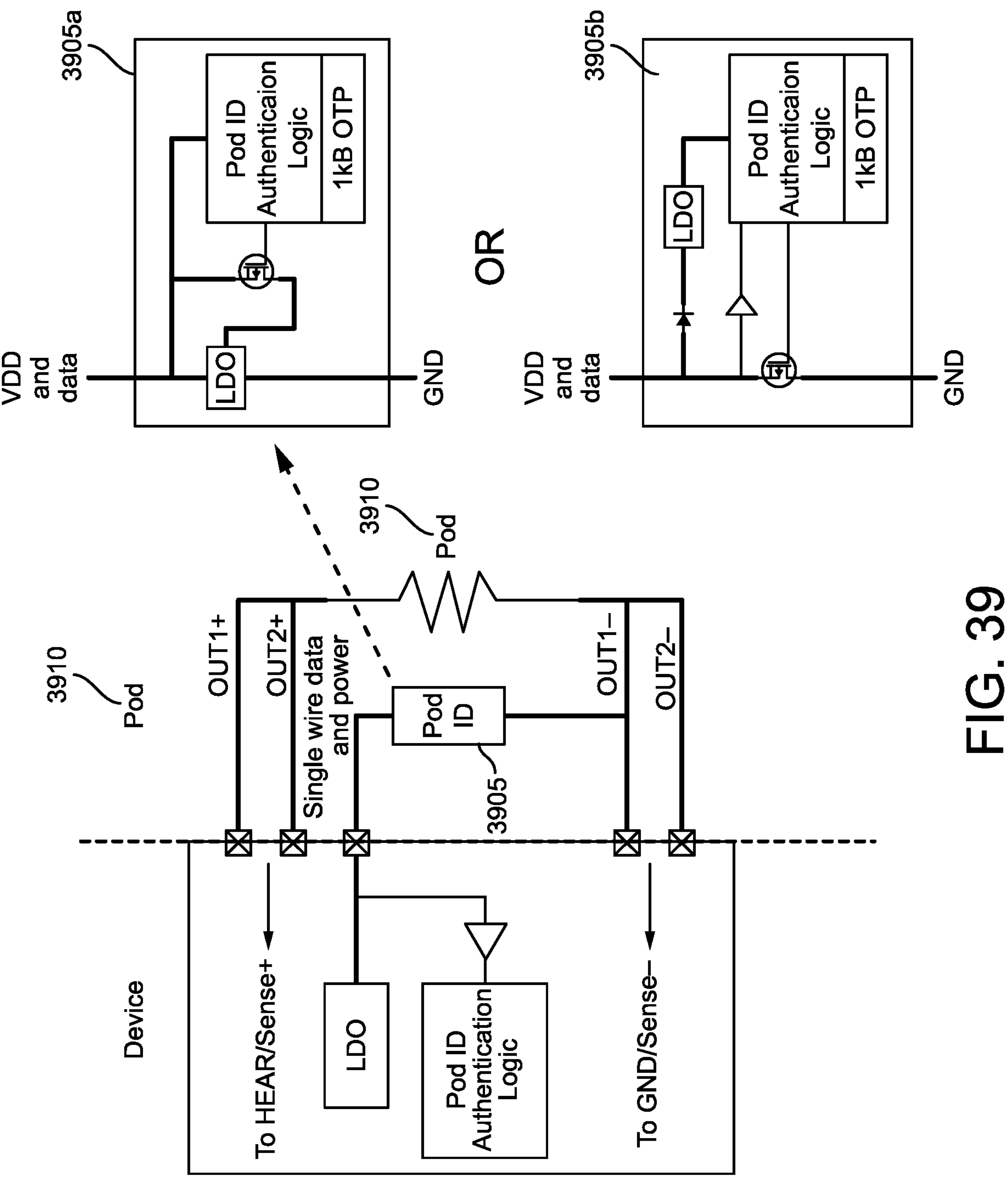

FIG. 39 is a block diagram illustrating pod identifier circuitry 3905 according to some implementations. The pod 3910 can contain a heating coil 3915 and pod identifier integrated circuit (PIC) 3905. Two example implementations of the PIC are illustrated at 3905*a* and 3905*b*.

The PIC 3905 can include a 2-pin device, one pin for ground and a second for both power and data. The PIC 3905 power and data over a single wire scheme can be flexible as long as the host IC on the device side uses the same protocol. In some implementations, the PIC 3905 can contain 1 kB OTP for sorting information, internal logic for reading/writing to OTP, and an internal power supply to properly supply the internal logic given the single wire power/data scheme. The PIC 3905 OTP storage of information can be user defined and flexible in structure. The PIC 3905 OTP can be designed to be programmed on the pod manufacturing line and cannot be modified/overwritten after programming. The PIC 3905 one time programming storage can be intended to store pod specific information such as serial number, flavor, coil resistance, and other various pod parameters. Such information can be utilized by the system to further enhance performance (e.g., heat consistency) and security via pod authentication.

As noted above, some aspects of the current subject matter relates to integrated power management and heater control. In some implementations, integrated power management unit 3200 can be formed as a single integrated circuit or multiple integrated circuits working together. The description herein relates to example vaporizer devices within which one or more features of the current subject matter can be implemented. These example vaporizer devices are described to provide context to descriptions of features provided by the current subject matter.

Figures 40A, 40B, 40C:
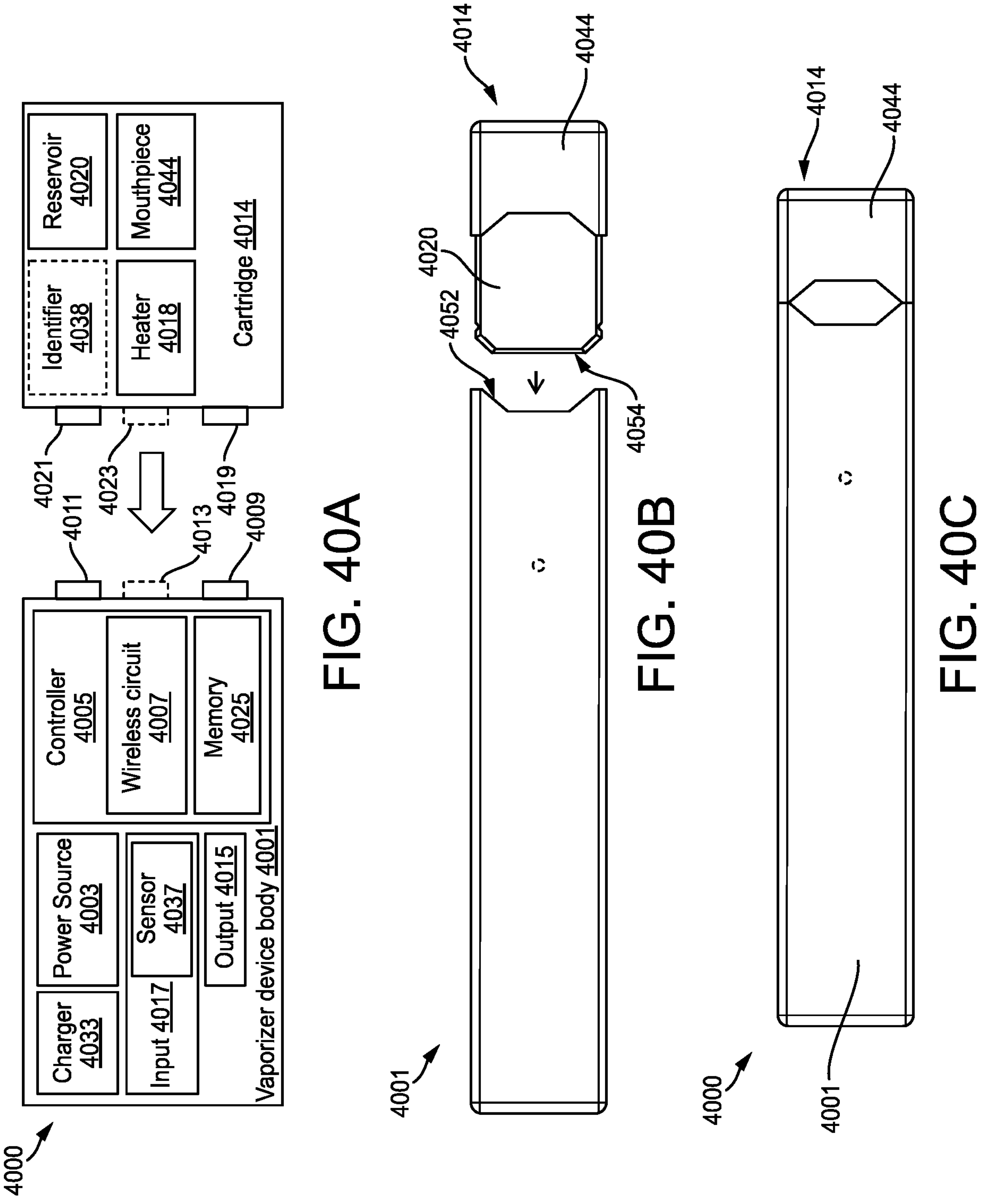
Figure 40E:
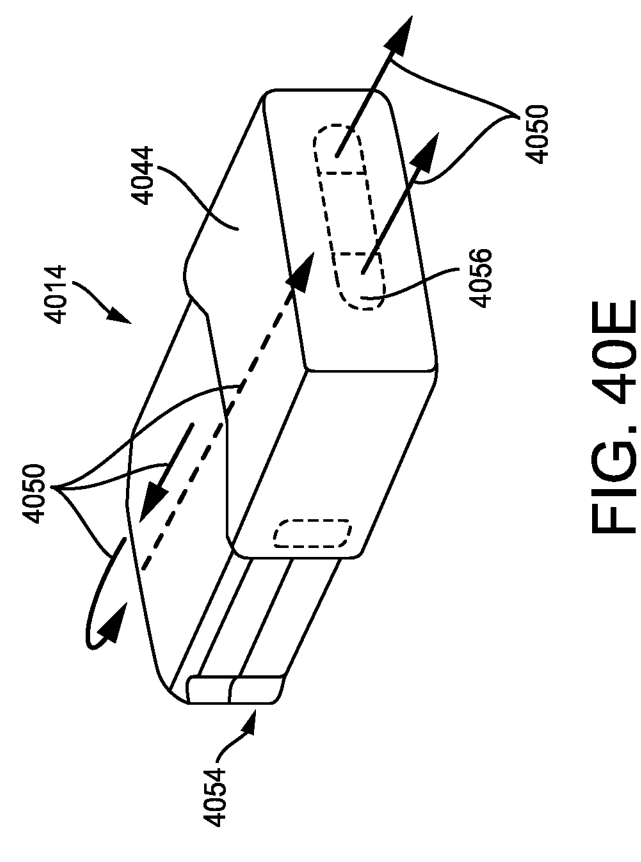
Figure 40D:
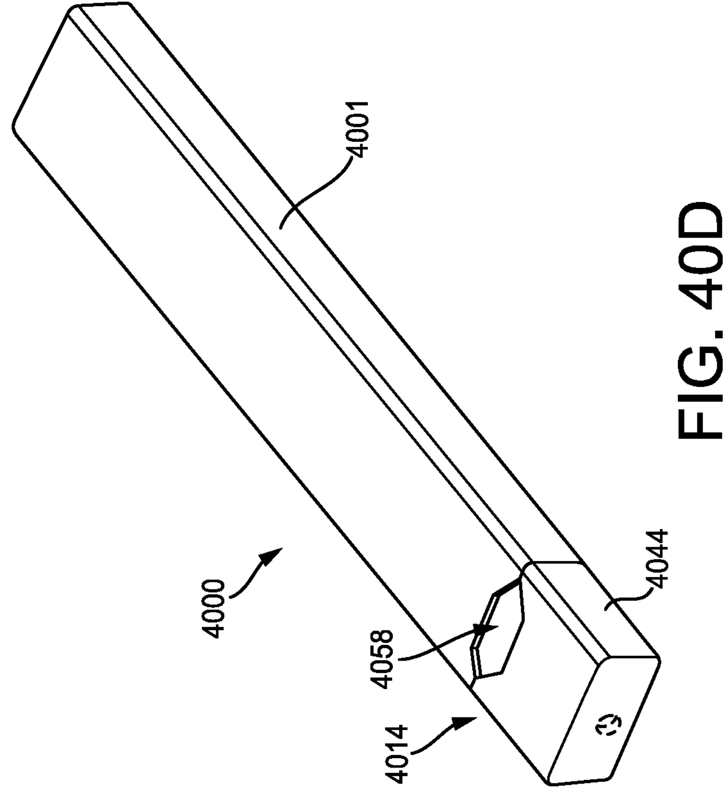

For example, in addition to the example vaporizer devices described above, FIGS. 40A-41C illustrate example vaporizer devices 4000, 4100 and features that may be included therein consistent with implementations of the current subject matter. FIG. 40A shows a schematic view of a vaporizer device 4000, that includes a cartridge 4014, and FIGS. 40B-40E show views of an exemplary vaporizer device 4000 with a vaporizer device body 4001 and a cartridge 4014. FIGS. 40B and 40C show top views before and after connecting a cartridge 4014 to a vaporizer device body 4001. FIG. 40D shows an isometric perspective view of the vaporizer device 4000, which includes a vaporizer device body 4001 combined with a cartridge 4014, and FIG. 40E shows an isometric perspective view of one variation of a cartridge 4014 holding a liquid vaporizable material. In general, when a vaporizer device includes a cartridge (such as the cartridge 4014), the cartridge 4014 may include one or more reservoirs 4020 configured to contain a vaporizable material. Any appropriate vaporizable material may be contained within the reservoir 4020 of the cartridge 4014, including solutions of nicotine or other organic materials as well as compositions that may include one or more neat (e.g., not dissolved in a solvent) chemical compounds, mixtures, formulations, etc.

As noted above, the vaporizer device 4000 shown in FIG. 40 includes a vaporizer device body 4001. As shown in FIG. 40, a vaporizer device body 4001 consistent with implementations of the current subject matter may include a power source 4003 (e.g., a device or system that stores electrical energy for on-demand use), which may be a battery, capacitor, a combination thereof, or the like, and which may be rechargeable or non-rechargeable. A controller 4005, which may include a processor (e.g., a programmable processor, special purpose circuitry, or the like), can also be included as part of the vaporizer device body 4001. The vaporizer device body 4001 may include a housing that encloses one or more of the components of the vaporizer body, such as the power source 4003, the controller 4005, and/or any of the other components described herein as being part of such a device. In various implementations of a vaporizer device that includes a vaporizer device body 4001 and a cartridge 4014, the cartridge 4014 may be attached on, in, or partially in the vaporizer device body 4001. For example, the vaporizer device body 4001 may include a cartridge receptacle 4052 into which the cartridge 4014 may be insertably received.

A processor of the controller 4005 may include circuitry to control operation of a heater 4018, which can optionally include one or more heating elements for vaporizing a vaporizable material contained within the cartridge 4014, for example within a reservoir or container that is part of the cartridge 4014. In various implementations, the heater 4018 may be present in the vaporizer device body 4001 or within the cartridge 4014 (as shown in FIG. 40A), or both. The controller circuitry may include one or more clocks (oscillators), charging circuitry, I/O controllers, memory, etc. Alternatively or in addition, the controller circuitry may include circuitry for one or more wireless communication modes, including Bluetooth, near-field communication (NFC), Wi-Fi, ultrasound, ZigBee, RFID, etc. The vaporizer device body 4001 may also include a memory 4025 that may be part of the controller 4005 or otherwise in data communication with the controller. The memory 4025 may include volatile (e.g., random access memory) and/or non-volatile (e.g., read-only memory, flash memory, solid state storage, a hard drive, other magnetic storage, etc.) memory or data storage.

Further with reference to FIG. 40, a vaporizer device 4000 may include a charger 4033 (and charging circuitry which may be controlled by the controller 4005), optionally including an inductive charger and/or a plug-in charger. For example, a universal serial bus (USB) connection may be used to charge the vaporizer device 4000 and/or to allow communication over a wired connection between a computing device and the controller 4005. The charger 4033 may charge the onboard power source 4003. A vaporizer device 4000 consistent with implementations of the current subject matter may also include one or more inputs 4017, such as buttons, dials, or the like, a sensor 4037, which may include one or more sensors such as accelerometers or other motion sensors, pressure sensors (e.g., relative and/or absolute pressure sensors, which may be capacitive, semiconductorbased, etc.), flow sensors, or the like. One more such sensors 4037 may be used by the vaporizer device 4000 to detect user handling and interaction. For example, detection of a rapid movement (such as a shaking motion) of the vaporizer device 4000 may be interpreted by the controller 4005 (e.g., through receipt of a signal from one or more of the sensors 4037) as a user command to begin communication with a user device that is part of a vaporizer system and that can be used for controlling one or more operations and/or parameters of the vaporizer device 4000 as described in more detail below. Additionally or alternatively, detection of a rapid movement (such as a shaking motion) of the vaporizer device 4000 may be interpreted by the controller 4005 (e.g., through receipt of a signal from one or more of the sensors 4037) as a user command to cycle through a plurality of temperature settings to which the vaporizable material held within the cartridge 4014 is to be heated by action of the heater 4018. In some optional variations, detection of removal of the cartridge 4014 by the controller 4005 (e.g., through receipt of a signal from one or more of the sensors 4037) during a cycling-through of the plurality of temperature settings may act to establish the temperature (e.g., when the cycle is at a desired temperature, a user may remove the cartridge 4014 to set the desired temperature). The cartridge 4014 may then be re-engaged with the vaporizer device body 4001 by the user to allow use of the vaporizer device 4000 with the heater controlled by the controller 4005 consistent with the selected temperature setting. The plurality of temperature settings may be indicated through one or more indicators on the vaporizer device body 4001. A pressure sensor can, as noted above, be used in detection of any of a start, an end, or a continuation of a puff.

A vaporizer device 4000 consistent with implementations of the current subject matter may also include one or more outputs 4015. Outputs 4015 as used herein can refer to any of optical (e.g., LEDs, displays, etc.), tactile (e.g., vibrational, etc.), or sonic (e.g., piezoelectric, etc.) feedback components, or the like, or some combination thereof.

A vaporizer device 4000 consistent with implementations of the current subject that includes a cartridge 4014 may include one or more electrical contacts (e.g., pins, plates, sockets, mating receptacles or other features for coupling electrically with other contacts, etc.), such as the vaporizer device body electrical contacts 4009, 4011, 4013 shown in FIG. 40A) on or within the vaporizer device body 4001 that may engage complementary cartridge contacts 4019, 4021, 4023 (e.g., pins, plates, sockets, mating receptacles or other features for coupling electrically with other contacts, etc.) on the cartridge 4014 when the cartridge is engaged with the vaporizer device body 4001. The contacts on the vaporizer body 4001 are generally referred to herein as "vaporizer body contacts" and those on the cartridge 4014 are generally referred herein to as "cartridge contacts." These contacts may be used to provide energy from the power source 4003 to the heater 4018 in implementations of the current subject matter in which the heater 4018 is included in the cartridge 4014. For example, when the cartridge contacts and the vaporizer body contacts are respectively engaged by coupling of the cartridge 4014 with the vaporizer device body 4001, an electrical circuit can be formed allowing control of power flow from the power source 4003 in the vaporizer device body 4001 to the heater 4018 in the cartridge 4014. A controller 4005 in the vaporizer device body 4001 can regulate this power flow to control a temperature at which the heater 4018 heats a vaporizable material contained in the cartridge 4014.

While three vaporizer device body contacts 4009, 4011, 4013 and three cartridge contacts 4019, 4021, 4023 are shown, certain implementations of the current subject matter may use only two of each type of contacts to complete an electrical circuit that can be used for power delivery from the power source 4003 to the heater 4018 and optionally also for measuring a temperature of a heating element in the heater (e.g., by briefly and intermittently interrupting a flow of current to the heating element, measuring a resistance of the heating element during these brief interruptions, and using a thermal resistance coefficient to obtain temperature from the measured resistance) and/or transmitting data between an optional identifier 4038 and the controller 4005. Alternatively or in addition, additional contacts (e.g., optional contacts 4013 and 4023) may be included for data passing, temperature measurements, pressure sensor measurements (e.g., if a pressure sensor is included on the cartridge while the controller 4005 is in the vaporizer device body 4001).

An airflow path (4050, in FIG. 40E) can direct air to the heater, where the air is combined with vaporized vaporizable material from a reservoir 4020 such that an inhalable aerosol is generated for delivery to a user via a mouthpiece 4044, which can also be part of the cartridge 4014. The airflow path 4050 may, in some examples, pass between an outer surface of the cartridge 4014 and an inner surface of a cartridge receptacle on the vaporizer device body 4001 as described further below.

Any compatible electrical contact may be used, including pins (e.g., pogo pins), plates, and the like. In addition, as described below, in some implementations of the current subject matter one-way or two-way communication is provided between the vaporizer device body 4001 and the cartridge 4014 through one or more electrical contacts, which may include the electrical contacts used to provide energy from the power source 4003 to the heater 4018, which may include a heating element such as a resistive heating element. The cartridge 4014 and the vaporizer device body 4001 may be removably coupled together, e.g., by engaging a portion of a housing of the cartridge 4014 with the vaporizer device body 4001 and/or the vaporizer housing in a mechanical connection (e.g., a snap and/or friction fit). Alternatively or additionally, the cartridge 4014 and the vaporizer device body 4001 may be coupled magnetically or via some other coupling or engaging mechanism. Other connection types are also within the scope of the current subject matter, as are combinations of two or more connection types.

Figures 40F, 41A:
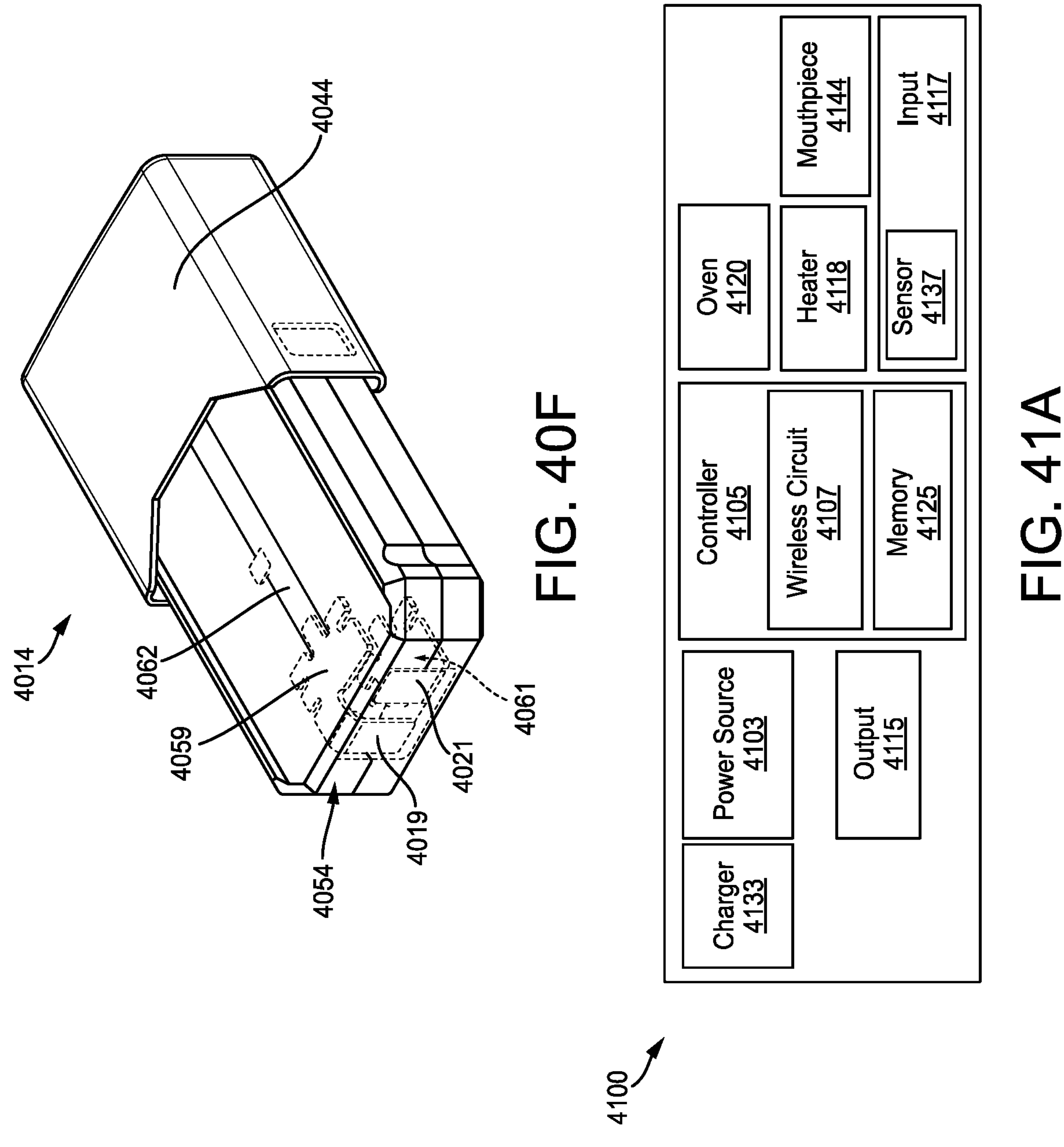

FIGS. 40B to 40F illustrate an example of a vaporizer 4000 with a vaporizer device body 4001 and cartridge 4014. The two are shown unconnected in FIG. 40B and connected in FIG. 40C. FIG. 40D shows an isometric perspective view of the combined vaporizer device body 4001 and cartridge 4014, and FIG. 40E and FIG. 40F shows an individual cartridge 4014 from two different views. FIGS. 40B-40F in combination illustrate an example cartridge-based vaporizer device including many of the features generally shown in FIG. 40A. Other configurations, including some or all of the features described herein, are also within the scope of the current subject matter. FIG. 40D shows a vaporizer device 4000 having a cartridge 4014 coupled into a cartridge receptacle 4052 of the vaporizer device body 4001. In some implementations of the current subject matter, the reservoir 4020 may be formed in whole or in part from translucent material such that a level of the vaporizable material is visible from a window 4058. The cartridge 4014 and/or the vaporizer device body 4001 may be configured such that the window 4058 remains visible when the cartridge 4014 is insertably received by the cartridge receptacle 4052. For example, in one exemplary configuration, the window 4058 may be disposed between a bottom edge of the mouthpiece 4044 and a top edge of the vaporizer device body 4001 when the cartridge 4014 is coupled with the cartridge receptacle 4052.

FIG. 40E illustrates an example of an airflow path 4050 for air to be drawn by a user puff from outside of the cartridge 4014 past the heater 4018 (e.g., through a vaporization chamber that includes or contains the heater 4018, and on to the mouthpiece 4044 for delivery of the inhalable aerosol. The mouthpiece may optionally have multiple openings through which the inhalable aerosol is delivered. For example, a cartridge receptacle 4052 may be present at one end of a vaporizer device body 4001, such that an insertable end 4054 of the cartridge 4014 may be insertably received into the cartridge receptacle 4052. When the cartridge insertable end 4054 is fully inserted into the cartridge receptacle 4052, an inner surface of the cartridge receptacle 4052 forms one surface of part of the airflow path 4050 and an exterior surface of the cartridge insertable end 4054 forms another surface of that part of the airflow path.

As shown in FIG. 40E, this configuration causes air to flow down around the cartridge insertable end 4054 into the cartridge receptacle 4052 and then back in the opposite direction after passing around the inserted end (e.g., an end opposite an end that includes the mouthpiece 4044) of the cartridge 4014 as it enters into the cartridge body toward the vaporization chamber and heater 4018. The airflow path 4050 then travels through the interior of the cartridge 4014, for example via one or more tubes or internal channels to one or more outlets 4056 formed in the mouthpiece 4044. For a cartridge having a non-cylindrical shape, the mouthpiece 4044 may likewise be non-cylindrical, and more than one outlets 4056 may be formed in the mouthpiece, optionally arranged in a line along a longer of two transverse axes of the cartridge 4014, where a longitudinal axis of the cartridge is oriented along a direction the cartridge 4014 is moved to be insertably received or otherwise coupled to the vaporizer device body 4001 and the two transverse axes are perpendicular to each other and to the longitudinal axis.

FIG. 40F shows additional features that may be included in a cartridge 4014 consistent with the current subject matter. For example, the cartridge 4014 can include two cartridge contacts 4019, 4021 disposed on the insertable end 4054, which is configured to be inserted into the cartridge receptacle 4052 of a vaporizer device body 4001. These cartridge contacts 4019, 4021 can optionally each be part of a single piece of metal that forms a conductive structure 4059, 4061 connected to one of two ends of a resistive heating element. The two conductive structures can optionally form opposing sides of a heating chamber and can also act as heat shields and/or heat sinks to reduce transmission of heat to outer walls of the cartridge 4014. FIG. 40F also shows a central tube 4062 within the cartridge 4014 that defines part of the airflow path 4050 between the heating chamber formed between the two conductive structures 4059, 4061 and the mouthpiece 4044.

As mentioned above, the cartridge 4014 and optionally the vaporizer device body 4001 may optionally be non-circular in cross section, with various oblong (e.g., one of two transverse axes which are orthogonal to a longitudinal axis of the vaporizer device 4000 being longer than the other) cross-sectional shapes contemplated, including approximately rectangular, approximately rhomboidal, approximately triangular or trapezoidal, approximately oval in shape, etc. It will be well understood by one of ordinary skill in the art that the use of "approximately" in this context contemplates that any vertices of the cross-sectional shape need not be sharp, but can instead have a non-zero radius of curvature, and that any surfaces between such vertices need not be completely planar but can instead have a non-infinite radius of curvature.

Although the examples described herein with respect to FIGS. 1-40F are directed to a vaporizer that utilizes a removable cartridge, the vaporizer device consistent with implementations of the current subject matter is not limited to such a device configuration. For example, a vaporizer cartridge 52 and/or cartridge 4014 may be incorporated as part of a vaporizer body 50, 250, 350, 450, 650 and/or vaporizer body 4001 that includes a reservoir in which the atomizer and the heating element are included or in contact with.

For example, FIGS. 41A-41C relate to an example implementation of the current subject matter in which the vaporizer device is not cartridge based. FIG. 41A shows a schematic diagram of a vaporizer device 4100 that does not use a cartridge (but may still optionally accept a cartridge), but may instead (or additionally) be configured for use with a loose-leaf material or some other vaporizable material (e.g., a solid, a wax, etc.). The vaporizer device 4100 in FIG. 41A may be configured to receive, in an oven 4120 (e.g., a vaporization chamber), a vaporizable material such as a loose vaporizable material, a wax, and/or some other liquid or solid vaporizable material. Many elements similar to those present in the vaporizer device 4000 using a cartridge 4014 shown in FIG. 40A-40E may also be included as part of a vaporizer device 4100 that does not require use of cartridges. For example, a vaporizer device 4100 may include, in one housing, controller 4005 which may include power control circuitry, and/or wireless circuitry 4107, and/or memory 4025. A power source 4003 (e.g., a battery, capacitor, etc.) within the housing may be charged by a charger 4033 (and may include charging control circuitry, not shown). The vaporizer device 4100 may also include one or more outputs 4015 and one or more inputs 4017 with sensors 4037, which may include one or more of the sensors discussed above in regards to the cartridge-based vaporizer device 4000. In addition, the vaporizer device 4100 may include one or more heaters 4018 that heat a vaporization chamber, which may be an oven 4120 or other heating chamber. The heater 4018 may be controlled using the resistance of the heater 4018 to determine the temperature of the heater, e.g., by using the temperature coefficient of resistivity for the heater. A mouthpiece 4044 may also be included in such a vaporizer device 4100 for delivery of a generated inhalable aerosol to a user. FIG. 41B shows a side isometric perspective of an exemplary vaporizer device 4100 with a vaporizer device body 4101. In the bottom isometric perspective view of FIG. 41C, a lid 4130 is shown removed from the vaporizer body 4101, exposing the oven/vaporization chamber 4120.

A vaporizer device consistent with implementations of the current subject matter may have an orientation other than that shown in the exemplary illustrations of FIGS. 1-41C.

Terminology

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the teachings herein. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A vaporizer device, comprising:
- an outer shell;
- a skeleton forming a rigid tray configured to be located within the outer shell, the rigid tray comprising:
  - a back wall;
  - a first side wall extending from a first side of the back wall; and
  - a second side wall extending from a second side of the back wall, the second side wall approximately parallel to the first side wall, wherein the back wall, the first side wall, and the second side wall define an interior volume;
- a power source; and
- electrical circuitry electrically coupled to the power source, wherein the electrical circuitry is configured to supply power to a vaporizer cartridge coupled to the vaporizer device, and wherein the power source and the electrical circuitry are secured to the skeleton and at least partially positioned within the interior volume.

2. The vaporizer device of claim 1, wherein the vaporizer cartridge comprises:
- a reservoir configured to store vaporizable material;
- a wicking element configured to wick the vaporizable material stored within the reservoir; and
- a heating element in thermal contact with the wicking element and configured to vaporize the vaporizable material when supplied with power via the electrical circuitry.

3. The vaporizer device of claim 1, further comprising a cartridge receptacle configured to receive the vaporizer cartridge, the outer shell at least partially defining the cartridge receptacle, and at least a portion of the electrical circuitry disposed within the cartridge receptacle to electrically couple to the vaporizer cartridge.

4. The vaporizer device of claim 1, further comprising a cartridge connector configured to mechanically secure the vaporizer cartridge to the vaporizer device such that the vaporizer cartridge is electrically coupled to the electrical circuitry.

5. The vaporizer device of claim 4, wherein the first side wall comprises a first retainer spring at a first end portion of the first side wall, the first retainer spring configured to secure the cartridge connector to the skeleton at a first end of the skeleton.

6. The vaporizer device of claim 5, wherein the second side wall comprises a second retainer spring at a second end portion of the second side wall, the second retainer spring configured to secure the cartridge connector to the skeleton.

7. The vaporizer device of claim 6, wherein the first retainer spring and the second retainer spring extend towards the interior volume.

8. The vaporizer device of claim 6, wherein the first retainer spring and the second retainer spring are biased towards the interior volume.

9. The vaporizer device of claim 6, wherein the first retainer spring and the second retainer spring are each securable to the cartridge connector via a snap-fit arrangement.

10. The vaporizer device of claim 4, wherein the cartridge connector comprises a cartridge connector body and at least two receptacle contacts coupled to the cartridge connector body, the at least two receptacle contacts configured to electrically communicate with at least two cartridge contacts of the vaporizer cartridge and supply power to the vaporizer cartridge via the electrical circuitry.

11. The vaporizer device of claim 4, wherein the outer shell comprises metal.

12. The vaporizer device of claim 11, further comprising an end cap module configured to mechanically couple with the skeleton, wherein the end cap module comprises:
- an antenna configured to wirelessly communicate with an external device; and
- an antenna carrier configured to isolate the antenna from the outer shell to improve antenna performance, wherein the antenna carrier is disposed outside of the outer shell when the skeleton is located within the outer shell.

13. The vaporizer device of claim 12, wherein the antenna carrier comprises plastic and is configured to support the antenna.

14. The vaporizer device of claim 12, wherein the skeleton comprises a first end and a second end, wherein the end is opposite the second end, and wherein the end cap module is configured to be coupled to the second end of the skeleton.

15. The vaporizer device of claim 12, wherein at least a portion of the end cap module is positioned within the outer shell.

16. The vaporizer device of claim 12, wherein at least a portion of the end cap module is positioned outside of the outer shell.

17. The vaporizer device of claim 4, wherein the skeleton further comprises a first end and a second end opposite the first end, and wherein the cartridge connector is configured to be coupled to the first end, the cartridge connector being coupleable to the vaporizer cartridge.

18. The vaporizer device of claim 1, wherein the skeleton further comprises a securement member, the securement member extending from the first side wall and the second side wall to at least partially surround the interior volume.

19. The vaporizer device of claim 18, wherein the securement member is configured to surround at least a portion of the cartridge connector that is located within the interior volume.

* * * * *